United States Patent
Story et al.

(10) Patent No.: US 11,481,094 B2
(45) Date of Patent: Oct. 25, 2022

(54) USER INTERFACES FOR LOCATION-RELATED COMMUNICATIONS

(71) Applicant: Apple Inc., Cupertino, CA (US)

(72) Inventors: Hannah S. Story, San Mateo, CA (US); Nabila Rahman, San Francisco, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 92 days.

(21) Appl. No.: 17/020,382

(22) Filed: Sep. 14, 2020

(65) Prior Publication Data

US 2020/0409537 A1 Dec. 31, 2020

Related U.S. Application Data

(63) Continuation-in-part of application No. 16/669,187, filed on Oct. 30, 2019.
(Continued)

(51) Int. Cl.
*G06F 3/04842* (2022.01)
*H04W 4/029* (2018.01)
(Continued)

(52) U.S. Cl.
CPC ........ *G06F 3/04842* (2013.01); *G06F 3/0482* (2013.01); *H04L 67/52* (2022.05); *H04W 4/029* (2018.02)

(58) Field of Classification Search
CPC ... G06F 3/04842; G06F 3/0482; H04L 67/18; H04L 67/306; H04W 4/029; H04W 4/80;
(Continued)

(56) References Cited

U.S. PATENT DOCUMENTS 4,803,487 A 2/1989 Willard et al.
5,237,159 A 8/1993 Stephens et al.
(Continued)

FOREIGN PATENT DOCUMENTS

AU 2016102028 B4 7/2017
CA 2545339 A1 11/2007
(Continued)

OTHER PUBLICATIONS

Board Opinion received for Chinese Patent Application No. 201810094316.X, dated Sep. 30, 2021, 11 pages (3 pages of English Translation and 8 pages of Official Copy).
(Continued)

*Primary Examiner* — Christopher M Brandt
(74) *Attorney, Agent, or Firm* — Dentons US LLP

(57) ABSTRACT

The present disclosure generally relates to managing location-related communications of an electronic device associated with a user account. In some embodiments, techniques are discussed for managing location-related communications by pausing display of location-related communications while location-related alerts are enabled. In some embodiments, an option for pausing the alerts is displayed with a set of one or more alert conditions. In some embodiments, techniques are discussed for managing location-related communications by automatically generating a second alert after a first alert was generated in response to a set of alert criteria being met.

21 Claims, 54 Drawing Sheets

Related U.S. Application Data

(60) Provisional application No. 62/856,005, filed on Jun. 1, 2019.

(51) Int. Cl.
  *G06F 3/0482* (2013.01)
  *H04L 67/52* (2022.01)

(58) Field of Classification Search
  CPC .. H04W 4/023; H04W 4/021; H04M 1/72457
  See application file for complete search history.

(56) References Cited

U.S. PATENT DOCUMENTS

| | | |
|---|---|---|
| 5,265,007 A | 11/1993 | Barnhard, Jr. et al. |
| 5,345,552 A | 9/1994 | Brown |
| 5,475,653 A | 12/1995 | Yamada et al. |
| 5,484,988 A | 1/1996 | Hills et al. |
| 5,655,094 A | 8/1997 | Cline et al. |
| 5,691,524 A | 11/1997 | Josephson |
| 5,717,868 A | 2/1998 | James |
| 5,745,116 A | 4/1998 | Pisutha-arnond |
| 5,783,808 A | 7/1998 | Josephson |
| 5,910,989 A | 6/1999 | Naccache |
| 5,917,913 A | 6/1999 | Wang |
| 5,943,055 A | 8/1999 | Sylvan |
| 5,983,197 A | 11/1999 | Enta |
| 6,016,484 A | 1/2000 | Williams et al. |
| 6,052,709 A | 4/2000 | Paul |
| 6,164,528 A | 12/2000 | Hills et al. |
| 6,181,837 B1 | 1/2001 | Cahill et al. |
| 6,189,785 B1 | 2/2001 | Lowery |
| 6,193,152 B1 | 2/2001 | Fernando et al. |
| 6,230,148 B1 | 5/2001 | Pare, Jr. et al. |
| 6,253,075 B1 | 6/2001 | Beghtol et al. |
| 6,260,027 B1 | 7/2001 | Takahashi et al. |
| 6,282,656 B1 | 8/2001 | Wang |
| 6,328,207 B1 | 12/2001 | Gregoire et al. |
| 6,385,644 B1 | 5/2002 | Devine et al. |
| 6,396,513 B1 | 5/2002 | Helfman et al. |
| 6,398,646 B1 | 6/2002 | Wei et al. |
| 6,489,977 B2 | 12/2002 | Sone et al. |
| 6,498,835 B1 | 12/2002 | Skladman et al. |
| 6,515,988 B1 | 2/2003 | Eldridge et al. |
| 6,581,042 B2 | 6/2003 | Pare, Jr. et al. |
| 6,597,378 B1 | 7/2003 | Shiraishi et al. |
| 6,644,546 B2 | 11/2003 | George et al. |
| 6,661,438 B1 | 12/2003 | Shiraishi et al. |
| 6,662,166 B2 | 12/2003 | Pare, Jr. et al. |
| 6,792,085 B1 | 9/2004 | Rigaldies et al. |
| 6,941,345 B1 | 9/2005 | Kapil et al. |
| 6,950,810 B2 | 9/2005 | Lapsley et al. |
| 6,970,855 B2 | 11/2005 | Das et al. |
| 6,999,469 B1 | 2/2006 | Chu et al. |
| 7,017,119 B1 | 3/2006 | Johnston et al. |
| 7,099,845 B2 | 8/2006 | Higgins et al. |
| 7,099,850 B1 | 8/2006 | Mann et al. |
| 7,155,411 B1 | 12/2006 | Blinn et al. |
| 7,356,516 B2 | 4/2008 | Richey et al. |
| 7,359,880 B2 | 4/2008 | Abel et al. |
| 7,430,537 B2 | 9/2008 | Templeton et al. |
| 7,535,344 B2 | 5/2009 | Obradovich |
| 7,644,019 B2 | 1/2010 | Woda et al. |
| 7,657,441 B2 | 2/2010 | Richey et al. |
| 7,689,508 B2 | 3/2010 | Davis et al. |
| 7,953,393 B2 | 5/2011 | Chin et al. |
| 7,996,045 B1 | 8/2011 | Bauer et al. |
| 8,050,997 B1 | 11/2011 | Nosek et al. |
| 8,099,669 B2 | 1/2012 | Nixon et al. |
| 8,144,136 B2 | 3/2012 | Minakuchi et al. |
| 8,150,930 B2 | 4/2012 | Satterfield et al. |
| 8,157,164 B1 | 4/2012 | Billman |
| 8,171,137 B1 | 5/2012 | Parks et al. |
| 8,195,507 B2 | 6/2012 | Postrel |
| 8,285,258 B2 | 10/2012 | Schultz et al. |
| 8,392,259 B2 | 3/2013 | Macgillivray et al. |
| 8,434,133 B2 | 4/2013 | Kulkarni et al. |
| 8,452,654 B1 | 5/2013 | Wooters et al. |
| 8,478,816 B2 | 7/2013 | Parks et al. |
| 8,504,114 B1 | 8/2013 | Tseng |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,612,294 B1 | 12/2013 | Treyz et al. |
| 8,613,070 B1 | 12/2013 | Deva et al. |
| 8,762,272 B1 | 6/2014 | Cozens et al. |
| 8,763,896 B2 | 7/2014 | Kushevsky et al. |
| 8,831,677 B2 | 9/2014 | Villa-real |
| 8,892,474 B1 | 11/2014 | Shroyer et al. |
| 8,924,292 B1 | 12/2014 | Ellis et al. |
| 8,983,539 B1 | 3/2015 | Kim et al. |
| 9,219,620 B2 | 12/2015 | Nixon |
| 9,292,310 B2 | 3/2016 | Chaudhri et al. |
| 9,324,067 B2 | 4/2016 | Steele et al. |
| 9,405,766 B2 | 8/2016 | Robbin et al. |
| 9,461,833 B1 | 10/2016 | Marra et al. |
| 9,483,763 B2 | 11/2016 | Van Os et al. |
| 9,507,608 B2 | 11/2016 | Block et al. |
| 9,519,901 B1 | 12/2016 | Dorogusker |
| 9,558,636 B1 | 1/2017 | Burdick |
| 9,575,591 B2 | 2/2017 | Yang et al. |
| 9,628,950 B1 | 4/2017 | Noeth et al. |
| 9,652,741 B2 | 5/2017 | Goldberg et al. |
| 9,808,206 B1 | 11/2017 | Zhao et al. |
| 9,846,685 B2 | 12/2017 | Li |
| 9,851,214 B1 | 12/2017 | Chintakindi |
| 10,019,904 B1 | 7/2018 | Chan et al. |
| 10,225,711 B2 | 3/2019 | Parks et al. |
| 10,254,911 B2 | 4/2019 | Yang |
| 10,417,037 B2 | 9/2019 | Gruber et al. |
| 10,482,461 B2 | 11/2019 | Van Os et al. |
| 2001/0030597 A1 | 10/2001 | Inoue et al. |
| 2002/0004760 A1 | 1/2002 | Yoshida et al. |
| 2002/0023215 A1 | 2/2002 | Wang et al. |
| 2002/0037715 A1 | 3/2002 | Mauney et al. |
| 2002/0046064 A1 | 4/2002 | Maury et al. |
| 2002/0065774 A1 | 5/2002 | Young et al. |
| 2002/0198906 A1 | 12/2002 | Press |
| 2003/0006280 A1 | 1/2003 | Seita et al. |
| 2003/0055977 A1 | 3/2003 | Miller |
| 2003/0061157 A1 | 3/2003 | Hirka et al. |
| 2003/0079057 A1 | 4/2003 | Ruskin et al. |
| 2003/0098871 A1 | 5/2003 | Kawano et al. |
| 2003/0128237 A1 | 7/2003 | Sakai |
| 2003/0151982 A1 | 8/2003 | Brewer et al. |
| 2003/0200184 A1 | 10/2003 | Dominguez et al. |
| 2003/0236746 A1 | 12/2003 | Turner et al. |
| 2004/0041841 A1 | 3/2004 | Lemogne et al. |
| 2004/0100389 A1 | 5/2004 | Naito et al. |
| 2004/0113953 A1 | 6/2004 | Newman |
| 2004/0122685 A1 | 6/2004 | Bunce |
| 2004/0143553 A1 | 7/2004 | Torget et al. |
| 2004/0215572 A1 | 10/2004 | Uehara et al. |
| 2004/0254891 A1 | 12/2004 | Blinn et al. |
| 2005/0018823 A1 | 1/2005 | Adamczyk et al. |
| 2005/0117601 A1 | 6/2005 | Anderson et al. |
| 2005/0187873 A1 | 8/2005 | Labrou et al. |
| 2005/0250538 A1 | 11/2005 | Narasimhan et al. |
| 2005/0268237 A1 | 12/2005 | Crane et al. |
| 2006/0000900 A1 | 1/2006 | Fernandes et al. |
| 2006/0026245 A1 | 2/2006 | Cunningham et al. |
| 2006/0064372 A1 | 3/2006 | Gupta |
| 2006/0092177 A1 | 5/2006 | Blasko et al. |
| 2006/0099970 A1 | 5/2006 | Morgan et al. |
| 2006/0101350 A1 | 5/2006 | Scott et al. |
| 2006/0123427 A1 | 6/2006 | Harold et al. |
| 2006/0132456 A1 | 6/2006 | Anson |
| 2006/0165060 A1 | 7/2006 | Dua et al. |
| 2006/0208065 A1 | 9/2006 | Mendelovich et al. |
| 2006/0224985 A1 | 10/2006 | Baek et al. |
| 2006/0229014 A1 | 10/2006 | Harada et al. |
| 2006/0294007 A1 | 12/2006 | Barthelemy |
| 2006/0294025 A1 | 12/2006 | Mengerink |
| 2006/0294452 A1 | 12/2006 | Matsumoto |

(56) References Cited

U.S. PATENT DOCUMENTS

| | | |
|---|---|---|
| 2007/0036300 A1 | 2/2007 | Brown et al. |
| 2007/0061786 A1 | 3/2007 | Zhou et al. |
| 2007/0192168 A1 | 8/2007 | Van |
| 2007/0194113 A1 | 8/2007 | Esplin et al. |
| 2007/0219901 A1 | 9/2007 | Garbow et al. |
| 2007/0254712 A1 | 11/2007 | Chitti |
| 2007/0255564 A1 | 11/2007 | Yee et al. |
| 2007/0259654 A1 | 11/2007 | Oijer |
| 2007/0288932 A1 | 12/2007 | Horvitz et al. |
| 2008/0004113 A1 | 1/2008 | Avery et al. |
| 2008/0011827 A1 | 1/2008 | Little et al. |
| 2008/0012701 A1 | 1/2008 | Kass et al. |
| 2008/0016368 A1 | 1/2008 | Adams |
| 2008/0016537 A1 | 1/2008 | Little et al. |
| 2008/0041936 A1 | 2/2008 | Vawter |
| 2008/0043958 A1 | 2/2008 | May et al. |
| 2008/0054081 A1 | 3/2008 | Mullen |
| 2008/0059351 A1 | 3/2008 | Richey et al. |
| 2008/0077673 A1 | 3/2008 | Thomas et al. |
| 2008/0078831 A1 | 4/2008 | Johnson et al. |
| 2008/0091166 A1 | 4/2008 | Fitzgerald et al. |
| 2008/0094371 A1 | 4/2008 | Forstall et al. |
| 2008/0119176 A1 | 5/2008 | Chen et al. |
| 2008/0153464 A1 | 6/2008 | Morris |
| 2008/0165136 A1 | 7/2008 | Christie et al. |
| 2008/0180408 A1 | 7/2008 | Forstall et al. |
| 2008/0220752 A1 | 9/2008 | Forstall et al. |
| 2008/0275779 A1 | 11/2008 | Lakshminarayanan |
| 2008/0301580 A1 | 12/2008 | Hjelmeland Alams et al. |
| 2008/0319875 A1 | 12/2008 | Levchin et al. |
| 2008/0320391 A1 | 12/2008 | Lemay et al. |
| 2009/0005011 A1 | 1/2009 | Christie et al. |
| 2009/0030793 A1 | 1/2009 | Fordyce, III |
| 2009/0036165 A1 | 2/2009 | Brede |
| 2009/0037093 A1 | 2/2009 | Kurihara et al. |
| 2009/0055494 A1 | 2/2009 | Fukumoto et al. |
| 2009/0082043 A1 | 3/2009 | Lazaridis |
| 2009/0088207 A1 | 4/2009 | Sweeney et al. |
| 2009/0138815 A1 | 5/2009 | Mercer |
| 2009/0159696 A1 | 6/2009 | Mullen |
| 2009/0181726 A1 | 7/2009 | Vargas et al. |
| 2009/0182674 A1 | 7/2009 | Patel et al. |
| 2009/0195469 A1 | 8/2009 | Lim et al. |
| 2009/0207743 A1 | 8/2009 | Huq et al. |
| 2009/0210308 A1 | 8/2009 | Toomer et al. |
| 2009/0222748 A1 | 9/2009 | Lejeune et al. |
| 2009/0222842 A1 | 9/2009 | Narayanan et al. |
| 2009/0228868 A1 | 9/2009 | Forstall et al. |
| 2009/0244015 A1 | 10/2009 | Sengupta et al. |
| 2009/0248247 A1 | 10/2009 | Furuichi et al. |
| 2009/0249247 A1 | 10/2009 | Tseng et al. |
| 2009/0284476 A1 | 11/2009 | Bull et al. |
| 2009/0298444 A1 | 12/2009 | Shigeta |
| 2009/0307715 A1 | 12/2009 | Santamaria et al. |
| 2009/0325630 A1 | 12/2009 | Tiitola et al. |
| 2009/0327151 A1 | 12/2009 | Carlson et al. |
| 2010/0020035 A1 | 1/2010 | Ryu et al. |
| 2010/0042517 A1 | 2/2010 | Paintin et al. |
| 2010/0058231 A1 | 3/2010 | Duarte et al. |
| 2010/0058333 A1 | 3/2010 | Peterson |
| 2010/0082445 A1 | 4/2010 | Hodge et al. |
| 2010/0082462 A1 | 4/2010 | Yuan et al. |
| 2010/0082481 A1 | 4/2010 | Lin et al. |
| 2010/0088692 A1 | 4/2010 | Rathi et al. |
| 2010/0103125 A1 | 4/2010 | Kim et al. |
| 2010/0114731 A1 | 5/2010 | Kingston et al. |
| 2010/0123724 A1 | 5/2010 | Moore et al. |
| 2010/0131303 A1 | 5/2010 | Collopy et al. |
| 2010/0144368 A1 | 6/2010 | Sullivan et al. |
| 2010/0146384 A1 | 6/2010 | Peev et al. |
| 2010/0146437 A1 | 6/2010 | Woodcock et al. |
| 2010/0149090 A1 | 6/2010 | Morris et al. |
| 2010/0153265 A1 | 6/2010 | Hershfield et al. |
| 2010/0159995 A1 | 6/2010 | Stallings et al. |
| 2010/0161434 A1 | 6/2010 | Herwig et al. |
| 2010/0162169 A1 | 6/2010 | Skarp |
| 2010/0171759 A1 | 7/2010 | Nickolov et al. |
| 2010/0191570 A1 | 7/2010 | Michaud et al. |
| 2010/0191818 A1 | 7/2010 | Satterfield et al. |
| 2010/0199359 A1 | 8/2010 | Miki |
| 2010/0205091 A1 | 8/2010 | Graziano et al. |
| 2010/0216425 A1 | 8/2010 | Smith |
| 2010/0223145 A1 | 9/2010 | Dragt |
| 2010/0227600 A1 | 9/2010 | Vander Veen et al. |
| 2010/0228836 A1 | 9/2010 | Lehtovirta et al. |
| 2010/0243741 A1 | 9/2010 | Eng |
| 2010/0251243 A1 | 9/2010 | Gill et al. |
| 2010/0257490 A1 | 10/2010 | Lyon et al. |
| 2010/0267362 A1 | 10/2010 | Smith et al. |
| 2010/0269040 A1 | 10/2010 | Lee |
| 2010/0281409 A1 | 11/2010 | Rainisto et al. |
| 2010/0287513 A1 | 11/2010 | Singh et al. |
| 2010/0292600 A1 | 11/2010 | Dibenedetto et al. |
| 2010/0299436 A1 | 11/2010 | Khalid et al. |
| 2010/0306705 A1 | 12/2010 | Nilsson |
| 2010/0311397 A1 | 12/2010 | Li |
| 2010/0332518 A1 | 12/2010 | Song et al. |
| 2011/0004845 A1 | 1/2011 | Ciabarra |
| 2011/0045813 A1 | 2/2011 | Choi |
| 2011/0047368 A1 | 2/2011 | Sundaramurthy et al. |
| 2011/0055763 A1 | 3/2011 | Utsuki et al. |
| 2011/0059769 A1 | 3/2011 | Brunolli |
| 2011/0081923 A1 | 4/2011 | Bednar et al. |
| 2011/0088003 A1 | 4/2011 | Swink et al. |
| 2011/0096011 A1 | 4/2011 | Suzuki |
| 2011/0099079 A1 | 4/2011 | White et al. |
| 2011/0103598 A1 | 5/2011 | Fukui et al. |
| 2011/0106921 A1 | 5/2011 | Brown et al. |
| 2011/0111728 A1 | 5/2011 | Ferguson et al. |
| 2011/0145049 A1 | 6/2011 | Hertel et al. |
| 2011/0151418 A1 | 6/2011 | Delespaul et al. |
| 2011/0153628 A1 | 6/2011 | Basu et al. |
| 2011/0161116 A1 | 6/2011 | Peak et al. |
| 2011/0167383 A1 | 7/2011 | Schuller et al. |
| 2011/0183650 A1 | 7/2011 | Mckee |
| 2011/0184820 A1 | 7/2011 | Mon et al. |
| 2011/0201306 A1 | 8/2011 | Ali |
| 2011/0202417 A1 | 8/2011 | Dewakar et al. |
| 2011/0218849 A1 | 9/2011 | Rutigliano et al. |
| 2011/0225547 A1 | 9/2011 | Fong et al. |
| 2011/0239158 A1 | 9/2011 | Barraclough et al. |
| 2011/0244796 A1 | 10/2011 | Khan et al. |
| 2011/0251892 A1 | 10/2011 | Laracey |
| 2011/0254684 A1 | 10/2011 | Antoci et al. |
| 2011/0260964 A1 | 10/2011 | Mujkic |
| 2011/0265041 A1 | 10/2011 | Ganetakos et al. |
| 2011/0279852 A1 | 11/2011 | Oda et al. |
| 2012/0016678 A1 | 1/2012 | Gruber et al. |
| 2012/0023185 A1 | 1/2012 | Holden et al. |
| 2012/0040719 A1 | 2/2012 | Lee et al. |
| 2012/0059813 A1 | 3/2012 | Sejnoha et al. |
| 2012/0071146 A1 | 3/2012 | Shrivastava et al. |
| 2012/0077463 A1 | 3/2012 | Robbins et al. |
| 2012/0078751 A1 | 3/2012 | Macphail et al. |
| 2012/0084691 A1 | 4/2012 | Yun |
| 2012/0089507 A1 | 4/2012 | Zhang et al. |
| 2012/0101881 A1 | 4/2012 | Taylor et al. |
| 2012/0101887 A1 | 4/2012 | Harvey et al. |
| 2012/0102437 A1 | 4/2012 | Worley et al. |
| 2012/0105358 A1 | 5/2012 | Momeyer et al. |
| 2012/0108215 A1 | 5/2012 | Kameli et al. |
| 2012/0109764 A1 | 5/2012 | Martin et al. |
| 2012/0117507 A1 | 5/2012 | Tseng et al. |
| 2012/0123806 A1 | 5/2012 | Schumann et al. |
| 2012/0123937 A1 | 5/2012 | Spodak et al. |
| 2012/0129496 A1 | 5/2012 | Park et al. |
| 2012/0135726 A1 | 5/2012 | Luna et al. |
| 2012/0149342 A1 | 6/2012 | Cohen et al. |
| 2012/0150970 A1 | 6/2012 | Peterson et al. |
| 2012/0154431 A1 | 6/2012 | Fram |
| 2012/0158511 A1 | 6/2012 | Lucero et al. |
| 2012/0172088 A1 | 7/2012 | Kirch et al. |
| 2012/0191603 A1 | 7/2012 | Nuzzi |
| 2012/0192094 A1 | 7/2012 | Goertz et al. |

(56) References Cited

U.S. PATENT DOCUMENTS

| | | |
|---|---|---|
| 2012/0204191 A1 | 8/2012 | Shia et al. |
| 2012/0214458 A1 | 8/2012 | Levien et al. |
| 2012/0215553 A1 | 8/2012 | Leston |
| 2012/0215647 A1 | 8/2012 | Powell et al. |
| 2012/0216127 A1 | 8/2012 | Meyr |
| 2012/0221464 A1 | 8/2012 | Pasquero et al. |
| 2012/0232968 A1 | 9/2012 | Caiman et al. |
| 2012/0236037 A1 | 9/2012 | Lessing et al. |
| 2012/0245985 A1 | 9/2012 | Cho et al. |
| 2012/0267432 A1 | 10/2012 | Kuttuva |
| 2012/0271712 A1 | 10/2012 | Katzin et al. |
| 2012/0290449 A1 | 11/2012 | Mullen et al. |
| 2012/0290657 A1 | 11/2012 | Parks et al. |
| 2012/0304084 A1 | 11/2012 | Kim et al. |
| 2012/0310760 A1 | 12/2012 | Phillips et al. |
| 2012/0316933 A1 | 12/2012 | Pentland et al. |
| 2012/0317023 A1 | 12/2012 | Moon et al. |
| 2012/0322370 A1 | 12/2012 | Lee |
| 2012/0322371 A1 | 12/2012 | Lee |
| 2013/0002580 A1 | 1/2013 | Sudou |
| 2013/0006746 A1 | 1/2013 | Moore et al. |
| 2013/0007665 A1 | 1/2013 | Chaudhri et al. |
| 2013/0013499 A1 | 1/2013 | Kalgi |
| 2013/0030934 A1 | 1/2013 | Bakshi et al. |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0063364 A1 | 3/2013 | Moore |
| 2013/0063383 A1 | 3/2013 | Anderssonreimer et al. |
| 2013/0065566 A1 | 3/2013 | Gisby et al. |
| 2013/0073286 A1 | 3/2013 | Bastea-forte et al. |
| 2013/0073321 A1 | 3/2013 | Hofmann et al. |
| 2013/0076591 A1 | 3/2013 | Sirpal et al. |
| 2013/0080177 A1 | 3/2013 | Chen |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0085936 A1 | 4/2013 | Law et al. |
| 2013/0091298 A1 | 4/2013 | Ozzie et al. |
| 2013/0103519 A1 | 4/2013 | Kountotsis et al. |
| 2013/0110719 A1 | 5/2013 | Carter et al. |
| 2013/0124319 A1 | 5/2013 | Hodge et al. |
| 2013/0124423 A1 | 5/2013 | Fisher |
| 2013/0125016 A1 | 5/2013 | Pallakoff et al. |
| 2013/0138334 A1 | 5/2013 | Meredith et al. |
| 2013/0141325 A1 | 6/2013 | Bailey et al. |
| 2013/0141331 A1 | 6/2013 | Shiu et al. |
| 2013/0144653 A1 | 6/2013 | Poe et al. |
| 2013/0151414 A1 | 6/2013 | Zhu et al. |
| 2013/0151961 A1 | 6/2013 | Sasaki |
| 2013/0159941 A1 | 6/2013 | Langlois et al. |
| 2013/0166325 A1 | 6/2013 | Ganapathy et al. |
| 2013/0173699 A1 | 7/2013 | Parks et al. |
| 2013/0174044 A1 | 7/2013 | Hill |
| 2013/0179304 A1 | 7/2013 | Swist et al. |
| 2013/0200146 A1 | 8/2013 | Moghadam et al. |
| 2013/0218721 A1 | 8/2013 | Borhan et al. |
| 2013/0219285 A1 | 8/2013 | Iwasaki et al. |
| 2013/0219303 A1 | 8/2013 | Eriksson et al. |
| 2013/0222236 A1 | 8/2013 | GÄrdenfors et al. |
| 2013/0226792 A1 | 8/2013 | Kushevsky et al. |
| 2013/0238455 A1 | 9/2013 | Laracey |
| 2013/0246275 A1 | 9/2013 | Joyce et al. |
| 2013/0268353 A1* | 10/2013 | Zeto, III .............. G06Q 30/02 705/14.58 |
| 2013/0282533 A1 | 10/2013 | Foran-owens et al. |
| 2013/0282577 A1 | 10/2013 | Milne |
| 2013/0290187 A1 | 10/2013 | Itwaru |
| 2013/0304514 A1 | 11/2013 | Hyde et al. |
| 2013/0304651 A1 | 11/2013 | Smith et al. |
| 2013/0304758 A1 | 11/2013 | Gruber et al. |
| 2013/0307809 A1 | 11/2013 | Sudou |
| 2013/0311997 A1 | 11/2013 | Gruber et al. |
| 2013/0316744 A1 | 11/2013 | Newham et al. |
| 2013/0318158 A1 | 11/2013 | Teng et al. |
| 2013/0321314 A1 | 12/2013 | Oh et al. |
| 2013/0322634 A1 | 12/2013 | Bennett et al. |
| 2013/0325951 A1 | 12/2013 | Chakra et al. |
| 2013/0325967 A1 | 12/2013 | Parks et al. |
| 2013/0332162 A1 | 12/2013 | Keen |
| 2013/0332358 A1 | 12/2013 | Zhao |
| 2013/0332364 A1 | 12/2013 | Templeton et al. |
| 2013/0332892 A1 | 12/2013 | Matsuki |
| 2013/0339436 A1 | 12/2013 | Gray |
| 2013/0346068 A1 | 12/2013 | Solem et al. |
| 2013/0346273 A1 | 12/2013 | Stockton et al. |
| 2013/0346302 A1 | 12/2013 | Purves et al. |
| 2013/0346882 A1 | 12/2013 | Shiplacoff et al. |
| 2013/0347018 A1 | 12/2013 | Limp et al. |
| 2014/0006285 A1 | 1/2014 | Chi et al. |
| 2014/0006562 A1 | 1/2014 | Handa et al. |
| 2014/0006949 A1 | 1/2014 | Briand et al. |
| 2014/0019352 A1 | 1/2014 | Shrivastava |
| 2014/0025513 A1 | 1/2014 | Cooke et al. |
| 2014/0032706 A1 | 1/2014 | Kuscher et al. |
| 2014/0058873 A1 | 2/2014 | Sorensen et al. |
| 2014/0058935 A1 | 2/2014 | Mijares |
| 2014/0058939 A1 | 2/2014 | Savla |
| 2014/0074569 A1 | 3/2014 | Francis et al. |
| 2014/0074635 A1 | 3/2014 | Reese et al. |
| 2014/0074716 A1 | 3/2014 | Ni |
| 2014/0082715 A1 | 3/2014 | Grajek et al. |
| 2014/0094143 A1 | 4/2014 | Ayotte |
| 2014/0095965 A1 | 4/2014 | Li |
| 2014/0101056 A1 | 4/2014 | Wendling |
| 2014/0108263 A1 | 4/2014 | Ortiz et al. |
| 2014/0118272 A1 | 5/2014 | Gunn |
| 2014/0122331 A1 | 5/2014 | Vaish et al. |
| 2014/0128035 A1 | 5/2014 | Sweeney |
| 2014/0129007 A1 | 5/2014 | Utter |
| 2014/0129435 A1 | 5/2014 | Pardo et al. |
| 2014/0129441 A1 | 5/2014 | Blanco et al. |
| 2014/0130035 A1 | 5/2014 | Desai et al. |
| 2014/0136633 A1 | 5/2014 | Murillo et al. |
| 2014/0136986 A1 | 5/2014 | Martin et al. |
| 2014/0141721 A1 | 5/2014 | Kim et al. |
| 2014/0143145 A1 | 5/2014 | Kortina et al. |
| 2014/0149198 A1 | 5/2014 | Kim et al. |
| 2014/0149859 A1 | 5/2014 | Van Dyken et al. |
| 2014/0156801 A1 | 6/2014 | Fernandes et al. |
| 2014/0160033 A1 | 6/2014 | Brikman et al. |
| 2014/0164082 A1 | 6/2014 | Sun et al. |
| 2014/0164544 A1 | 6/2014 | Gagneraud |
| 2014/0171064 A1 | 6/2014 | Das |
| 2014/0172533 A1 | 6/2014 | Andrews et al. |
| 2014/0173455 A1 | 6/2014 | Shimizu et al. |
| 2014/0187163 A1 | 7/2014 | Fujita |
| 2014/0188673 A1 | 7/2014 | Graham et al. |
| 2014/0189030 A1 | 7/2014 | Benchenaa et al. |
| 2014/0189533 A1 | 7/2014 | Krack et al. |
| 2014/0189589 A1 | 7/2014 | Kim et al. |
| 2014/0210708 A1 | 7/2014 | Simmons et al. |
| 2014/0213295 A1* | 7/2014 | Conklin .............. H04W 4/08 455/456.2 |
| 2014/0222664 A1 | 8/2014 | Milne |
| 2014/0223358 A1 | 8/2014 | Park |
| 2014/0223490 A1 | 8/2014 | Pan et al. |
| 2014/0228063 A1 | 8/2014 | Harris et al. |
| 2014/0237389 A1 | 8/2014 | Ryall et al. |
| 2014/0240122 A1 | 8/2014 | Roberts et al. |
| 2014/0240216 A1 | 8/2014 | Bukurak et al. |
| 2014/0244365 A1 | 8/2014 | Price et al. |
| 2014/0244493 A1 | 8/2014 | Kenyon et al. |
| 2014/0244495 A1 | 8/2014 | Davis et al. |
| 2014/0244715 A1 | 8/2014 | Hodges et al. |
| 2014/0257871 A1 | 9/2014 | Christensen et al. |
| 2014/0258935 A1 | 9/2014 | Nishida et al. |
| 2014/0273975 A1 | 9/2014 | Barat et al. |
| 2014/0279442 A1 | 9/2014 | Luoma et al. |
| 2014/0279474 A1 | 9/2014 | Evans et al. |
| 2014/0279497 A1 | 9/2014 | Qaim-maqami et al. |
| 2014/0279556 A1 | 9/2014 | Priebatsch et al. |
| 2014/0279728 A1 | 9/2014 | Skole |
| 2014/0282068 A1 | 9/2014 | Levkovitz et al. |

(56) References Cited

U.S. PATENT DOCUMENTS

| | | |
|---|---|---|
| 2014/0297385 A1 | 10/2014 | Ryan |
| 2014/0310348 A1 | 10/2014 | Keskitalo et al. |
| 2014/0320387 A1 | 10/2014 | Eriksson et al. |
| 2014/0337450 A1 | 11/2014 | Choudhary et al. |
| 2014/0337748 A1 | 11/2014 | Lee |
| 2014/0359481 A1 | 12/2014 | Graham et al. |
| 2014/0359637 A1 | 12/2014 | Yan |
| 2014/0359709 A1 | 12/2014 | Nassar et al. |
| 2014/0362702 A1 | 12/2014 | Luna |
| 2014/0368333 A1 | 12/2014 | Touloumtzis et al. |
| 2014/0380187 A1 | 12/2014 | Lewin et al. |
| 2015/0006207 A1 | 1/2015 | Jarvis et al. |
| 2015/0007049 A1 | 1/2015 | Langlois |
| 2015/0012425 A1 | 1/2015 | Mathew |
| 2015/0017956 A1 | 1/2015 | Jeong |
| 2015/0035762 A1 | 2/2015 | Lu |
| 2015/0044965 A1 | 2/2015 | Kurimoto et al. |
| 2015/0051846 A1 | 2/2015 | Masuya |
| 2015/0058146 A1 | 2/2015 | Aissi et al. |
| 2015/0061862 A1 | 3/2015 | Shin et al. |
| 2015/0061972 A1 | 3/2015 | Kang et al. |
| 2015/0065035 A1 | 3/2015 | Son et al. |
| 2015/0067580 A1 | 3/2015 | Um et al. |
| 2015/0089536 A1 | 3/2015 | Byerley |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0127539 A1 | 5/2015 | Ye et al. |
| 2015/0135278 A1 | 5/2015 | Corda et al. |
| 2015/0143419 A1 | 5/2015 | Bhagwat et al. |
| 2015/0181373 A1 | 6/2015 | Xie et al. |
| 2015/0186871 A1 | 7/2015 | Laracey |
| 2015/0187019 A1 | 7/2015 | Fernandes et al. |
| 2015/0199967 A1 | 7/2015 | Reddy et al. |
| 2015/0220924 A1 | 8/2015 | Bakker |
| 2015/0243246 A1 | 8/2015 | Mun et al. |
| 2015/0248389 A1 | 9/2015 | Kahn et al. |
| 2015/0257004 A1 | 9/2015 | Shanmugam et al. |
| 2015/0271120 A1 | 9/2015 | Langholz |
| 2015/0286387 A1 | 10/2015 | Gu et al. |
| 2015/0286391 A1 | 10/2015 | Jacobs et al. |
| 2015/0287403 A1 | 10/2015 | Holzer Zaslansky et al. |
| 2015/0302856 A1 | 10/2015 | Kim et al. |
| 2015/0334533 A1 | 11/2015 | Luo et al. |
| 2015/0339652 A1 | 11/2015 | Park et al. |
| 2015/0347690 A1 | 12/2015 | Keen et al. |
| 2015/0348001 A1 | 12/2015 | Van Os et al. |
| 2015/0348002 A1 | 12/2015 | Van Os |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0350129 A1 | 12/2015 | Cary et al. |
| 2015/0350140 A1 | 12/2015 | Garcia et al. |
| 2015/0350146 A1 | 12/2015 | Cary et al. |
| 2015/0379476 A1 | 12/2015 | Chaudhri et al. |
| 2015/0382047 A1 | 12/2015 | Van Os et al. |
| 2016/0019536 A1 | 1/2016 | Ortiz et al. |
| 2016/0043905 A1 | 2/2016 | Fiedler |
| 2016/0047666 A1 | 2/2016 | Fuchs |
| 2016/0061613 A1 | 3/2016 | Jung et al. |
| 2016/0062540 A1 | 3/2016 | Yang et al. |
| 2016/0062570 A1 | 3/2016 | Dascola et al. |
| 2016/0098522 A1 | 4/2016 | Weinstein |
| 2016/0112557 A1 | 4/2016 | Nixon et al. |
| 2016/0124592 A1 | 5/2016 | Kidron et al. |
| 2016/0134737 A1 | 5/2016 | Pulletikurty |
| 2016/0154549 A1 | 6/2016 | Chaudhri |
| 2016/0156597 A1 | 6/2016 | Meng et al. |
| 2016/0157225 A1 | 6/2016 | Joshi et al. |
| 2016/0173617 A1 | 6/2016 | Allinson |
| 2016/0180026 A1 | 6/2016 | Kim et al. |
| 2016/0210099 A1 | 7/2016 | Hampapuram et al. |
| 2016/0232513 A1 | 8/2016 | Purves et al. |
| 2016/0232638 A1 | 8/2016 | Chen |
| 2016/0253665 A1 | 9/2016 | Van Os et al. |
| 2016/0259489 A1 | 9/2016 | Yang |
| 2016/0259656 A1 | 9/2016 | Sumner et al. |
| 2016/0260414 A1 | 9/2016 | Yang |
| 2016/0269176 A1 | 9/2016 | Pang et al. |
| 2016/0270717 A1 | 9/2016 | Luna et al. |
| 2016/0299526 A1 | 10/2016 | Inagaki et al. |
| 2016/0314670 A1 | 10/2016 | Roberts et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2017/0011210 A1 | 1/2017 | Cheong et al. |
| 2017/0032375 A1 | 2/2017 | Van Os et al. |
| 2017/0060359 A1 | 3/2017 | Chaudhri et al. |
| 2017/0083202 A1 | 3/2017 | Yang et al. |
| 2017/0147197 A1 | 5/2017 | Yang et al. |
| 2017/0153795 A1 | 6/2017 | Yang et al. |
| 2017/0177797 A1 | 6/2017 | Kurniawan et al. |
| 2017/0192730 A1 | 7/2017 | Yang et al. |
| 2017/0227935 A1 | 8/2017 | Su et al. |
| 2017/0274267 A1 | 9/2017 | Blahnik |
| 2017/0295476 A1 | 10/2017 | Webb |
| 2017/0300897 A1 | 10/2017 | Ferenczi et al. |
| 2017/0353836 A1* | 12/2017 | Gordon ................. G06F 3/0482 |
| 2017/0364637 A1 | 12/2017 | Kshepakaran et al. |
| 2018/0067904 A1 | 3/2018 | Li |
| 2018/0081918 A1 | 3/2018 | Gravenites et al. |
| 2018/0117944 A1 | 5/2018 | Lee |
| 2018/0120985 A1 | 5/2018 | Wallace et al. |
| 2018/0158066 A1 | 6/2018 | Van Os et al. |
| 2018/0213354 A1 | 7/2018 | Wang et al. |
| 2018/0276673 A1 | 9/2018 | Van Os et al. |
| 2019/0034050 A1 | 1/2019 | Williams et al. |
| 2019/0050867 A1 | 2/2019 | Van Os et al. |
| 2019/0149972 A1 | 5/2019 | Parks et al. |
| 2019/0187861 A1 | 6/2019 | Yang |
| 2019/0286301 A1 | 9/2019 | Yang et al. |
| 2019/0332229 A1 | 10/2019 | Chaudhri et al. |
| 2019/0361729 A1 | 11/2019 | Gruber et al. |
| 2020/0008010 A1 | 1/2020 | Pai et al. |
| 2020/0065821 A1 | 2/2020 | Van Os et al. |
| 2020/0186960 A1* | 6/2020 | Nolan ................. G06Q 30/0259 |
| 2020/0211047 A1 | 7/2020 | Van Os et al. |
| 2020/0245928 A1 | 8/2020 | Kang et al. |
| 2020/0363914 A1 | 11/2020 | Dascola et al. |
| 2020/0372514 A1 | 11/2020 | Van Os et al. |
| 2020/0381099 A1 | 12/2020 | Crowley et al. |
| 2020/0382908 A1 | 12/2020 | Behzadi et al. |
| 2021/0011586 A1 | 1/2021 | Chaudhri et al. |
| 2021/0011587 A1 | 1/2021 | Chaudhri et al. |
| 2021/0073823 A1 | 3/2021 | Van Os |
| 2021/0173431 A1 | 6/2021 | Yang et al. |
| 2021/0192530 A1 | 6/2021 | Van Os et al. |
| 2021/0225482 A1 | 7/2021 | Crowley et al. |
| 2022/0129144 A1 | 4/2022 | Carrigan et al. |

FOREIGN PATENT DOCUMENTS

| | | |
|---|---|---|
| CN | 1429364 A | 7/2003 |
| CN | 1556955 A | 12/2004 |
| CN | 1848988 A | 10/2006 |
| CN | 1852335 A | 10/2006 |
| CN | 1950762 A | 4/2007 |
| CN | 101171604 A | 4/2008 |
| CN | 101321156 A | 12/2008 |
| CN | 101390371 A | 3/2009 |
| CN | 101433034 A | 5/2009 |
| CN | 101535940 A | 9/2009 |
| CN | 101625620 A | 1/2010 |
| CN | 101730907 A | 6/2010 |
| CN | 101835026 A | 9/2010 |
| CN | 101981987 A | 2/2011 |
| CN | 101997972 A | 3/2011 |
| CN | 102075619 A | 5/2011 |
| CN | 102111505 A | 6/2011 |
| CN | 102282578 A | 12/2011 |
| CN | 102395128 A | 3/2012 |
| CN | 102404458 A | 4/2012 |
| CN | 102754071 A | 10/2012 |

(56) References Cited

FOREIGN PATENT DOCUMENTS

| | | | |
|---|---|---|---|
| CN | 102830795 A | 12/2012 |
| CN | 102866828 A | 1/2013 |
| CN | 103188280 A | 7/2013 |
| CN | 103260059 A | 8/2013 |
| CN | 103413218 A | 11/2013 |
| CN | 103500079 A | 1/2014 |
| CN | 103558916 A | 2/2014 |
| CN | 103581413 A | 2/2014 |
| CN | 103582873 A | 2/2014 |
| CN | 103701605 A | 4/2014 |
| CN | 103765385 A | 4/2014 |
| CN | 103765861 A | 4/2014 |
| CN | 103778082 A | 5/2014 |
| CN | 103778533 A | 5/2014 |
| CN | 103839023 A | 6/2014 |
| CN | 103944811 A | 7/2014 |
| CN | 203930358 U | 11/2014 |
| CN | 104205785 A | 12/2014 |
| CN | 104252675 A | 12/2014 |
| CN | 104272854 A | 1/2015 |
| CN | 104281430 A | 1/2015 |
| CN | 104335234 A | 2/2015 |
| CN | 104346297 A | 2/2015 |
| CN | 105260078 A | 1/2016 |
| CN | 105388998 A | 3/2016 |
| CN | 105721667 A | 6/2016 |
| EP | 1079371 A1 | 2/2001 |
| EP | 1357458 A2 | 10/2003 |
| EP | 1406176 A1 | 4/2004 |
| EP | 1589734 A2 | 10/2005 |
| EP | 1662760 A1 | 5/2006 |
| EP | 1708464 A2 | 10/2006 |
| EP | 1760584 A1 | 3/2007 |
| EP | 1858238 A2 | 11/2007 |
| EP | 2219105 A1 | 8/2010 |
| EP | 2306262 A1 | 4/2011 |
| EP | 2428947 A2 | 3/2012 |
| EP | 2523109 A1 | 11/2012 |
| EP | 2568409 A1 | 3/2013 |
| EP | 2574026 A1 | 3/2013 |
| EP | 2632131 A1 | 8/2013 |
| EP | 2674889 A2 | 12/2013 |
| EP | 2701107 A1 | 2/2014 |
| EP | 2720442 A1 | 4/2014 |
| EP | 2725537 A1 | 4/2014 |
| EP | 2849042 A1 | 3/2015 |
| EP | 2891049 A1 | 7/2015 |
| EP | 2921899 A2 | 9/2015 |
| EP | 2891049 A4 | 3/2016 |
| EP | 3096235 A1 | 11/2016 |
| EP | 3101882 A2 | 12/2016 |
| JP | 6-202842 A | 7/1994 |
| JP | 6-284182 A | 10/1994 |
| JP | 11-39385 A | 2/1999 |
| JP | 11-45117 A | 2/1999 |
| JP | 11-73530 A | 3/1999 |
| JP | 2000-122957 A | 4/2000 |
| JP | 2001-309455 A | 11/2001 |
| JP | 2002-99854 A | 4/2002 |
| JP | 2002-342356 A | 11/2002 |
| JP | 2002-351768 A | 12/2002 |
| JP | 2002-366485 A | 12/2002 |
| JP | 2003-16398 A | 1/2003 |
| JP | 2003-30245 A | 1/2003 |
| JP | 2003-169372 A | 6/2003 |
| JP | 2003-178244 A | 6/2003 |
| JP | 2003-346059 A | 12/2003 |
| JP | 2004-252736 A | 9/2004 |
| JP | 2005-521961 A | 7/2005 |
| JP | 2005-523505 A | 8/2005 |
| JP | 2006-31182 A | 2/2006 |
| JP | 2006-79427 A | 3/2006 |
| JP | 2006-93912 A | 4/2006 |
| JP | 2006-113637 A | 4/2006 |
| JP | 2006-114018 A | 4/2006 |
| JP | 2006-129429 A | 5/2006 |
| JP | 2006-163960 A | 6/2006 |
| JP | 2006-172464 A | 6/2006 |
| JP | 2006-197071 A | 7/2006 |
| JP | 2006-221468 A | 8/2006 |
| JP | 2006-235957 A | 9/2006 |
| JP | 2006-277670 A | 10/2006 |
| JP | 2007-3293 A | 1/2007 |
| JP | 2007-34637 A | 2/2007 |
| JP | 2007-507011 A | 3/2007 |
| JP | 2007-226794 A | 9/2007 |
| JP | 2007-304983 A | 11/2007 |
| JP | 2007-334637 A | 12/2007 |
| JP | 2008-104068 A | 5/2008 |
| JP | 2008-522262 A | 6/2008 |
| JP | 2009-502048 A | 1/2009 |
| JP | 2009-49878 A | 3/2009 |
| JP | 2009-99076 A | 5/2009 |
| JP | 2009-134521 A | 6/2009 |
| JP | 2009-521753 A | 6/2009 |
| JP | 2009-239867 A | 10/2009 |
| JP | 2009-543166 A | 12/2009 |
| JP | 2010-517390 A | 5/2010 |
| JP | 2010-524051 A | 7/2010 |
| JP | 2010-245940 A | 10/2010 |
| JP | 2011-43401 A | 3/2011 |
| JP | 2011-101097 A | 5/2011 |
| JP | 2011-516936 A | 5/2011 |
| JP | 2011-519439 A | 7/2011 |
| JP | 2011-209786 A | 10/2011 |
| JP | 2012-504273 A | 2/2012 |
| JP | 2012-508930 A | 4/2012 |
| JP | 2012-99025 A | 5/2012 |
| JP | 2012-511282 A | 5/2012 |
| JP | 2012-114676 A | 6/2012 |
| JP | 2012-198369 A | 10/2012 |
| JP | 2012-198625 A | 10/2012 |
| JP | 2012-215981 A | 11/2012 |
| JP | 2012-529699 A | 11/2012 |
| JP | 2012-248090 A | 12/2012 |
| JP | 2013-20496 A | 1/2013 |
| JP | 2013-34322 A | 2/2013 |
| JP | 2013-506225 A | 2/2013 |
| JP | 2013-48389 A | 3/2013 |
| JP | 2013-530445 A | 7/2013 |
| JP | 2013-530458 A | 7/2013 |
| JP | 2013-533532 A | 8/2013 |
| JP | 5267966 B2 | 8/2013 |
| JP | 2013-175188 A | 9/2013 |
| JP | 2013-218663 A | 10/2013 |
| JP | 2014-503861 A | 2/2014 |
| JP | 2014-41616 A | 3/2014 |
| JP | 2014-44719 A | 3/2014 |
| JP | 2014-44724 A | 3/2014 |
| JP | 2014-53692 A | 3/2014 |
| JP | 2014-57129 A | 3/2014 |
| JP | 2014-75155 A | 4/2014 |
| JP | 2014-123169 A | 7/2014 |
| JP | 2014-519126 A | 8/2014 |
| JP | 2014-528601 A | 10/2014 |
| JP | 2015-8001 A | 1/2015 |
| JP | 2015-501022 A | 1/2015 |
| JP | 2015-506040 A | 2/2015 |
| JP | 2015-524974 A | 8/2015 |
| JP | 2015-171114 A | 9/2015 |
| JP | 2015-526776 A | 9/2015 |
| JP | 2016-40716 A | 3/2016 |
| JP | 2017-526073 A | 9/2017 |
| JP | 2017-182393 A | 10/2017 |
| JP | 2017-529880 A | 10/2017 |
| JP | 2017-532069 A | 11/2017 |
| KR | 10-2004-0049502 A | 6/2004 |
| KR | 10-2006-0098024 A | 9/2006 |
| KR | 10-2006-0105441 A | 10/2006 |
| KR | 10-2008-0064395 A | 7/2008 |
| KR | 10-2010-0045059 A | 5/2010 |
| KR | 10-2011-0056561 A | 5/2011 |
| KR | 10-2012-0040693 A | 4/2012 |
| KR | 10-1184865 B1 | 9/2012 |

(56) References Cited

FOREIGN PATENT DOCUMENTS

| | | |
|---|---|---|
| KR | 10-2013-0027326 A | 3/2013 |
| KR | 10-2013-0108563 A | 10/2013 |
| KR | 10-2013-0112339 A | 10/2013 |
| KR | 10-2013-0116905 A | 10/2013 |
| KR | 10-1330962 B1 | 11/2013 |
| KR | 10-2014-0018019 A | 2/2014 |
| KR | 10-2014-0026263 A | 3/2014 |
| KR | 10-2014-0027029 A | 3/2014 |
| KR | 10-2014-0031283 A | 3/2014 |
| KR | 10-2014-0055429 A | 5/2014 |
| KR | 10-2016-0076264 A | 6/2016 |
| KR | 10-2017-0029014 A | 3/2017 |
| TW | 201012152 A | 3/2010 |
| TW | 201215086 A | 4/2012 |
| TW | M474482 U | 3/2014 |
| TW | 201509168 A | 3/2015 |
| WO | 2003/038698 A1 | 5/2003 |
| WO | 2003/083793 A2 | 10/2003 |
| WO | 2004/095414 A1 | 11/2004 |
| WO | 2005/053225 A1 | 6/2005 |
| WO | 2005/109829 A1 | 11/2005 |
| WO | 2007/008321 A2 | 1/2007 |
| WO | 2007/076210 A1 | 7/2007 |
| WO | 2007/102110 A2 | 9/2007 |
| WO | 2007/116521 A1 | 10/2007 |
| WO | 2008/030776 A2 | 3/2008 |
| WO | 2008/147457 A1 | 12/2008 |
| WO | 2009/082377 A1 | 7/2009 |
| WO | 2009/097555 A2 | 8/2009 |
| WO | 2009/137419 A2 | 11/2009 |
| WO | 2009/140095 A2 | 11/2009 |
| WO | 2010/039337 A2 | 4/2010 |
| WO | 2010/056484 A2 | 5/2010 |
| WO | 2010/065752 A2 | 6/2010 |
| WO | 2011/041427 A2 | 4/2011 |
| WO | 2011/063516 A1 | 6/2011 |
| WO | 2011/084857 A1 | 7/2011 |
| WO | 2011/149231 A2 | 12/2011 |
| WO | 2012/083113 A2 | 6/2012 |
| WO | 2012/128824 A1 | 9/2012 |
| WO | 2012/154748 A1 | 11/2012 |
| WO | 2012/170446 A2 | 12/2012 |
| WO | 2012/172970 A1 | 12/2012 |
| WO | 2013/003372 A1 | 1/2013 |
| WO | 2013/023224 A2 | 2/2013 |
| WO | 2013/048880 A1 | 4/2013 |
| WO | 2013/066659 A1 | 5/2013 |
| WO | 2013/090624 A1 | 6/2013 |
| WO | 2013/093558 A1 | 6/2013 |
| WO | 2013/097895 A1 | 7/2013 |
| WO | 2013/111239 A1 | 8/2013 |
| WO | 2013/135270 A1 | 9/2013 |
| WO | 2013/169842 A2 | 11/2013 |
| WO | 2013/169865 A2 | 11/2013 |
| WO | 2013/169870 A1 | 11/2013 |
| WO | 2013/169875 A2 | 11/2013 |
| WO | 2013/173504 A1 | 11/2013 |
| WO | 2013/176847 A1 | 11/2013 |
| WO | 2013/177500 A1 | 11/2013 |
| WO | 2013/177548 A1 | 11/2013 |
| WO | 2014/021967 A1 | 2/2014 |
| WO | 2014/032461 A1 | 3/2014 |
| WO | 2014/065846 A1 | 5/2014 |
| WO | 2014/083001 A2 | 6/2014 |
| WO | 2013/173504 A8 | 12/2014 |
| WO | 2015/009581 A1 | 1/2015 |
| WO | 2015/009765 A1 | 1/2015 |
| WO | 2015/013522 A1 | 1/2015 |
| WO | 2015/030912 A1 | 3/2015 |
| WO | 2015/034163 A1 | 3/2015 |
| WO | 2015/038684 A1 | 3/2015 |
| WO | 2015/051361 A1 | 4/2015 |
| WO | 2015/065561 A1 | 5/2015 |
| WO | 2015/120358 A1 | 8/2015 |
| WO | 2015/183828 A1 | 12/2015 |
| WO | 2016/036472 A1 | 3/2016 |
| WO | 2016/036582 A2 | 3/2016 |
| WO | 2018/213401 A1 | 11/2018 |
| WO | 2020/076365 A1 | 4/2020 |

OTHER PUBLICATIONS

Final Office Action received for U.S. Appl. No. 17/031,702, dated Oct. 21, 2021, 16 pages.
Intention to Grant received for European Patent Application No. 15727130.5, dated Oct. 19, 2021, 8 pages.
Notice of Allowance received for U.S. Appl. No. 17/031,700, dated Oct. 14, 2021, 11 pages.
Applicant-Initiated Interview Summary received for U.S. Appl. No. 14/475,446, dated May 3, 2021, 3 pages.
Examiner's Answer to Appeal Brief received for U.S. Appl. No. 14/475,471, dated Apr. 23, 2021, 12 pages.
Final Office Action received for U.S. Appl. No. 16/669,187, dated Mar. 31, 2021, 46 pages.
Non-Final Office Action received for U.S. Appl. No. 17/031,700, dated May 11, 2021, 10 pages.
Non-Final Office Action received for U.S. Appl. No. 17/031,702, dated Apr. 26, 2021, 13 pages.
Notice of Allowance received for U.S. Appl. No. 16/990,974, dated Apr. 28, 2021, 5 pages.
Decision on Appeal received for U.S. Appl. No. 15/128,952, mailed on Dec. 28, 2020, 23 pages.
Extended European Search Report received for European Patent Application No. 20195339.5, dated Dec. 11, 2020, 7 pages.
Notice of Allowance received for Chinese Patent Application No. 201710734839.1, dated Dec. 4, 2020, 3 pages (1 page of English Translation and 2 pages of Official Copy).
Notice of Allowance received for Korean Patent Application No. 10-2018-7035747, dated Dec. 9, 2020, 5 pages (2 pages of English Translation and 3 pages of Official Copy).
Office Action received for Japanese Patent Application No. 2018-080122, dated Nov. 27, 2020, 16 pages (8 pages of English Translation and 8 pages of Official Copy).
Search Report and Opinion received for Danish Patent Application No. PA202070620, dated Dec. 11, 2020, 9 pages.
Summons to Attend Oral Proceedings received for European Patent Application No. 18170262.2, mailed on Dec. 15, 2020, 5 pages.
Brief Communication Regarding Oral Proceedings received for European Patent Application No. 18170262.2, mailed on Oct. 4, 2021, 2 pages.
Summons to Attend Oral Proceedings received for European Patent Application No. 20180033.1, mailed on Oct. 4, 2021, 9 pages.
Advisory Action received for U.S. Appl. No. 14/475,446, dated Sep. 20, 2019, 12 pages.
Advisory Action received for U.S. Appl. No. 14/503,296, dated Oct. 2, 2015, 3 pages.
Advisory Action received for U.S. Appl. No. 14/838,263, dated Jul. 12, 2018, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 15/137,944, dated May 11, 2017, 6 pages.
Advisory Action received for U.S. Appl. No. 15/348,204, dated Feb. 4, 2019, 4 pages.
Advisory Action received for U.S. Appl. No. 16/164,561, dated Nov. 14, 2019, 2 pages.
Airize, "Notification & Control Center Problem Issue Solution", Available online at: https://www.youtube.com/watch?v=K0zCueYlaTA, Dec. 6, 2013, 1 page.
Applicant Initiated Interview Summary received for U.S. Appl. No. 14/475,471, dated Mar. 18, 2020, 5 pages.
Applicant Initiated Interview Summary received for U.S. Appl. No. 14/475,471, dated Oct. 28, 2019, 5 pages.
Applicant Initiated Interview Summary received for U.S. Appl. No. 16/507,664, dated Aug. 26, 2020, 5 pages.

(56) References Cited

OTHER PUBLICATIONS

Applicant-Initiated Interview Summary received for U.S. Appl. No. 14/838,263, dated Jan. 17, 2020, 6 pages.
Applicant-Initiated Interview Summary received for U.S. Appl. No. 16/281,838, dated Jun. 2, 2020, 5 pages.
Applicant-Initiated Interview Summary received for U.S. Appl. No. 16/667,271, dated Apr. 8, 2020, 3 pages.
Basu Saikat, "Ms Outlook Tip: How to Automatically Organize Incoming Emails", Available online at: http://www.makeuseof.com/tag/ms-outlook-productivity-tip-how-to-move-emails-to-individual-folders-automatically/, Sep. 27, 2009, pp. 1-6.
Brief Communication Regarding Oral Proceedings received for European Patent Application No. 15727291.5, mailed on Jun. 9, 2020, 12 pages.
Brief Communication regarding Oral Proceedings received for European Patent Application No. 16201205.8, mailed on May 29, 2020, 29 pages.
Chan Christine, "Handoff Your Browser to Your iPhone or iPad! Plus a Chance to Win a Copy!", Apr. 12, 2011, 2 pages.
Chenzai, "Apple, please don't screw up notifications on the Apple Watch", Available online at: https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages.
Corrected Notice of Allowance received for U.S. Appl. No. 14/839,897, dated Jan. 23, 2019, 6 pages.
Corrected Notice of Allowance received for U.S. Appl. No. 14/839,903, dated Feb. 13, 2019, 2 pages.
Corrected Notice of Allowance received for U.S. Appl. No. 14/839,903, dated Mar. 1, 2019, 2 pages.
Corrected Notice of Allowance received for U.S. Appl. No. 15/005,945, dated Oct. 18, 2016, 6 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/294,439, dated Mar. 13, 2019, 4 pages.
Corrected Notice of Allowance received for U.S. Appl. No. 15/348,204, dated Apr. 11, 2019, 8 pages.
Corrected Notice of Allowance received for U.S. Appl. No. 15/348,204, dated May 31, 2019, 8 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Decision on Appeal received for Korean Patent Application No. 10-2016-0152210, mailed on Jun. 23, 2020, 20 pages.
Decision to Grant received for Danish Patent Application No. PA201770126, dated Mar. 27, 2018, 2 pages.
Decision to Grant received for European Patent Application No. 12727053.6, dated Aug. 27, 2020, 2 pages.
Decision to Grant received for European Patent Application No. 15711969.4, dated Sep. 26, 2019, 2 pages.
Decision to Grant received for European Patent Application No. 15759981.2, dated Jan. 8, 2020, 2 pages.
Decision to Grant received for Japanese Patent Application No. 2014-513804, dated Jul. 31, 2015, 6 pages.
Decision to Refuse Application received for the European Patent Application No. 16803996.4, dated Apr. 3, 2020, 25 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Decision to Refuse received for European Patent Application No. 18154163.2, dated May 17, 2019, 22 pages.
Decision to Refuse received for the European Patent Application No. 16803996.4, dated Apr. 14, 2020, 28 pages.
Dell Streak Softbank001DL Manual, Softbank Corp, vol. 2, Mar. 2011, 28 pages.
European Search Report received for European Patent Application No. 20180033.1, dated Jul. 6, 2020, 4 pages.
Examiner's Answer to Appeal Brief received for U.S. Appl. No. 15/128,952, dated Jan. 8, 2020, 9 pages.
Examiner's Pre-Review Report received for Japanese Patent Application No. 2018-080122, dated Feb. 25, 2020, 6 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 18154163.2, dated Mar. 2, 2018, 4 pages.
Extended European Search Report received for European Patent Application No. 18170262.2, dated Jul. 25, 2018, 8 pages.
Extended European Search Report received for European Patent Application No. 19203942.8, dated Apr. 1, 2020, 10 pages.
Final Office Action received for U.S. Appl. No. 09/735,499, dated Dec. 9, 2010, 13 pages.
Final Office Action received for U.S. Appl. No. 09/735,499, dated Dec. 18, 2003, 12 pages.
Final Office Action received for U.S. Appl. No. 09/735,499, dated May 17, 2005, 12 pages.
Final Office Action received for U.S. Appl. No. 13/312,618, dated Dec. 12, 2014, 13 pages.
Final Office Action received for U.S. Appl. No. 13/489,415, dated Jun. 11, 2014, 34 pages.
Final Office Action received for U.S. Appl. No. 14/475,446, dated Apr. 18, 2019, 28 pages.
Final Office Action received for U.S. Appl. No. 14/475,446, dated Jul. 14, 2017, 20 pages.
Final Office Action received for U.S. Appl. No. 14/475,471, dated Jul. 11, 2019, 18 pages.
Final Office Action received for U.S. Appl. No. 14/475,471, dated Jun. 28, 2017, 16 pages.
Final Office Action received for U.S. Appl. No. 14/475,471, dated May 15, 2020, 19 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/838,235, dated Jun. 15, 2016, 18 pages.
Final Office Action received for U.S. Appl. No. 14/838,263, dated Feb. 21, 2019, 31 pages.
Final Office Action received for U.S. Appl. No. 14/838,263, dated Mar. 22, 2018, 33 pages.
Final Office Action received for U.S. Appl. No. 14/839,897, dated Jan. 10, 2018, 16 pages.
Final Office Action received for U.S. Appl. No. 14/839,903, dated Sep. 18, 2018, 11 pages.
Final Office Action received for U.S. Appl. No. 14/841,455, dated Nov. 6, 2018, 14 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.

(56) References Cited

OTHER PUBLICATIONS

Final Office Action Received for U.S. Appl. No. 14/871,635, dated Jan. 18, 2018, 33 pages.
Final Office Action Received for U.S. Appl. No. 14/871,635, dated May 3, 2019, 32 pages.
Final Office Action Received for U.S. Appl. No. 14/871,654, dated Nov. 16, 2017, 32 pages.
Final Office Action received for U.S. Appl. No. 14/977,219, dated Dec. 13, 2018, 9 pages.
Final Office Action received for U.S. Appl. No. 15/128,952, dated Jul. 18, 2018, 19 pages.
Final Office Action received for U.S. Appl. No. 15/137,944, dated Feb. 27, 2017, 10 pages.
Final Office Action received for U.S. Appl. No. 15/348,204, dated Oct. 13, 2017, 26 pages.
Final Office Action received for U.S. Appl. No. 15/348,204, dated Sep. 13, 2018, 29 pages.
Final Office Action received for U.S. Appl. No. 15/866,341, dated May 14, 2019, 10 pages.
Final Office Action received for U.S. Appl. No. 16/164,561, dated Sep. 5, 2019, 12 pages.
Frakes Dan, "How to Get Started with Airplay", Available at https://www.macworld.com/article/2039770/how-to-get-started-with-airplay.html, Macworld, May 27, 2013, 8 pages.
How to Move Mail to Different Folders in Gmail, Available online at: https://web.archive.org/web/20140731230338/http://www.wikihow.com/Move-Mail-to-Different-Folders-in-Gmail, Jul. 31, 2014, pp. 1-4.
Intention to Grant received for Danish Patent Application No. PA201570550, dated Dec. 22, 2016, 2 pages.
Intention to Grant received for Danish Patent Application No. PA201570773, dated Mar. 9, 2018, 2 pages.
Intention to Grant received for Denmark Patent Application No. PA201770126, dated Jan. 19, 2018, 2 pages.
Intention to Grant received for European Patent Application No. 15711969.4, dated May 29, 2019, 11 pages.
Intention to Grant received for European Patent Application No. 15759981.2, dated Aug. 12, 2019, 8 pages.
Intention to Grant received for European Patent Application No. 15759981.2, dated Mar. 21, 2019, 8 pages.
Intention to Grant received for European Patent Application No. 15787091.6, dated Apr. 23, 2020, 7 pages.
Intention to Grant received for European Patent Application No. 18170262.2, dated Jun. 30, 2020, 8 pages.
Intention to Grant received for European Patent Application No. 12727053.6, dated Aug. 4, 2020, 8 pages.
Intention to Grant Received for European Patent Application No. 12727053.6, dated Mar. 6, 2020, 8 pages.
International Preliminary Report on Patentability received for PCT Patent Application No. PCT/US2012/040962, dated Dec. 10, 2013, 11 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/030591, dated Dec. 8, 2016, 10 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2015/046805, dated Mar. 16, 2017, 8 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/021012, dated Sep. 21, 2017, 11 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2015/046807, dated Mar. 16, 2017, 13 pages.
International Search Report and Written Opinion received for PCT Application No. PCT/US2015/030591, dated Jul. 21, 2015, 11 pages.
International Search Report and Written Opinion received for PCT Application No. PCT/US2015/033326, dated Aug. 10, 2015, 13 pages.
International Search Report and Written Opinion received for PCT Application No. PCT/US2015/046807, dated Apr. 1, 2016, 17 pages.
International Search Report and Written Opinion received for PCT Patent Application No. PCT/US2012/040962, dated Jan. 3, 2013, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/046805, dated Dec. 10, 2015, 11 pages.
International Search Report and Written Opinion received for PCT Patent Application No. PCT/US2015/055165, dated Apr. 20, 2016, 22 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2016/033751, dated Oct. 5, 2016, 14 pages.
Invitation to Pay Additional Fees received for PCT Application No. PCT/US2015/046807, dated Dec. 15, 2015, 7 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2015/044083, dated Nov. 4, 2015, 11 pages.
Invitation to Pay Additional Fees received for PCT Patent Application No. PCT/US2015/055165, dated Jan. 18, 2016, 6 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2020/034155, dated Jul. 27, 2020, 12 pages.
Iosvlog Daily, "iOS 7 Notification Center Complete Walkthrough", Available online at: https://www.youtube.com/watch?v=gATXt-o42LA, Jun. 10, 2013, 1 page.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Kinect Gesture Commands—Kinect Voice Commands, Xbox Wire, Available Online at: https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b, 2013, 2 pages.
Leonard Jonathano, "How to: dismiss banner notifications or toast notifications on ios7", Available online at: https://www.youtube.com/watch?v=vSjHnBFIW_M, Dec. 17, 2013, 1 page.

(56) References Cited

OTHER PUBLICATIONS

Lewis Jeffery, "iOS Notification Banner Pull Down to Notification Center in iOS 7 Beta 5", Available online at: "https://www.youtube.com/watch?v=nPOs6ETPxDg", Aug. 6, 2013, 1 page.
Miller Eric, "Background Polling", Microsoft Outlook Express, Jul. 30, 1998, 1page.
Minutes of the Oral Proceedings received for European Application No. 15711969.4, mailed on May 16, 2019, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201205.8, mailed on Jun. 29, 2020, 6 pages.
Minutes of the Oral Proceedings received for European Patent Application No. 18154163.2, mailed on May 17, 2019, 7 pages.
Naver Blog, "How to Use Smart Wallet and Registered Card", Online Available at: http://feena74.blog.me/140185758401, Mar. 29, 2013, 20 pages.
Non-Final Office Action received for U.S. Appl. No. 14/838,263, dated Sep. 21, 2018, 33 pages.
Non-Final Office Action received for U.S. Appl. No. 16/507,664, dated May 11, 2020, 16 pages.
Non-Final Office Action received for U.S. Appl. No. 09/735,499, dated Jul. 21, 2004, 11 pages.
Non-Final Office Action received for U.S. Appl. No. 09/735,499, dated Jun. 21, 2010, 11 pages.
Non-Final Office Action received for U.S. Appl. No. 09/735,499, dated May 22, 2003, 12 pages.
Non-Final Office Action received for U.S. Appl. No. 09/735,499, dated Nov. 16, 2007, 11 pages.
Non-Final Office Action received for U.S. Appl. No. 13/489,415, dated Dec. 5, 2013, 25 pages.
Non-Final Office Action received for U.S. Appl. No. 13/489,415, dated Feb. 11, 2015, 30 pages.
Non-Final Office Action received for U.S. Appl. No. 14/475,446, dated Jun. 28, 2018, 21 pages.
Non-Final Office Action received for U.S. Appl. No. 14/475,446, dated Mar. 18, 2020, 20 pages.
Non-Final Office Action received for U.S. Appl. No. 14/475,446, dated Nov. 18, 2016, 24 pages.
Non-Final Office Action received for U.S. Appl. No. 14/475,471, dated Dec. 19, 2019, 20 pages.
Non-Final Office Action received for U.S. Appl. No. 14/475,471, dated Nov. 18, 2016, 19 pages.
Non-Final Office Action received for U.S. Appl. No. 14/475,471, dated Sep. 18, 2018, 25 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/838,263, dated Aug. 16, 2019, 33 pages.
Non-Final Office Action received for U.S. Appl. No. 14/838,263, dated Jul. 14, 2017, 34 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/841,455, dated Apr. 25, 2018, 13 pages.
Non-Final Office Action received for U.S. Appl. No. 14/869,715, dated Jan. 29, 2016, 62 pages.
Non-Final Office Action received for U.S. Appl. No. 14/869,715, dated Oct. 11, 2016, 37 pages.
Non-Final Office Action Received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action Received for U.S. Appl. No. 14/871,654, dated May 4, 2017, 23 pages.
Non-Final Office Action received for U.S. Appl. No. 14/977,219, dated Apr. 6, 2018, 6 pages.
Non-Final Office Action received for U.S. Appl. No. 14/977,219, dated Feb. 7, 2020, 10 pages.
Non-Final Office Action received for U.S. Appl. No. 14/977,219, dated Sep. 6, 2019, 8 pages.
Non-Final Office Action received for U.S. Appl. No. 15/005,945, dated May 17, 2016, 9 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/294,439, dated Jan. 26, 2018, 18 pages.
Non-Final Office Action received for U.S. Appl. No. 15/348,204, dated Apr. 28, 2017, 22 pages.
Non-Final Office Action received for U.S. Appl. No. 15/348,204, dated Feb. 20, 2018, 28 pages.
Non-Final Office Action received for U.S. Appl. No. 15/425,273, dated Oct. 3, 2018, 10 pages.
Non-Final Office Action received for U.S. Appl. No. 15/431,435, dated Jun. 8, 2017, 13 pages.
Non-Final Office Action received for U.S. Appl. No. 15/866,341, dated Nov. 13, 2018, 11 pages.
Non-Final Office Action received for U.S. Appl. No. 15/992,722, dated Aug. 6, 2020, 7 pages.
Non-Final Office Action received for U.S. Appl. No. 16/164,561, dated Jan. 4, 2019, 14 pages.
Non-Final Office Action received for U.S. Appl. No. 16/281,838, dated Mar. 26, 2020, 18 pages.
Non-Final Office Action received for U.S. Appl. No. 16/667,271, dated Dec. 13, 2019, 8 pages.
Non-Final Office Action received for U.S. Appl. No. 16/669,187 dated Sep. 25, 2020, 40 pages.
Non-Final Office Action received for U.S. Appl. No. 14/503,364, dated Feb. 3, 2016, 16 pages.
Non-Final Office Action received for U.S. Appl. No. 14/841,455, dated Apr. 11, 2019, 13 pages.
Non-Final Office Action received for U.S. Appl. No. 13/312,618, dated Jun. 11, 2014, 11 pages.
Non-Final Office Action received for U.S. Appl. No. 14/838,235, dated Jan. 5, 2016, 3 pages.
Notice of Acceptance received for Australian Patent Application No. 2012268312, dated Feb. 3, 2016, 2 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2015267671, dated Apr. 4, 2018, 3 pages.
Notice of Acceptance received for Australian Patent Application No. 2015385757, dated Jul. 16, 2018, 3 pages.
Notice of Acceptance received for Australian Patent Application No. 2016203250, dated Mar. 15, 2018, 3 pages.
Notice of Acceptance received for Australian Patent Application No. 2016230001, dated May 25, 2018, 3 pages.

(56) References Cited

OTHER PUBLICATIONS

Notice of Acceptance received for Australian Patent Application No. 2017201064, dated Feb. 20, 2018, 3 pages.
Notice of Acceptance received for Australian Patent Application No. 2018202559, dated Oct. 21, 2019, 3 pages.
Notice of Acceptance received for Australian Patent Application No. 2018202751, dated Sep. 4, 2019, 3 pages.
Notice of Acceptance received for Australian Patent Application No. 2018204028, dated Jun. 12, 2019, 3 pages.
Notice of Acceptance received for Australian Patent Application No. 2018204430, dated Jun. 26, 2019, 3 pages.
Notice of Acceptance received for Australian Patent Application No. 2018220115, dated Jun. 29, 2020, 3 pages.
Notice of Acceptance received for Australian Patent Application No. 2018247345, dated May 15, 2019, 3 pages.
Notice of Acceptance received for Australian Patent Application No. 2019246830, dated Oct. 24, 2019, 3 pages.
Notice of Acceptance received for Australian Patent Application No. 2015312369, dated Mar. 21, 2018, 3 pages.
Notice of Allowance received for Chinese Patent Application No. 2012800272819, dated Jun. 13, 2017, 4 pages.
Notice of Allowance received for Chinese Patent Application No. 201510549056.7, dated Jul. 2, 2019, 2 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201520669842.6, dated May 18, 2016, 4 pages.
Notice of Allowance received for Chinese Patent Application No. 201580028073.4, dated Oct. 22, 2019, 2 pages.
Notice of Allowance received for Chinese Patent Application No. 201580028505.1, dated Sep. 19, 2019, 2 pages.
Notice of Allowance received for Chinese Patent Application No. 201610371856.9, dated May 11, 2020, 2 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201620830403.3, dated Sep. 8, 2017, 2 pages.
Notice of Allowance received for Chinese Patent Application No. 201680011682.3, dated Aug. 5, 2020, 2 pages.
Notice of Allowance received for Chinese Patent Application No. 201710093861.2, dated Sep. 24, 2019, 4 pages.
Notice of Allowance received for Chinese Patent Application No. 201810321928.8, dated Sep. 11, 2019, 2 pages.
Notice of Allowance received for Danish Patent Application No. PA201570550, dated Mar. 20, 2017, 2 pages.
Notice of Allowance received for Danish Patent Application No. PA201570771, dated Sep. 2, 2016, 2 pages.
Notice of Allowance received for Danish Patent Application No. PA201570773, dated Apr. 26, 2018, 2 pages.
Notice of Allowance received for Japanese Patent Application No. 2015-171114, dated Mar. 1, 2019, 3 pages.
Notice of Allowance received for Japanese Patent Application No. 2016-224506, dated Jan. 24, 2020, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2016-569669, dated Mar. 19, 2018, 4 pages.
Notice of Allowance received for Japanese Patent Application No. 2017-510297, dated May 7, 2018, 4 pages.
Notice of Allowance received for Japanese Patent Application No. 2017-543762, dated Mar. 30, 2020, 4 pages.
Notice of Allowance received for Japanese Patent Application No. 2017-545733, dated Jun. 1, 2018, 4 pages.
Notice of Allowance received for Japanese Patent Application No. 2017-562050, dated Jun. 1, 2020, 4 pages.
Notice of Allowance received for Japanese Patent Application No. 2018-008937, dated Jul. 2, 2018, 4 pages.
Notice of Allowance received for Japanese Patent Application No. 2018-071908, dated Nov. 25, 2019, 8 pages.
Notice of Allowance received for Japanese Patent Application No. 2018-072632, dated Dec. 7, 2018, 4 pages.
Notice of Allowance received for Japanese Patent Application No. 2018-126311, dated Feb. 1, 2019, 4 pages.
Notice of Allowance received for Korean Patent Application No. 10-2013-7034852, dated Aug. 24, 2016, 3 pages.
Notice of Allowance received for Korean Patent Application No. 10-2015-7007065, dated Aug. 28, 2019, 4 pages.
Notice of Allowance received for Korean Patent Application No. 1020157037047, dated Oct. 30, 2017, 3 pages.
Notice of Allowance received for Korean Patent Application No. 10-2016-7032902, dated Sep. 7, 2018, 3 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-0022582, dated Feb. 27, 2020, 5 pages.
Notice of Allowance received for Korean Patent Application No. 10-2017-7005628, dated Jun. 18, 2018, 5 pages.
Notice of Allowance received for Korean Patent Application No. 10-2017-7022905, dated Jul. 31, 2019, 4 pages.
Notice of Allowance received for Korean Patent Application No. 10-2017-7034677, dated May 27, 2019, 5 pages.
Notice of Allowance received for Korean Patent Application No. 10-2018-7001854, dated Aug. 21, 2018, 4 pages.
Notice of Allowance Received for Korean Patent Application No. 10-2018-7027006, dated May 23, 2019, 4 pages.
Notice of Allowance received for Korean Patent Application No. 10-2019-7024901, dated May 12, 2020, 5 pages.
Notice of Allowance received for Korean Patent Application No. 10-2019-7025322, dated Nov. 20, 2019, 5 pages.
Notice of Allowance received for Korean Patent Application No. 10-2020-0048600, dated Apr. 30, 2020, 5 pages.
Notice of Allowance received for Korean Patent Application No. 10-2020-7004737, dated Mar. 31, 2020, 4 pages.
Notice of Allowance received for Taiwanese Patent Application No. 104108223, dated Jan. 10, 2017, 3 pages.
Notice of Allowance received for Taiwanese Patent Application No. 104117508, dated Sep. 18, 2019, 5 pages.
Notice of Allowance received for Taiwanese Patent Application No. 104128702, dated Oct. 25, 2017, 3 pages.
Notice of Allowance received for Taiwanese Patent Application No. 104128704, dated Feb. 21, 2018, 5 pages.
Notice of Allowance received for Taiwanese Patent Application No. 104133756, dated Nov. 30, 2017, 5 pages.
Notice of Allowance received for Taiwanese Patent Application No. 104133757, dated Jan. 18, 2017, 3 pages.
Notice of Allowance received for the U.S. Appl. No. 14/503,381, dated Dec. 16, 2015, 8 pages.
Notice of Allowance received for U.S. Appl. No. 09/735,499, dated Aug. 30, 2011, 8 pages.
Notice of Allowance received for U.S. Appl. No. 13/489,415, dated Nov. 17, 2015, 12 pages.
Notice of Allowance received for U.S. Appl. No. 13/489,415, dated Oct. 22, 2015, 15 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.

(56) References Cited

OTHER PUBLICATIONS

Notice of Allowance received for U.S. Appl. No. 14/503,364, dated Jun. 16, 2016, 11 pages.
Notice of Allowance received for U.S. Appl. No. 14/838,235, dated Dec. 29, 2016, 4 pages.
Notice of Allowance Received for U.S. Appl. No. 14/838,235, dated Oct. 4, 2016, 7 pages.
Notice of Allowance received for U.S. Appl. No. 14/838,263, dated Mar. 24, 2020, 9 pages.
Notice of Allowance received for U.S. Appl. No. 14/839,897, dated Jun. 8, 2018, 11 pages.
Notice of Allowance received for U.S. Appl. No. 14/839,903, dated Jan. 3, 2019, 7 pages.
Notice of Allowance received for U.S. Appl. No. 14/869,715, dated Dec. 19, 2017, 32 pages.
Notice of Allowance received for U.S. Appl. No. 14/871,635, dated Feb. 3, 2020, 3 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 14/871,654, dated May 22, 2018, 22 pages.
Notice of Allowance received for U.S. Appl. No. 15/005,945, dated Aug. 12, 2016, 9 pages.
Notice of Allowance received for U.S. Appl. No. 15/137,944, dated Dec. 21, 2017, 8 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/348,204, dated Mar. 14, 2019, 11 pages.
Notice of Allowance received for U.S. Appl. No. 15/425,273, dated Mar. 7, 2019, 8 pages.
Notice of Allowance received for U.S. Appl. No. 15/431,435, dated Jan. 23, 2018, 8 pages.
Notice of Allowance received for U.S. Appl. No. 15/866,341, dated Jul. 26, 2019, 8 pages.
Notice of Allowance received for U.S. Appl. No. 16/164,561, dated Apr. 8, 2020, 5 pages.
Notice of Allowance received for U.S. Appl. No. 16/281,838, dated Aug. 26, 2020, 9 pages.
Notice of Allowance received for U.S. Appl. No. 16/667,271, dated May 12, 2020, 11 pages.
Notice of Allowance received for U.S. Appl. No. 14/841,455, dated Oct. 22, 2019, 10 pages.
Notice of Allowance received for U.S. Appl. No. 13/312,618, dated Aug. 14, 2015, 9 pages.
Nozawa Naoki et al., "iPad Perfect Manual for iOS 4", JPN, SOTEC Ltd, Yanagisawa Junichi, Dec. 31, 2010, pp. 189-190.
Office Action received for Australian Patent Application No. 2012268312, dated Feb. 16, 2015, 3 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015101188, dated Apr. 14, 2016, 3 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015267514 dated May 25, 2017, 3 pages.
Office Action received for Australian Patent Application No. 2015267514, dated May 22, 2018, 3 pages.
Office Action received for Australian Patent Application No. 2015267671, dated Apr. 5, 2017, 2 pages.
Office Action received for Australian Patent Application No. 2015385757, dated Sep. 11, 2017, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016203250, dated May 26, 2017, 2 pages.
Office Action received for Australian Patent Application No. 2016230001, dated Feb. 7, 2018, 3 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2016270775, dated Nov. 26, 2019, 3 pages.
Office Action received for Australian Patent Application No. 2017100070, dated Mar. 16, 2017, 6 pages.
Office Action received for Australian Patent Application No. 2017100197, dated Apr. 28, 2017, 4 pages.
Office Action received for Australian Patent Application No. 2017100198, dated Apr. 20, 2017, 4 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018202751, dated Apr. 2, 2019, 4 pages.
Office Action received for Australian Patent Application No. 2018203708, dated Aug. 15, 2019, 5 pages.
Office Action received for Australian Patent Application No. 2018203708, dated Jan. 3, 2019, 4 pages.
Office Action received for Australian Patent Application No. 2018204028, dated Apr. 17, 2019, 2 pages.
Office Action received for Australian Patent Application No. 2018204430, dated Aug. 15, 2018, 5 pages.
Office Action received for Australian Patent Application No. 2018220115, dated Apr. 21, 2020, 3 pages.
Office Action received for Australian Patent Application No. 2018220115, dated Oct. 4, 2019, 3 pages.
Office Action received for Australian Patent Application No. 2018247345, dated May 6, 2019, 2 pages.
Office Action received for Australian Patent Application No. 2020200685, dated Apr. 20, 2020, 3 pages.

(56) References Cited

OTHER PUBLICATIONS

Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2015312369, dated Mar. 29, 2017, 3 pages.
Office Action received for Chinese Patent Application No. 2012800272819, dated Jan. 4, 2016, 9 pages.
Office Action received for Chinese Patent Application No. 2012800272819, dated Sep. 21, 2016, 12 pages.
Office Action received for Chinese Patent Application No. 201510284715.9, dated Apr. 14, 2020, 19 pages.
Office Action received for Chinese Patent Application No. 201510284715.9, dated Dec. 18, 2019, 24 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201510284896.5, dated Sep. 3, 2019, 9 pages.
Office Action received for Chinese Patent Application No. 201510549056.7, dated Aug. 7, 2018, 7 pages.
Office Action received for Chinese Patent Application No. 201510549056.7, dated Mar. 15, 2019, 7 pages.
Office Action received for Chinese Patent Application No. 2015105490567, dated Nov. 24, 2017, 15 pages.
Office Action received for Chinese Patent Application No. 201520358683.8, dated Sep. 2, 2015, 4 pages.
Office Action received for Chinese Patent Application No. 201520669842.6, dated Dec. 4, 2015, 7 pages.
Office Action received for Chinese Patent Application No. 201580028073.4, dated Feb. 2, 2019, 18 pages.
Office Action received for Chinese Patent Application No. 201580028505.1, dated Jan. 16, 2019, 15 pages.
Office Action received for Chinese Patent Application No. 201580028505.1, dated Jun. 20, 2019, 7 pages.
Office Action received for Chinese Patent Application No. 201580077218.X, dated Feb. 3, 2020, 23 pages.
Office Action received for Chinese Patent Application No. 201610371856.9, dated Dec. 18, 2019, 6 pages.
Office Action received for Chinese Patent Application No. 201610371856.9, dated Dec. 19, 2018, 12 pages.
Office Action received for Chinese Patent Application No. 201610371856.9, dated Jul. 10, 2019, 6 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201620509362.8, dated Feb. 10, 2017, 2 pages.
Office Action received for Chinese Patent Application No. 201620509362.8, dated Oct. 21, 2016, 3 pages.
Office Action Received for Chinese Patent Application No. 201620830403.3, dated Jun. 7, 2017, 2 pages.
Office Action Received for Chinese Patent Application No. 201620830403.3, dated Mar. 7, 2017, 3 pages.
Office Action received for Chinese Patent Application No. 201680011682.3, dated Dec. 2, 2019, 14 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201710094150.7, dated Jul. 31, 2019, 6 pages.
Office Action received for Chinese Patent Application No. 201710734839.1, dated Apr. 14, 2020, 20 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action received for Chinese Patent Application No. 201810321928.8, dated Jul. 2, 2019, 10 pages.
Office Action received for Chinese Patent Application No. 201280027281.9, dated Mar. 2, 2017, 5 pages.
Office Action Received for Danish Patent Application No. PA 201670709, dated Jul. 21, 2017, 4 pages.
Office Action Received for Danish Patent Application No. PA 201670709, dated Nov. 30, 2016, 10 pages.
Office Action received for Danish Patent Application No. PA201570550, dated Dec. 7, 2015, 6 pages.
Office Action received for Danish Patent Application No. PA201570550, dated Jan. 19, 2016, 2 pages.
Office Action received for Danish Patent Application No. PA201570550, dated Oct. 19, 2016, 3 pages.
Office Action received for Danish Patent Application No. PA201570771, dated Jun. 13, 2016, 3 pages.
Office Action received for Danish Patent Application No. PA201570771, dated Mar. 17, 2016, 8 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action Received for Danish Patent Application No. PA201570773, dated Mar. 18, 2016, 9 pages.
Office Action received for Danish Patent Application No. PA201570773, dated Sep. 12, 2016, 3 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201770125, dated Jan. 26, 2018, 5 pages.
Office Action received for Danish Patent Application No. PA201770125, dated Jul. 20, 2018, 2 pages.
Office Action received for Danish Patent Application No. PA201770126, dated Oct. 18, 2017, 3 pages.
Office Action received for European Patent Application No. 15711969.4, dated Nov. 17, 2017, 9 pages.
Office Action received for European Patent Application No. 15727130.5, dated Feb. 14, 2020, 4 pages.
Office Action received for European Patent Application No. 15727130.5, dated Jun. 8, 2018, 5 pages.
Office Action received for European Patent Application No. 15727130.5, dated Mar. 13, 2019, 4 pages.
Office Action received for European Patent Application No. 15727291.5, dated Jan. 15, 2018, 8 pages.
Office Action received for European Patent Application No. 15728352.4, dated Jan. 25, 2018, 10 pages.
Office Action received for European Patent Application No. 15759981.2, dated Apr. 19, 2018, 6 pages.
Office Action received for European Patent Application No. 15759981.2, dated Aug. 6, 2018, 10 pages.

(56) References Cited

OTHER PUBLICATIONS

Office Action received for European Patent Application No. 15759981.2, dated May 16, 2018, 6 pages.
Office Action received for European Patent Application No. 15787091.6, dated Aug. 2, 2019, 8 pages.
Office Action received for European Patent Application No. 15787091.6, dated Oct. 8, 2018, 7 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16710590.7, dated Mar. 15, 2019, 10 pages.
Office Action received for European Patent Application No. 16803996.4, dated Nov. 29, 2018, 12 pages.
Office Action received for European Patent Application No. 18154163.2, dated Apr. 11, 2018, 6 pages.
Office Action received for European Patent Application No. 18170262.2, dated Dec. 9, 2019, 3 pages.
Office Action received for European Patent Application No. 18170262.2, dated May 16, 2019, 6 pages.
Office Action received for European Patent Application No. 18170262.2, dated May 27, 2019, 6 pages.
Office Action received for European Patent Application No. 20180033.1, dated Jul. 17, 2020, 7 pages.
Office Action Received for European Patent Application No. 12727053.6, dated Jul. 4, 2018, 5 pages.
Office Action Received for European Patent Application No. 127270536, dated Mar. 21, 2016, 6 pages.
Office Action received for German Patent Application No. 202015004267.8, dated Nov. 4, 2015, 4 pages.
Office Action received for Indian Patent Application No. 201617039493, dated Oct. 21, 2019, 6 pages.
Office Action received for Japanese Patent Application No. 2014-513804, dated Nov. 28, 2014, 7 pages.
Office Action received for Japanese Patent Application No. 2015-171114, dated Dec. 22, 2017, 16 pages.
Office Action received for Japanese Patent Application No. 2015171114, dated May 19, 2017, 11 pages.
Office Action received for Japanese Patent Application No. 2015-171114, dated May 22, 2018, 11 pages.
Office Action received for Japanese Patent Application No. 2015171114, dated Sep. 5, 2016, 6 pages.
Office Action received for Japanese Patent Application No. 2016-224506, dated May 14, 2019, 22 pages.
Office Action received for Japanese Patent Application No. 2016-224507, dated Dec. 1, 2017, 14 pages.
Office Action received for Japanese Patent Application No. 2016-224507, dated Jun. 16, 2017, 16 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-510297, dated Dec. 4, 2017, 5 pages.
Office Action received for Japanese Patent Application No. 2017-510297, dated Jul. 10, 2017, 10 pages.
Office Action received for Japanese Patent Application No. 2017-543762, dated Apr. 8, 2019, 5 pages.
Office Action received for Japanese Patent Application No. 2017-543762, dated Jul. 9, 2018, 8 pages.
Office Action received for Japanese Patent Application No. 2017-545733, dated Feb. 13, 2018, 7 pages.
Office Action received for Japanese Patent Application No. 2017-562050, dated Feb. 1, 2019, 15 pages.
Office Action received for Japanese Patent Application No. 2017-562050, dated Sep. 30, 2019, 5 pages.
Office Action received for Japanese Patent Application No. 2018-071908, dated Jan. 28, 2019, 11 pages.
Office Action received for Japanese Patent Application No. 2018-072632, dated Jul. 9, 2018, 5 pages.
Office Action received for Japanese Patent Application No. 2018-080122, dated Aug. 9, 2019, 5 pages.
Office Action received for Japanese Patent Application No. 2018-080122, dated Jan. 28, 2019, 11 pages.
Office Action received for Japanese Patent Application No. 2018-126311, dated Nov. 2, 2018, 4 pages.
Office Action received for Japanese Patent Application No. 2019-000698, dated Mar. 9, 2020, 8 pages.
Office Action received for Japanese Patent Application No. 2020-028315, dated Jul. 6, 2020, 18 pages.
Office Action received for Korean Patent Application No. 10-2013-7034852, dated Apr. 26, 2016, 6 pages.
Office Action received for Korean Patent Application No. 10-2013-7034852, dated Jul. 30, 2015, 6 pages.
Office Action received for Korean Patent Application No. 10-2013-7034852, dated Nov. 19, 2014, 7 pages.
Office Action received for Korean Patent Application No. 10-2015-7007065, dated Aug. 21, 2017, 5 pages.
Office Action received for Korean Patent Application No. 10-2015-7007065, dated Dec. 24, 2018, 9 pages.
Office Action received for Korean Patent Application No. 10-2015-7007065, dated Feb. 28, 2018, 8 pages.
Office Action received for Korean Patent Application No. 10-2015-7037047, dated Mar. 15, 2016, 11 pages.
Office Action received for Korean Patent Application No. 1020157037047, dated Nov. 29, 2016, 10 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7005628, dated Jan. 30, 2018, 6 pages.
Office Action received for Korean Patent Application No. 10-2017-7005628, dated May 10, 2017, 12 pages.
Office Action received for Korean Patent Application No. 10-2017-7022905, dated Oct. 22, 2018, 9 pages.
Office Action received for Korean Patent Application No. 10-2017-7034677, dated Nov. 1, 2018, 5 pages.
Office Action received for Korean Patent Application No. 10-2018-7001854, dated Apr. 2, 2018, 13 pages.
Office Action Received for Korean Patent Application No. 10-2018-7027006, dated Jan. 14, 2019, 6 pages.
Office Action received for Korean Patent Application No. 10-2018-7035747, dated Apr. 9, 2020, 11 pages.
Office Action received for Korean Patent Application No. 10-2019-7024901, dated Sep. 26, 2019, 6 pages.
Office Action received for Korean Patent Application No. 10-2020-0097418, dated Aug. 28, 2020, 6 pages.
Office Action received for Taiwanese Patent Application No. 104108223, dated Apr. 25, 2016, 10 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.

(56) References Cited

OTHER PUBLICATIONS

Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Office Action received for Taiwanese Patent Application No. 104128702, dated Feb. 7, 2017, 12 pages.
Office Action received for Taiwanese Patent Application No. 104128704, dated Jul. 31, 2017, 7 pages.
Office Action received for Taiwanese Patent Application No. 104128704, dated Nov. 2, 2016, 12 pages.
Office Action received for Taiwanese Patent Application No. 104133756, dated May 17, 2017, 13 pages.
Office Action received for Taiwanese Patent Application No. 104133757, dated Jul. 6, 2016, 22 pages.
Patterson Ben, "iOS 7 tip: Alerts, banners, and badgesâwhats the difference?", Available online at: https://web.archive.org/web/20140128072440/http://heresthethingblog.com/2014/01/22/ios-7-tip-whats-difference-alert/, Jan. 22, 2014, 5 pages.
Preliminary Opinion before oral proceedings received for European Patent Application No. 18154163.2, mailed on Apr. 16, 2019, 12 pages.
Real Solution of two-step-authentication Password Management for Authentication Enhancement, Fukuda Takao, Nikkei PC, JPN, Nikkei Business Publications, Inc, No. 694, Mar. 24, 2014, 11 pages.
Restriction Requirement received for U.S. Appl. No. 14/475,446, dated Jul. 18, 2016, 8 pages.
Restriction Requirement received for U.S. Appl. No. 14/475,471, dated Jul. 15, 2016, 8 pages.
Result of Consultation received for European Patent Application No. 16803996.4, mailed on Feb. 17, 2020, 14 pages.
Saitou Kazuo, "Web Site expert", vol. 32, Oct. 25, 2010, 8 pages.
Samsung User Manual, SM-R380_UM_EU_Eng_D13_140411.pdf, Apr. 2014, 78 pages.
Samsung, "Samsung Gear 2 User manual", Online Available at: https://data2.manualslib.com/pdf3/76/7550/754923-samsung/gear_2.pdf?7eb313a9f65b1566bcf9ff58661c6b3a&take=binary, XP055464984, Apr. 9, 2014, pp. 1-97.
Search Report and Opinion received for Netherlands Patent Application No. 2015354, completed on Jun. 22, 2017, 24 pages.
Search Report and Opinion received for Netherlands Patent Application No. 2019878, dated Apr. 6, 2018, 24 pages.
Search Report received for Danish Patent Application No. PA201770125, dated May 5, 2017, 10 pages.
Search Report received for Danish Patent Application No. PA201770126, dated Apr. 26, 2017, 8 pages.
Shankland Stephen, "Chrome OS Gets 'OK Google' Voice Search Control", available online at: http://www.cnet.com/news/chrome-os-gets-ok-google-voice-search-control/, May 21, 2014, 4 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Summons to Attend Oral Proceedings received for European Patent Application No. 15711969.4, mailed on Oct. 22, 2018, 12 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 16803996.4, mailed on Oct. 2, 2019, 16 pages.
Summons to Attend Oral Proceedings received for European Patent Application No. 18154163.2, mailed on Nov. 29, 2018, 9 pages.
User Manual, Available Online at: http://www.manualslib.com/download/754923/Samsung-Gear-2.html, 2014, pp. 1-97.
Vanhemert Kyle, "Why Siri Could be the Killer App for Smartwatches", XP002798416, Retrieved from the Internet: URL: https://www.wired.com/2013/12/what-can-a-smartwatch-really-do/, Dec. 19, 2013, 14 pages.
Corrected Notice of Allowance received for U.S. Appl. No. 16/281,838, dated Oct. 30, 2020, 2 pages.
Notice of Acceptance received for Australian Patent Application No. 2020200685, dated Oct. 29, 2020, 3 pages.
Notice of Allowance received for Japanese Patent Application No. 2018-080122, dated May 7, 2021, 28 pages (1 page of English Translation and 27 pages of Official Copy).
Notice of Allowance received for Korean Patent Application No. 10-2020-0097418, dated Apr. 27, 2021, 5 pages (2 pages of English Translation and 3 pages of Official Copy).
Notice of Allowance received for U.S. Appl. No. 16/281,838, dated May 20, 2021, 9 pages.
Office Action received for Danish Patent Application No. PA202070620, dated May 10, 2021, 5 pages.
Decision to Grant received for European Patent Application No. 15787091.6, dated Dec. 3, 2020, 2 pages.
Office Action received for Japanese Patent Application No. 2020-028315, dated Nov. 9, 2020, 11 pages (6 pages of English Translation and 5 pages of Official Copy).
Result of Consultation received for European Patent Application No. 16710590.7, mailed on Dec. 7, 2020, 4 pages.
Non-Final Office Action received for U.S. Appl. No. 16/990,974, dated Oct. 15, 2020, 6 pages.
Notice of Allowance received for U.S. Appl. No. 15/992,722, dated Oct. 19, 2020, 5 pages.
Notice of Allowance received for U.S. Appl. No. 16/507,664, dated Oct. 15, 2020, 11 pages.
Office Action received for Korean Patent Application No. 10-2018-7035747, dated Oct. 14, 2020, 6 pages (3 pages of English Translation and 3 pages of Official Copy).
Non-Final Office Action received for U.S. Appl. No. 16/814,226, dated Jul. 13, 2021, 17 pages.
Office Action received for Australian Patent Application No. 2020239692, dated Jul. 20, 2021, 5 pages.
Notice of Allowance received for Japanese Patent Application No. 2019-000698, dated Feb. 8, 2021, 4 pages (1 page of English Translation and 3 pages of Official Copy).
Office Action received for Australian Patent Application No. 2019271927, dated Feb. 10, 2021, 5 pages.
Summons to Attend Oral Proceedings received for European Patent Application No. 16201159.7, mailed on Feb. 4, 2021, 12 pages.
Applicant Initiated Interview Summary received for U.S. Appl. No. 16/669,187, dated Jul. 2, 2021, 4 pages.
Brief Communication Regarding Oral Proceedings received for European Patent Application No. 16201159.7, dated Jun. 29, 2021, 13 pages.
Office Action received for Japanese Patent Application No. 2020-010992, dated May 24, 2021, 9 pages (4 pages of English Translation and 5 pages of Official Copy).
Applicant-Initiated Interview Summary received for U.S. Appl. No. 16/880,714, dated Feb. 26, 2021, 5 pages.
International Search Report and Written Opinion received for PCT Patent Application No. PCT/US2020/035164, dated Feb. 8, 2021, 26 pages.
International Search Report and Written Opinion received for PCT Patent Application No. PCT/US2020/052041, dated Feb. 8, 2021, 18 pages.
Non-Final Office Action received for U.S. Appl. No. 14/475,446, dated Mar. 9, 2021, 22 pages.
Office Action received for Japanese Patent Application No. 2019-234184, dated Jan. 29, 2021, 6 pages (3 pages of English Translation and 3 pages of Official Copy).
Final Office Action received for U.S. Appl. No. 14/475,446, dated Jun. 11, 2021, 23 pages.

(56) References Cited

OTHER PUBLICATIONS

Intention to Grant received for European Patent Application No. 16710590.7, dated Jun. 14, 2021, 8 pages.
Non-Final Office Action received for U.S. Appl. No. 16/434,747, dated Jun. 10, 2021, 13 pages.
Notice of Allowance received for U.S. Appl. No. 16/880,714, dated Jun. 9, 2021, 6 pages.
Office Action received for European Patent Application No. 20192404.0, dated Jun. 8, 2021, 7 pages.
Kern et al., "Context-Aware Notification for Wearable Computing", Perceptual Computing and Computer Vision, Proceedings of the Seventh IEEE International Symposium on Wearable Computers, 2003, 8 pages.
Advisory Action received for U.S. Appl. No. 16/669,187, dated Jan. 4, 2022, 4 pages.
Advisory Action received for U.S. Appl. No. 17/031,702, dated Jan. 10, 2022, 3 pages.
Board Decision received for Chinese Patent Application No. 201510284896.5, dated Nov. 19, 2021, 14 pages (1 page of English Translation and 13 pages of Official Copy).
Board Decision received for Chinese Patent Application No. 201810094316.X, dated Dec. 3, 2021, 18 pages (1 page of English Translation and 17 pages of Official Copy).
Notice of Acceptance received for Australian Patent Application No. 2020289822, dated Dec. 22, 2021, 3 pages.
Notice of Allowance received for U.S. Appl. No. 16/814,226, dated Dec. 30, 2021, 24 pages.
Office Action received for Australian Patent Application No. 2019271927, dated Dec. 17, 2021, 4 pages.
Notice of Allowance received for U.S. Appl. No. 16/990,974, dated Jan. 22, 2021, 7 pages.
Result of Consultation received for European Patent Application No. 18170262.2, dated Jan. 18, 2021, 3 pages.
Notice of Allowance received for U.S. Appl. No. 16/880,714, dated Mar. 19, 2021, 7 pages.
Office Action received for Chinese Patent Application No. 201810654707.2, dated Mar. 1, 2021, 23 pages (8 pages of English translation and 15 pages of official copy).
Corrected Notice of Allowance received for U.S. Appl. No. 16/814,226, dated Jan. 18, 2022, 21 pages.
Corrected Notice of Allowance received for U.S. Appl. No. 16/814,226, dated Jan. 27, 2022, 2 pages.
Non-Final Office Action received for U.S. Appl. No. 17/031,702, dated Jan. 26, 2022, 19 pages.
Notice of Allowance received for Chinese Patent Application No. 202010009882.3 dated Jan. 14, 2022, 4 pages (1 page of English Translation and 3 pages of Official Copy).
Notice of Allowance received for U.S. Appl. No. 14/475,471, dated Jan. 26, 2022, 6 pages.
Office Action received for Chinese Patent Application No. 201710094150.7, dated Jan. 10, 2022, 6 pages (3 pages of English Translation and 3 pages of Official Copy).
Office Action received for Chinese Patent Application No. 201810654707.2 dated Jan. 11, 2022, 11 pages (5 pages of English Translation and 6 pages of Official Copy).
Office Action received for European Patent Application No. 20195339.5, dated Jan. 20, 2022, 5 pages.
Office Action received for Japanese Patent Application No. 2020-551585, dated Jan. 6, 2022, 11 pages (5 pages of English Translation and 6 pages of Official Copy).
Bao et al., "Location-based and Preference-Aware Recommendation Using Sparse Geo-Social Networking Data", ACM SIGSPATIAL GIS '12, Redondo Beach, CA, USA, Online Available at: https://www.microsoft.com/en-us/research/wp-content/uploads/2016/02/LocationRecommendation.pdf, Nov. 6-9, 2012, 10 pages.
Intention to Grant received for European Patent Application No. 15787091.6, dated Sep. 30, 2020, 7 pages.
International Search Report and Written Opinion received for PCT Patent Application No. PCT/US2020/034155, dated Sep. 17, 2020, 19 pages.

Office Action received for Australian Patent Application No. 2020200028, dated Sep. 24, 2020, 3 pages.
Office Action received for Chinese Patent Application No. 201710734839.1, dated Aug. 24, 2020, 6 pages (3 pages of English Translation and 3 pages of Official Copy).
Lu Haiyun, "Recommendations Based on Purchase Patterns", International Journal of Machine Learning and Computing, vol. 4, No. 6, Online available at http://www.ijmlc.org/papers/462-C015.pdf, Dec. 2014, 4 pages.
Decision on Appeal received for U.S. Appl. No. 14/475,471, mailed on Nov. 16, 2021, 12 pages.
Examiner-Initiated Interview Summary received for U.S. Appl. No. 16/814,226, dated Nov. 15, 2021, 2 pages.
Notice of Allowance received for Korean Patent Application No. 10-2021-0099243, dated Oct. 30, 2021, 4 pages (1 page of English Translation and 3 pages of Official Copy).
Office Action received for Chinese Patent Application No. 202110011509.6, dated Oct. 11, 2021, 10 pages (5 pages of English Translation and 5 pages of Official Copy).
Office Action received for Indian Patent Application No. 202018014786, dated Nov. 9, 2021, 7 pages.
Office Action received for Japanese Patent Application No. 2019-234184, dated Oct. 15, 2021, 8 pages (4 pages of English Translation and 4 pages of Official Copy).
Applicant-Initiated Interview Summary received for U.S. Appl. No. 16/434,747, dated Sep. 8, 2021, 4 pages.
Applicant-Initiated Interview Summary received for U.S. Appl. No. 16/814,226, dated Aug. 30, 2021, 3 pages.
Office Action received for Australian Patent Application No. 2020289822, dated Aug. 24, 2021, 7 pages.
Office Action received for Chinese Patent Application No. 202010009882.3, dated Aug. 9, 2021, 11 pages (5 pages of English Translation and 6 pages of Official Copy).
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Final Office Action received for U.S. Appl. No. 16/434,747, dated Nov. 26, 2021, 14 pages.
Office Action received for Danish Patent Application No. PA202070620, dated Nov. 19, 2021, 2 pages.
Decision to Grant received for European Patent Application No. 16710590.7, dated Oct. 28, 2021, 2 pages.
Final Office Action received for U.S. Appl. No. 16/814,226, dated Oct. 28, 2021, 19 pages.
Intention to Grant received for European Patent Application No. 18170262.2, dated Oct. 27, 2021, 8 pages.
Office Action received for European Patent Application No. 19203942.8, dated Oct. 29, 2021, 6 pages.
Applicant-Initiated Interview Summary received for U.S. Appl. No. 17/031,702, dated Dec. 29, 2021, 5 pages.
International Preliminary Report on Patentability received for PCT Patent Application No. PCT/US2020/035164, dated Dec. 16, 2021, 19 pages.
International Preliminary Report on Patentability received for PCT Patent Application No. PCT/US2020/034155, dated Dec. 16, 2021, 14 pages.
Record of Oral Hearing received for U.S. Appl. No. 14/475,471, mailed on Dec. 9, 2021, 22 pages.
Applicant-Initiated Interview Summary received for U.S. Appl. No. 16/669,187, dated Nov. 23, 2020, 3 pages.
Corrected Notice of Allowance received for U.S. Appl. No. 16/507,664, dated Nov. 27, 2020, 7 pages.
European Search Report received for European Patent Application No. 20192404.0, dated Nov. 20, 2020, 4 pages.
Invitation to Pay Additional Fees and Partial International Search Report received for PCT Patent Application No. PCT/US2020/035164, dated Oct. 16, 2020, 14 pages.
Non-Final Office Action received for U.S. Appl. No. 16/880,714, dated Oct. 28, 2020, 11 pages.
Notice of Acceptance received for Australian Patent Application No. 2020200028, dated Nov. 10, 2020, 3 pages.

(56) References Cited

OTHER PUBLICATIONS

Notice of Allowance received for Chinese Patent Application No. 201580077218.X, dated Nov. 13, 2020, 2 pages (1 page of English Translation and 1 page of Official Copy).
Office Action received for European Patent Application No. 15727130.5, dated Nov. 19, 2020, 5 pages.
Office Action received for Japanese Patent Application No. 2019000698, dated Oct. 23, 2020, 4 pages (2 pages of English Translation and 2 pages of Official Copy).
Office Action received for Indian Patent Application No. 202018044420, dated Jan. 31, 2022, 6 pages.
Office Action received for Japanese Patent Application No. 2020-010992, dated Jan. 28, 2022, 6 pages (3 pages of English Translation and 3 pages of Official Copy).
Summons to Attend Oral Proceedings received for European Patent Application No. 20192404.0, mailed on Feb. 2, 2022, 11 pages.
Decision to Refuse received for European Patent Application No. 16201159.7, dated Sep. 27, 2021, 22 pages.
Minutes of the Oral Proceedings received for European Patent Application No. 16201159.7, mailed on Sep. 23, 2021, 6 pages.
Office Action received for Australian Patent Application No. 2019271927, dated Sep. 8, 2021, 4 pages.
Supplemental Notice of Allowance received for U.S. Appl. No. 16/880,714, dated Sep. 16, 2021, 2 pages.
Board Decision received for Chinese Patent Application No. 201710094150.7, dated Dec. 22, 2021, 20 pages (1 page of English Translation and 19 pages of Official Copy).
Brief Communication Regarding Oral Proceedings received for European Patent Application No. 20180033.1, dated Feb. 25, 2022, 20 pages.
Corrected Notice of Allowance received for U.S. Appl. No. 16/814,226, dated Mar. 9, 2022, 2 pages.
Decision to Grant received for European Patent Application No. 15727130.5, dated Mar. 3, 2022, 3 pages.
Extended European Search Report received for European Patent Application No. 21207736.6, dated Feb. 22, 2022, 11 pages.
International Search Report and Written Opinion received for PCT Patent Application No. PCT/US2021/056674, dated Jan. 26, 2022, 10 pages.
Notice of Allowance received for Chinese Patent Application No. 201710094150.7, dated Feb. 23, 2022, 4 pages (1 page of English Translation and 3 pages of Official Copy).
Office Action received for Indian Patent Application No. 202118018461, dated Feb. 23, 2022, 6 pages.
Das et al., "A Security Framework for Mobile-to-Mobile Payment Network", International Conference on Personal Wireless Communications., Jan. 25, 2005, pp. 420-423.
Corrected Notice of Allowance received for U.S. Appl. No. 16/814,226, dated Apr. 8, 2022, 2 pages.
Notice of Acceptance received for Australian Patent Application No. 2020239692, dated Apr. 6, 2022, 3 pages.
Notice of Allowance received for U.S. Appl. No. 16/434,747, dated Apr. 28, 2022, 8 pages.
Notice of Allowance received for U.S. Appl. No. 16/669,187, dated Apr. 25, 2022, 9 pages.
Office Action received for Chinese Patent Application No. 201510284896.5, dated Mar. 14, 2022, 10 pages (5 pages of English Translation and 5 pages of Official Copy).
Decision to Refuse received for European Patent Application No. 20180033.1, dated Mar. 28, 2022, 30 pages.
Minutes of the Oral Proceedings received for European Patent Application No. 20180033.1, mailed on Mar. 25, 2022, 15 pages.
Non-Final Office Action received for U.S. Appl. No. 17/041,415, dated Mar. 29, 2022, 11 pages.
Notice of Allowance received for Japanese Patent Application No. 2019-234184, dated Mar. 22, 2022, 4 pages (1 page of English Translation and 3 pages of Official Copy).
Notice of Allowance received for U.S. Appl. No. 14/475,471, dated Mar. 30, 2022, 3 pages.
Brief Communication Regarding Oral Proceedings received for European Patent Application No. 20192404.0, dated May 4, 2022, 3 pages.
Examiner's Answer to Appeal Brief received for U.S. Appl. No. 14/475,446, dated Apr. 29, 2022, 12 pages.
Office Action received for Chinese Patent Application No. 201810654707.2 dated Apr. 2, 2022, 16 pages (6 pages of English Translation and 10 pages of Official Copy).
Office Action received for Korean Patent Application No. 10-2022-0010942, dated Apr. 27, 2022, 5 pages (2 pages of English Translation and 3 pages of Official Copy).
Applicant-initiated Interview Summary received for U.S. Appl. No. 16/434,747, dated Mar. 18, 2022, 4 pages.
Decision to Grant received for European Patent Application No. 18170262.2, dated Mar. 11, 2022, 2 pages.
Notice of Allowance received for Chinese Patent Application No. 202110011509.6, dated Mar. 2, 2022, 2 pages (1 page of English Translation and 1 page of Official Copy).
Yongxi et al., "Application of RFID Technology in Mobile Payment", China Academic Journal Electronic Publishing House, 1994-2022, Nov. 25, 2012, pp. 97-99 (Official Copy Only). {See Communication under 37 CFR § 1.98(a) (3)}.
Office Action received for Australian Patent Application No. 2020239692, dated Jan. 27, 2022, 3 pages.
Office Action received for Australian Patent Application No. 2021201059, dated Feb. 15, 2022, 4 pages.
Office Action received for Japanese Patent Application No. 2020-028315, dated Feb. 7, 2022, 6 pages (3 pages of English Translation and 3 pages of Official Copy).
Applicant-Initiated Interview Summary received for U.S. Appl. No. 17/031,702, dated Jun. 1, 2022, 4 pages.
Notice of Allowance received for Japanese Patent Application No. 2020-028315, dated May 27, 2022, 3 pages (1 page of English Translation and 2 pages of Official Copy).
Office Action received for Australian Patent Application No. 2021201059, dated May 25, 2022, 3 pages.

* cited by examiner

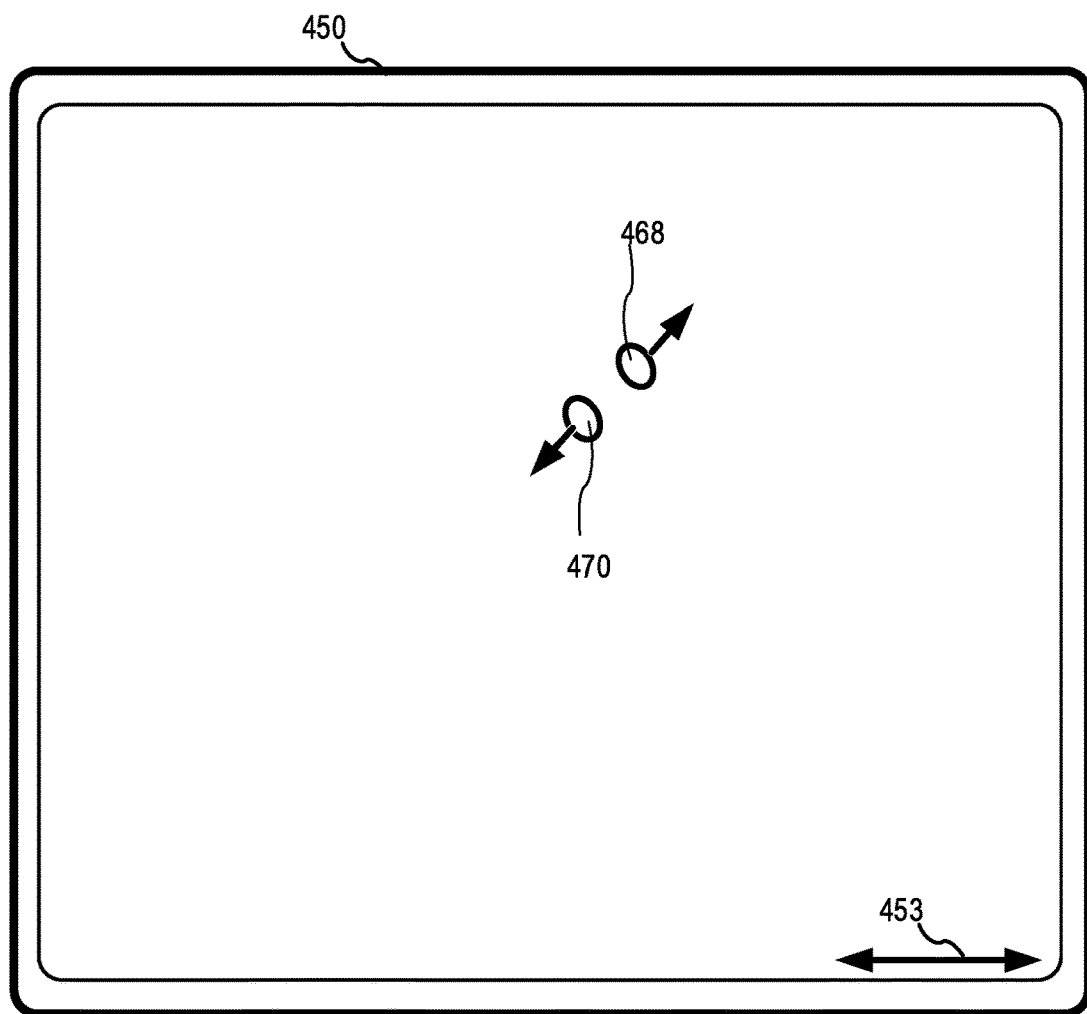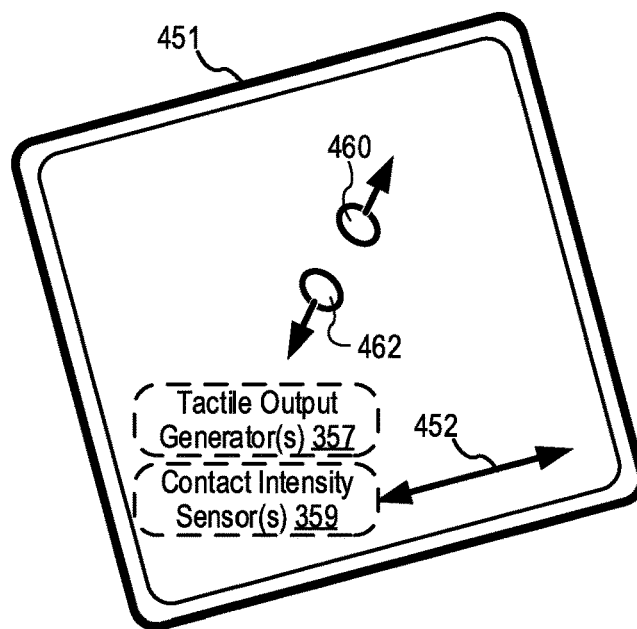
FIG. 4B

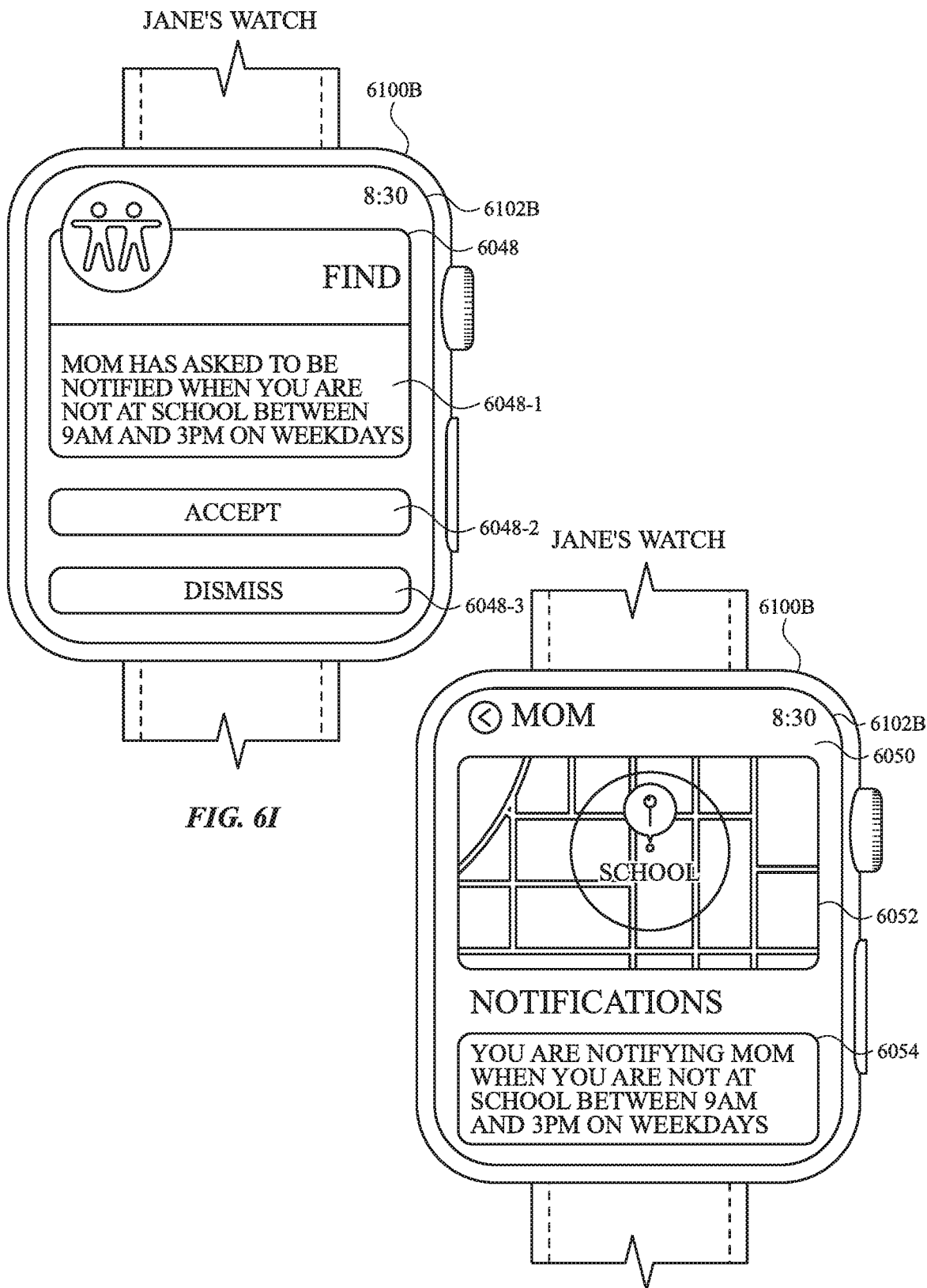

700

702
While an electronic device is associated with a first user account that shares a location of the electronic device with one or more user accounts other than the first user account:

704
Receive an indication that a second user account is requesting to be notified about changes in location of the electronic device relative to a first geographic location that satisfy a set of criteria.

706
After the electronic device receives the indication that the second user account is requesting to be notified about changes in the location of the electronic device relative to the first geographic location that satisfy the set of criteria:

708
In accordance with a determination that a set of notification criteria are satisfied, the set of notification criteria including a criterion that is satisfied when the indication that the second user account is requesting to be notified has been received, display, via the display device, a notification indicating that the second user account is requesting to be notified about changes in the location of the electronic device relative to the first geographic location that satisfy the set of criteria.

710
In accordance with a determination that the set of notification criteria are not satisfied, forgo displaying the notification indicating that the second user account is requesting to be notified about changes in the location of the electronic device relative to the first geographic location that satisfy the set of criteria.

802
While a current location associated with a user account is being evaluated relative to a geographic location and a range of times:

804
In accordance with a determination that the current location associated with the user account does not have a predefined relationship to the geographic location during the range of times, generate an alert indicating that the current location associated with the user account does not have the predefined relationship to the geographic location.

806
In accordance with a determination that the current location associated with the user account does not have a predefined relationship to the geographic location at a time that is outside of the range of times, forgo generating an alert indicating that the current location associated with the user account does not have the predefined relationship to the geographic location.

808
In accordance with a determination that the current location associated with the user account has a predefined relationship to the geographic location at a time that is outside of the range of times, forgo generating an alert indicating that the current location associated with the user account does not have the predefined relationship to the geographic location

810
In accordance with a determination that the current location associated with the user account has a predefined relationship to the geographic location during the range of times, forgo generating an alert indicating that the current location associated with the user account does not have the predefined relationship to the geographic location.

*FIG. 8*

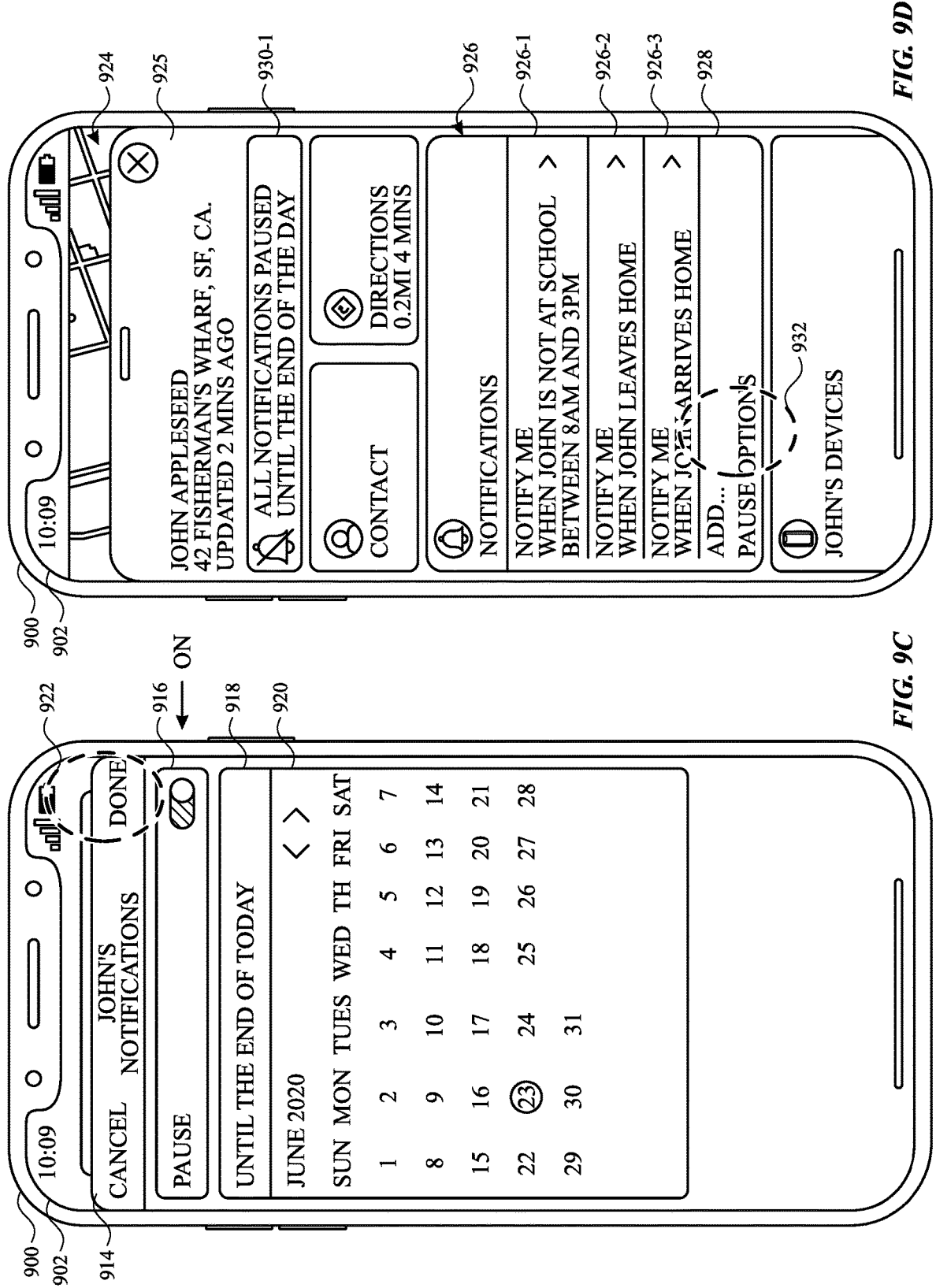

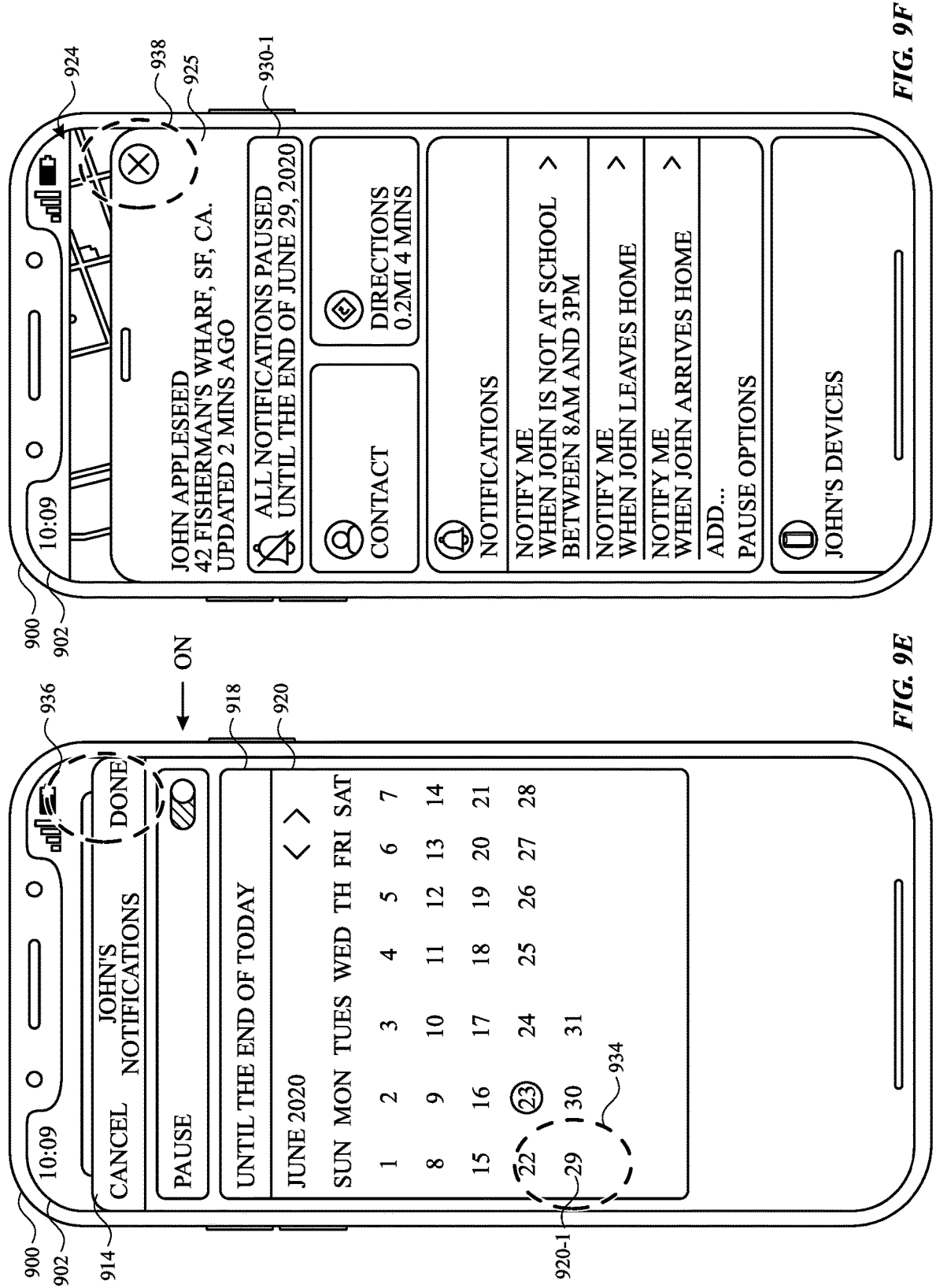

1200

1202
While an alert condition that is triggered based on a comparison between a current location associated with a user account relative to a geographic location and a range of times is active:

1204
After generating a first alert based on having met a first set of criteria that includes a criterion that is met when the current location associated with the user account does not have a first predefined relationship to the geographic location during the range of times, and while still within the range of times, detect a change in the current location associated with the user account.

1206
In response to detecting the change in the current location associated with the user account and in accordance with a determination that a second set of criteria are met, wherein the second set of criteria includes a criterion that is met when the current location associated with the user account has a second predefined relationship to the geographic location, generate a second alert.

1208
In response to detecting the change in the current location associated with the user account and in accordance with a determination that the second set of criteria are not met, forgo generating the second alert.

*FIG. 12*

USER INTERFACES FOR LOCATION-RELATED COMMUNICATIONS

CROSS-REFERENCE TO RELATED APPLICATIONS

This application is a Continuation-In-Part of U.S. patent application Ser. No. 16/669,187, entitled "User interfaces for Location-Related Communications," filed Oct. 30, 2019, which claims the benefit of U.S. Provisional Application No. 62/856,005, entitled "User interfaces for Location-Related Communications," filed Jun. 1, 2019, the contents of which are hereby incorporated by reference in their entireties.

FIELD

The present disclosure relates generally to computer user interfaces, and more specifically to techniques for managing location-related communications of an electronic device associated with a user account.

BACKGROUND

An electronic device can include hardware and/or software for identifying the current location of the electronic device. Such a device can also communicate its location to one or more other devices.

BRIEF SUMMARY

Some techniques for managing location-related communications of an electronic device associated with a user account using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices. Existing techniques may also not provide sufficient notice and security for sensitive, location-related communications.

Accordingly, the present technique provides electronic devices with faster, more efficient methods and interfaces for managing location-related communications of an electronic device associated with a user account. Such methods and interfaces optionally complement or replace other methods for managing location-related communications of an electronic device associated with a user account. Such methods and interfaces reduce the cognitive burden on a user and produce a more efficient human-machine interface. For battery-operated computing devices, such methods and interfaces conserve power and increase the time between battery charges.

Example methods are described herein. An example method includes, at an electronic device having a display device: while the electronic device is associated with a first user account that shares a location of the electronic device with one or more user accounts other than the first user account: receiving an indication that a second user account is requesting to be notified about changes in location of the electronic device relative to a first geographic location that satisfy a set of criteria; and after receiving the indication that the second user account is requesting to be notified about changes in the location of the electronic device relative to the first geographic location that satisfy the set of criteria: in accordance with a determination that a set of notification criteria are satisfied, the set of notification criteria including a criterion that is satisfied when the indication that the second user account is requesting to be notified has been received, displaying, via the display device, a notification indicating that the second user account is requesting to be notified about changes in the location of the electronic device relative to the first geographic location that satisfy the set of criteria.

Example non-transitory computer-readable storage media are described herein. An example non-transitory computer-readable storage medium stores one or more programs configured to be executed by one or more processors of an electronic device with a display device, the one or more programs including instructions for: while the electronic device is associated with a first user account that shares a location of the electronic device with one or more user accounts other than the first user account: receiving an indication that a second user account is requesting to be notified about changes in location of the electronic device relative to a first geographic location that satisfy a set of criteria; and after receiving the indication that the second user account is requesting to be notified about changes in the location of the electronic device relative to the first geographic location that satisfy the set of criteria: in accordance with a determination that a set of notification criteria are satisfied, the set of notification criteria including a criterion that is satisfied when the indication that the second user account is requesting to be notified has been received, displaying, via the display device, a notification indicating that the second user account is requesting to be notified about changes in the location of the electronic device relative to the first geographic location that satisfy the set of criteria.

Example transitory computer-readable storage media are described herein. An example transitory computer-readable storage medium stores one or more programs configured to be executed by one or more processors of an electronic device with a display device, the one or more programs including instructions for: while the electronic device is associated with a first user account that shares a location of the electronic device with one or more user accounts other than the first user account: receiving an indication that a second user account is requesting to be notified about changes in location of the electronic device relative to a first geographic location that satisfy a set of criteria; and after receiving the indication that the second user account is requesting to be notified about changes in the location of the electronic device relative to the first geographic location that satisfy the set of criteria: in accordance with a determination that a set of notification criteria are satisfied, the set of notification criteria including a criterion that is satisfied when the indication that the second user account is requesting to be notified has been received, displaying, via the display device, a notification indicating that the second user account is requesting to be notified about changes in the location of the electronic device relative to the first geographic location that satisfy the set of criteria.

Example electronic devices are described herein. An example electronic device includes a display device; one or more processors; and memory storing one or more programs configured to be executed by the one or more processors, the one or more programs including instructions for: while the electronic device is associated with a first user account that shares a location of the electronic device with one or more user accounts other than the first user account: receiving an indication that a second user account is requesting to be notified about changes in location of the electronic device relative to a first geographic location that satisfy a set of criteria; and after receiving the indication that the second user account is requesting to be notified about changes in the location of the electronic device relative to the first geographic location that satisfy the set of criteria: in accordance with a determination that a set of notification criteria are satisfied, the set of notification criteria including a criterion that is satisfied when the indication that the second user account is requesting to be notified has been received, displaying, via the display device, a notification indicating that the second user account is requesting to be notified about changes in the location of the electronic device relative to the first geographic location that satisfy the set of criteria.

An example electronic device includes a display device; and means for, while the electronic device is associated with a first user account that shares a location of the electronic device with one or more user accounts other than the first user account: receiving an indication that a second user account is requesting to be notified about changes in location of the electronic device relative to a first geographic location that satisfy a set of criteria; and after receiving the indication that the second user account is requesting to be notified about changes in the location of the electronic device relative to the first geographic location that satisfy the set of criteria: in accordance with a determination that a set of notification criteria are satisfied, the set of notification criteria including a criterion that is satisfied when the indication that the second user account is requesting to be notified has been received, displaying, via the display device, a notification indicating that the second user account is requesting to be notified about changes in the location of the electronic device relative to the first geographic location that satisfy the set of criteria.

An example method includes, at an electronic device: while a current location associated with a user account is being evaluated relative to a geographic location and a range of times: in accordance with a determination that the current location associated with the user account does not have a predefined relationship to the geographic location during the range of times, generating an alert indicating that the current location associated with the user account does not have the predefined relationship to the geographic location; and in accordance with a determination that the current location associated with the user account does not have a predefined relationship to the geographic location at a time that is outside of the range of times, forgoing generation of an alert indicating that the current location associated with the user account does not have the predefined relationship to the geographic location.

An example non-transitory computer-readable storage medium stores one or more programs configured to be executed by one or more processors of an electronic device with a display device, the one or more programs including instructions for: while a current location associated with a user account is being evaluated relative to a geographic location and a range of times: in accordance with a determination that the current location associated with the user account does not have a predefined relationship to the geographic location during the range of times, generating an alert indicating that the current location associated with the user account does not have the predefined relationship to the geographic location; and in accordance with a determination that the current location associated with the user account does not have a predefined relationship to the geographic location at a time that is outside of the range of times, forgoing generation of an alert indicating that the current location associated with the user account does not have the predefined relationship to the geographic location.

An example transitory computer-readable storage medium stores one or more programs configured to be executed by one or more processors of an electronic device with a display device, the one or more programs including instructions for: while a current location associated with a user account is being evaluated relative to a geographic location and a range of times: in accordance with a determination that the current location associated with the user account does not have a predefined relationship to the geographic location during the range of times, generating an alert indicating that the current location associated with the user account does not have the predefined relationship to the geographic location; and in accordance with a determination that the current location associated with the user account does not have a predefined relationship to the geographic location at a time that is outside of the range of times, forgoing generation of an alert indicating that the current location associated with the user account does not have the predefined relationship to the geographic location.

An example electronic device includes one or more processors; and memory storing one or more programs configured to be executed by the one or more processors, the one or more programs including instructions for: while a current location associated with a user account is being evaluated relative to a geographic location and a range of times: in accordance with a determination that the current location associated with the user account does not have a predefined relationship to the geographic location during the range of times, generating an alert indicating that the current location associated with the user account does not have the predefined relationship to the geographic location; and in accordance with a determination that the current location associated with the user account does not have a predefined relationship to the geographic location at a time that is outside of the range of times, forgoing generation of an alert indicating that the current location associated with the user account does not have the predefined relationship to the geographic location.

An example electronic device includes means for, while a current location associated with a user account is being evaluated relative to a geographic location and a range of times: in accordance with a determination that the current location associated with the user account does not have a predefined relationship to the geographic location during the range of times, generating an alert indicating that the current location associated with the user account does not have the predefined relationship to the geographic location; and in accordance with a determination that the current location associated with the user account does not have a predefined relationship to the geographic location at a time that is outside of the range of times, forgoing generation of an alert indicating that the current location associated with the user account does not have the predefined relationship to the geographic location.

Example methods are described herein. An example method includes, at a computer system that is in communication with a display generation component: while an alert condition that is triggered based a comparison between a current location associated with a user account relative to a geographic location is active: displaying, via the display generation component, a user interface that includes: one or more representations of active alert conditions associated with the user account for generating one or more alerts indicating that the current location associated with the user account does not have a predefined relationship to a geographic location; and a first selectable user interface object that, when selected, transitions the computer system to a first mode that prevents alerts corresponding to one or more of the active alert conditions from being generated; in response to a determination that the current location associated with the user account does not have a predefined relationship to a geographic location: in accordance with a determination that a set of alert criteria are met, the alert criteria including a criterion that is met when the computer system is not in the first mode, generating an alert indicating that the current location associated with the user account does not have the predefined relationship to the geographic location; and in accordance with a determination that the alert criteria are not met, forgoing generating an alert indicating that the current location associated with the user account does not have the predefined relationship to the geographic location.

Example non-transitory computer-readable storage media are described herein. An example non-transitory computer-readable storage medium stores one or more programs configured to be executed by one or more processors of a computer system that is in communication a display generation component, the one or more programs including instructions for: while an alert condition that is triggered based a comparison between a current location associated with a user account relative to a geographic location is active: displaying, via the display generation component, a user interface that includes: one or more representations of active alert conditions associated with the user account for generating one or more alerts indicating that the current location associated with the user account does not have a predefined relationship to a geographic location; and a first selectable user interface object that, when selected, transitions the computer system to a first mode that prevents alerts corresponding to one or more of the active alert conditions from being generated; in response to a determination that the current location associated with the user account does not have a predefined relationship to a geographic location: in accordance with a determination that a set of alert criteria are met, the alert criteria including a criterion that is met when the computer system is not in the first mode, generating an alert indicating that the current location associated with the user account does not have the predefined relationship to the geographic location; and in accordance with a determination that the alert criteria are not met, forgoing generating an alert indicating that the current location associated with the user account does not have the predefined relationship to the geographic location.

Example transitory computer-readable storage media are described herein. An example transitory computer-readable storage medium stores one or more programs configured to be executed by one or more processors of a computer system that is in communication a display generation component, the one or more programs including instructions for: while an alert condition that is triggered based a comparison between a current location associated with a user account relative to a geographic location is active: displaying, via the display generation component, a user interface that includes: one or more representations of active alert conditions associated with the user account for generating one or more alerts indicating that the current location associated with the user account does not have a predefined relationship to a geographic location; and a first selectable user interface object that, when selected, transitions the computer system to a first mode that prevents alerts corresponding to one or more of the active alert conditions from being generated; in response to a determination that the current location associated with the user account does not have a predefined relationship to a geographic location: in accordance with a determination that a set of alert criteria are met, the alert criteria including a criterion that is met when the computer system is not in the first mode, generating an alert indicating that the current location associated with the user account does not have the predefined relationship to the geographic location; and in accordance with a determination that the alert criteria are not met, forgoing generating an alert indicating that the current location associated with the user account does not have the predefined relationship to the geographic location.

Example computer systems are described herein. An example computer system is in communication with a display generation component, and includes one or more processors, and memory storing one or more programs configured to be executed by the one or more processors, the one or more programs including instructions for: while an alert condition that is triggered based a comparison between a current location associated with a user account relative to a geographic location is active: displaying, via the display generation component, a user interface that includes: one or more representations of active alert conditions associated with the user account for generating one or more alerts indicating that the current location associated with the user account does not have a predefined relationship to a geographic location; and a first selectable user interface object that, when selected, transitions the computer system to a first mode that prevents alerts corresponding to one or more of the active alert conditions from being generated; in response to a determination that the current location associated with the user account does not have a predefined relationship to a geographic location: in accordance with a determination that a set of alert criteria are met, the alert criteria including a criterion that is met when the computer system is not in the first mode, generating an alert indicating that the current location associated with the user account does not have the predefined relationship to the geographic location; and in accordance with a determination that the alert criteria are not met, forgoing generating an alert indicating that the current location associated with the user account does not have the predefined relationship to the geographic location.

An example computer system is in communication with a display generation component, and includes: means for, while an alert condition that is triggered based a comparison between a current location associated with a user account relative to a geographic location is active: displaying, via the display generation component, a user interface that includes: one or more representations of active alert conditions associated with the user account for generating one or more alerts indicating that the current location associated with the user account does not have a predefined relationship to a geographic location; and a first selectable user interface object that, when selected, transitions the computer system to a first mode that prevents alerts corresponding to one or more of the active alert conditions from being generated; in response to a determination that the current location associated with the user account does not have a predefined relationship to a geographic location: in accordance with a determination that a set of alert criteria are met, the alert criteria including a criterion that is met when the computer system is not in the first mode, generating an alert indicating that the current location associated with the user account does not have the predefined relationship to the geographic location; and in accordance with a determination that the alert criteria are not met, forgoing generating an alert indicating that the current location associated with the user account does not have the predefined relationship to the geographic location.

Example methods are described herein. An example method includes, at a computer system: while an alert condition that is triggered based on a comparison between a current location associated with a user account relative to a geographic location and a range of times is active: after generating a first alert based on having met a first set of criteria that includes a criterion that is met when the current location associated with the user account does not have a first predefined relationship to the geographic location during the range of times, and while still within the range of times, detecting a change in the current location associated with the user account; and in response to detecting the change in the current location associated with the user account and in accordance with a determination that a second set of criteria are met, wherein the second set of criteria includes a criterion that is met when the current location associated with the user account has a second predefined relationship to the geographic location, generating a second alert.

Example non-transitory computer-readable storage media are described herein. An example non-transitory computer-readable storage medium stores one or more programs configured to be executed by one or more processors of a computer system, the one or more programs including instructions for: while an alert condition that is triggered based on a comparison between a current location associated with a user account relative to a geographic location and a range of times is active: after generating a first alert based on having met a first set of criteria that includes a criterion that is met when the current location associated with the user account does not have a first predefined relationship to the geographic location during the range of times, and while still within the range of times, detecting a change in the current location associated with the user account; and in response to detecting the change in the current location associated with the user account and in accordance with a determination that a second set of criteria are met, wherein the second set of criteria includes a criterion that is met when the current location associated with the user account has a second predefined relationship to the geographic location, generating a second alert.

Example transitory computer-readable storage media are described herein. An example transitory computer-readable storage medium stores one or more programs configured to be executed by one or more processors of a computer system, the one or more programs including instructions for: while an alert condition that is triggered based on a comparison between a current location associated with a user account relative to a geographic location and a range of times is active: after generating a first alert based on having met a first set of criteria that includes a criterion that is met when the current location associated with the user account does not have a first predefined relationship to the geographic location during the range of times, and while still within the range of times, detecting a change in the current location associated with the user account; and in response to detecting the change in the current location associated with the user account and in accordance with a determination that a second set of criteria are met, wherein the second set of criteria includes a criterion that is met when the current location associated with the user account has a second predefined relationship to the geographic location, generating a second alert.

Example computer systems are described herein. An example computer system includes one or more processors, and memory storing one or more programs configured to be executed by the one or more processors, the one or more programs including instructions for: while an alert condition that is triggered based on a comparison between a current location associated with a user account relative to a geographic location and a range of times is active: after generating a first alert based on having met a first set of criteria that includes a criterion that is met when the current location associated with the user account does not have a first predefined relationship to the geographic location during the range of times, and while still within the range of times, detecting a change in the current location associated with the user account; and in response to detecting the change in the current location associated with the user account and in accordance with a determination that a second set of criteria are met, wherein the second set of criteria includes a criterion that is met when the current location associated with the user account has a second predefined relationship to the geographic location, generating a second alert.

An example computer system includes: means for while an alert condition that is triggered based on a comparison between a current location associated with a user account relative to a geographic location and a range of times is active: after generating a first alert based on having met a first set of criteria that includes a criterion that is met when the current location associated with the user account does not have a first predefined relationship to the geographic location during the range of times, and while still within the range of times; detecting a change in the current location associated with the user account; and in response to detecting the change in the current location associated with the user account and in accordance with a determination that a second set of criteria are met, wherein the second set of criteria includes a criterion that is met when the current location associated with the user account has a second predefined relationship to the geographic location, generating a second alert.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing location-related communications of an electronic device associated with a user account, thereby increasing the effectiveness, efficiency, and user satisfaction with such devices. Such methods and interfaces may complement or replace other methods for managing location-related communications of an electronic device associated with a user account.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for managing location-related communications of an electronic device associated with a user account, in accordance with some embodiments.

FIG. 8 is a flow diagram illustrating a method for managing location-related communications of an electronic device associated with a user account, in accordance with some embodiments.

FIGS. 9A-9L illustrate exemplary user interfaces for managing location-related communications of an electronic device associated with a user account, in accordance with some embodiments.

FIG. 12 is a flow diagram illustrating a method for managing location-related communications of an electronic device associated with a user account, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing location-related communications of an electronic device associated with a user account. For example, a parent can manage notifications for indicating when another device, such as a child's device that is associated with the child's user account, is not at an expected geographic location for a particular timeframe. Such techniques can reduce the cognitive burden on a user who manages location-related communications of an electronic device associated with a user account, thereby enhancing productivity. Further, such techniques can reduce processor and battery power otherwise wasted on redundant user inputs.

Figure 9B:
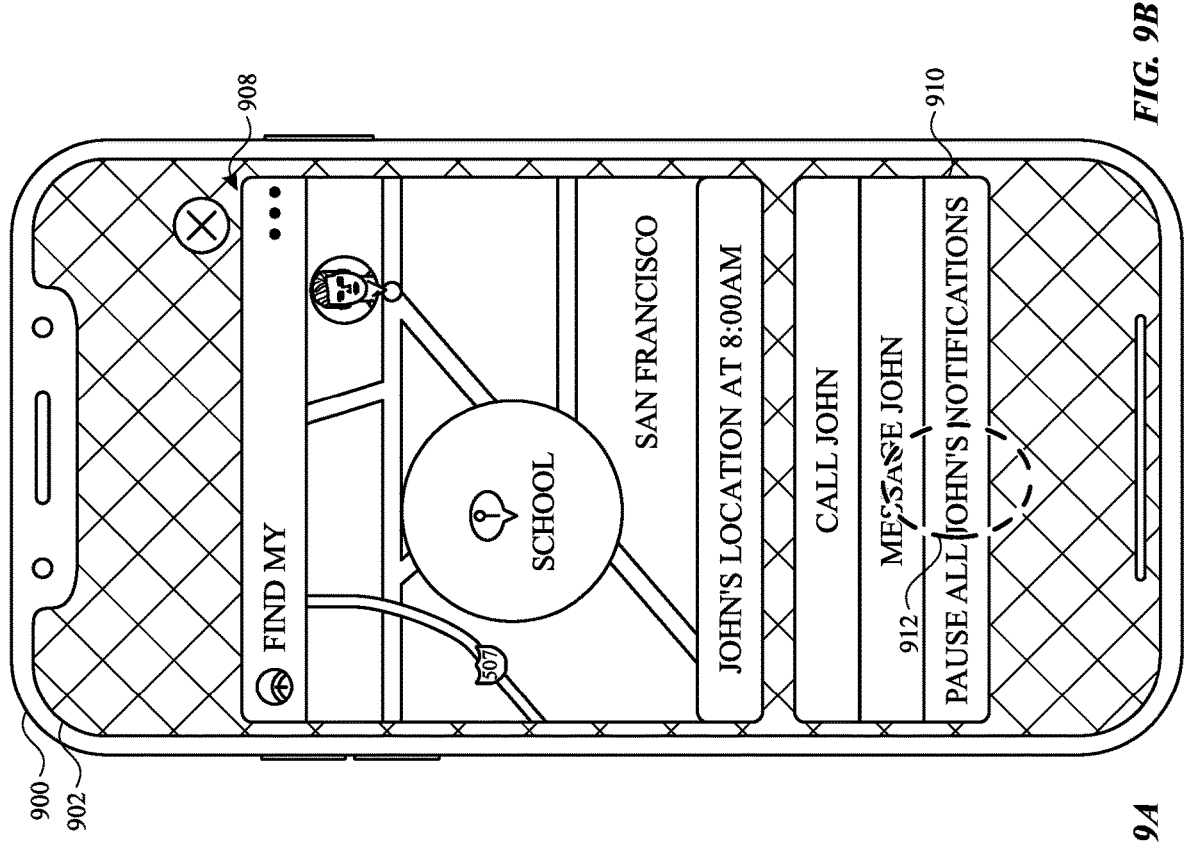
Figure 10:
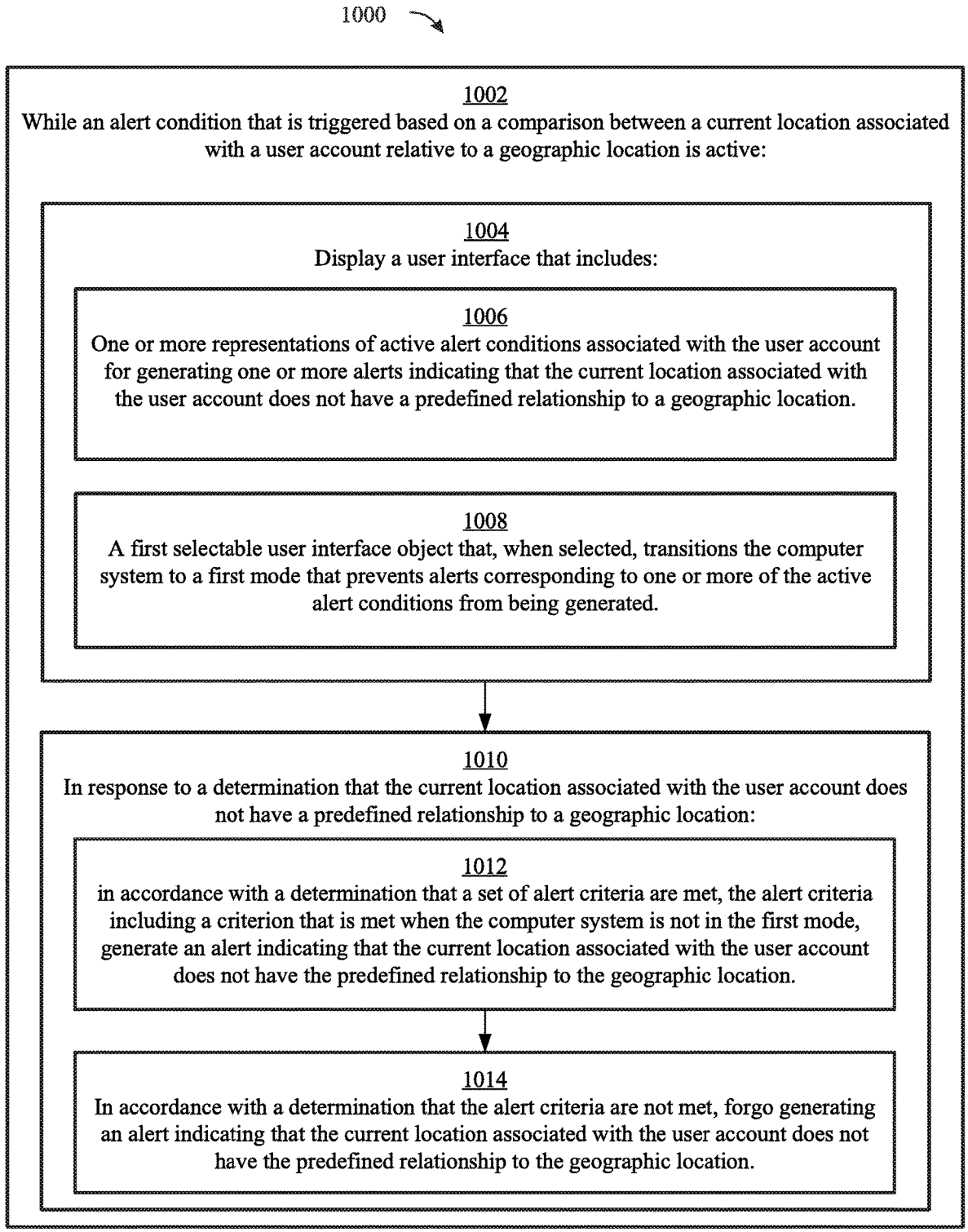
FIG. 10 is a flow diagram illustrating a method for managing location-related communications of an electronic device associated with a user account, in accordance with some embodiments.
Figure 11A:
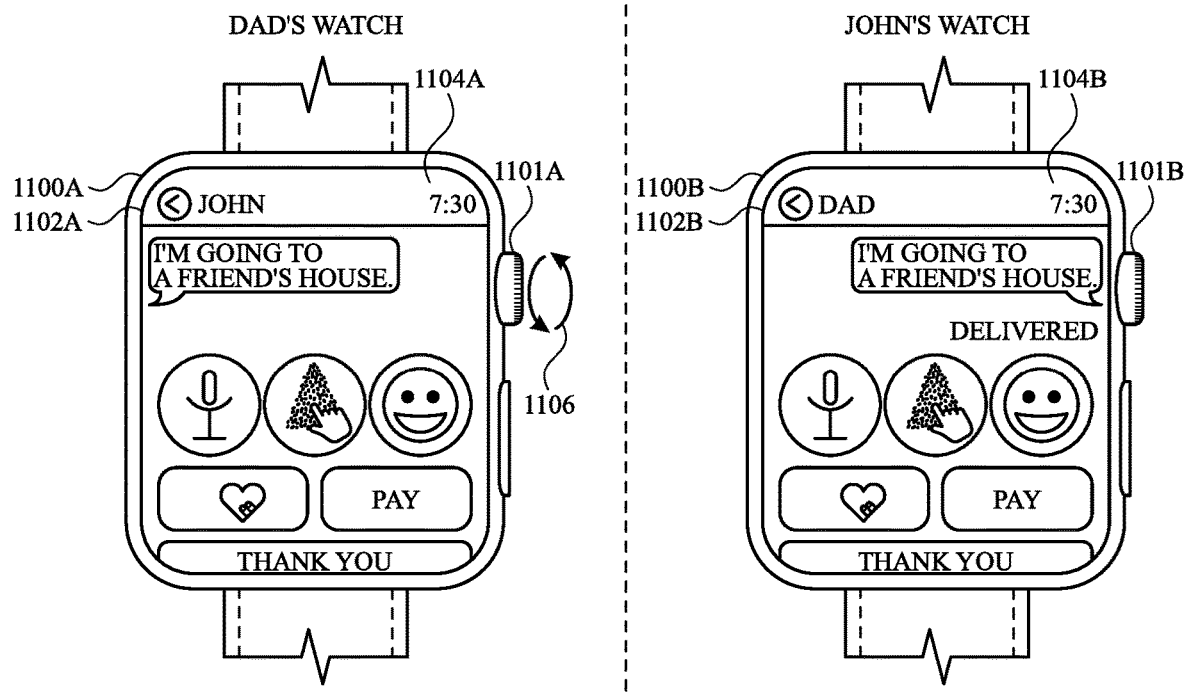
FIGS. 11A-11R illustrate exemplary user interfaces for managing location-related communications of an electronic device associated with a user account, in accordance with some embodiments.

Below, FIGS. 1A-1B, 2, 3, 4A-4B, and 5A-5B provide a description of exemplary devices for performing the techniques for managing location-related communications of an electronic device. FIGS. 6A-6U illustrate exemplary user interfaces for managing location-related communications of an electronic device associated with a user account. FIG. 7 is a flow diagram illustrating methods of managing location-related communications of an electronic device associated with a user account, in accordance with some embodiments. FIG. 8 is a flow diagram illustrating methods of managing location-related communications of an electronic device associated with a user account, in accordance with some embodiments. The user interfaces in FIGS. 6A-6U are used to illustrate the processes described below, including the processes in FIGS. 7 and 8. FIGS. 9A-9L, illustrate exemplary user interfaces for managing location-related communications of an electronic device associated with a user account. FIG. 10 is a flow diagram illustrating methods of managing location-related communications of an electronic device associated with a user account, in accordance with some embodiments. The user interfaces in FIGS. 9A-9L are used to illustrate the processes described below, including the processes in FIG. 10. FIGS. 11A-11R illustrate exemplary user interfaces for managing location-related communications of an electronic device associated with a user account. FIG. 12 is a flow diagram illustrating methods of managing location-related communications of an electronic device associated with a user account, in accordance with some embodiments. The user interfaces in FIGS. 11A-11R are used to illustrate the processes described below, including the processes in FIG. 12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
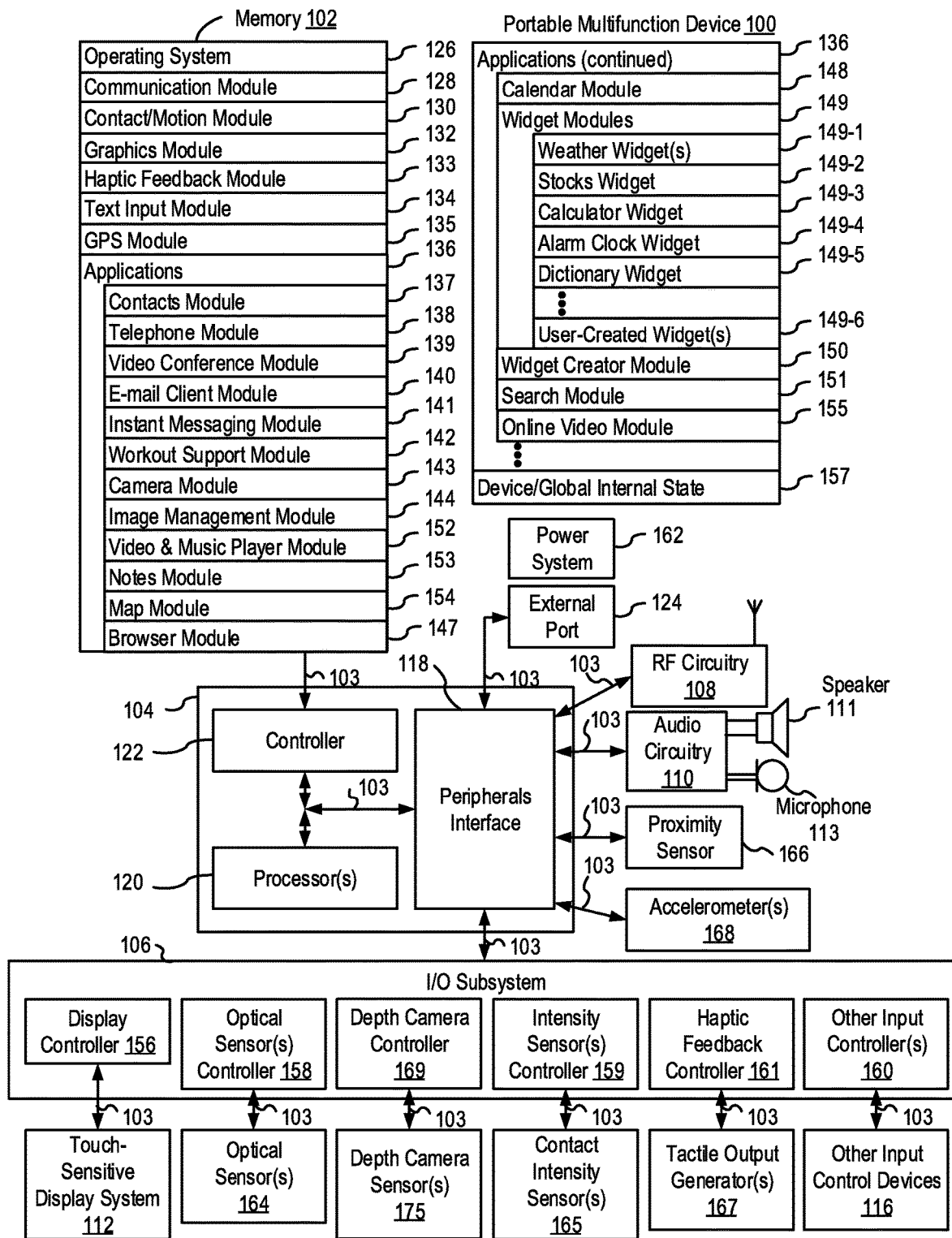
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (MAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed; including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed. May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749; "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector in Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
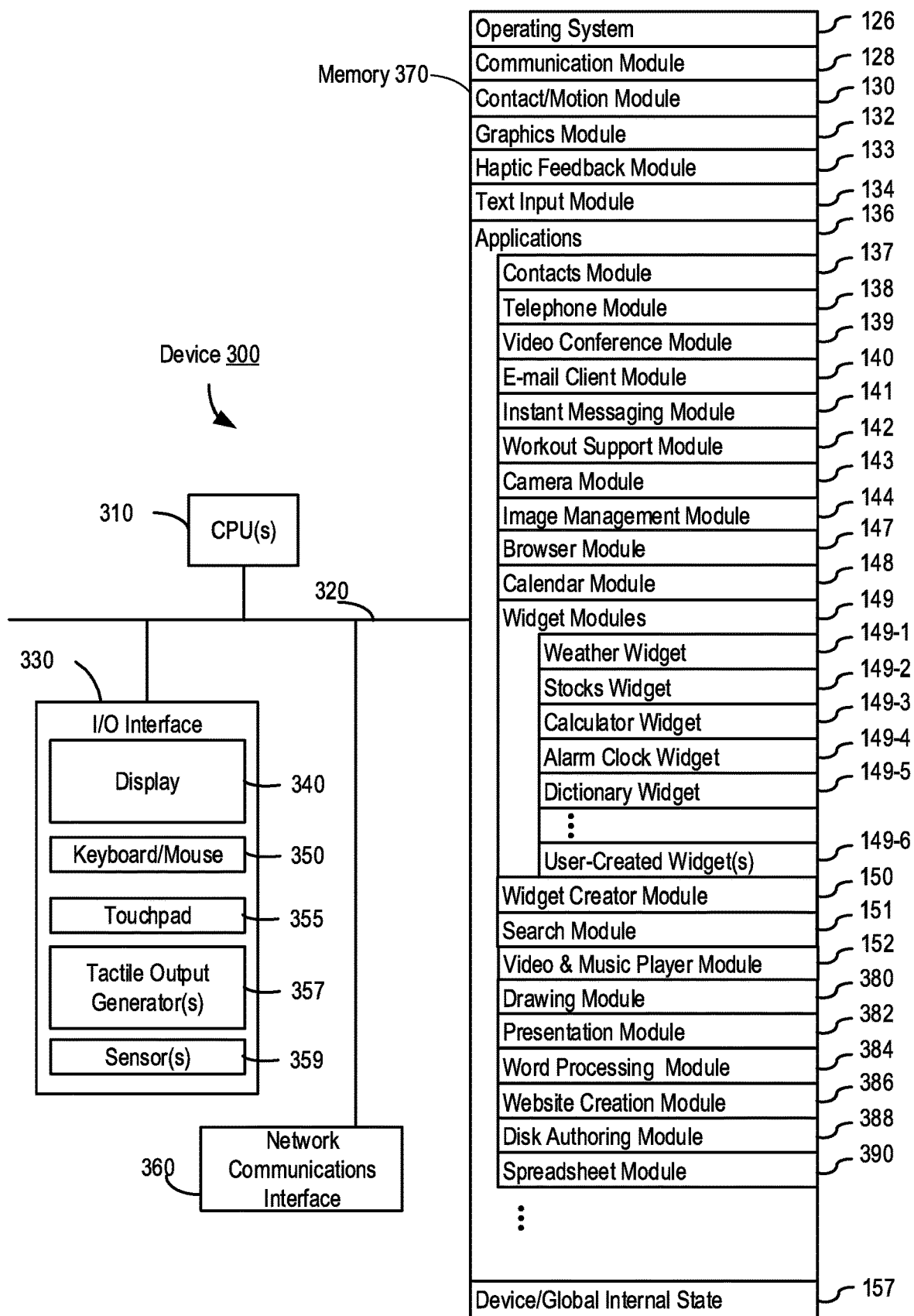
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc. is adapted for coupling directly to other devices or indirectly over a network (e.g., the Internet, wireless LAN, etc). In some embodiments, the external port is a multi-pin e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5; and other widgets obtained by the user, as well as user-created widgets 149-6;
  Widget creator module 150 for making user-created widgets 149-6;
  Search module 151;
  Video and music player module 152, which merges video player module and music player module;
  Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management; voice recognition, and voice replication.

In conjunction with touch screen 112; display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RE circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RE circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RE circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RE circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RE circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
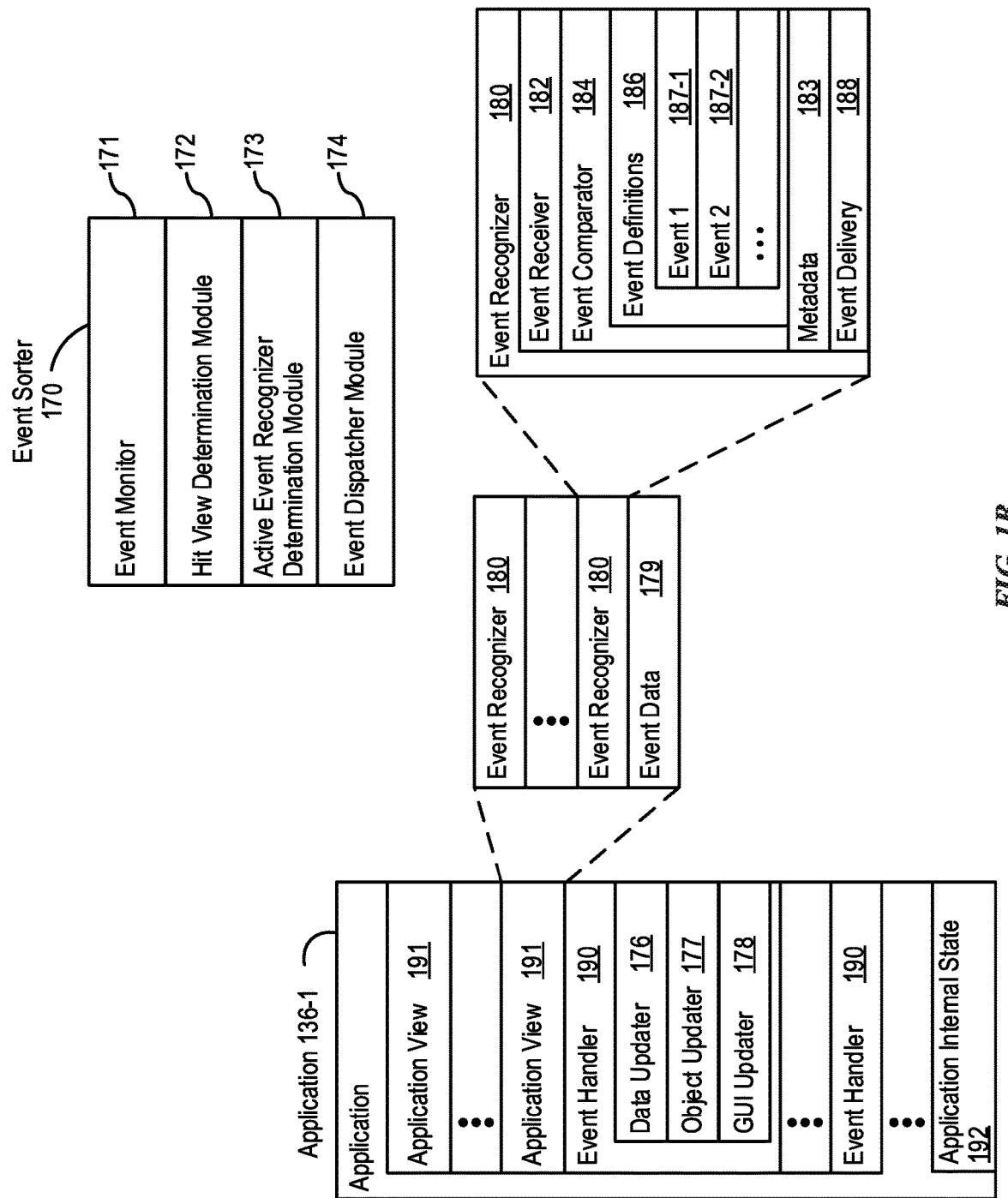
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1, For example, data updater 176 updates the telephone number used in contacts module 137; or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments; they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
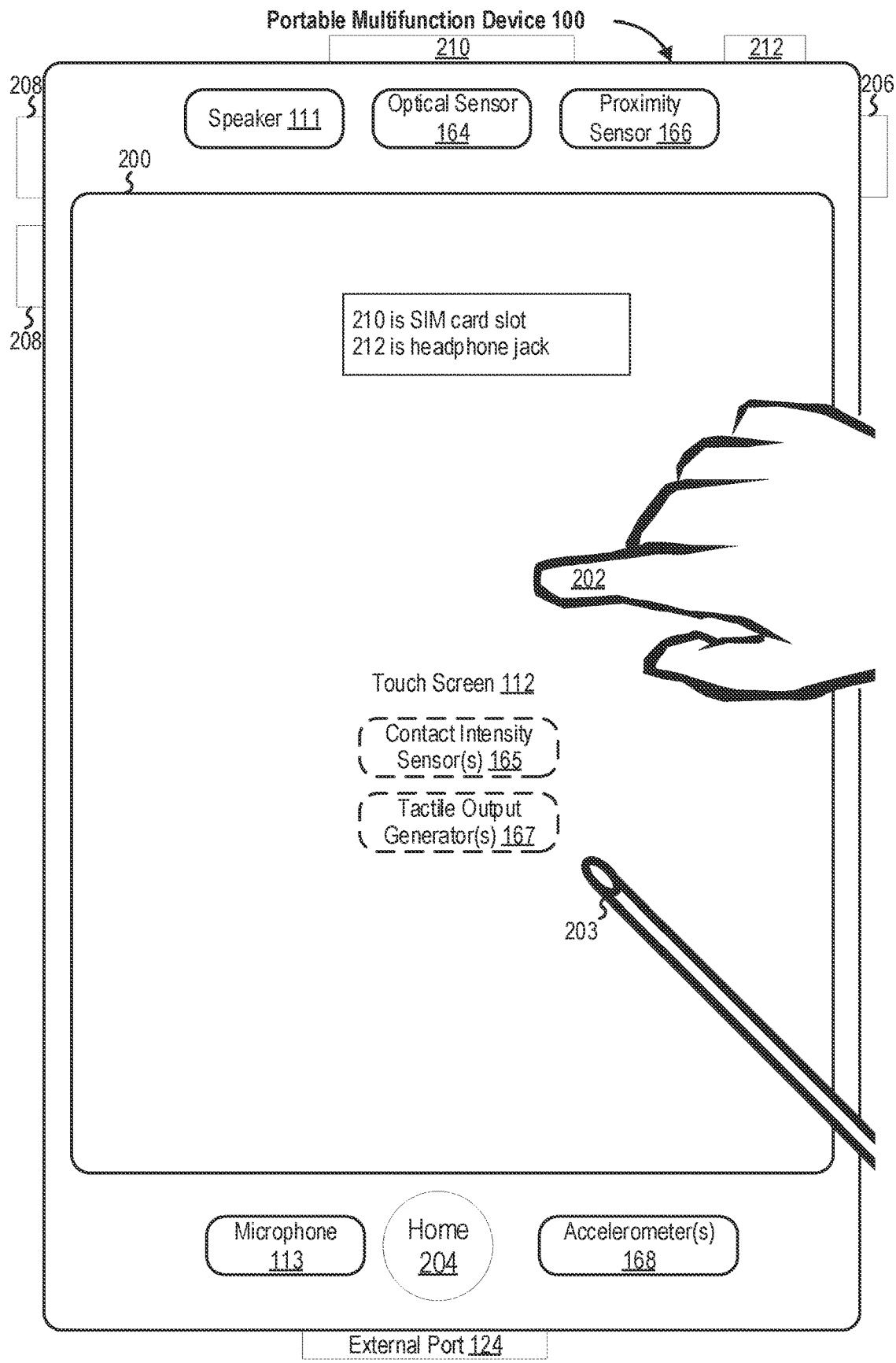
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment; as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204; push button 206 for powering the device on/off and locking the device, volume adjustment button(s) 208, subscriber identity module (SIM) card slot 210; headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370; and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device TOO. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
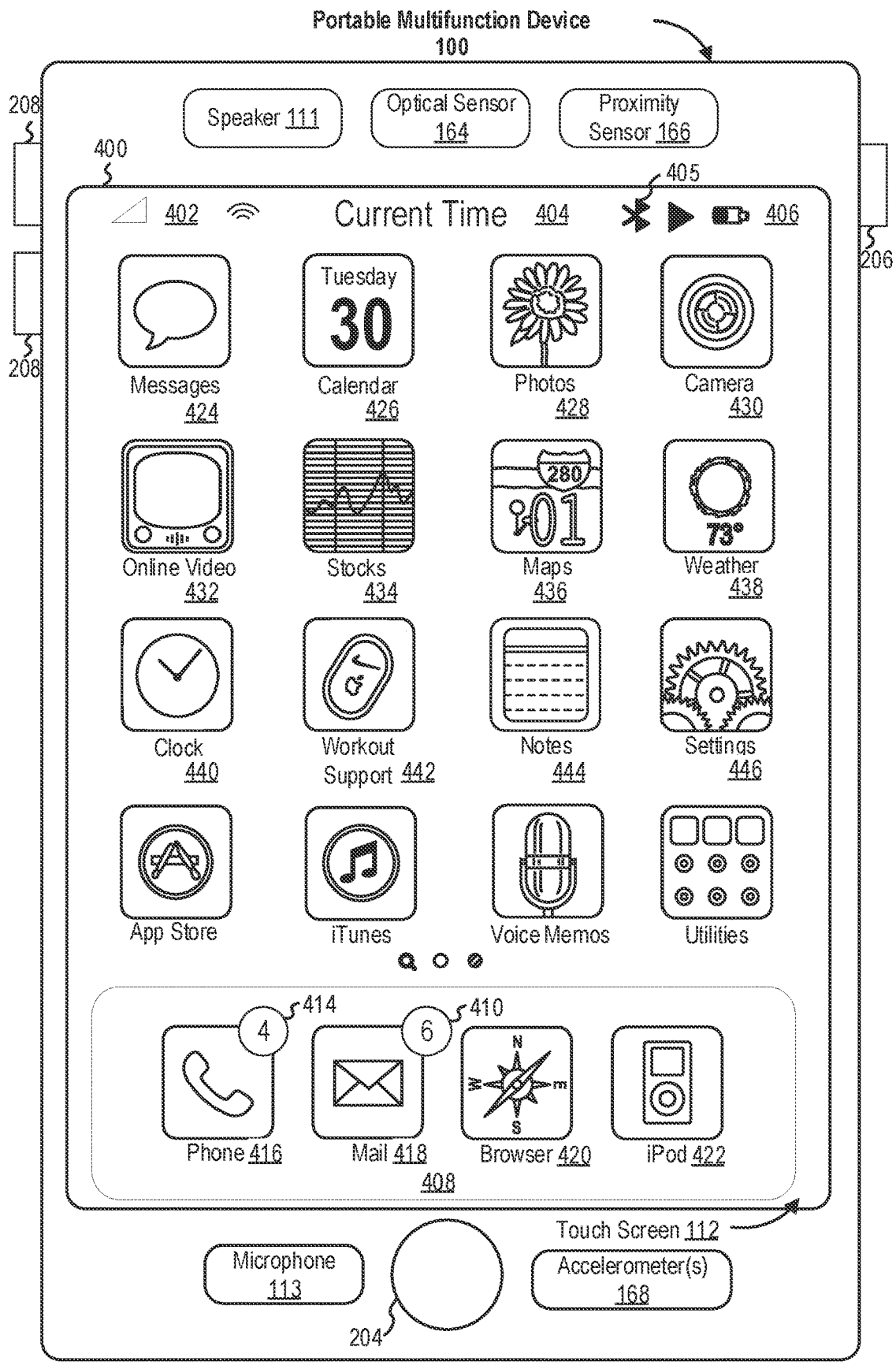
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments, Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
icon 422 for video and music player module 152, also referred to as iPod (trademark of Apple Inc.) module 152, labeled "iPod;" and
Icons for other applications, such as:
Icon 424 for IM module 141; labeled "Messages;"
Icon 426 for calendar module 148, labeled "Calendar;"
icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3 with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
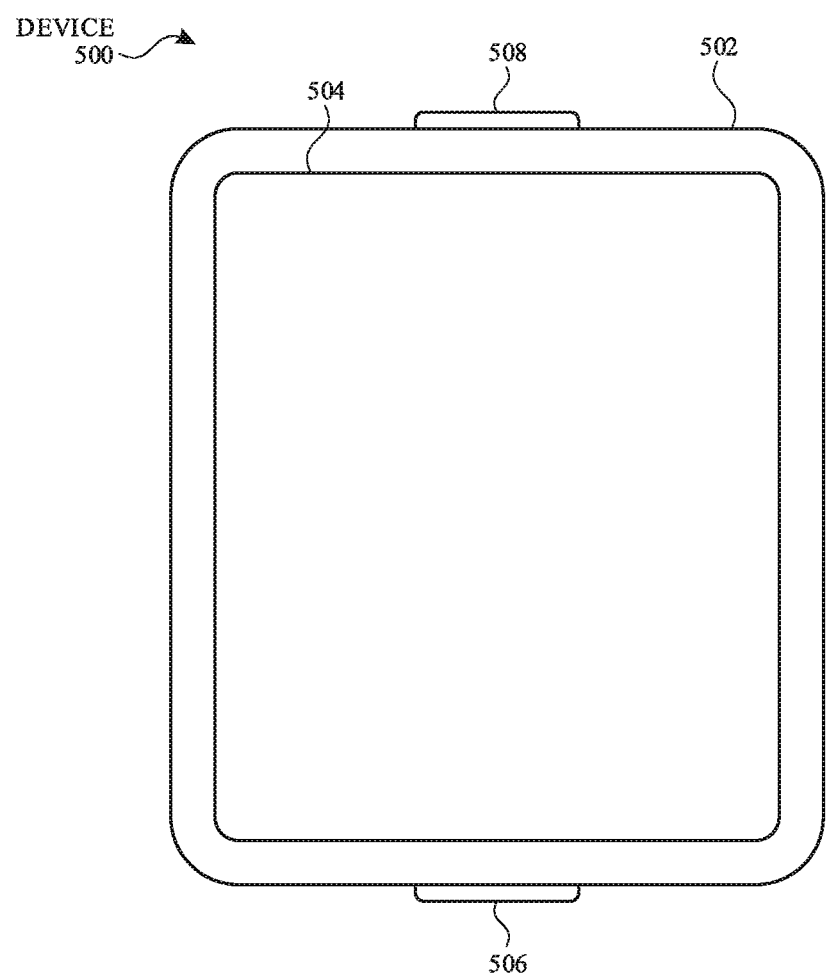
FIG. 5A illustrates a personal electronic device in accordance with some embodiments.
Figure 6A:
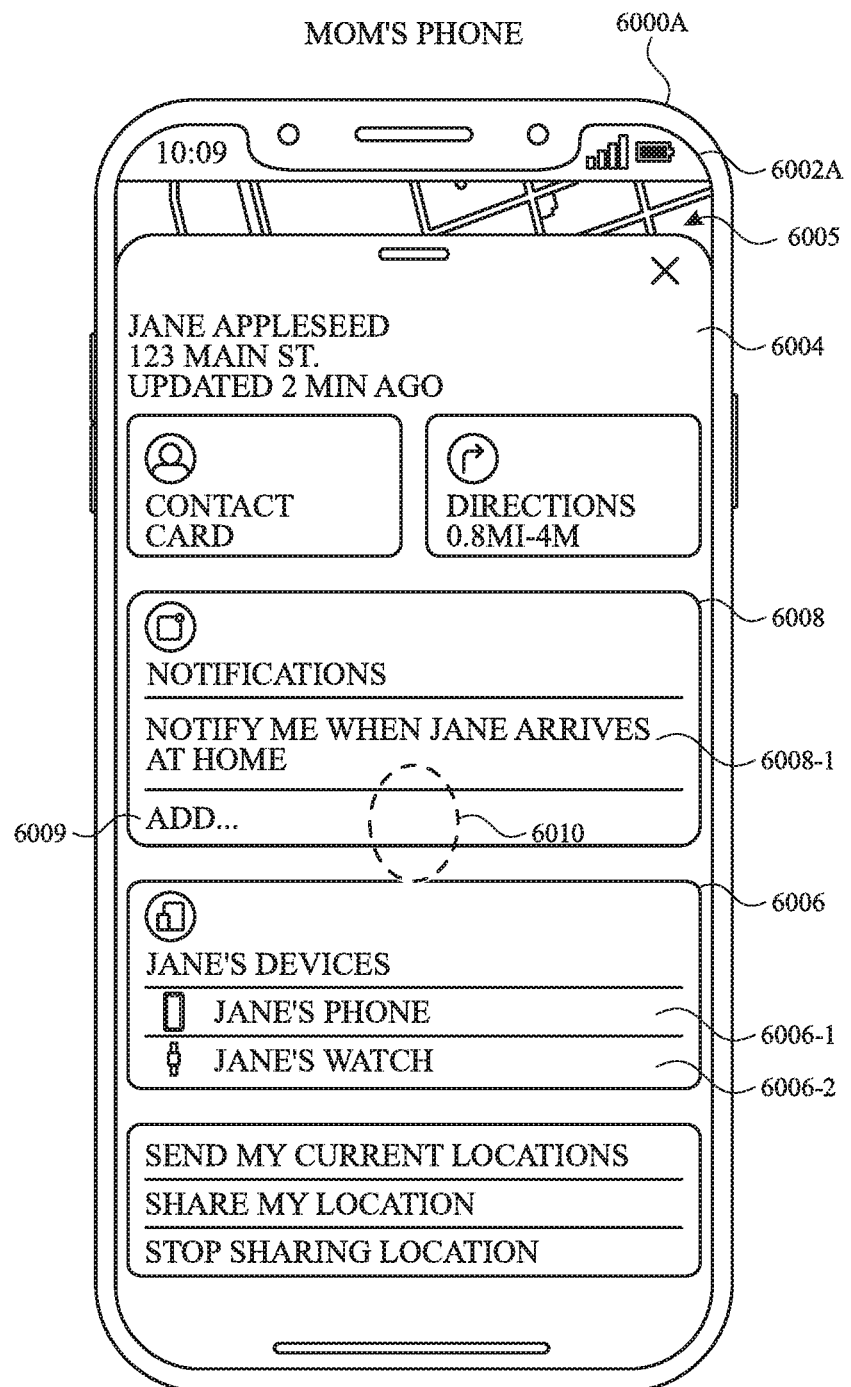
FIGS. 6A-6U illustrate exemplary user interfaces for managing location-related communications of an electronic device associated with a user account, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical, Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
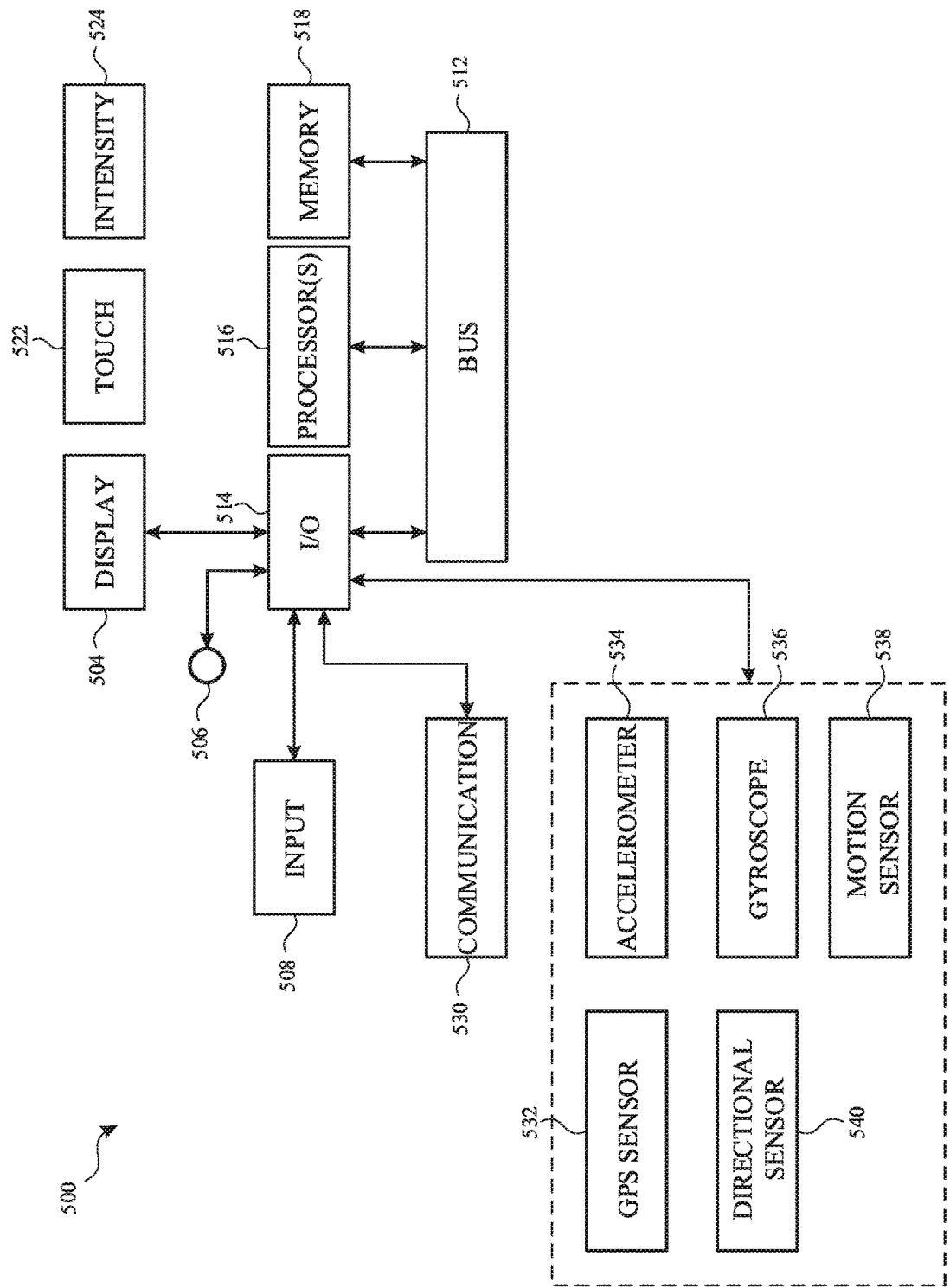
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, and 1200 (FIGS. 7, 8, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical; and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example; the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1; 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") associated processes that are implemented on an electronic device, such as portable multifunction device 100, device 300, or device 500.

FIGS. 6A-6U illustrate exemplary user interfaces for managing location-related (also referred to herein as location-based) communications of an electronic device associated with a user account, in accordance with some embodiments. The user interfaces in these figures are used to illustrate the processes described below, including the processes in FIGS. 7 and 8. As discussed in greater detail below, it should be appreciated that these processes involve various steps that can be performed across different electronic devices. Non-limiting examples of such steps can include calculations, determinations, instructions to grant, revoke, or deny permission for an account to use data in a particular manner, and instructions to display an object such as a notification or alert. In some embodiments, one or more steps can be performed at a first electronic device (e.g., electronic device 6000A) that includes one or more features of device 100, device 300, and device 500. In some embodiments, one or more steps can be performed at a second electronic device (e.g., electronic device 6000B) that is includes one or more features of device 100, device 300, and device 500. In some embodiments, one or more steps can be performed at a third electronic device such as, for example, a server. In some embodiments, one or more steps are performed at any combination of the first electronic device, the second electronic device, and the third electronic device.

FIGS. 6A-6U illustrate exemplary user inputs and corresponding changes to a user interface, which can be displayed on an electronic device, such as electronic device 6000, having display 6002, which in some cases is a touch-sensitive display (e.g., 112). In the present disclosure, the described electronic device can be referenced using reference numbers 6000, 6000A, or 6000B. In general, reference number 6000A is used to refer to a first electronic device (e.g., a parent's electronic device), reference number 6000B is used to refer to a second electronic device that is different from the first electronic device (e.g., a child's electronic device), and reference number 6000 is used to refer indiscriminately to the first electronic device, the second electronic device, or both. Similarly, various features of electronic device 6000 can be referenced with an "A" or "B" designation to differentiate between two instances of a similar feature. For example, reference number 6002A is used to refer to a display component of electronic device 6000A, reference number 6002B is used to refer to a display component of electronic device 6000B, and reference number 6002 is generally used to refer to a display of electronic device 6000, which, in turn, refers indiscriminately to the display of the first electronic device, the display of the second electronic device, or both.

In some embodiments, including embodiments discussed with respect to FIGS. 9A-9L and 11A-11R, the electronic devices are associated with user accounts. For example, electronic device 6000A is an electronic device that is associated with a parent's user account, and electronic device 6000B is an electronic device that is associated with a child's user account. It should be appreciated that the user accounts do not require a particular relationship to one another, other than an authorization to share data with at least one of the accounts. For the sake of simplicity, however, the following disclosure uses embodiments in which one user account is a parent's user account and the other user account is a child's user account. Specifically, in some embodiments, the parent is referred to as "Mom" and the child is referred to as "Jane," and in other embodiments, the parent is referred to as "Dad" and the child is referred to as "John." Accordingly, in the embodiments illustrated in FIGS. 6A-6U, electronic device 6000A can be referred to herein as Mom's device 6000A, and electronic device 6000B can be referred to herein as Jane's device 6000B. Similarly, the parent's account can be referred to as "Mom's account," and the child's account can be referred to as "Jane's account." Similar nomenclature is used in other instances where appropriate. For example, in FIGS. 11A-11R, electronic device 1100A can be referred to as Dad's watch, which is associated with "Dad's account," and electronic device 1100B can referred to as John's watch, which is associated with "John's account."

In some embodiments, the user accounts can be authorized to share location data between the user accounts. For example, in accordance with the present disclosure, Jane has set up her user account in a manner that authorizes Mom's account to receive, at one or more electronic devices associated with Mom's account, location data indicating a location (e.g., GPS coordinates) of one or more electronic devices associated with Jane's account. Thus, Jane is said to have authorized Mom to receive location data for Jane's electronic devices. Accordingly, Mom's account is authorized (by Jane's account) to manage location data associated with Jane's account. An analogous relationship exists between Dad's account (and associated electronic devices) and John's account (and associated electronic devices).

With reference to FIGS. 6A-6U, the following disclosure describes various embodiments in which Mom manages location-related communications relating to Jane, which is presumed to be represented by the location of one or more of Jane's electronic devices (e.g., Jane's device 6000B or Jane's device 6100B), by establishing a geofence (e.g., a virtual boundary based on a particular geographic location (e.g., a particular geographic area)) for a particular timeframe. In such embodiments, Mom is managing Jane's location in order to be notified (e.g., by receiving notifications at Mom's device 6000A) when Jane is not at an expected location during a particular range of times. This enables Mom to be alerted to a situation in which Jane is not at an expected location, such as at school, for example, without the need for Mom to constantly monitor Jane's location using, for example, a map application. In effect, Mom can assume that Jane is at school during the specified timeframe, unless she is notified otherwise. An analogous relationship exists between Dad and John, as discussed in greater detail below with reference to FIGS. 9A-9L and 11A-11R.

Referring now to FIG. 6A, Mom's device 6000A is shown displaying locations management user interface 6005. Locations management user interface 6005 includes Jane's account information 6004, which includes information available at Mom's device 6000A pertaining to Jane's account. Jane's account information 6004 includes devices listing 6006 for indicating devices associated with Jane's user account, and notifications listing 6008 for viewing and managing location-based notifications (e.g., geofence notifications) created for Jane's account. As shown in FIG. 6A, Jane's listed devices include Jane's Phone 6006-1, which refers to Jane's device 6000B shown in FIG. 6F, and Jane's Watch 6006-2, which refers to Jane's device 6100B shown in FIG. 6I. Notifications listing 6008 includes first geofence identifier 6008-1 corresponding to an existing geofence notification for notifying Mom's account when Jane (e.g., Jane's device 6000B) arrives at home. Notifications listing 6008 also includes notification creation affordance 6009, which can be selected to create a new geofence notification.

Figure 6B:
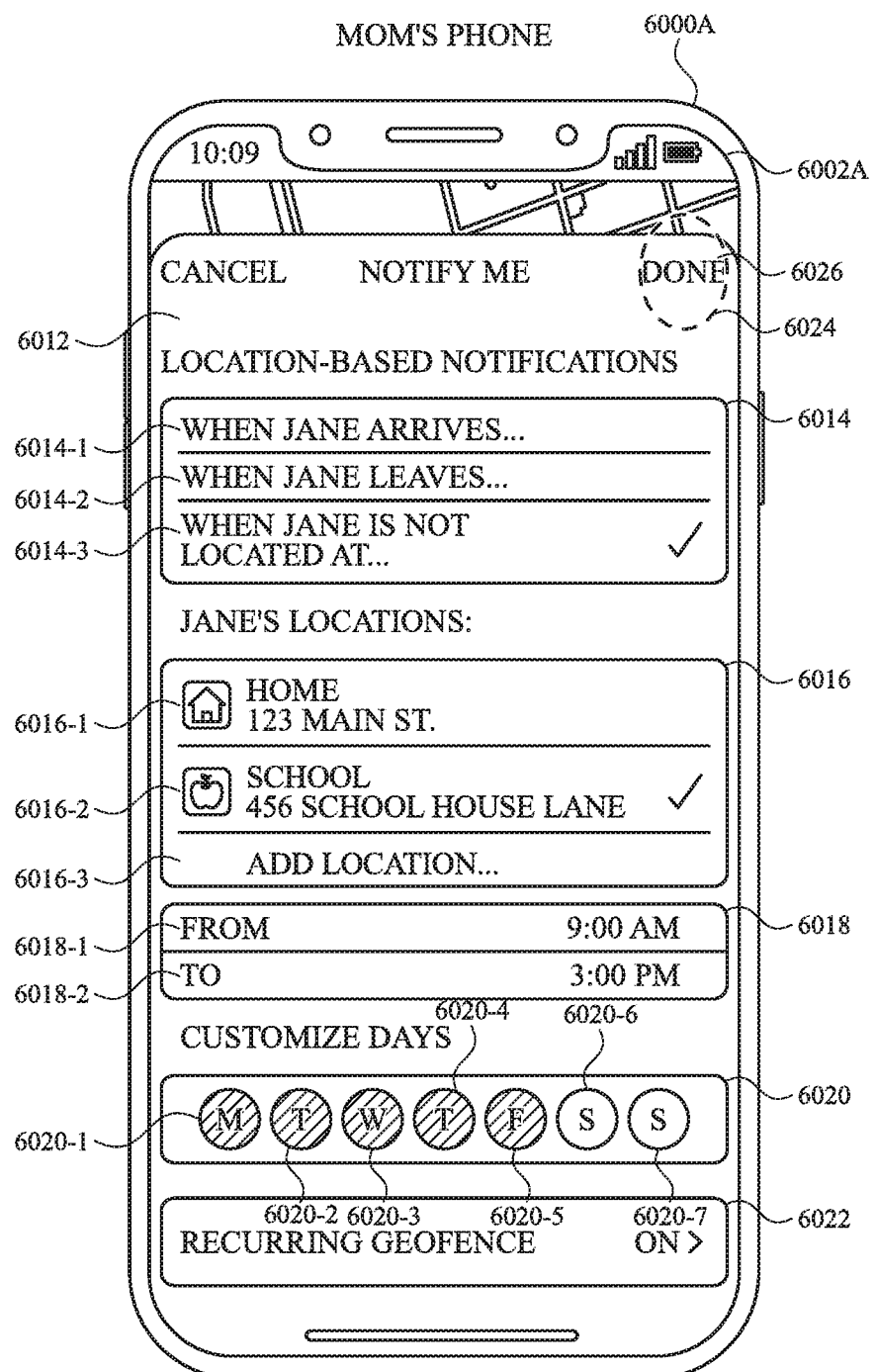

As shown in FIG. 6A, Mom's device 6000A detects input 6010 (e.g., a user input such as, for example, a tap gesture) on notification creation affordance 6009 and, in response, displays notification creation user interface 6012 shown in FIG. 6B.

Notification creation user interface 6012 is a user interface for creating a geofence notification for Jane's account. As shown in FIG. 6B, notification creation user interface 6012 includes location-based notification type region 6014, location selection region 6016, time selection region 6018, and day customization region 6020. In some embodiments, notification creation user interface 6012 can include recurrence affordance 6022 for setting the geofence notification to be a recurring notification. In some embodiments, the geofence notification defaults to a recurring notification unless specified otherwise.

Location-based notification type region 6014 includes selectable options for setting a notification condition for the geofence. For example, arrival notification type 6014-1 sets a condition that is satisfied when Jane arrives at a particular location (e.g., during a particular period of time). Thus, an arrival notification type will notify Morn (e.g., by displaying a notification on Mom's device 6000A) when Jane arrives at the specified location. Departure notification type 6014-2 sets a condition that is satisfied when Jane leaves a particular location (e.g., during a particular period of time). Thus, a departure notification type will notify Mom when Jane leaves the specified location. Expected location notification type 6014-3 sets a condition that is satisfied when Jane is not at a particular location during a particular time period. Thus, an expected location notification type will notify Morn when Jane is not at the specified location at any time during the specified period of time. For example, a notification will be triggered if Jane is not at the specified location when the time starts, or if Jane leaves the specified location after the time period starts but before the time period ends. As shown in FIG. 6B, the selected geofence notification type is expected location notification type 6014-3.

Location selection region 6016 includes selectable options for setting a location component for the selected geofence notification type (expected location notification type 6014-3). In some embodiments, the location options are user-defined locations that indicate a location that is within the boundary of the geofence (e.g., a central point for the geofence). In FIG. 6B, the location options include home 6016-1 and school 6016-2. Location options also include location creation option 6016-3, which can be selected to create a new location. In some embodiments, a user can create a new location option by selecting location creation option 6016-3 and specifying the new location, which is then added to location selection region 6016. In some embodiments, specifying the new location can include entering location information (e.g., address information, coordinates, etc.) and/or selecting a location on a map. As shown in FIG. 6B, the selected location option is school 6016-2. Thus, the geofence notification is configured to notify Mom if Jane is not located at school during the set timeframe.

In some embodiments, the boundary of the geofence can be adjusted relative to any of the selected locations (e.g., home, school, or other created location) by adjusting the boundary of the geofence on a map showing the selected location. For example, Mom can select one of the location options to view a map of the location with a representation of the geofence boundary (see, for example, FIG. 6S), and can adjust the boundary (e.g., diameter) of the geofence by, adjusting a zoom level of the displayed map while the geofence boundary remains stationary with respect to the map display area.

Time selection region 6018 includes options for setting the timeframe for the selected geofence notification type (expected location notification type 6014-3). In some embodiments, the time selection options include start time 6018-1 and end time 6018-2. As shown in FIG. 6B, the start time is 9:00 AM, and the end time is 3:00 PM. In this embodiment, the geofence notification is configured to notify Mom if Jane is not at school between 9:00 AM and 3:00 PM.

Day customization region 6020 includes selectable options for setting particular days of the week that the geofence is active. As shown in FIG. 6B, options 6020-1 through 6020-5 are selected and correspond to Monday, Tuesday, Wednesday, Thursday, and Friday. Options 6020-6 and 6020-7, corresponding to Saturday and Sunday, respectively, are not selected. Accordingly, the geofence notification is active on weekdays, and is inactive on weekends. Thus, the geofence notification is configured to notify Morn if Jane is not located at school between 9:00 AM and 3:00 PM on weekdays. If Jane is not located at school at any time outside of 9:00 AM to 3:00 PM on a weekday, Morn will not be notified.

Recurrence affordance 6022 is set to "ON," indicating that the geofence notification is a recurring notification that will repeat indefinitely or until specified otherwise. For example, the geofence will repeat on a weekly basis.

Figure 6C:
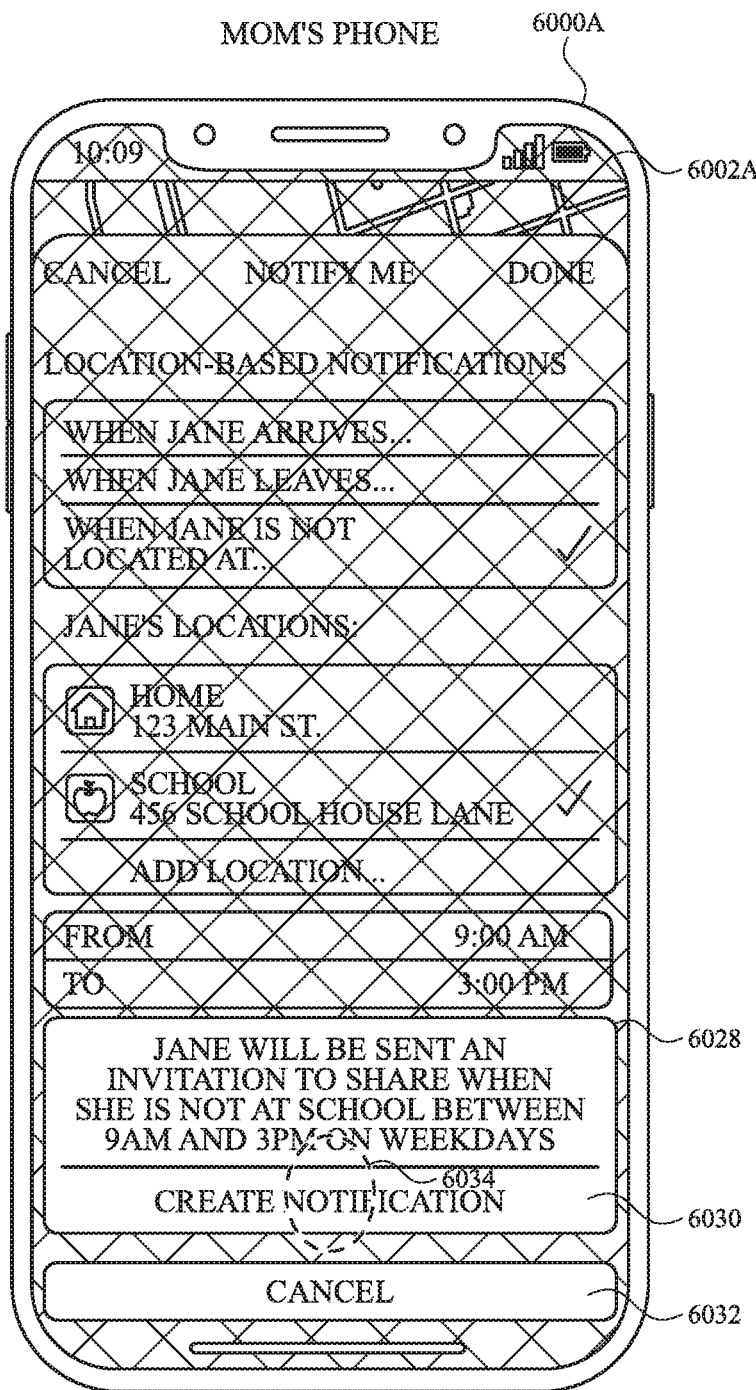

In FIG. 6B, Morn's device 6000A detects input 6024 on done affordance 6026 and, in response, displays confirmation user interface 6028, as shown in FIG. 6C. Confirmation user interface 6028 summarizes the conditions of the geofence and displays create notification affordance 6030 for confirming creation of the geofence and cancel affordance 6032 for canceling creation of the geofence. If the geofence is confirmed (e.g., by selection of create notification affordance 6030) an invitation is sent to Jane's account to accept the conditions of the geofence, as discussed in greater detail below with reference to FIGS. 6F-6K.

Figure 6D:
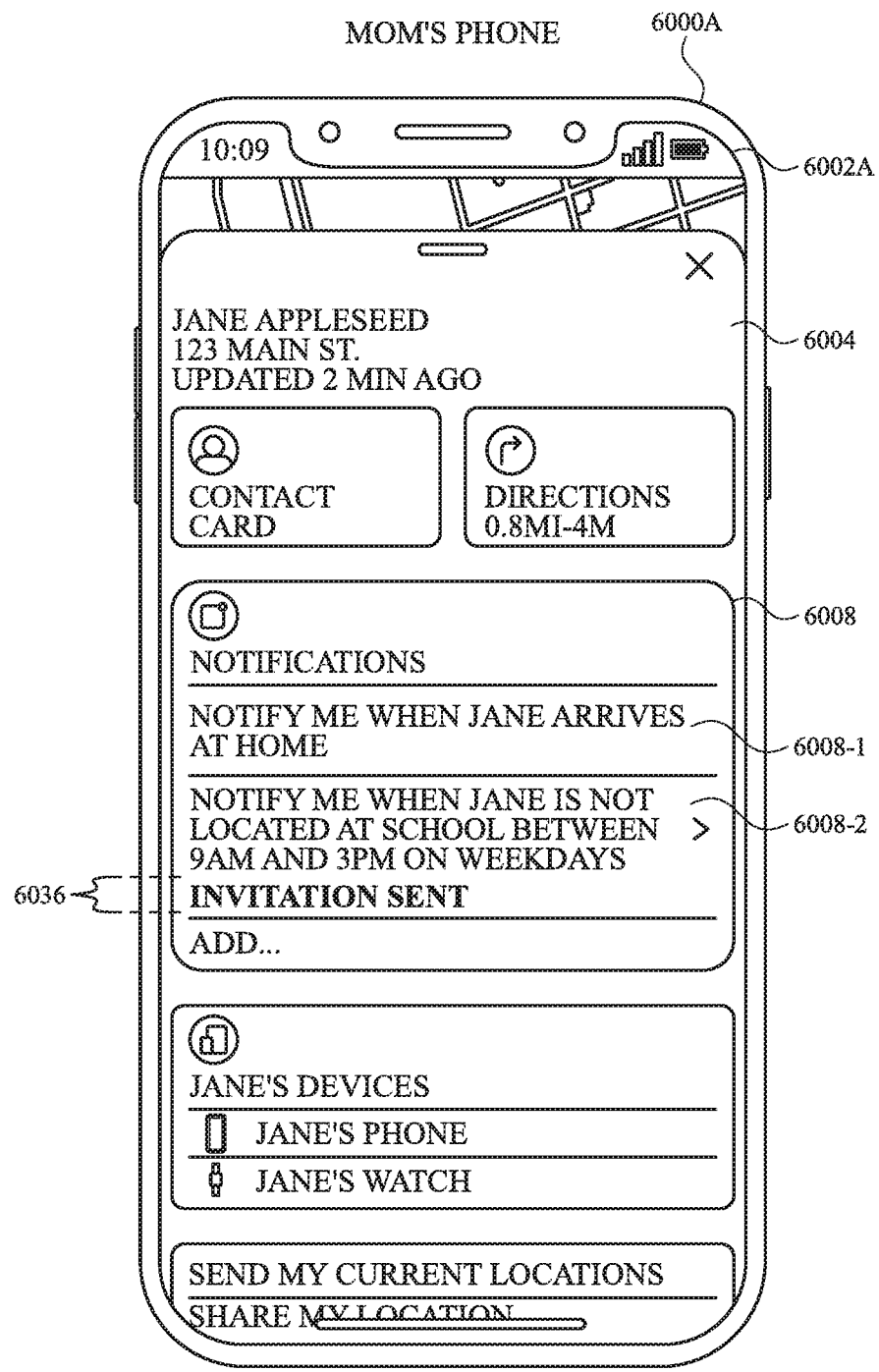
Figure 6E:
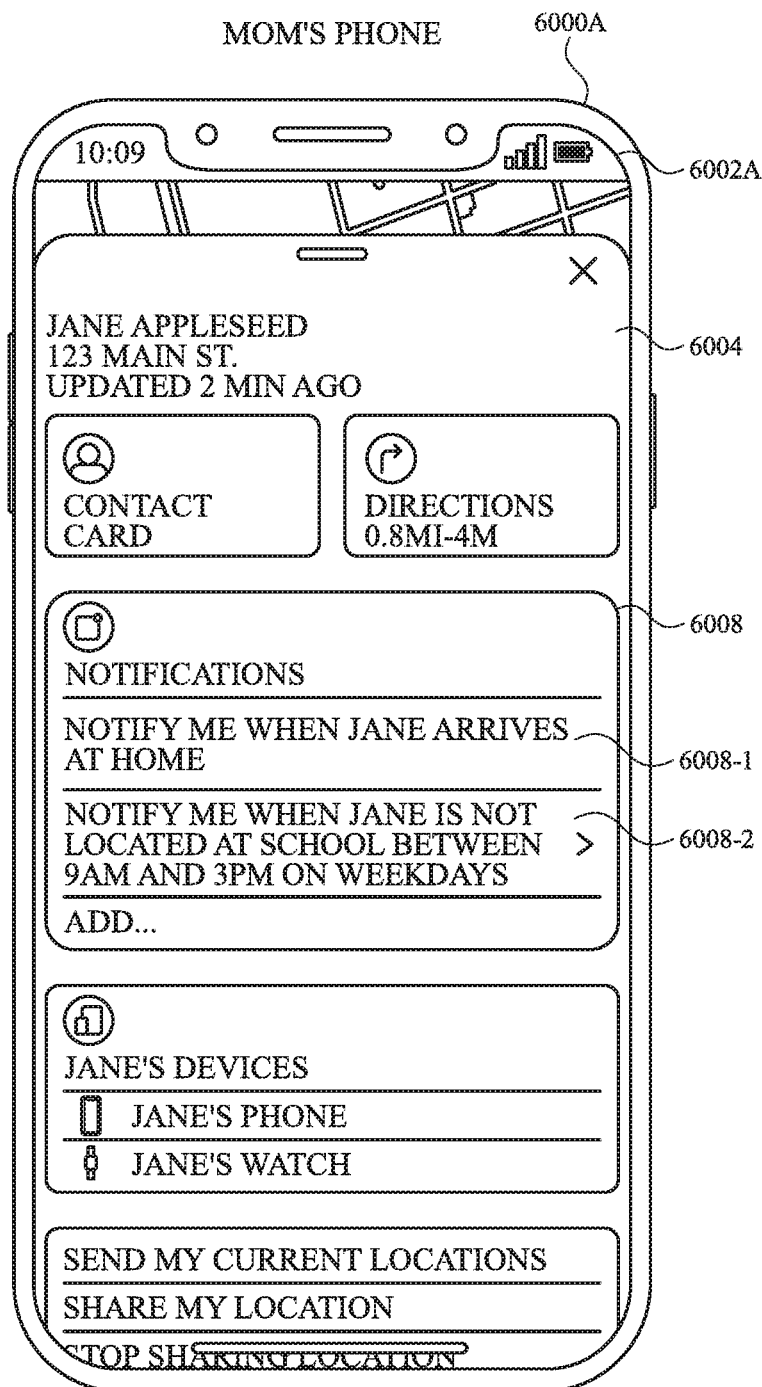

In FIG. 6C, Morn's device 6000A detects input 6034 on create notification affordance 6030 and, in response, displays, in FIG. 6D, Jane's account information 6004 with notifications listing 6008 updated to show second geofence identifier 6008-2 corresponding to the geofence notification created in FIGS. 6A-6C. As shown in FIG. 6D, second geofence identifier 6008-2 is shown with an "Invitation Sent" status identifier 6036 when the geofence is pending acceptance by Jane's account. This indicates that Jane's account has been sent an invitation to accept the terms of the geofence notification, but Jane's account has not yet accepted the terms of the geofence. If Jane's account does not accept the terms of the geofence, Mom's account is not authorized to receive a notification if Jane's device breaches the geofence (e.g., if Jane is not located at school between 9 AM and 3 PM on weekdays), and the geofence will not be activated and, in some embodiments, second geofence identifier 6008-2 will be removed from notifications listing 6008. In some embodiments, Mom's account continues to receive location information for Jane's account, even if Jane's account does not accept the terms of the geofence notification request. After Jane's account has accepted the terms of the geofence, status identifier 6036 is removed, as shown in FIG. 6E.

FIGS. 6F-6K illustrate various embodiments in which the invitation to accept the terms of the geofence notification is displayed for Jane's acceptance. In some embodiments, the invitation can be displayed on Jane's device 6000B, as shown in FIGS. 6F-6H and 6K. In some embodiments, the invitation can be displayed on Jane's device 6100B, as shown in FIGS. 6I and 6J. In some embodiments, Jane's device 6100B is a wearable device (e.g., a smartwatch) having display 6102B.

Figure 6F:

In some embodiments, display of the invitation (e.g., as a notification) is triggered by various conditions. For example, in some embodiments, such as that shown in FIG. 6F, the invitation is displayed when the geofence is created by Mom's account (e.g., upon selection of create notification affordance 6030, as shown in FIG. 6C). In some embodiments, the invitation is displayed upon creation of the geofence if the geofence is not a recurring event (e.g., a one-time geofence). In FIG. 6F, Jane's device 6000B displays lock screen user interface 6038. Lock screen user interface 6038 includes notification 6040 displayed at 10:09 AM on Saturday, June $1^{st}$, which is approximately the same time that Mom's account created the geofence in FIGS. 6A-6C. Notification 6040 invites Jane's account to accept the conditions of the geofence created by Mom's account, thereby authorizing Mom's account to receive a notification if Jane's device (e.g., 6000B or 6100B, depending on which device is configured to represent Jane's location, for example, as configured at device option 6078 in FIG. 6M) breaches the geofence (e.g., if Jane is not located at school between 9 AM and 3 PM on weekdays). In some embodiments, Jane can interact with notification 6040 to accept or decline the invitation to authorize the geofence notification. If Jane accepts the invitation, Jane's account continues to share location data with Mom's account and authorizes Mom's account to receive a notification if Jane's device breaches the geofence. If Jane declines the invitation (or otherwise does not accept the invitation), Jane's account continues to share location data with Mom's account based on prior authorization of the location data sharing, but does not authorize Mom's account to receive a notification if Jane's device breaches the geofence.

Figure 6G:

In some embodiments, the invitation is displayed when one or more of the components (e.g., the location component, the time component) specified by the geofence are satisfied. For example, FIG. 6G illustrates an embodiment in which notification 6040 is displayed on lock screen user interface 6038 when the start time component of the geofence is satisfied. FIG. 6G shows two instances of Jane's device 6000B, wherein each instance of Jane's device corresponds to a particular time. Jane's device 6000B-1 represents the state of Jane's device 6000B at 8:59 AM on Monday, June $3^{rd}$. Jane's device 6000B-2 represents the state of Jane's device 6000B at 9:00 AM on Monday, June $3^{rd}$. As shown in FIG. 6G, notification 6040 is not displayed at Jane's device 6000B until 9:00 AM on Monday, June $3^{rd}$, which corresponds to the start time (e.g., 9:00 AM on a weekday) set in FIG. 6B.

Figure 6H:
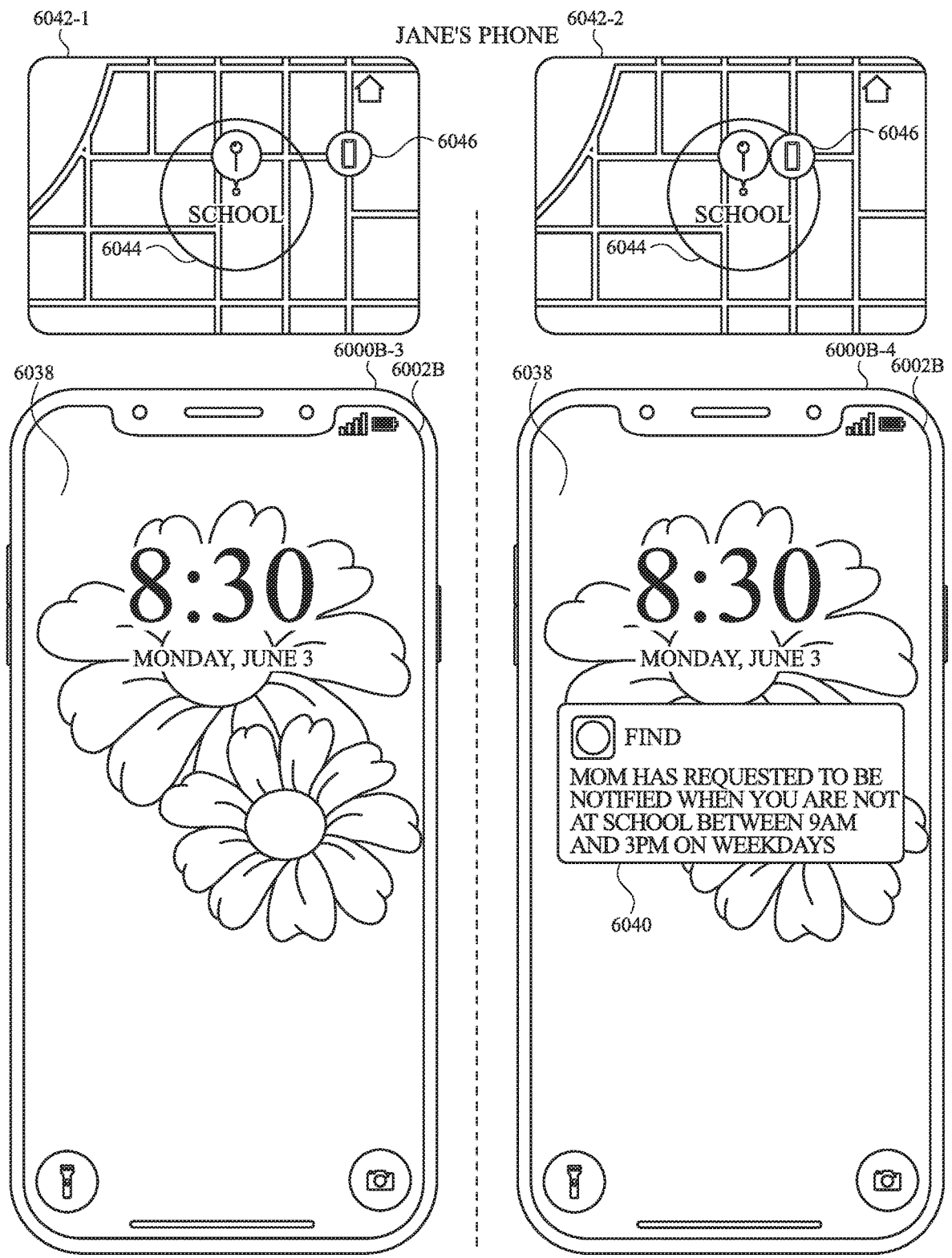

As another example, FIG. 6H illustrates an embodiment in which notification 6040 is displayed when the location component of the geofence is satisfied. FIG. 6H shows two instances of a map and Jane's device, wherein each instance of the map corresponds to an instance of Jane's device. Jane's device 6000B-3 represents a state of Jane's device 6000B for a detected location of the device, which is represented by map 6042-1. Jane's device 6000B-4 represents a state of Jane's device 6000B for a detected location of the device, which is represented by map 6042-2. Each instance of the map (e.g., map 6042-1 and map 6042-2) includes geofence boundary 6044 (representing the location component specified for the geofence) and representation 6046 of Jane's device 6000B on the map. As shown in map 6042-1, representation 6046 is not located within geofence boundary 6044, indicating that Jane's device 6000B is not located at the location specified by the geofence. Accordingly, Jane's device 6000B-3 does not display notification 6040 on lock screen user interface 6038, because the location of Jane's device 6000B does not satisfy the location component of the geofence. As shown in map 6042-2, however, representation 6046 is located within geofence boundary 6044, indicating that Jane's device 6000B is located at the location specified by the geofence. Accordingly, Jane's device 6000B-4 displays notification 6040 (e.g., on lock screen user interface 6038), because the location of Jane's device 6000B satisfies the location component of the geofence. In some embodiments, notification 6040 is displayed when both the time component and the location component of the geofence are satisfied.

In some embodiments, the invitation can be displayed on various electronic devices associated with Jane's account. For example, FIGS. 6I and 6J illustrate an embodiment in which the invitation is displayed on Jane's device 6100B, which is shown as a wearable device such as, for example, a smartwatch. In FIG. 6I, the invitation is displayed as notification 6048, which is similar to notification 6040. Notification 6048 includes text region 6048-1 displaying text inviting Jane to accept the conditions of the geofence created by Mom's account in FIGS. 6A-6C. Notification 6048 also includes accept affordance 6048-2, which can be selected to accept the invitation (thereby authorizing Mom's account to receive a notification if Jane's device breaches the geofence), and dismiss affordance 6048-3, which can be selected to dismiss the invitation without authorizing Morn's account to receive a notification if Jane's device breaches the geofence. In some embodiments, such as that shown in FIG. 6J, Jane's device 6100B displays user interface 6050 in response to detecting selection of accept affordance 6048-2. User interface 6050 includes map 6052 showing a representation of the location of the geofence and text 6054 indicating the terms of the geofence and confirming to Jane that she has accepted the terms of the geofence, authorizing Mom's account to receive a notification if Jane (e.g., Jane's device 6100B or Jane's device 6000B) is not located at school between 9 AM and 3 PM on weekdays.

In some embodiments, notification 6040 (or notification 6048) can be dismissed without immediately accepting the invitation. In such embodiments, the invitation can be accessed (and subsequently accepted or declined) from a locations management user interface associated with Jane's account such as, for example, locations management user interface 6056 shown in FIG. 6K. In some embodiments, Jane's device 6000B displays locations management user interface 6056 in response to detecting one or more inputs directed to a notification. For example, Jane's device 6000B displays locations management user interface 6056 in FIG. 6K in response to detecting a tap input on notification 6040 in FIG. 6H.

Figure 6K:
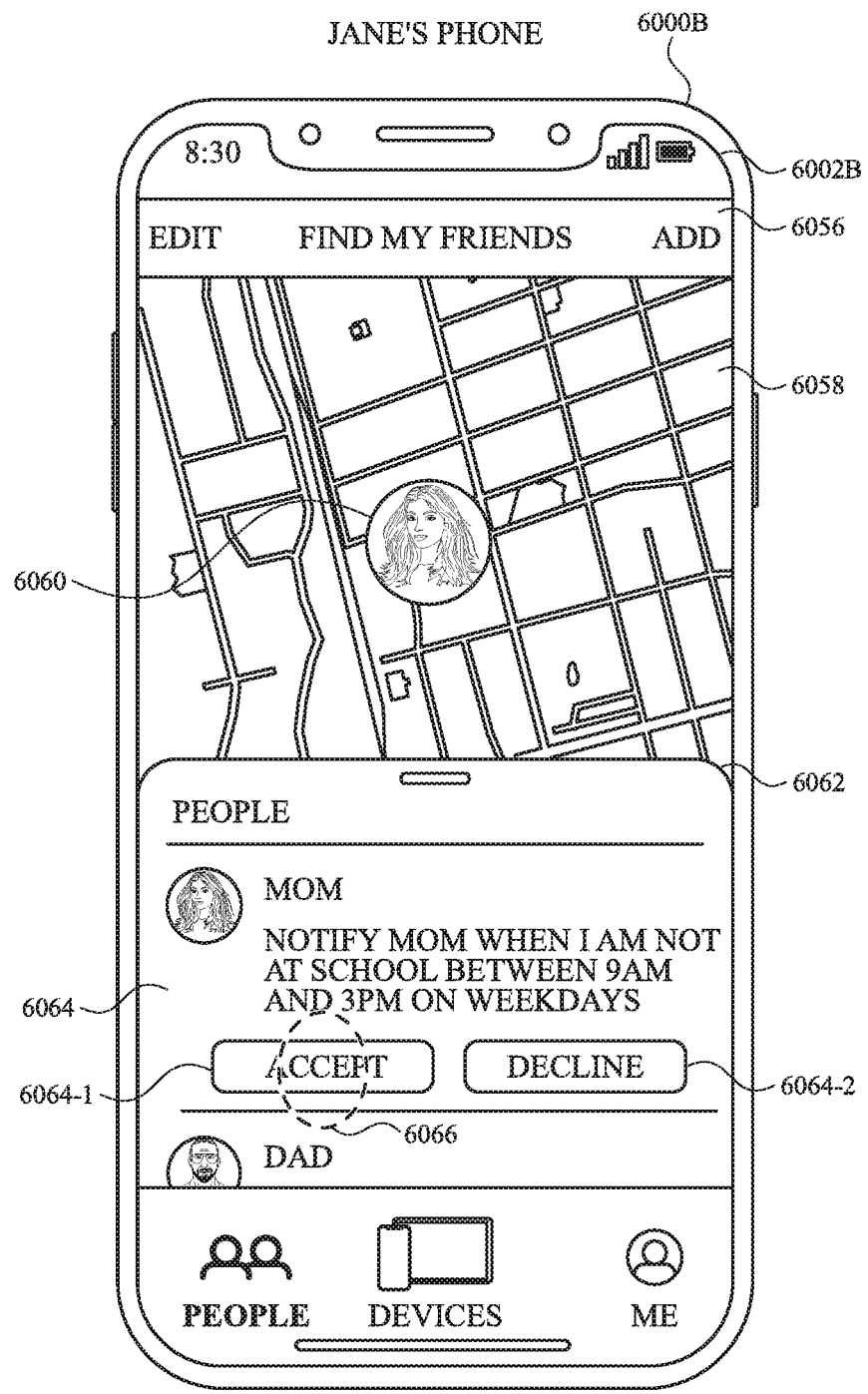

In FIG. 6K, Jane's device 6000B displays locations management user interface 6056, which includes map 6058 showing locations associated with user accounts that are authorized to share location data with Jane's account. For example, map 6058 shows representation 6060 indicating a location on map 6058 that is associated with Mom's account (for example, a location of Mom's device 6000A). Locations management user interface 6056 also includes user accounts region 6062, which includes data related to the user accounts authorized to share location data with Jane's account. As shown in FIG. 6K, user accounts region 6062 includes item 6064 representing the invitation to accept the terms of the geofence notification created by Mom's account in FIGS. 6A-6C. Item 6064 specifies the terms of the geofence notification and includes accept affordance 6064-1 for accepting the terms of the geofence notification and decline affordance 6064-2 for declining the terms of the geofence notification. If Jane accepts the terms of the geofence notification, Jane's account continues to share location data with Mom's account and authorizes Mom's account to receive a notification if Jane's device breaches the geofence. If Jane declines the terms of the geofence notification, Jane's account continues to share location data with Mom's account based on prior authorization of the location data sharing, but does not authorize Mom's account to receive a notification if Jane's device breaches the geofence.

FIG. 6K depicts Jane's acceptance of the terms of the geofence notification. Specifically, Jane's device 6000B detects input 6066 on accept affordance 6064-1 and, in response, updates item 6064, as shown in FIG. 6L, to display text 6064-3 confirming to Jane that she has accepted the terms of the geofence and indicating that Mom's account is authorized to receive a notification if Jane (e.g., Jane's device 6100B or Jane's device 6000B) is not located at school between 9 AM and 3 PM on weekdays.

Figure 6L:
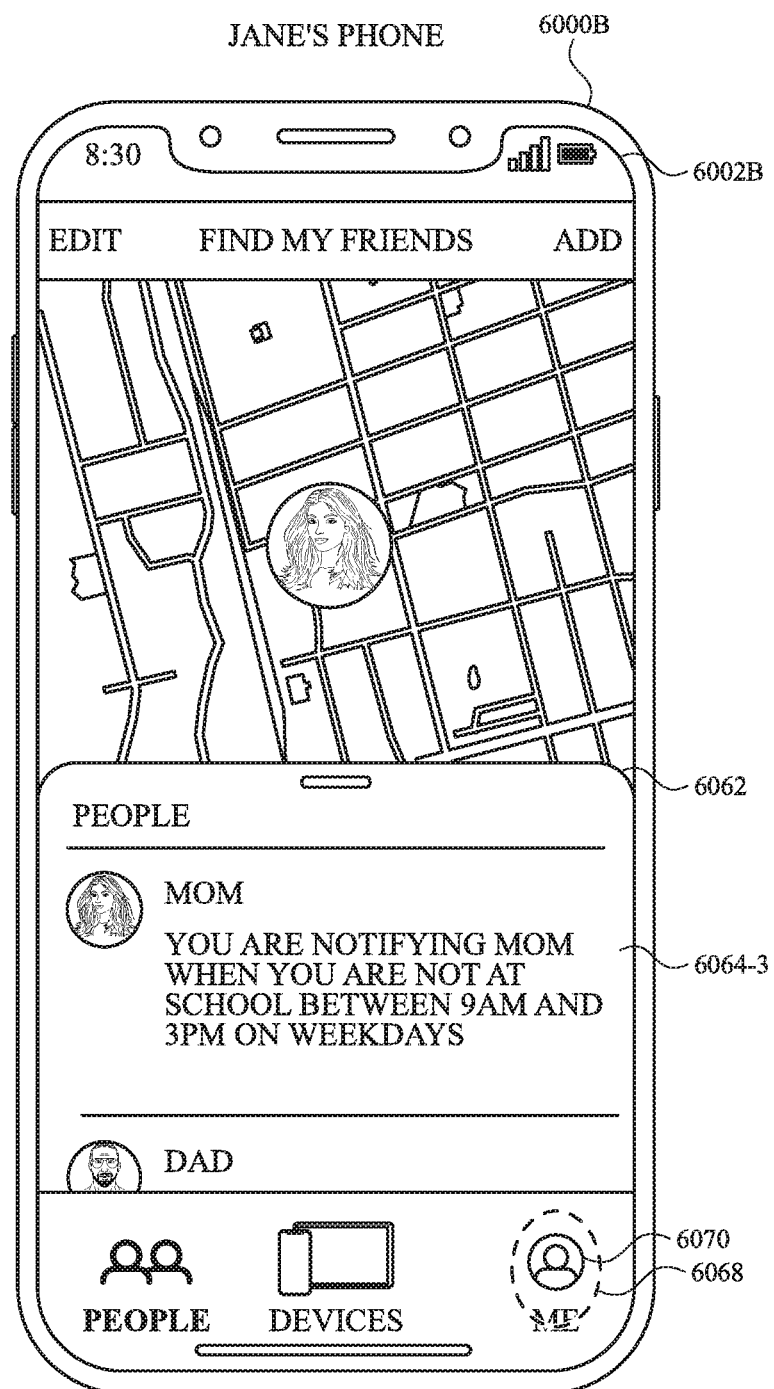
Figure 6M:
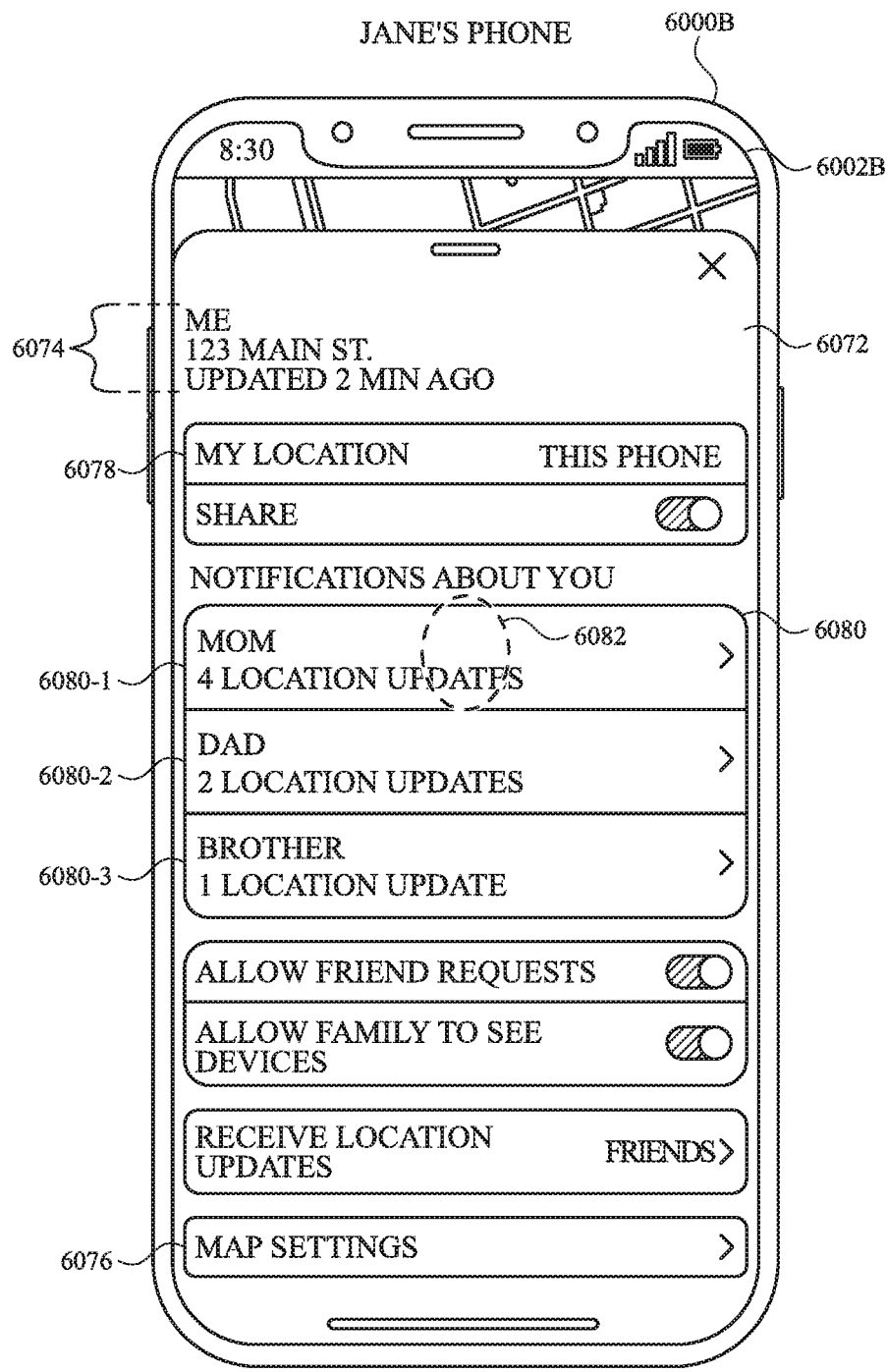
Figure 6N:
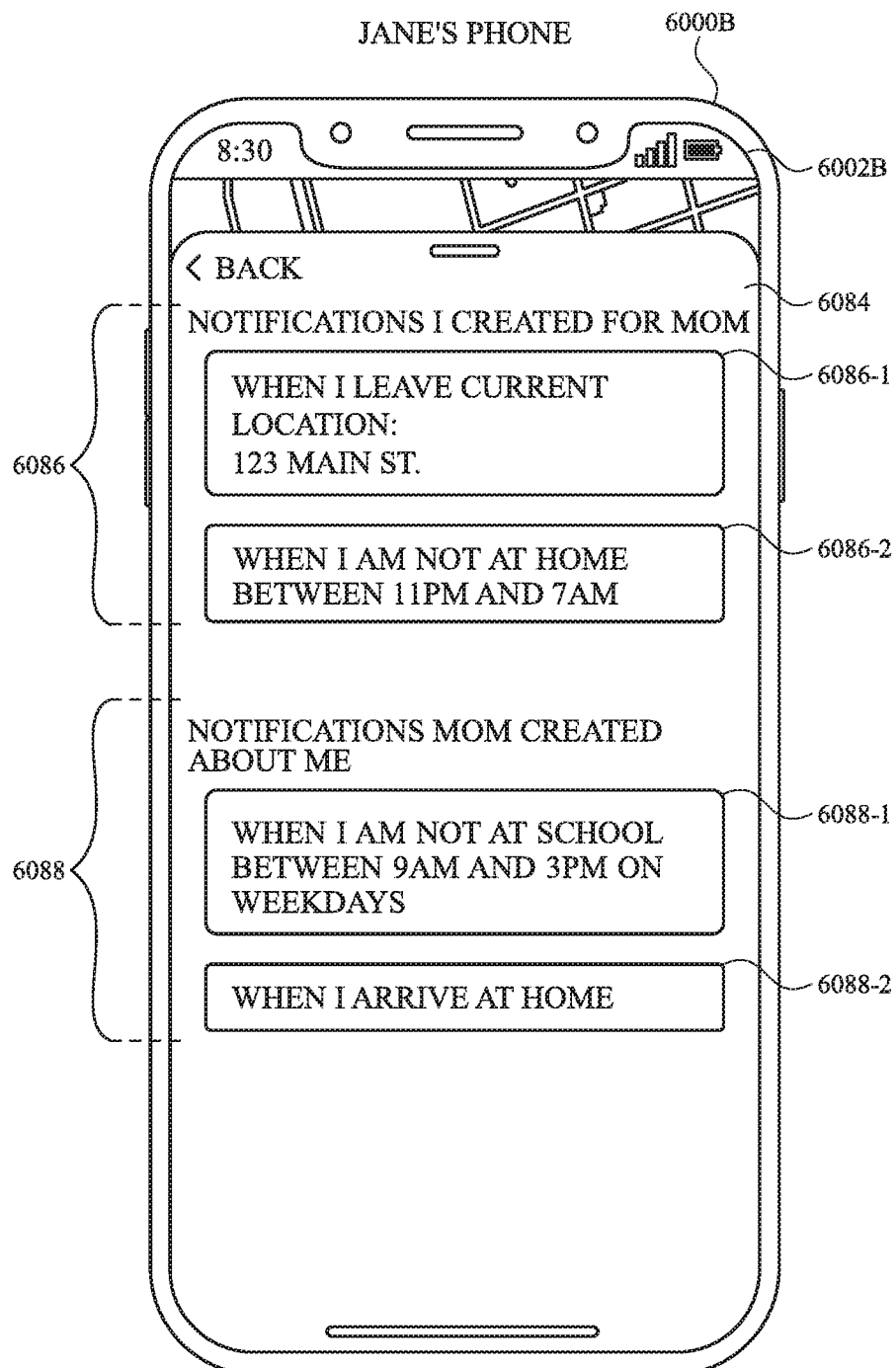
Figure 60:
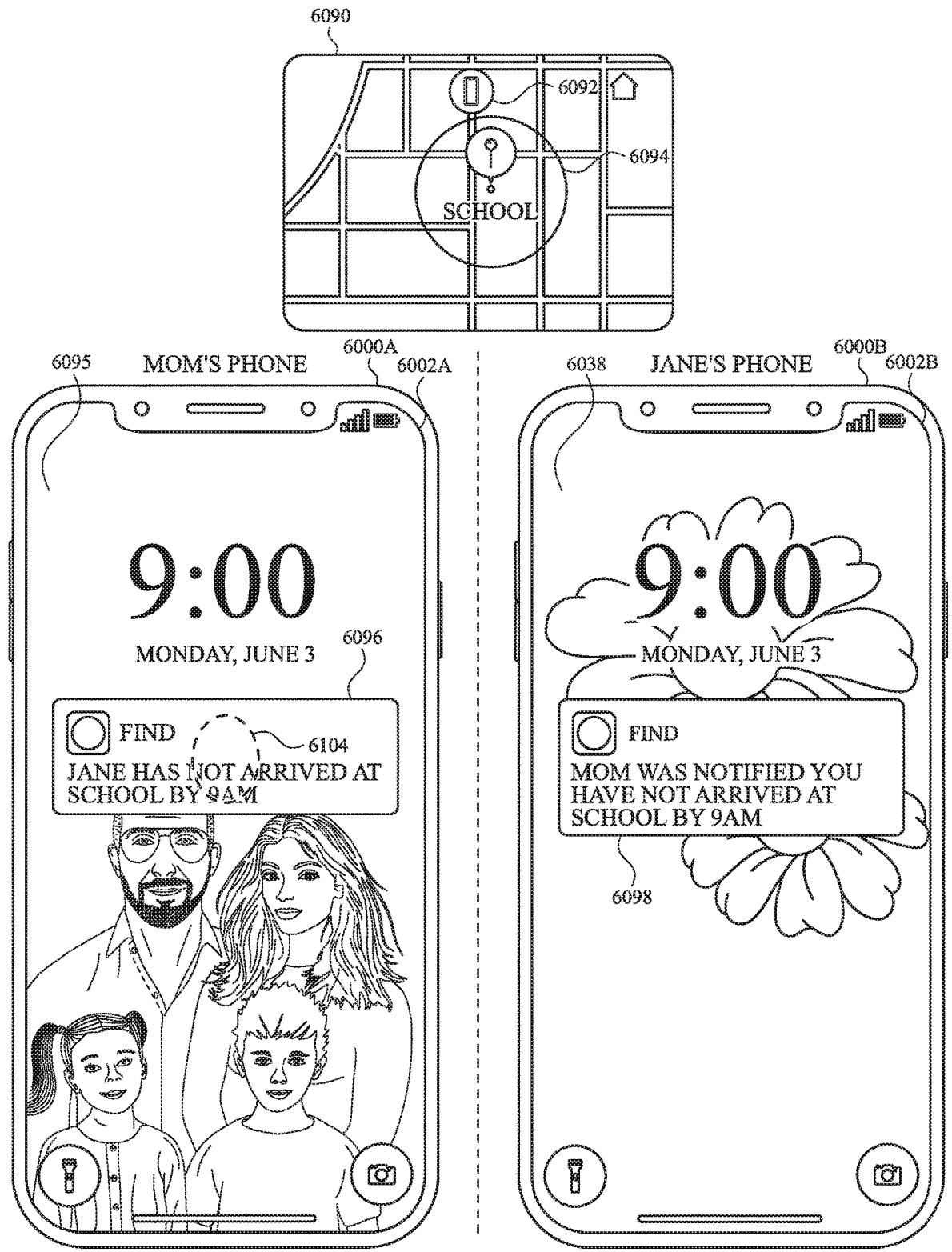

FIGS. 6L-6N illustrate various embodiments for managing geofence notifications associated with Jane's account.

In FIG. 6L, Jane's device 6000B detects input 6068 on "Me" affordance 6070 and, in response, displays notification management user interface 6072, as shown in FIG. 6M. Notification management user interface 6072 includes location-based notification information associated with Jane's account such as, for example, location information 6074 indicating a detected location associated with Jane's account (e.g., a location of Jane's device 6000B), map settings option 6076, and device option 6078 for selecting a specific device that is used to determine the location associated with Jane's account. For example, in FIG. 6M, device option 6078 indicates that Jane's location is associated with the location of Jane's device 6000a However, in some embodiments, device option 6078 can be updated to select Jane's device 6100B or other electronic devices associated with Jane's user account, such that the location of the selected device is associated with the location of Jane.

As shown in FIG. 6M, notification management user interface 6072 also includes authorized geofence notifications listing 6080, which indicates geofence notifications that Jane's account has authorized for other user accounts. As shown in FIG. 6M, the geofence notification listings are grouped by the user accounts for which the geofence notifications have been authorized. For example, geofence notifications listing 6080-1 represents a set of four geofence notifications that have been authorized for Mom's account. Similarly, geofence notifications listing 6080-2 represents a set of two geofence notifications that have been authorized for Dad's account, and geofence notifications listing 6080-3 represents a single geofence notification that has been authorized for Brother's account.

In FIG. 6M, Jane's device 6000B detects input 6082 on geofence notifications listing 6080-1 and, in response, displays notifications details user interface 6084, which shows details for the geofence notifications that have been authorized for Mom's account, as depicted in FIG. 6N.

Notifications details user interface 6084 includes additional details for the geofence notifications authorized for Mom's account. In FIG. 6N, the authorized geofence notifications are grouped based on the user account that created the respective notifications. For example, region 6086 includes representations of authorized geofence notifications that were created by Jane's account. These correspond to geofence notifications created by Jane's account (e.g., in a manner similar to that discussed above with respect to FIG. 6B) and authorizing Mom's account to be notified when the conditions of the geofence notification are satisfied. For example, representation 6086-1 corresponds to a geofence notification created by Jane's account that notifies Mom's account when Jane's device 6000B leaves its current location. Additionally, representation 6086-2 corresponds to a geofence notification created by Jane's account that notifies Mom's account when Jane's device 6000B is not located at home between 11 PM and 7 AM.

Notifications details user interface 6084 also includes region 6088 with representations of authorized geofence notifications that were created by Morn's account. These correspond to geofence notifications created by Mom's account (e.g., in a manner similar to that discussed above with respect to FIG. 6B) and authorized by Jane's account so that Mom's account is notified when the conditions of the geofence notification are satisfied. For example, representation 6088-1 corresponds to the geofence notification created by Mom's account in FIGS. 6A-6C (and authorized by Jane's account) that notifies Morn's account when Jane's device 6000B is not located at school between 9 AM and 3 PM weekdays. Additionally, representation 6088-2 corresponds to a geofence notification created by Morn's account (and authorized by Jane's account) that notifies Morn's account when Jane's device 6000B arrives at home.

In some embodiments, the geofence notifications represented in notifications details user interface 6084 can be de-authorized by Jane's account and removed from notifications detail user interface 6084. For example, in response to Jane's device 6000B detecting a swipe input on representation 6088-2, Jane's account removes authorization for the corresponding geofence notification. Accordingly, Jane's device 6000B removes representation 6088-2 from notifications details user interface 6084 and updates geofence notifications listing 6080-1 to reflect the removal of the geofence notification (e.g., updating geofence notification listing 6080-1 to indicate a set of three geofence notifications are authorized for Mom's account).

FIGS. 6O-6U depict various embodiments illustrating how detected changes in Jane's location (e.g., the location of Jane's device 6000B) satisfy, or fail to satisfy, the conditions of the geofence created in FIGS. 6A-6C and authorized by Jane's account in FIG. 6K, and illustrating notifications that are displayed (e.g., on Mom's device 6000A, Jane's device 60008, or both) as a result of the detected changes in location breaching the geofence.

Figure 6P:
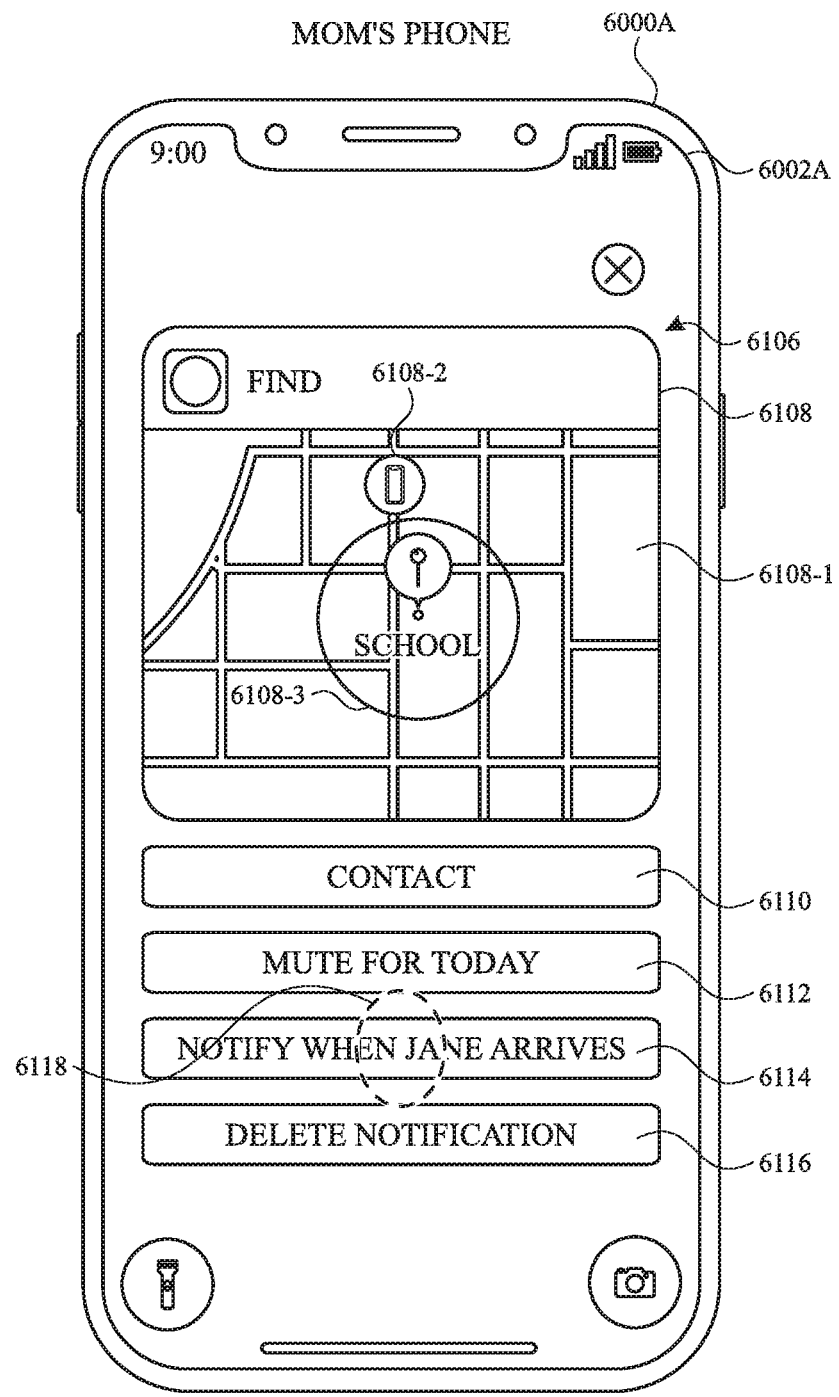
Figure 6Q:
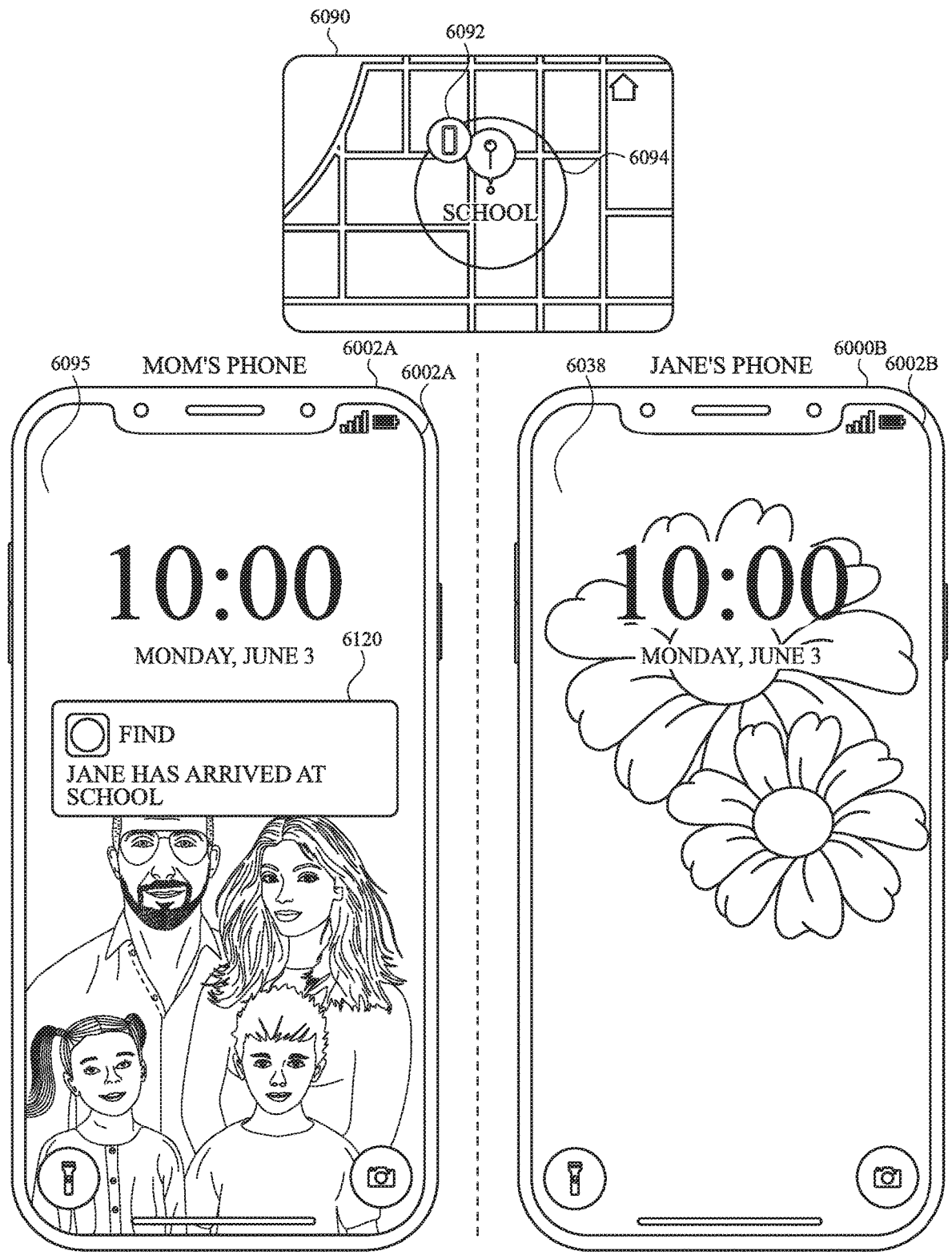

FIGS. 6O-6Q illustrate an embodiment in which Jane's location breaches the geofence because Jane's device 6000B is not located at the specified location of the geofence (e.g., school) at the specified start time (e.g., 9 AM on a weekday). FIG. 6O includes map 6090, which is similar to map 6042 shown in FIG. 6H. Map 6090 includes representation 6092 of Jane's device 6000B, and geofence boundary 6094. As shown in FIG. 6O, representation 6092 of Jane's device is outside geofence boundary 6094 at 9:00 AM on Monday. Accordingly, Jane's location breaches the geofence. As a result, Mom's device 6000A displays notification 6096 (e.g., on lock screen user interface 6095) indicating that Jane did not arrive at school by 9 AM.

In some embodiments, Jane's device 6000B displays notification 6098 (e.g., on lock screen user interface 6038) to alert Jane that she breached the geofence and that Mom's account was notified of the breach. In some embodiments, notification 6098 is displayed only the first time Jane breaches the geofence.

In some embodiments, Mom's device 6000A can display different user interfaces in response to detecting different inputs on a displayed notification (e.g., notification 6096, notification 6120, or notification 6122). For example, in some embodiments, in response to detecting a tap gesture input on the notification, Mom's device 6000A displays locations management user interface 6005. An example of such an embodiment is discussed in greater detail below with reference to FIG. 6S. In some embodiments, in response to detecting a long press input on the notification, Mom's device 6000A displays a popup user interface showing various options that are available in response to Jane's breach of the geofence. An example of such an embodiment is discussed in greater detail below with reference to FIG. 6O. It should also be appreciated that the notifications can be displayed as other user interface objects such as, for example, a banner. The notifications can also be displayed on user interfaces other than lock screen user interfaces. For example, the user interface can be associated with an application operating on electronic device 6000 and the notification is displayed as a banner appearing over the user interface at the top of display 6002.

As illustrated in FIG. 6O, Mom's device 6000A detects long press input 6104 on notification 6096 and, in response, displays popup user interface 6106, as shown in FIG. 6P. Popup user interface 6106 includes various selectable options for responding to notification 6096. For example, popup user interface 6106 includes map option 6108, contact option 6110, mute option 6112, "Notify when Jane Arrives" option 6114, and delete option 6116. Map option 6108 includes map 6108-1, which is similar to map 6090 shown in FIG. 6O, having representation 6108-2 of Jane's device 6000A and geofence boundary 6108-3. Map option 6108 shows Jane's location on a map (e.g., at the time notification 6096 was displayed or at the time input 6104 was detected).

In some embodiments, popup user interface 6106 is a user interface that displays a set of options without fully launching an application for performing the options. However, the options available in popup user interface 6106 can be selected to launch the application for performing the selected option. For example, in some embodiments, map option 6108 corresponds to an option for launching an application for displaying a map user interface showing a live representation of Jane's location on an expanded map. For example, in response to detecting selection of map option 6108, Mom's device 6000A displays locations management user interface 6005 to show a map user interface (e.g., similar to map 6130 shown in locations management user interface 6005 illustrated in FIG. 6S) depicting a live representation of Jane's location on a map.

In some embodiments, in response to detecting selection of contact option 6110, Mom's device 6000A displays one or more options for contacting Jane's device 6000B (e.g., via phone call, messaging, email, or a video communication session).

In some embodiments, in response to detecting selection of mute option 6112, Mom's device 6000A does not display alerts for the geofence for the remainder of the day. This can be useful for a scenario in which Mom is aware that Jane's location will again breach, or will continue to breach, the geofence (e.g., Jane is on vacation with Mom) and Mom wishes to not be notified of any such future breaches for the remainder of the day.

In some embodiments, in response to detecting selection of delete option 6116, Mom's device 6000A dismisses notification 6096 and, in some embodiments, deletes the geofence altogether.

In some embodiments, in response to detecting selection of "Notify when Jane Arrives" option 6114, Mom's device 6000A dismisses notification 6096 and later displays a notification if Jane's location matches the location specified in the conditions of the geofence. This can be useful in a scenario in which Mom is aware that Jane will be late to school (e.g., Jane has a doctor's appointment), but wants to know that Jane eventually makes it to school as expected. FIGS. 6P and 6Q illustrate an embodiment in which "Notify when Jane Arrives" option 6114 is selected.

As shown in FIG. 6P, Mom's device 6000A detects input 6118 on "Notify when Jane Arrives" option 6114, at 9:00 AM. FIG. 6Q shows Jane arriving at school an hour later (e.g., at 10:00 AM), and Mom's device 6000A displaying notification 6120 informing Mom that Jane has arrived at school. In some embodiments, Jane's device 6000B does not display any notifications in this scenario (e.g., lock screen user interface 6038 does not include a notification).

Figure 6R:
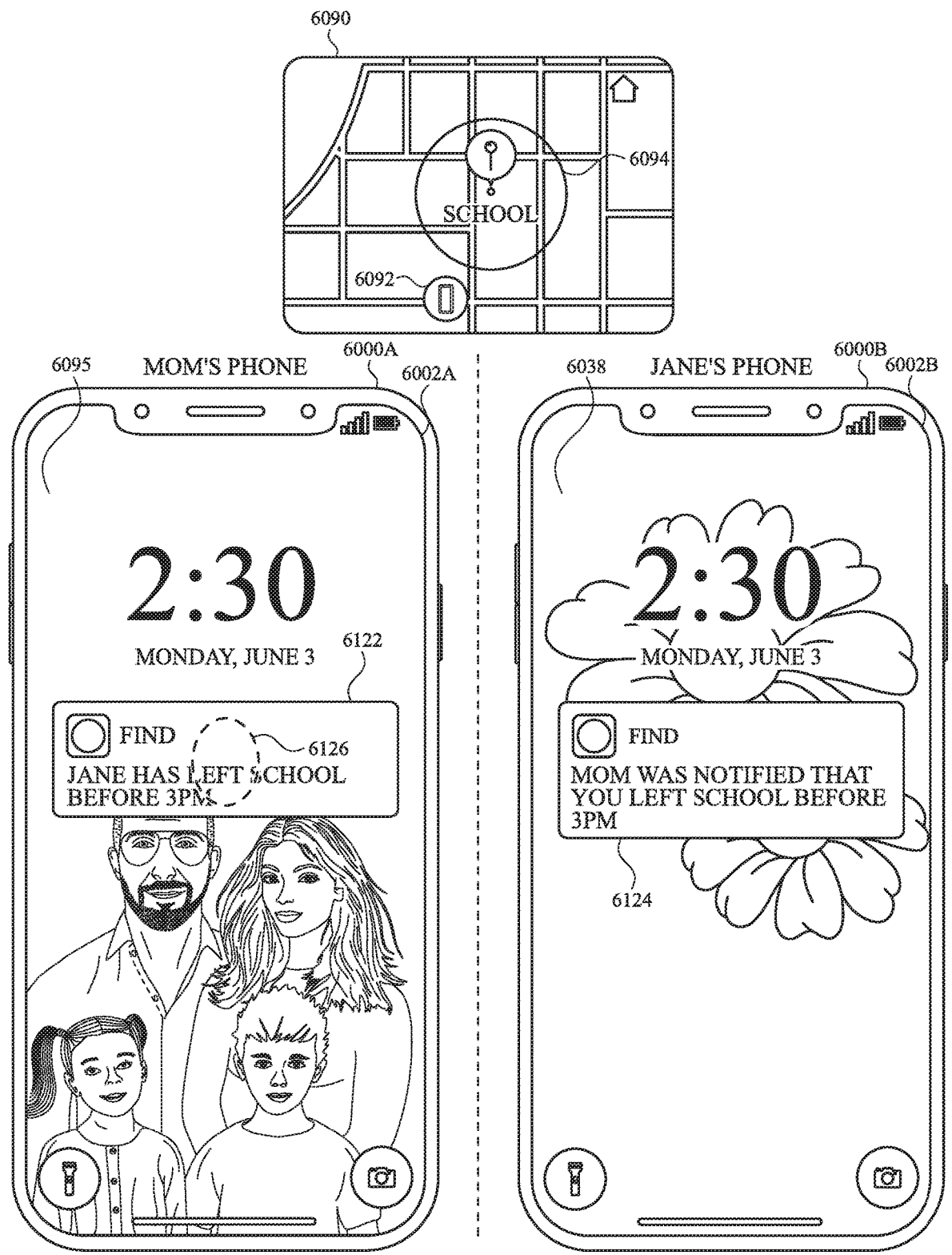
Figure 6S:
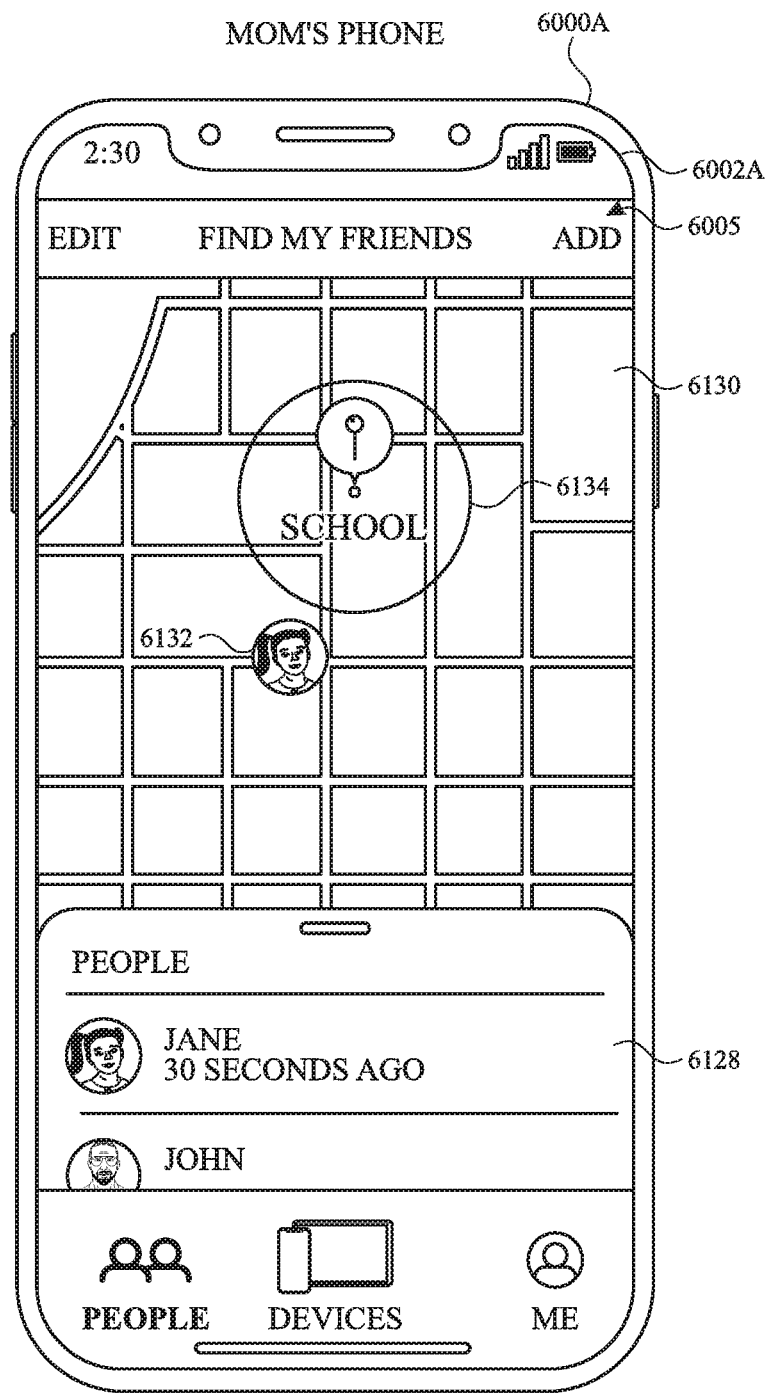

FIGS. 6R and 6S illustrate an embodiment in which Jane's location breaches the geofence because Jane's device 6000B leaves the specified location of the geofence (e.g., school) before the specified end time (e.g., 3 PM on a weekday). As shown in FIG. 6R, representation 6092 of Jane's device 6000B is outside geofence boundary 6094 at 2:30 PM on Monday. Accordingly, Jane's location breaches the geofence. As a result, Mom's device 6000A displays notification 6122 indicating that Jane left school before 3 PM.

In some embodiments, Jane's device 6000B displays notification 6124 to alert Jane that she breached the geofence and that Mom's account was notified of the breach. In some embodiments, notification 6124 is displayed only the first time Jane breaches the geofence.

As mentioned above, in some embodiments, Mom's device 6000A can display different user interfaces in response to detecting different inputs on a displayed notification. In FIG. 6R, Mom's device 6000A detects tap gesture input 6126 on notification 6122 and, in response, displays locations management user interface 6005 associated with Mom's account, as shown in FIG. 6S. Locations management user interface 6005 is similar to locations management user interface 6056, which is a locations management user interface associated with Jane's account. Thus, Mom's device 6000A can perform operations similar to those discussed above with respect to locations management user interface 6056. For example, locations management user interface 6005 includes map 6130 showing locations associated with user accounts that are authorized to share location data with Mom's account, including representation 6132 indicating a location on map 6130 that is associated with Jane's account (e.g., a location of Jane's device 6000B), and geofence boundary 6134. As illustrated in FIG. 6S, map 6130 shows that Jane's location is outside the boundary of the geofence.

Locations management user interface 6005 also includes item 6128 associated with Jane's account. In some embodiments, in response to detecting a selection of item 6128, Mom's device 6000A displays Jane's account information 6004 (e.g., see FIG. 6A).

Figure 6T:
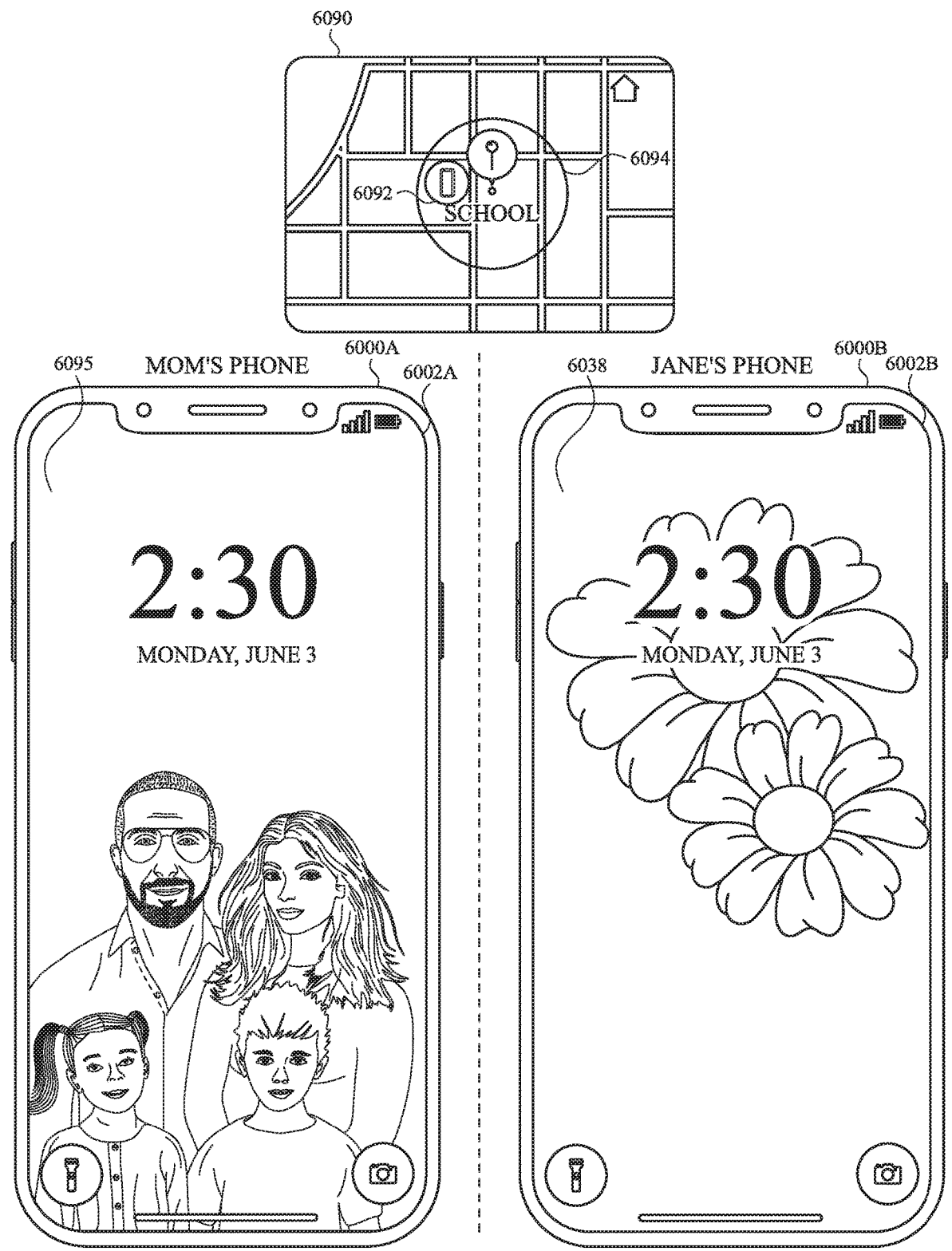
Figure 6U:
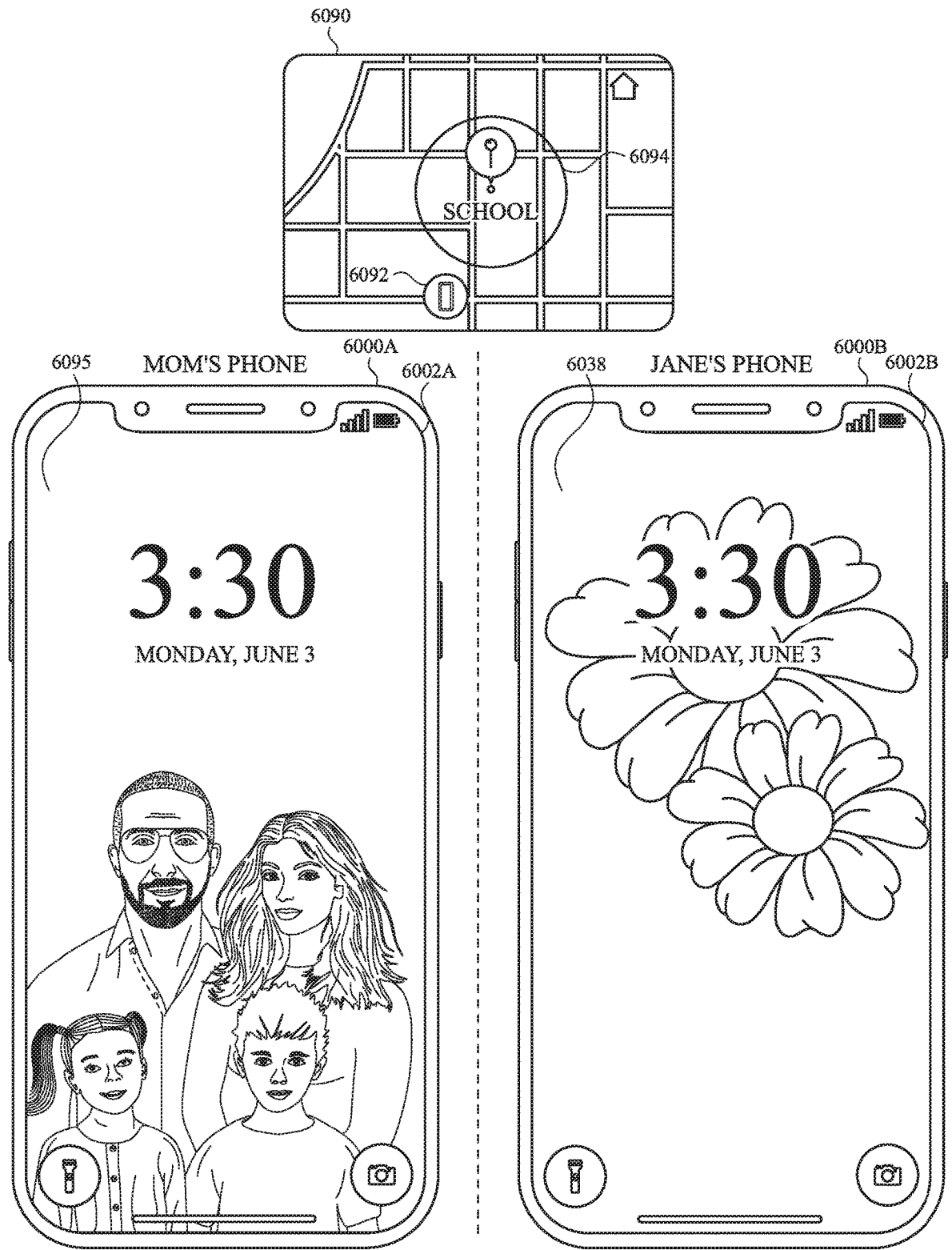

FIG. 6T illustrates an embodiment in which Jane's location is inside the boundaries of the geofence during the specified time range and, therefore, is not breaching the geofence. As shown in FIG. 6T, representation 6092 of Jane's device 6000B is inside geofence boundary 6094 at 2:30 PM on Monday. Because the geofence is active from 9:00 AM to 3:00 PM on weekdays, Jane's presence at school conforms with the constraints of the geofence. As such, Jane is not breaching the geofence. As a result, neither Mom's device 6000A, nor Jane's device 6000B, display any notifications concerning a breach of the geofence. Accordingly, lock screen user interface 6095 and lock screen user interface 6038 do not include any notifications.

FIG. 6U illustrates an embodiment in which Jane's location is outside the boundaries of the geofence, but because the time is outside the specified range, Jane is not breaching the geofence. As shown in FIG. 6U, representation 6092 of Jane's device 6000B is outside geofence boundary 6094 at 3:30 PM on Monday. Because the geofence is active from 9:00 AM to 3:00 PM on weekdays, Jane is not breaching the geofence. As a result, neither Mom's device 6000A, nor Jane's device 6000B, display any notifications concerning a breach of the geofence. Accordingly, lock screen user interface 6095 and lock screen user interface 6038 do not include any notifications.

It should be appreciated that one or more of the operations disclosed herein (including those discussed below with respect to method 700 and method 800) can be performed across various combinations of the electronic devices discussed herein. For example, in some embodiments, Jane's device 6000B (or Jane's device 6100B) evaluates location data for Jane's device, determines when the geofence is breached, and causes the corresponding notification(s) to be displayed at Mom's device 6000A and, optionally, at Jane's device 6000B. For example, Jane's device can send the notification directly to Mom's device 6000A for display, or can send the notification indirectly by sending information to a server which, in turn; causes the notification to be displayed at Morn's device 600. In some embodiments, Morn's device 6000A evaluates location data for Jane's device, determines when the geofence is breached, and causes the corresponding notification(s) to be displayed at Mom's device 6000A and, optionally, at Jane's device 6000B (e.g., directly or indirectly through a server). In some embodiments, a server evaluates location data for Jane's device, determines when the geofence is breached; and causes the corresponding notification(s) to be displayed at Mom's device 6000A and, optionally, at Jane's device 6000B.

FIG. 7 is a flow diagram illustrating a method for managing location-related communications of an electronic device associated with a user account, using an electronic device, in accordance with some embodiments. Method 700 is performed at a device (e.g., 100, 300; 500, 6000, 6100B) with a display (e.g., 112). Some operations in method 700 are, optionally, combined, the orders of some operations are, optionally, changed, and some operations are, optionally; omitted.

As described below, method 700 provides an intuitive way for managing location-related communications of an electronic device associated with a user account. The method reduces the cognitive burden on a user for managing location-related communications of an electronic device associated with a user account, thereby creating a more efficient human-machine interface. For battery-operated computing devices, enabling a user to manage location-related communications of an electronic device associated with a user account faster and more efficiently conserves power and increases the time between battery charges.

While an electronic device (e.g., 6000; 6100) is associated with a first user account (e.g. Jane's account) that shares a location of the electronic device with one or more user accounts other than the first user account, the electronic device performs (702) the steps described below.

The electronic device receives (704) an indication (e.g., data associated with a request; receiving directly from an external electronic device associated with the second user account; receiving from a location-tracking server that received the request from the external electronic device) that a second user account (e.g., Mom's account) (e.g., a remote user or device that has been authorized (e.g., by the first user account associated with the electronic device) to receive location data for the electronic device) is requesting to be notified about changes in location of the electronic device relative to a first geographic location (e.g., school) (e.g., a physical address, a coordinate, a defined area or geographic landmark) that satisfy a set of criteria (e.g., a set of location-based criteria) (e.g., a set of criteria that are evaluated with respect to a predetermined time period (e.g., a range of times)). In some embodiments, the range of times is set by the second user account (e.g., using an external electronic device associated with the second user account). In some embodiments, the set of criteria are satisfied when a current location of the electronic device does not match (or is transitioning from matching to not matching) the first geographic location. In some embodiments, the set of criteria are satisfied when a current location of the electronic device matches (or is transitioning from not matching to matching) the first geographic location. In some embodiments, the set of criteria are evaluated based on the current location of the electronic device during the predetermined time period.

In some embodiments, the set of criteria include a criterion that is satisfied when the location of the electronic device (e.g., 6000B; 6100B) does not have a predefined relationship to the first geographic location (e.g., the electronic device is not located at the first geographic location) during a range of times (e.g., a range of times specified by the first user account) (e.g., a range of times specified by the second user account).

In some embodiments, the method further comprises: while the electronic device (e.g., 6000B; 6100B) is associated with the first user account that shares the location of the electronic device with one or more user accounts other than the first user account, and while the location of the electronic device is being evaluated (e.g., by the electronic device; by a server; by a second electronic device associated with the second user account) relative to the first geographic location and the range of times, performing one or more of the following steps. In accordance with a determination that the location of the electronic device does not have the predefined relationship to the first geographic location during the range of times (e.g., the electronic device is not located at the first geographic location at any point during the range of times), generating an alert (e.g., 6096; 6098; 6122; 6124) indicating that the location of the electronic device does not have the predefined relationship to the first geographic location. In some embodiments, generating the alert includes displaying the alert on the electronic device. In some embodiments, generating the alert includes causing the alert to be displayed on an electronic device associated with the second user account (e.g., Mom's device 6000A). In accordance with a determination that the location of the electronic device does not have the predefined relationship to the first geographic location at a time that is outside of the range of times (e.g., the electronic device is not located at the first geographic location at a time that is outside the range of times), forgoing generating the alert indicating that the location of the electronic device does not have the pre-defined relationship to the first geographic location (e.g., see FIG. 6U). Selectively generating an alert indicating that the location of the electronic device does not have the predefined relationship to the first geographic location provides feedback to a user to indicate when the conditions being evaluated fail to meet a specified criteria. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the electronic device is associated with the first user account that shares the location of the electronic device with one or more user accounts other than the first user account, and while the location of the electronic device is being evaluated (e.g., by the electronic device; by a server; by a second electronic device associated with the second user account) relative to the first geographic location and the range of times, the method further comprises: in accordance with a determination that the location of the electronic device has the predefined relationship to the first geographic location during the range of times (e.g., the electronic device is located at the first geographic location at a time that is within the range of times), forgoing generating the alert indicating that the location of the electronic device does not have the predefined relationship to the first geographic location (e.g., see FIG. 6T). Forgoing generating an alert indicating that the location of the electronic device does not have the predefined relationship to the first geographic location when the location of the electronic device has the predefined relationship during a range of times provides feedback to a user to indicate when the conditions being evaluated fail to meet a specified location criteria during a specified range of times. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the notification indicating that the second user account is requesting to be notified about changes in the location of the electronic device relative to the first geographic location that satisfy the set of criteria occurs at a time corresponding to the range of times (e.g., at or near the start of the range of times) (e.g., see display of notification 6040 in FIG. 6G). In some embodiments, the notification is displayed only the first time the start time of the range of times is reached. In some embodiments, displaying the notification at a time that matches the start time in the range of times provides an enhanced layer of security and preserves privacy of the tracked user by providing information that the location of the device is being tracked, which is particularly useful in a scenario in which a malicious actor has access to the tracked user's device, and the malicious actor sets the geofence and timeframe parameters and, without the tracked user's knowledge or consent, confirms the geofence and timeframe on the tracked user's device.

In some embodiments, the set of criteria includes a criterion that is satisfied when the location of the electronic device does not match (e.g., or is transitioning from matching to not matching) the first geographic location. In some embodiments, the second user account requests to be notified when the location of the electronic device is not at the first geographic location (e.g., during the range of times) (e.g., see FIGS. 6O and 6R).

In some embodiments, the set of criteria includes a criterion that is satisfied when the location of the electronic device matches (e.g., or is transitioning from not matching to matching) the first geographic location (e.g., see FIG. 6Q). In some embodiments, the second user account is notified (e.g., 6096) when the location of the electronic device does not match the first geographic location (e.g., during a range of times) and, in response, the second user account requests to be notified when the electronic device arrives at the first geographic location (e.g., during the range of times) (e.g., see input 6118 selecting "Notify when Jane Arrives" option 6114 in FIG. 6P).

Method 700 further includes: after the electronic device receives the indication that the second user account is requesting to be notified about changes in the location of the electronic device relative to the first geographic location that satisfy the set of criteria, the electronic device performs (706) one or more of the following steps.

In accordance with a determination that a set of notification criteria are satisfied, the set of notification criteria including a criterion that is satisfied when the indication that the second user account is requesting to be notified has been received, the electronic device displays (708), via the display device, a notification (e.g., 6040, 6048) (e.g., an alert, a banner) indicating that the second user account is requesting to be notified about changes in the location of the electronic device relative to the first geographic location that satisfy the set of criteria. In some embodiments, the indication includes text identifying the second user account and/or text describing the set of criteria. In some embodiments, the set of notification criteria are met by receiving the indication. In some embodiments, the set of notification criteria are met when a location of the electronic device relative to the first geographic location satisfies the set of criteria after receiving the indication. Displaying a notification indicating that the second user account is requesting to be notified about changes in the location of the electronic device relative to the first geographic location that satisfy the set of criteria provides feedback to the user indicating that a remote user account is requesting to use location data for notification purposes. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more user accounts other than the first user account includes the second user account (e.g., Mom's account) (e.g., the first user account shares the location of the electronic device with the second user account), and the method further comprises one or more of the following steps. After displaying the notification (e.g., 6040, 6048) indicating that the second user account is requesting to be notified about changes in the location of the electronic device relative to the first geographic location that satisfy the set of criteria and before authorizing (e.g., granting) the request to be notified about changes in the location of the electronic device relative to the first geographic location that satisfy the set of criteria (e.g., in some embodiments, after explicitly rejecting the request to be notified about changes in the location of the electronic device relative to the first geographic location that satisfy the set of criteria): sharing, with the second user account, a location of the electronic device. In some embodiments, the first user account continues to share the location of the electronic device with the second user account, even after the electronic device declines the request to notify the second user account about changes in the location of the electronic device relative to the first geographical location that satisfy the set of criteria. Sharing a location of the electronic device with the second user account after displaying the notification, and prior to authorizing the request to be notified (or after explicitly rejecting the request), permits the user to continue sharing location data with the second user account without requiring the user to provide additional input to resume location data sharing with the second user account. This reduces the number of inputs needed to resume location data sharing with the second user account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the notification (e.g., 6040, 6048) indicating that the second user account is requesting to be notified about changes in the location of the electronic device (e.g., 6000B, 6100B) relative to the first geographic location that satisfy the set of criteria, the method includes one or more of the following steps. In accordance with a determination that a current location of the electronic device relative to the first geographic location satisfies the set of criteria (e.g., during the range of times) and in accordance with a determination that authorization (e.g., explicit authorization for the particular request; pre-authorization based on the identity of the requesting device) has been received to notify the second user account when a location of the electronic device relative to the first geographic location satisfies the set of criteria, notifying (e.g., displaying notification 6096) (e.g., transmitting data to a device associated with the second user account; transmitting data to a notification server that notifies the second user account) the second user account that the current location of the electronic device relative to the first geographic location satisfies the set of criteria (e.g., during the range of times (e.g., the location of the electronic device is not at the first geographic location at any point during the range of times)). In accordance with a determination that a current location of the electronic device relative to the first geographic location satisfies the set of criteria and in accordance with a determination that authorization has not been received to notify the second user account when a location of the electronic device relative to the first geographic location satisfies the set of criteria, forgoing notifying the second user account that the current location of the electronic device relative to the first geographic location satisfies the set of criteria. Notifying the second user account that the current location of the electronic device relative to the first geographic location satisfies a set of criteria, when the set of criteria are satisfied and authorization has been received to notify the second user account, provides an enhanced layer of security and preserves privacy of the first user account by requiring authorization for the second user account to receive a notification related to the location associated with the first user account. Similarly, foregoing notifying the second user account that the current location of the electronic device relative to the first geographic location satisfies a set of criteria, when the set of criteria are satisfied and authorization has not been received to notify the second user account, provides an enhanced layer of security and preserves privacy of the first user account by requiring authorization for the second user account to receive a notification related to the location associated with the first user account.

In some embodiments, displaying the notification (e.g., 6040, 6048) indicating that the second user account is requesting to be notified about changes in the location of the electronic device relative to the first geographic location that satisfy the set of criteria occurs when the location of the electronic device has a predefined relationship to the first geographic location (e.g., when the electronic device is located at the first geographic location) (e.g., see FIG. 6H). In some embodiments, the notification is displayed only the first time the electronic device is located at the first geographic location. In some embodiments, displaying the notification when the device has the predefined relationship to the first geographic location provides an enhanced layer of security and preserves privacy of the tracked user by providing information that the location of the device is being tracked, which is particularly useful in a scenario in which a malicious actor has access to the tracked user's device, and the malicious actor sets the geofence and timeframe parameters and; without the tracked user's knowledge or consent, confirms the geofence and timeframe on the tracked user's device.

In some embodiments, displaying the notification (e.g., 6040, 6048) indicating that the second user account is requesting to be notified about changes in the location of the electronic device relative to the first geographic location that satisfy the set of criteria occurs in response to receiving the indication that the second user account is requesting to be notified about changes in the location of the electronic device relative to the first geographic location that satisfy the set of criteria (e.g., see FIG. 6F). In some embodiments, the second user account (e.g., Mom's account) sets the conditions for the geofence (e.g., as shown in FIGS. 6A-6C) and the electronic device receives the indication (and displays the notification) shortly (e.g., immediately) after the geofence is created.

In some embodiments, after displaying the notification (e.g., 6040, 6048) indicating that the second user account is requesting to be notified about changes in the location of the electronic device relative to the first geographic location that satisfy the set of criteria, the method further comprises one or more of the following. In accordance with a determination that authorization (e.g., explicit authorization for the particular request; pre-authorization based on the identity of the requesting device) has been received to notify the second user account when a location of the electronic device relative to the first geographic location satisfies the set of criteria, and that a second set of notification criteria are satisfied, the second set of notification criteria including a first criterion that is satisfied when the set of criteria are satisfied (e.g., the current location of the electronic device relative to the first geographic location satisfies the set of criteria (e.g., during the range of times)); displaying; via the display device (e.g., 6002); a notification (e.g., 6098, 6124) indicating that the location (e.g., current location) of the electronic device relative to the first geographic location satisfies the set of criteria. In some embodiments, the notification includes text identifying the second user account and/or text describing the set of criteria. In some embodiments, displaying the notification informs the user that a notification concerning the location of the electronic device is being sent to the second user account. This provides an element of privacy for the user by keeping the user informed of instances in which the user's personal information (e.g., location information) is being shared with other user accounts. In accordance with a determination that authorization has been received to notify the second user account when a location of the electronic device relative to the first geographic location satisfies the set of criteria, and that the second set of notification criteria are not satisfied, forgoing displaying the notification indicating that the location (e.g., current location) of the electronic device relative to the first geographic location satisfies the set of criteria.

In some embodiments, the second set of notification criteria include a second criterion that is satisfied when the set of criteria are satisfied for a first time (e.g., the notification is displayed only the first time the set of criteria are satisfied).

In some embodiments, the set of criteria are satisfied when a current location of the electronic device does not have a predefined relationship to the first geographical location (e.g., the electronic device is not located at the first geographic location) at a start time within a range of times (e.g., see FIG. 6O).

In some embodiments, after the electronic device receives the indication that the second user account (e.g., Mom's account) is requesting to be notified about changes in the location of the electronic device relative to the first geographic location that satisfy the set of criteria, and in accordance with a determination that the set of notification criteria are not satisfied (e.g., a current location of the electronic device (e.g., 6000B, 6100B) relative to the first geographic location fails to satisfy the set of criteria after receiving the indication), the electronic device forgoes (710) displaying the notification indicating that the second user account is requesting to be notified about changes in the location of the electronic device relative to the first geographic location that satisfy the set of criteria (e.g., see Jane's device 6000B-1 in FIG. 6G) (e.g., see Jane's device 6000B-3 in FIG. 6B).

In some embodiments, the method further comprises displaying (e.g., before receiving the indication; after receiving the indication), via the display device (e.g., 6002), a notification management interface (e.g., 6072) that includes a set (e.g., 6080) of one or more indications (e.g., 6080-1, 6080-2, 6080-3) that each correspond to a request to be notified about changes in the location of the electronic device relative to a geographic location.

In some embodiments, the notification management interface includes location-based notification information (e.g., 6074, 6076, 6078) (e.g., address information, map settings, options for sharing location information associated with the first user account) for the first user account (e.g., Jane's account).

In some embodiments, the set of one or more indications that each correspond to a request to be notified about changes in the location of the electronic device relative to a geographic location is organized according to the user account corresponding (e.g., the user account making the request to be notified; the user account that will be notified) to each indication of the set of one or more indications (e.g., in FIG. 6M, 6080-1 corresponds to Mom's account, 6080-2 corresponds to Dad's account, 6080-3 corresponds to Brother's account). In some embodiments, the set of indications include a representation of the user account corresponding to set of indications, and a representation indication of a number of notifications that are associated with the user account. Organizing the set of one or more indications according to the user account corresponding to each indication of the set of one or more indications provides an organized and easily navigable user interface that reduces the number of inputs needed for a user to locate the indications. Reducing the number of inputs needed for a user to locate the indications enhances the operability of the device and makes the user-device interface more efficient (e.g., by helping the user to provide proper inputs and reducing user mistakes when operating/interacting with the device) which; additionally, reduces power usage and improves battery life of the device by enabling the user to use the device more quickly and efficiently.

In some embodiments, the set of one or more indications that each correspond to a request to be notified about changes in the location of the electronic device relative to a geographic location includes one or more of the following. A first sub-set of one or more indications (e.g., 6086-1, 6086-2) that each correspond to a request to be notified about changes in the location of the electronic device relative to a geographic location that was created by the first user account (e.g., Jane's account). A second sub-set of one or more indications (e.g., 6088-1, 6088-2) that each correspond to a request to be notified about changes in the location of the electronic device relative to a geographic location that was created by a user account other than the first user account (e.g., Mom's account) (e.g., a user account of the one or more user accounts other than the first user account). In some embodiments, the first sub-set of one or more indications are grouped together (e.g., in region 6086) and the second sub-set of one or more indications are grouped together (e.g., in region 6088) (e.g., and separate from the first sub-set of one or more indications). Grouping together the first and second sub-sets of one or more indications provides an organized and easily navigable user interface that reduces the number of inputs needed for a user to locate the indications in each sub-set. Reducing the number of inputs needed for a user to locate the indications enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the method further comprises one or more of the following. While displaying the notification management interface (e.g., notifications details user interface 6084) (e.g., in some embodiments, notification management user interface 6072 includes notifications details user interface 6084), receiving a first set of one or more inputs corresponding to a request to de-authorize a first request to be notified about changes in the location of the electronic device relative to a geographic location. In response to receiving the first set of one or more inputs: removing authorization for notifications about changes in the location of the electronic device relative to a geographic location. In some embodiments, removing authorization for the notifications includes ceasing to display an indication (e.g., 6086-1, 6086-2, 6088-1, 6088-2, 6080-1, 6080-2, 6080-3) of the set of one or more indications that corresponds to the first request to be notified about changes in the location of the electronic device relative to a geographic location. In some embodiments, the first set of one or more inputs is a swipe input. In some embodiments, the first set of one or more inputs is a swipe input on the indication of the set of one or more indications that corresponds to a request to be notified about changes in the location of the electronic device relative to a geographic location followed by a tap gesture on a delete affordance. Removing authorization for notifications about changes in the location of the electronic device relative to a geographic location, in response to receiving the first set of one or more inputs, provides a quick and convenient method that reduces the number of inputs for removing authorization for the notification. Reducing the number of inputs needed for removing authorization for the notification enhances the operability of the device and makes the user-device interface more efficient (e.g., by helping the user to provide proper inputs and reducing user mistakes when operating/interacting with the devices which, additionally, reduces power usage and improves battery life of the device by enabling the user to use the device more quickly and efficiently.

Note that details of the processes described above with respect to method 700 (e.g., FIG. 7) are also applicable in an analogous manner to the methods described bellow. For example, methods 800, 1000, and 1200 optionally include one or more of the characteristics of the various methods described above with reference to method 700. For example, various steps of method 800 are performed after the notification displayed in step 708 has been accepted. As another example, the steps in method 700 can be used to enable the notifications discussed with respect to methods 1000 and 1200. For brevity, these details are not repeated below.

FIG. 8 is a flow diagram illustrating a method for managing location-related communications of an electronic device associated with a user account, using an electronic device, in accordance with some embodiments. Method 800 is performed at a device (e.g., 100, 120, 300, 310, 500, 516, 6000, 6100B). Some operations in method 800 are, optionally, combined, the orders of some operations are, optionally, changed, and some operations are, optionally, omitted.

As described below, method 800 provides an intuitive way for managing location-related communications of an electronic device associated with a user account. The method reduces the cognitive burden on a user for managing location-related communications of an electronic device associated with a user account, thereby creating a more efficient human-machine interface. For battery-operated computing devices, enabling a user to manage location-related communications of an electronic device associated with a user account faster and more efficiently conserves power and increases the time between battery charges.

Method 800 includes performing one or more of the following steps at an electronic device (e.g., a server) (e.g., an electronic device having a display device (e.g., a touch-sensitive display) (e.g., Jane's device 6000B; Jane's device 6100B) (e.g., Mom's device 6000A). In some embodiments, the electronic device is associated with a user account (e.g., a child's account; Jane's account) for which a current location is being evaluated. In some embodiments, the electronic device is associated with a second user account (e.g., a parent's user account; Mom's account) that is authorized to receive location data for an electronic device (e.g., Jane's device 6000B; Jane's device 6100B) associated with the user account (e.g., the child's user account) for which the current location is being evaluated. In some embodiments, the electronic device is a server that is authorized to receive location data for an electronic device (e.g., Jane's device 6000B; Jane's device 6100B) associated with the user account (e.g., Jane's account) for which the current location is being evaluated.

Method 800 includes performing (802) one or more of the following steps while a current location associated with a user account (e.g., Jane's account) (e.g., a current location of an electronic device associated with the user account) is being evaluated (e.g., tracked or monitored) relative to a geographic location (e.g., school) (e.g., a physical address, a coordinate, a defined area, or a geographic landmark) and a range of times (e.g., between 9:00 AM and 3:00 PM on weekdays) (e.g., a range of times specified by the user account) (e.g., a range of times specified by the second user account (e.g., Mom's account)).

In accordance with a determination that the current location associated with the user account does not have a predefined relationship to the geographic location during the range of times (e.g., the electronic device associated with the user account is not located at the geographic location at any point during the range of times), the electronic device generates (804) an alert (e.g., a notification such as a pop up or a banner) (e.g., 6096, 6098, 6122, 6124) indicating that the current location associated with the user account (e.g., Jane's account) does not have the predefined relationship to the geographic location (e.g., school) (e.g., see FIG. 6O) (e.g., see FIG. 6R). In some embodiments, generating the alert includes displaying the alert on the electronic device (e.g., when the electronic device is associated with the user account (e.g., child account) or is associated with the second user account (e.g., parent account)). In some embodiments, generating the alert includes causing an external electronic device to display the alert (e.g., when the electronic device is a server). In some embodiments, the external electronic device is an electronic device associated with the user account. In some embodiments, the external electronic device is an electronic device associated with the second user account. Generating an alert indicating that the current location associated with the user account does not have the predefined relationship to the geographic location, when the current location does not have the predefined relationship at a time within the range of times, provides feedback to a user indicating that the conditions being evaluated violate a specified criteria. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user account has the predefined relationship to the geographic location when the current location associated with the user account matches (e.g., or is transitioning from not matching to matching) the geographic location (e.g., see FIG. 6T).

In some embodiments, the alert is generated on a first date (e.g., Monday, June 3rd, as shown in FIG. 6O), and the alert includes a first user interface object (e.g., a "Mute for Today" affordance; mute option 6112) that, when selected, initiates a process for preventing display of subsequent alerts generated on the first date and associated with the evaluation of the current location associated with the user account relative to the geographic location during the range of times (e.g., when the first user interface object is selected, future alerts for the geofence and range of times are not displayed for the remainder of the day). In some embodiments, the first user interface object is displayed in response to long press input 6104 on notification 6096.

In some embodiments, the alert includes a second user interface object (e.g., a "Contact" affordance; contact option 6110) that, when selected, initiates a process for contacting (e.g., calling, mailing, messaging, video conferencing) an external electronic device (e.g., Jane's device 6000B; Jane's device 6100B) associated with the user account (e.g., Jane's account). In some embodiments, the second user interface object is displayed in response to long press input 6104 on notification 6096.

In some embodiments, the alert includes a third user interface object (e.g., a "Notify when Jane Arrives" affordance; "Notify when Jane Arrives" option 6114) that, when selected, initiates a process for: while the current location associated with the user account is being evaluated relative to the geographic location during the range of times and in accordance with a determination that the current location associated with the user account has the predefined relationship to the geographic location (e.g., during the range of times) (e.g., at a time outside the range of times), generating a second alert (e.g., 6120) indicating that the current location associated with the user account has the predefined relationship to the geographic location (e.g., generating the second alert when the electronic device associated with the user account is located at the geographic location or is transitioning from a location that does not match the geographic location to a location that does match the geographic location) (e.g., see FIG. 6Q). In some embodiments, the third user interface object is displayed in response to long press input 6104 on notification 6096. Generating a second alert indicating that the current location associated with the user account has the predefined relationship to the geographic location provides feedback to a user indicating that the conditions being evaluated are now satisfied, when they previously were not satisfied. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the alert includes a fourth user interface object (e.g., a map affordance; map option 6108) that, when selected, initiates a process for displaying a map representing the current location associated with the user account (e.g., associated with an external electronic device associated with the user account). In some embodiments, the alert includes a representation of the map (e.g., 6108-1) (e.g., the fourth user interface object is the representation of the map representing a location associated with the user account), and the map displayed in response to selecting the fourth user interface object includes an expanded map or an option to view an expanded map. In some embodiments, the fourth user interface object is displayed in response to long press input 6104 on notification 6096.

In some embodiments, the alert (e.g., 6096) is generated when the current location associated with the user account does not match the geographic location at a start time of the range of times (e.g., the alert is generated when the time period starts and the electronic device associated with the user account is not located within the geofence) (e.g., see FIG. 6O). In some embodiments, the determination that the current location associated with the user account does not have a predefined relationship to the geographic location during the range of times includes a determination that the current location associated with the user account does not match the geographic location at a start time of the range of times.

In some embodiments, the alert (e.g., 6122, 6124) is generated when the current location associated with the user account transitions from having the predefined relationship to the geographic location during the range of times to not having the predefined relationship to the geographic location during the range of times (e.g., the alert is generated when the electronic device associated with the user account leaves the geofence during the time period) (e.g., see FIG. 6R). In some embodiments, the determination that the current location associated with the user account does not have a predefined relationship to the geographic location during the range of times includes a determination that the current location associated with the user account has transitioned from having the predefined relationship to the geographic location during the range of times to not having the predefined relationship to the geographic location during the range of times.

In accordance with a determination that the current location associated with the user account does not have a predefined relationship to the geographic location at a time that is outside of the range of times (e.g., the electronic device associated with the user account is not located at the geographic location at a time that is outside the range of times), the electronic device forgoes (806) generating an alert indicating that the current location associated with the user account does not have the predefined relationship to the geographic location (e.g., see FIG. 6U). Foregoing generating an alert indicating that the current location associated with the user account does not have the predefined relationship to the geographic location, when the current location does not have the predefined relationship at a time outside of the range of times, provides feedback (by not generating the alert) to a user indicating that the conditions being evaluated do not violate a specified criteria. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the current location associated with the user account (e.g., Jane's account) is being evaluated (e.g., tracked or monitored) relative to the geographic location (e.g., school) and the range of times (e.g., between 9:00 AM and 3:00 PM on weekdays), in accordance with a determination that the current location associated with the user account has a predefined relationship to the geographic location at a time that is outside of the range of times (e.g., the electronic device associated with the user account is located at the geographic location at a time that is outside the range of times) (e.g., Jane's device 6000B is located at school at 3:30 PM on Monday), the electronic device foregoes (808) generating an alert indicating that the current location associated with the user account does not have the predefined relationship to the geographic location. Foregoing generating an alert indicating that the current location associated with the user account does not have the predefined relationship to the geographic location, when the current location does have the predefined relationship at a time outside of the range of times, provides feedback (by not generating the alert) to a user indicating that the conditions being evaluated do not violate a specified criteria. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the current location associated with the user account is being evaluated (e.g., tracked or monitored) relative to the geographic location and the range of times, in accordance with a determination that the current location associated with the user account has a predefined relationship to the geographic location during the range of times (e.g., the electronic device associated with the user account is located at the geographic location at a time that is within the range of times), the electronic device foregoes (810) generating an alert indicating that the current location associated with the user account does not have the predefined relationship to the geographic location (e.g., see FIG. 6T). Foregoing generating an alert indicating that the current location associated with the user account does not have the predefined relationship to the geographic location, when the current location does have the predefined relationship at a time within of the range of times, provides feedback (by not generating the alert) to a user indicating that the conditions being evaluated do not violate a specified criteria. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 6000) has a display device (e.g., 6002) (e.g., a touch-sensitive display) (e.g., at an electronic device associated with a second user account (e.g., Mom's device 6000A), and the method further comprises performing one or more of the following steps. Prior to the current location associated with the user account (e.g., Jane's account) being evaluated relative to the geographic location and the range of times (e.g., and while the user account shares a location of an electronic device associated with the user account with one or more user accounts other than the user account (e.g., Mom's account)), displaying, via the display device, the following: 1) a location user interface object (e.g., 6016-2) that, when selected, initiates a process for specifying the geographic location; 2) a date user interface object (e.g., 6020-1 through 6020-7) that, when selected, initiates a process for specifying a date component of the range of times; and 3) a time user interface object (e.g., 6018-1, 6018-2) that, when selected, initiates a process for specifying a time component of the range of times. In some embodiments, the boundary of the geofence is setup by detecting user selection of the location user interface object. In some embodiments, this includes receiving user input including location information such as an address, a coordinate, a defined area on a map, or a geographic landmark. In some embodiments, the user can view the geographic location on a map and manipulate the map to adjust the boundaries of the geofence (e.g., by adjusting a zoom level of the map). In some embodiments, the range of times is set up by detecting user selection of the date user interface object and time user interface object. In some embodiments, this includes detecting a user selection of a date on which the range of times should begin. In some embodiments, this includes detecting a user selection of particular days of the week for which the range of times should repeat (e.g., selecting options for repeating the range of times from Monday through Friday, but not on Saturday or Sunday). In some embodiments, this includes detecting a user selection of a start time and an end time for the range of times (e.g., start at 9:00 AM and end at 3:00 PM).

In some embodiments, prior to the current location associated with the user account (e.g., Jane's account) being evaluated relative to the geographic location and the range of times (e.g., and while the user account shares a location of an electronic device associated with the user account with one or more user accounts other than the user account), the electronic device generates (and, in some embodiments, transmits; causes to be transmitted) a notification (e.g., 6040, 6048) for display at an external electronic device (e.g., Jane's device 6000B, Jane's device 6100B) associated with the user account, the notification including an indication (e.g., text 6048-1) that a second user account (e.g., a remote user or device that has been authorized (e.g., by the user account associated with the electronic device) to receive location data associated with the user account; a user account associated with the electronic device) is requesting to be notified about changes in the location associated with the user account relative to the geographic location during the range of times. In some embodiments, the electronic device associated with the user account is a first electronic device (e.g., Jane's device 6000B). In some embodiments, the electronic device associated with the user account is a second electronic device (e.g., Jane's device 6100B) different from the first electronic device. In some embodiments, the notification is the notification displayed in step 708 discussed above with respect to method 700. Generating a notification including an indication that a second user account is requesting to be notified about changes in the location associated with the user account relative to the geographic location during the range of times provides an enhanced layer of security and preserves privacy of the tracked user by providing an indication to the user that another user account is intending to receive notifications related to the location associated with the user account.

In some embodiments, the notification (e.g., 6040, 6048) is generated in response to a determination that the current location associated with the user account (e.g., Jane's account) has the predefined relationship to the geographic location during the range of times (e.g., the electronic device associated with the user count is located at the geographic location without consideration of the range of times) (e.g., see FIG. 6H). In some embodiments, the notification is generated only the first time the location of the user account has the predefined relationship to the geographic location. In some embodiments, generating the notification when the device has the predefined relationship to the geographic location provides an enhanced layer of security and preserves privacy of the tracked user by providing information that the location of the device is being tracked, which is particularly useful in a scenario in which a malicious actor has access to the tracked user's device, and the malicious actor sets the geofence and timeframe parameters and, without the tracked user's knowledge or consent, confirms the geofence and timeframe on the tracked user's device.

In some embodiments, the notification is generated at a time that corresponds to (e.g., matches the start of) the range of times (e.g., the notification is generated at, or near, the start of the range of times) (e.g., see FIG. 6G). In some embodiments, the notification is generated only the first time the start time of the range of times is reached. In some embodiments, generating the notification at a time that matches the start time in the range of times provides an enhanced layer of security and preserves privacy of the tracked user by providing information that the location of the device is being tracked, which is particularly useful in a scenario in which a malicious actor has access to the tracked user's device, and the malicious actor sets the geofence and timeframe parameters and, without the tracked user's knowledge or consent, confirms the geofence and timeframe on the tracked user's device.

Note that details of the processes described above with respect to method 800 (e.g., FIG. 8) are also applicable in an analogous manner to the methods described above and below. For example, methods 700, 1000, and 1200 optionally include one or more of the characteristics of the various methods described above with reference to method 800. For example, various steps of method 800 are performed after acceptance of the notification displayed in step 708 of method 700. As another example, notifications discussed in method 800 can also be displayed using some of the steps discussed in methods 1000 and 1200 below. For brevity, these details are not repeated below.

FIGS. 9A-9L illustrate exemplary user interfaces for managing location-related communications of an electronic device associated with a user account, in accordance with some embodiments. The user interfaces in these figures are used to illustrate the processes described below, including the processes in FIG. 10. In a manner similar to that discussed above, these processes involve various steps that can be performed across different electronic devices. In some embodiments, one or more steps can be performed at a first electronic device (e.g., electronic device 900) that includes one or more features of device 100, device 300, device 500, and device 6000. In some embodiments, one or more steps can be performed at a second electronic device that is includes one or more features of device 100, device 300, device 500, and device 6000. In some embodiments, one or more steps can be performed at a third electronic device such as, for example, a server. In some embodiments, one or more steps are performed at any combination of the first electronic device, the second electronic device, and the third electronic device.

FIGS. 9A-9L illustrate exemplary user inputs and corresponding changes to a user interface, which can be displayed on electronic device, such as electronic device 900, having display 902, which in some cases is a touch-sensitive display (e.g., 112), Device 900 is similar to electronic device 6000 and, thus, includes one or more features of device 100, device 300, device 500, and/or device 6000.

Electronic device 900 is associated with Dad's account, which has been authorized to receive, at one or more electronic devices associated with Dad's account, location data indicating a location (e.g., GPS coordinates) of one or more electronic devices associated with John's account. Thus, John is said to have authorized Dad to receive location data for John's electronic devices. Accordingly, Dad's account is authorized (by John's account) to manage location data associated with John's account.

The following disclosure describes various embodiments in which Dad manages location-related communications relating to John, whose location is presumed to be represented by the location of one or more of John's electronic devices. In the embodiments illustrated in FIGS. 9A-9L, a geofence (e.g., a virtual boundary based on a particular geographic location (e.g., a particular geographic area)) has been established for a particular timeframe, and Dad is notified (e.g., by receiving notifications at Dad's device 900) when John is not at an expected location during a particular range of times. However, there can be instances in which Dad wishes not to be notified of breaches of the geofence, at least for a period of time. To accommodate this situation, the notifications can be paused without having to deactivate or modify the geofence. FIGS. 9A-9L illustrate various example user interfaces for managing the location-related communications by pausing receipt of the notifications for a period of time.

Figure 9A:
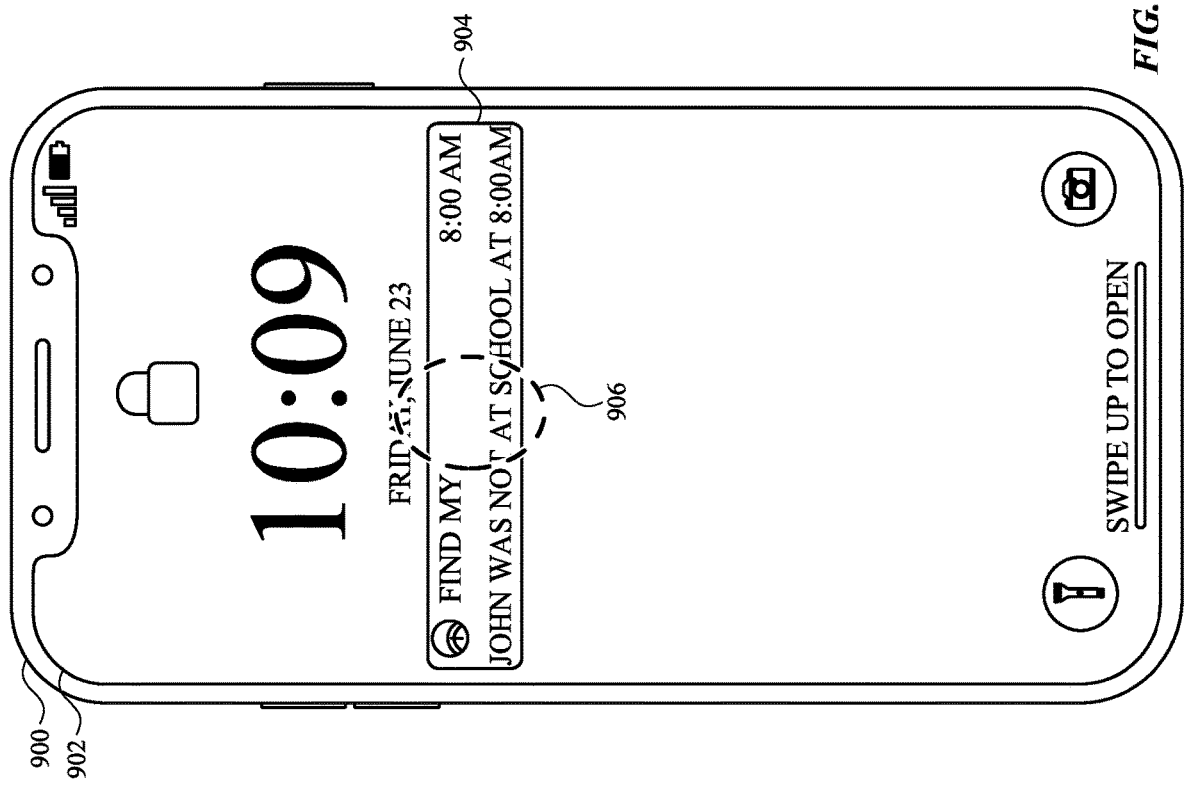

Referring now to FIG. 9A, Dad's device 900 is depicted displaying notification 904, which indicates that a geofence was breached when John was not at school at 8:00. Notification 904 is similar to notification 6096. Device 900 detects input 906, which is a tap-and-hold gesture.

Referring now to FIG. 9B, in response to detecting input 906, device 900 displays interface 908 (similar to interface 6106), which provides additional details for notification 904, including a map of John's location, options to contact John, and option 910 for pausing fixture display of location-based notifications, such as notification 904.

Device 900 detects input 912 on option 910 and, in response, pauses display of location-based notifications for John—that is, location-based notifications that are associated with John's account—and displays pause interface 914, as shown in FIG. 9C. In some embodiments, pause interface 914 is a user interface for an application for managing location-based data that is associated with various user accounts and electronic devices.

When the display of location-based notifications are paused for John, device 900 will not display location-based notifications that are associated with John's location, even if other criteria for displaying such notifications (such as John's breach of a geofence) is met. Thus, if John's location breaches a geofence in a manner that would ordinarily cause device 900 to display a location-based notification, device 900 will not display the notification during the period of time for which the notifications are paused. In the embodiment illustrated in FIGS. 9B and 9C, device 900 pauses display of the location-based notifications for a default period of time that expires at the end of the current day, Therefore, device 900 will not display location-based notifications that are associated with the location of John for the rest of the day.

Referring to FIG. 9C, pause interface 914 includes pause toggle 916, which is selectable to toggle the pause state of location-based notifications associated with John's account. In FIG. 9C, pause toggle 916 is on, indicating that display of location-based notifications associated with John's account are paused. Pause interface 914 also includes expiration indicator 918, which indicates the time at which the pause state is set to expire, and calendar affordance 920, which can be selected to change the expiration time for the pause state. In FIG. 9C, calendar affordance 920 shows that the current date (Jun. 23, 2020) is selected, and expiration indicator 918 shows that the location-based notifications are paused until the end of the day.

Device 900 detects input 922 and, in response, displays locations management user interface 924 (similar to locations management user interface 6005), as shown in FIG. 9D. Locations management user interface 924 includes John's account information 925 (similar to Jane's account information 6004), which depicts information available at Dad's device 900 pertaining to John's account. John's account information 925 includes notifications listing 926 (similar to notifications 6008) for viewing and managing location-based notifications (e.g., geofence notifications) created for John's account. Notifications listing 926 includes geofence identifiers 926-1 to 926-3, which correspond to existing geofence alert conditions associated with John. Geofence identifier 926-1 corresponds to an existing geofence alert condition for notifying Dad when John is not at school between 8 AM and 3 PM, which is the geofence alert condition that triggered notification 904 in FIG. 9A. John's account information 924 also includes pause options affordance 928, which can be selected to display pause interface 914. In some embodiments, John's account information 924 also includes attention blocks that provide relevant information associated with John's account. In FIG. 9D, attention block 930-1 indicates that notifications (e.g., location-based notifications) for John's account are paused until the end of the day. Specifically, notifications are paused until the end of the day for each of the alert conditions in notifications listing 926.

In FIG. 9D, device 900 detects input 932 on pause options affordance 928 and, in response, displays pause interface 914 in FIG. 9E.

FIG. 9E depicts a set of inputs that causes device 900 to change the expiration of the pause state from the end of the day to the end of Jun. 29, 2020. In FIG. 9E, device 900 detects input 934 on calendar affordance date 920-1, which corresponds to a selection of Jun. 29, 2020, thereby changing the expiration of the pause state to the end of Jun. 29, 2020. In some embodiments, expiration indicator 918 is updated, in response to input 934, to indicate notifications are paused "until the end of Jun. 29, 2020." Device 900 also detects input 936 and, in response, displays locations management interface 924, as shown in FIG. 9F. Attention block 930-1 is updated in FIG. 9F to indicate that notifications (for each of the alert conditions in notifications listing 926) are now paused until Jun. 29, 2020.

Figure 9H:
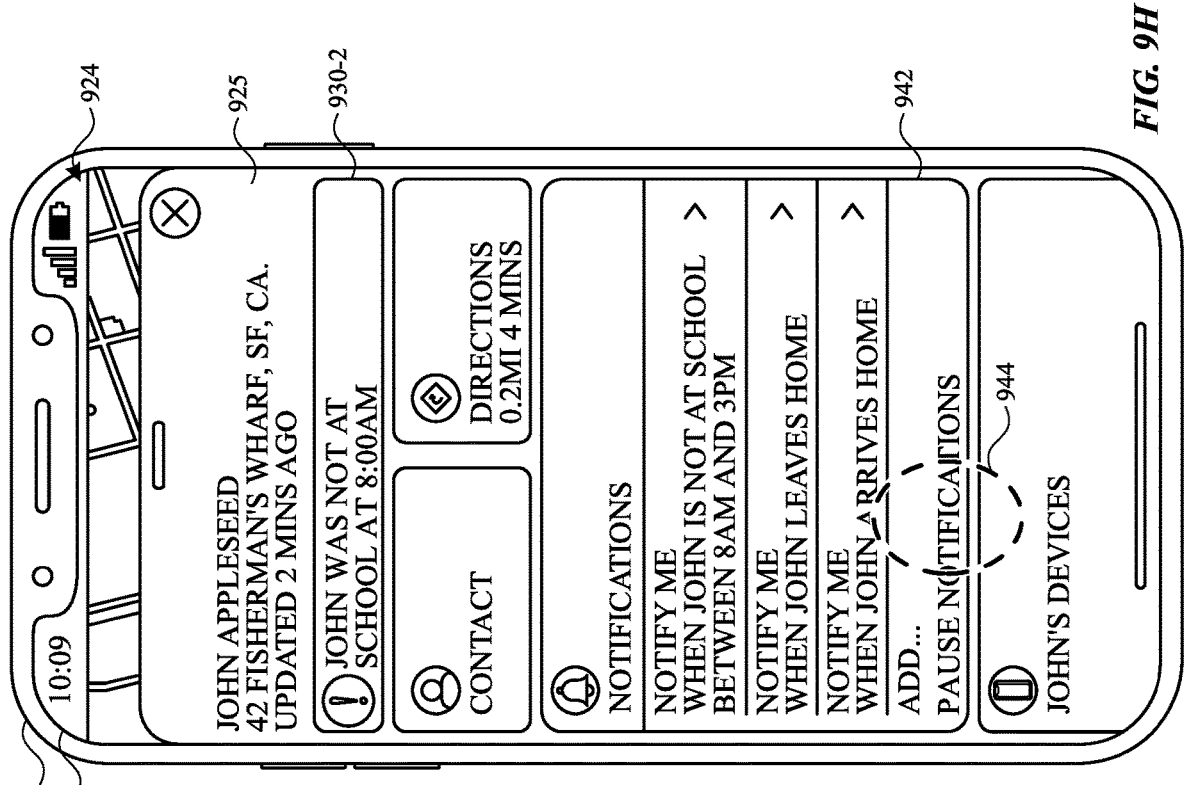
Figure 9G:
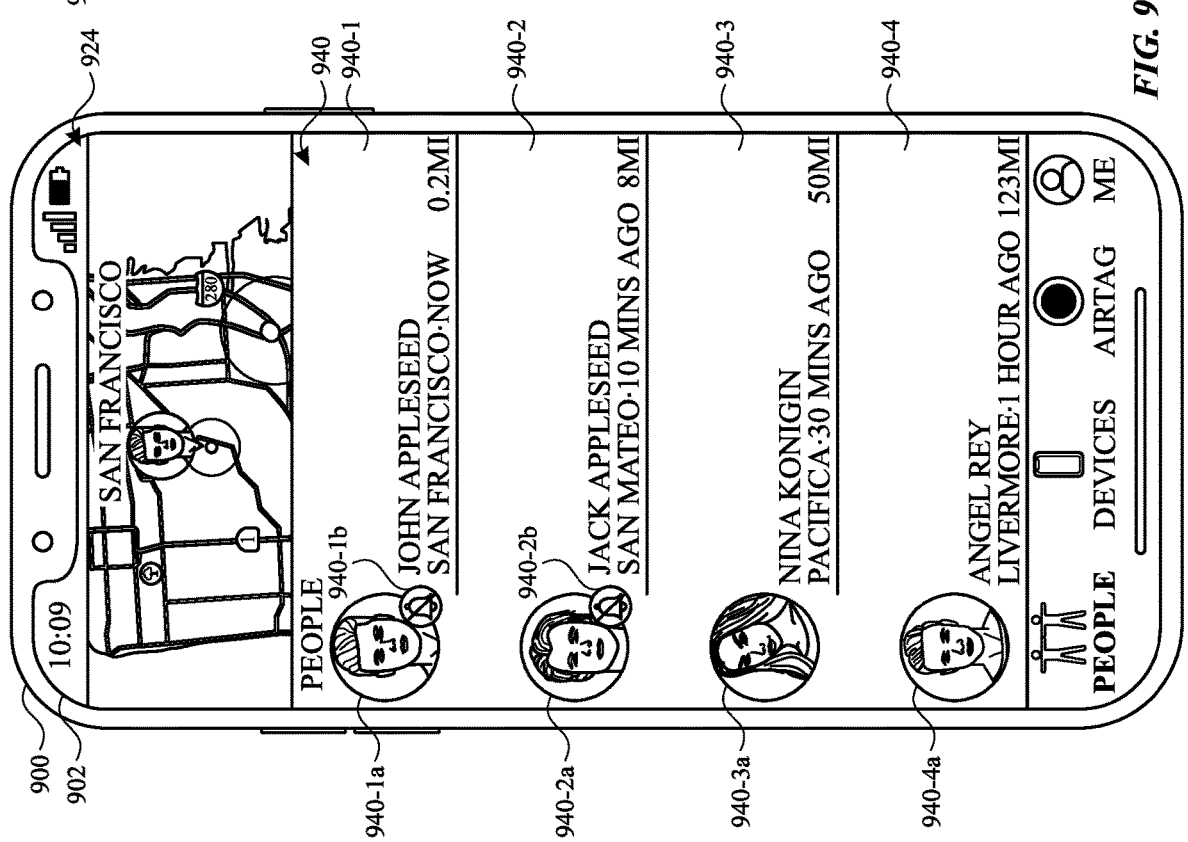

In FIG. 9F, device 900 detects input 938 and, in response, ceases display of John's account information 925, as shown in FIG. 9G.

In FIG. 9G, device 900 displays locations management interface 924, including user account listing 940, which includes indications of user accounts that are authorized to share location information with Dad's account. For example, account indication 940-1 corresponds to John's account, account indication 940-2 corresponds to the account of Jack Appleseed, account indication 940-3 corresponds to the account of Nina, and account indication 940-4 corresponds to the account of Angel. Each account indication includes a representation of the respective user associated with the user account and, if notifications are paused for the user account, an indication that notifications are paused for that user. For example, account indication 940-1 includes representation 940-1a of John and pause indicator 940-1b to indicate that John's notifications are currently paused. Account indication 940-2 includes representation 940-2a of Jack and pause indicator 940-2b to indicate that Jack's notifications are currently paused. Account indication 940-3 includes representation 940-3a of Nina, but does not include a pause indicator because notifications are not paused for Nina's account. Similarly, Account indication 940-4 includes representation 940-4a of Angel, but does not include a pause indicator because notifications are not paused for Angel's account.

FIGS. 9H-9L depict various embodiments in which device 900 is displaying John's account information 925 while location-based notifications are not paused for John's account.

FIG. 9H depicts an embodiment in which notification 904 was received, and notifications are not paused (notifications were not paused in FIG. 9B or toggle 916 is deselected in FIG. 9C). In FIG. 9H, John's account information 925 includes attention block 930-2 indicating that John was not at school at 8:00. Additionally, pause notifications affordance 942 is displayed in place of pause options affordance 928, which can be selected (e.g., via input 944) to pause notifications for John's account and display pause interface 914, as shown in FIG. 9L.

Figure 9I:
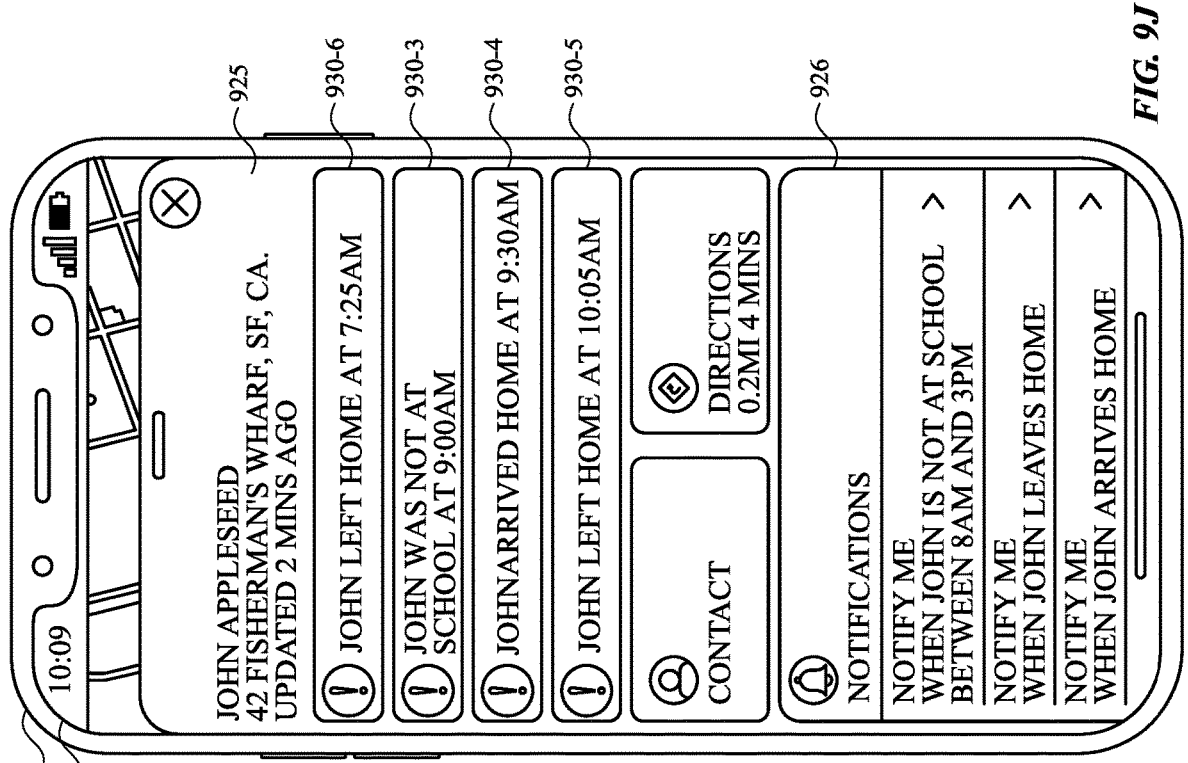

FIG. 9I depicts an embodiment in which various notifications (including notification 904) were received and notifications are not paused. Accordingly, John's account information 925 includes attention blocks 930-2, 930-3, 930-4, and 930-5, which include information corresponding to the notification conditions in notifications listing 926.

Figure 9J:
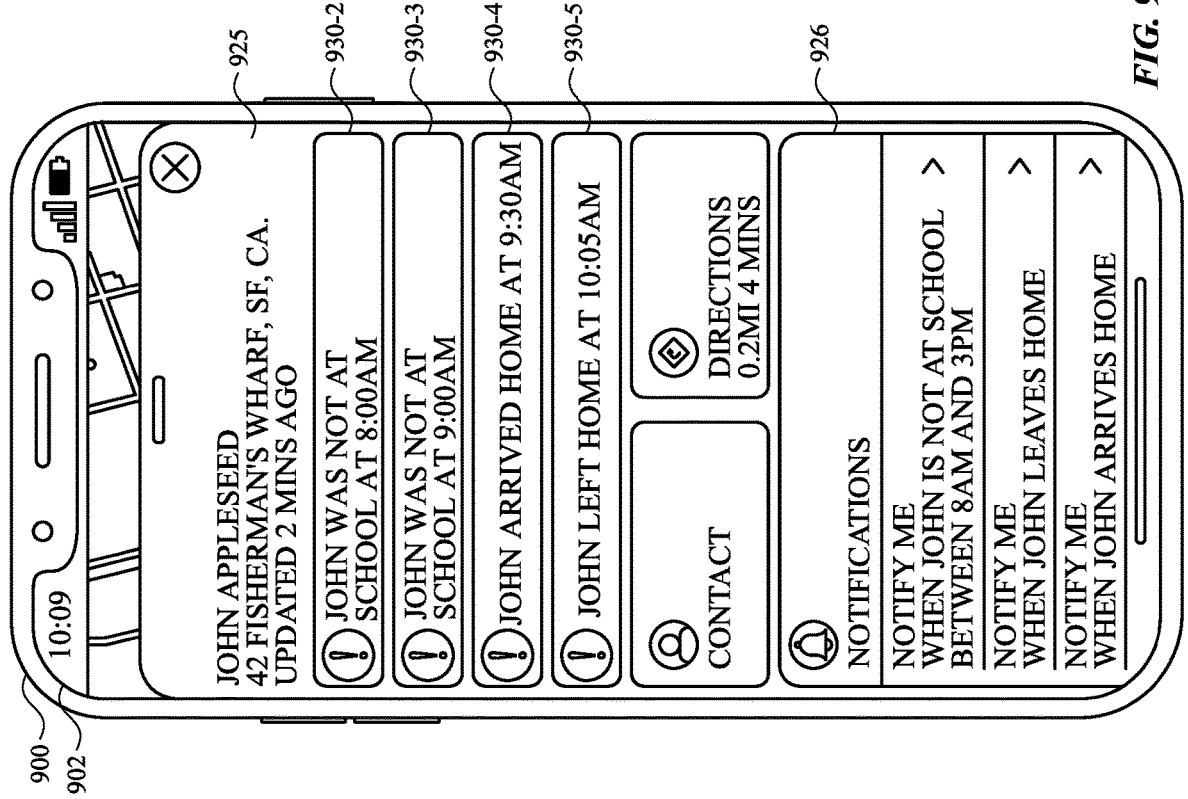

FIG. 9J depicts an embodiment in which various notifications (not including notification 904) were received and notifications are not paused. Accordingly, John's account information 925 includes attention blocks 930-3, 930-4, 930-5, and 930-6, which include information corresponding to the notification conditions in notifications listing 926.

Figure 9K:
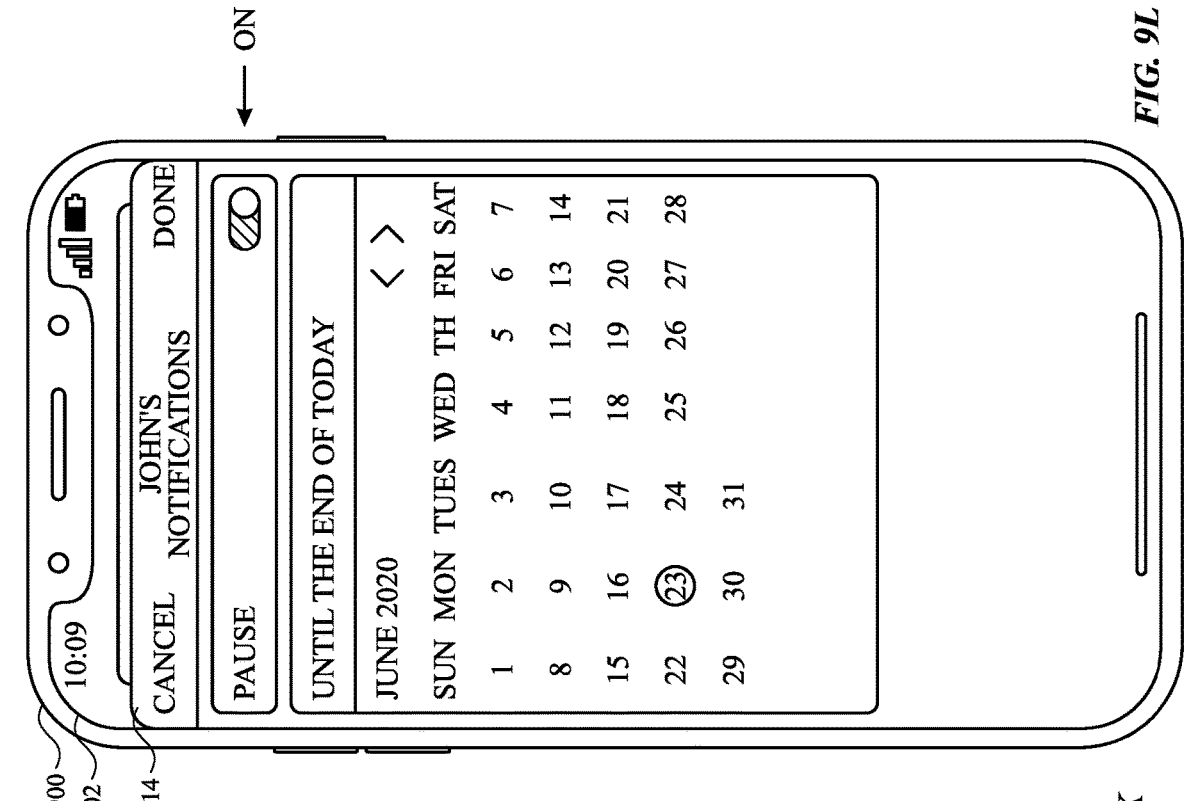
Figure 9L:
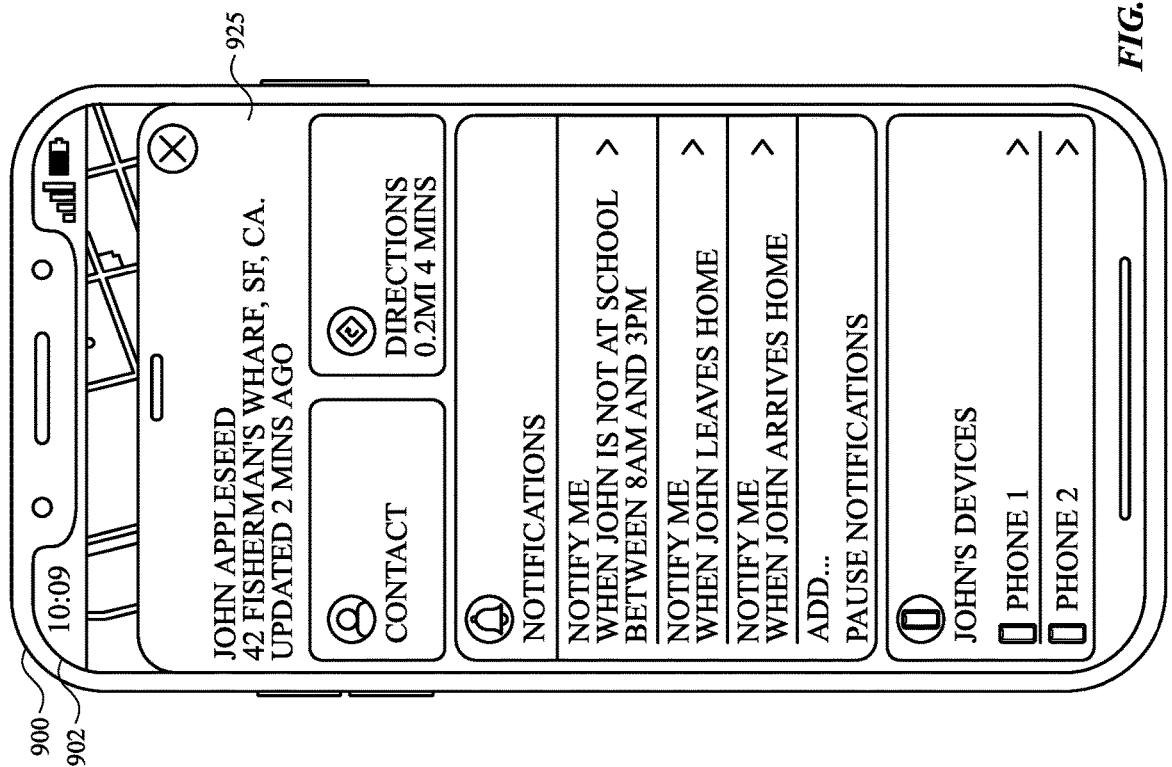

FIG. 9K depicts an embodiment in which John's account information 925 includes no attention blocks.

FIG. 10 is a flow diagram illustrating a method for managing location-related communications using an electronic device in accordance with some embodiments. Method 1000 is performed at an electronic device (e.g., 100, 300, 500, 6000, 900). Some operations in method 1000 are, optionally, combined, the orders of some operations are, optionally, changed, and some operations are, optionally, omitted.

In some embodiments, the electronic device (e.g., 900) is a computer system (e.g., a smartphone, a smartwatch; a server (e.g., a location-tracking server)). The computer system is optionally in communication (e.g., wired communication, wireless communication) with a display generation component (e.g., 902) and with one or more input devices (e.g., 902). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1000 provides an intuitive way for managing location-related communications. The method reduces the cognitive burden on a user for managing location-related communications, thereby creating a more efficient human-machine interface. For battery-operated computing devices, enabling a user to manage location-related communications faster and more efficiently conserves power and increases time between battery charges.

Method 1000 is performed (1002) while an alert condition that is triggered based a comparison between a current location associated with a user account (e.g., a current location of a computer system associated with the second user account) relative to a geographic location (e.g., a physical address, a coordinate, a defined area, or a geographic landmark) is active (e.g., the alert condition is being tracked or monitored). In some embodiments, the current location is being evaluated relative to the geographic location and a range of times (e.g., a range of times specified by the second user account) (e.g., a range of times specified by the first user account).

In method 1000, the computer system (e.g., 900) displays (1004), via the display generation component (e.g., 902), a user interface (e.g., 908; 914; 924; 925) that includes (e.g., concurrently includes) the following items. The computer system displays (1006) the user interface including one or more representations of active alert conditions (e.g., 926) associated with the user account for generating one or more alerts (e.g., 904) indicating that the current location associated with the user account does not have a predefined relationship to a geographic location (e.g., representations of different location-based alerts associated with the user account). The computer system also displays (1008) the user interface including a first selectable user interface object e.g., 910; 916; 942) (e.g., a selectable pause affordance) that, when selected, transitions the computer system to a first mode that prevents alerts corresponding to one or more of the active alert conditions from being generated (e.g., a state in which the location-based alerts for the user account is disabled). In some embodiments, the selectable pause affordance (e.g., 916) has a selected state and an unselected state. In some embodiments; when the pause affordance is unselected, location-based alerts for the user account are enabled to be displayed (e.g., via the display generation component). In some embodiments, when the pause affordance is selected, display of the location-based alerts for the user account is disabled.

In response to a determination (1010) that the current location associated with the user account does not have a predefined relationship to a geographic location (e.g., during a range of times) (e.g., the computer system associated with the second user account is not located at the geographic location at some point during the range of times), the computer system (e.g., 900) performs the following items.

In accordance with a determination that a set of alert criteria are met, the alert criteria including a criterion that is met when the computer system (e.g., 900) is not in the first mode (e.g., the location-based alerts are not paused), the computer system generates (1012) an alert (e.g., 904) (e.g., a notification such as a pop up or a banner) indicating that the current location associated with the user account does not have the predefined relationship to the geographic location. Generating an alert indicating that the current location associated with the user account does not have the predefined relationship to the geographic location when the set of alert criteria are met, including when the computer system is not in the first mode, provides feedback to a user of the computer system that the current location associated with the user account satisfies a set of criteria for which the user of the computer system wishes to be notified, without requiring the user of the computer system to actively monitor the current location associated with the user account, thereby reducing the number of inputs needed to monitor the current location. Providing improved feedback; reducing the number of inputs at the computer system, and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the alert criteria includes a criterion that is met when the computer system (e.g., 900) is not in a "do not disturb" mode. In some embodiments, the alert criteria includes a criterion that is met when the location-based alerts (e.g., 904) are not paused or disabled. In some embodiments, the alert criteria includes a criterion that is met when the display generation component (e.g., 902) is not disabled or turned off. In some embodiments, generating the alert includes displaying the alert on the display generation component of the computer system (e.g., when the computer system is associated with the second user account or is associated with the first user account). In some embodiments, generating the alert includes causing an external computer system to display the alert (e.g., when the computer system is a server). In some embodiments, the external computer system is associated with the first user account. In some embodiments, the external computer system is associated with the second user account.

In accordance with a determination that the alert criteria are not met (e.g., the location-based alerts are paused), the computer system (e.g., 900) forgoes (1014) generating an alert (e.g., 904) indicating that the current location associated with the user account does not have the predefined relationship to the geographic location. Forgoing generating an alert indicating that the current location associated with the user account does not have the predefined relationship to the geographic location when the set of alert criteria are not met, including when the computer system is in the first mode, permits a user of the computer system to temporarily avoid being notified when the current location associated with the user account satisfies a set of criteria for as long as the computer system is in the first mode, without requiring the user of the computer system to permanently disable or modify the set of criteria, thereby reducing the number of inputs needed to preserve the set of notification criteria for future use and reducing generation of irrelevant or undesired notifications. Reducing the number of inputs at the computer system and eliminating extraneous operations enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the selectable user interface object (e.g., 910) (e.g., the selectable pause affordance) is displayed in response to an input (e.g., 906) (e.g., a press-and-hold input gesture) on an alert notification (e.g., 904) (e.g., an alert notification that was triggered by one of the active alert conditions).

In some embodiments, the computer system (e.g., 900) is in communication with one or more input devices (e.g., 902) (e.g., a touch-sensitive surface) and the user interface (e.g., 914) further includes (e.g., concurrently in one view; separately on different views of the interface) a second selectable user interface object (e.g., 928; 942) (e.g., an affordance (e.g., a "Pause Options" affordance; e.g., a "Pause Notifications" affordance) (in some embodiments, the second selectable user interface object is the first selectable user interface object)). The computer system detects, via the one or more input devices, a first set of one or more inputs that includes a selection e.g., 932; 944) of the second selectable user interface object.

In response to detecting the selection (e.g., 932; 944) of the second selectable user interface object (e.g., 928; 942), the computer system (e.g., 900) displays, via the display generation component (e.g., 902), one or more selectable options (e.g., 920) (e.g., one or more affordances (e.g., a calendar affordance, a date affordance, a time affordance) for indicating a stop time (e.g., date and/or time) for the pause mode; e.g., a toggle affordance for toggling off/on the pause mode) for selecting a time (e.g., a date and/or time) for terminating the first mode (e.g., the selection schedules a process for transitioning the computer system out of the first mode; the selection indicates a time for terminating the first mode; the selection indicates a stop time for pausing alerts; the selection indicates a time at which the generation of alerts can resume). Displaying one or more selectable options for selecting a time for terminating the first mode provides feedback to a user of the computer system of a function that can be performed that terminates the pause on notifications at a selected time without requiring further input from the user to terminate the pause at a later time. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of one or more inputs includes a selection (e.g., 934) of a respective selectable option (e.g., 920-1) from the one or more selectable options (e.g., 920). In response to detecting the selection of the respective selectable option: in accordance with a determination that the respective selectable option is a first selectable option (e.g., a Jun. 26, 2020 calendar affordance), the computer system (e.g., 900) schedules a first time for terminating that first mode (e.g., scheduling the first mode to terminate on Jun. 26, 2020; changing a currently scheduled time (e.g., today) for terminating the first mode to an updated time (e.g., Jun. 26, 2020) for terminating the first mode). In accordance with a determination that the respective selectable option is a second selectable option (e.g., a Jun. 29, 2020 calendar affordance) different from the first selectable option, the computer system schedules a second time for terminating the first mode (e.g., scheduling the first mode to terminate on Jun. 29, 2020; changing a currently scheduled time (e.g., today) for terminating the first mode to an updated time (e.g., Jun. 29, 2020) for terminating the first mode). The second time is different from the first time.

In some embodiments, displaying the user interface (e.g., 924; 925) that includes the one or more representations of active alert conditions (e.g., 926) associated with the user account includes the following. In accordance with a determination that the computer system (e.g., 900) is in the first mode (e.g., alerts are paused), the computer system displays (e.g., in an upper region of the interface) an indication (e.g., 930-1) of a status of the first mode (e.g., a graphical user interface object indicating that notifications or alerts are paused) concurrently with the one or more representations of active alert conditions associated with the user account. In some embodiments, the indication of the status of the first mode includes an indication of a time at which the first mode is scheduled to terminate (e.g., an end time for the pause mode). In accordance with a determination that the computer system is not in the first mode, the computer system forges displaying the indication of the status of the first mode. Displaying an indication of a status of the first mode concurrently with the one or more representations of active alert conditions associated with the user account, depending on whether or not the computer system is in the first mode, provides feedback to a user of the computer system that notifications for the active alert conditions associated with the current location of the user account are temporarily disabled, without requiring the user of the computer system to access details for the user account, thereby reducing the number of inputs needed to determine the status of the notifications for the user account. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the one or more representations of active alert conditions includes a first representation (e.g., 926-1) of a first active alert condition associated with the user account for generating a first set of one or more alerts (e.g., 904) indicating that the current location associated with the user account does not have a first predefined relationship to a first geographic location (e.g., the current location does not match the first geographic location). In some embodiments, the one or more representations of active alert conditions includes a second representation (e.g., 926-2) of a second active alert condition (e.g., different from the first active alert condition) associated with the user account for generating a second set of one or more alerts indicating that the current location associated with the user account does not have a second predefined relationship to a second geographic location (e.g., the current location does not match the second geographic location). In some embodiments, the first mode prevents the first set of one or more alerts corresponding to the first active alert condition from being generated. In some embodiments, the first mode prevents the second set of one or more alerts corresponding to the second active alert condition from being generated. In some embodiments, the first mode pauses alerts for multiple all) active alert conditions (e.g., geofence alert conditions). Displaying the one or more representations of active alert conditions including a first representation of a first active alert condition associated with the user account and a second representation of a second active alert condition associated with the user account provides feedback to a user of the computer system of a function that can be performed that provides a first set of one or more alerts indicating that the current location associated with the user account does not have the first predefined relationship to the first geographic location; or a second set of one or more alerts indicating that the current location associated with the user account does not have the second predefined relationship to the second geographic location, without requiring further input from the user to monitor the current location associated with the user account. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 900) is in communication with one or more input devices (e.g., 902) (e.g., a touch-sensitive surface). After generating the alert (e.g., 904), the computer system receives, via the one or more input devices, a request (e.g., 922) to display the user interface (e.g., 924; 925) (e.g., a request to update display of the user interface; a request to display the user interface having the representations of the alert conditions for the user account). In response to receiving the request to display the user interface, the computer system displays the user interface, wherein the user interface includes a notification (e.g., 930-2) (e.g., an indication; a user interface object that includes content related to the alert) corresponding to the alert (e.g., a notification that was generated with the alert). Displaying the user interface including a notification corresponding to the alert provides feedback to a user of the computer system that the current location associated with the user account meets a set of criteria for which a user of the computer system wishes to be notified, and reduces the number of inputs at the computer system by providing this feedback without requiring the user of the computer system to actively monitor the current location associated with the user account and without having to access prior notifications, which may have been dismissed or deleted by the user of the computer system. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 900) is in communication with one or more input devices (e.g., 902) (e.g., a touch-sensitive surface). The computer system receives, via the one or more input devices, a request (e.g., 938) to display an account user interface (e.g., 924; 940), In response to receiving the request to display the account user interface, the computer system displays, via the display generation component, the account user interface. The account user interface includes a representation (e.g., 940-1; 940-3) of a first user account authorized to share location data (e.g., data indicating a location associated with a respective user account) with the computer system (e.g., with a user account associated with the computer system). In accordance with a determination that the computer system is in a second mode (e.g., the first mode is enabled with respect to the first user account) that prevents alerts corresponding to one or more active alert conditions for the first user account from being generated, the representation of the first user account includes an indication (e.g., 904-1*b*) that the computer system is in the second mode (e.g., an affordance indicating that notifications or alerts are paused (e.g., for all alert conditions associated with the first user account)). In accordance with a determination that the computer system is not in the second mode, the representation of the first user account (e.g., 940-3) does not include the indication that the computer system is in the second mode. Displaying the representation of the first user account including (or not) an indication that the computer system is in the second mode that prevents alerts corresponding to one or more active alert conditions for the first user account from being generated, depending on whether or not the computer system is in the second mode, provides feedback to a user of the computer system that notifications associated with the current location of the first user account are temporarily disabled, without requiring the user of the computer system to access details for the first user account, thereby reducing the number of inputs needed to determine the status of the notifications for the first user account. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

The account user interface also includes a representation (e.g., 940-2; 940-4) of a second user account (e.g., different from the first user account) authorized to share location data with the computer system. In accordance with a determination that the computer system (e.g., 900) is in a third mode (e.g., the first mode is enabled with respect to the second user account) that prevents alerts (e.g., 904) corresponding to one or more active alert conditions for the second user account from being generated, the representation of the second user account includes an indication (e.g., 940-2*b*) that the computer system is in the third mode (e.g., an affordance indicating that notifications or alerts are paused (e.g., for all alert conditions associated with the second user account)). In accordance with a determination that the computer system is not in the third mode, the representation of the second user account (e.g., 940-4) does not include the indication that the computer system is in the third mode. Displaying the representation of the second user account including (or not) an indication that the computer system is in the third mode that prevents alerts corresponding to one or more active alert conditions for the second user account from being generated, depending on whether or not the computer system is in the third mode, provides feedback to a user of the computer system that notifications associated with the current location of the second user account are temporarily disabled, without requiring the user of the computer system to access details for the second user account, thereby reducing the number of inputs needed to determine the status of the notifications for the second user account. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first selectable user interface object (e.g., 916) includes a first setting (e.g., a first toggle setting) that, when selected, transitions the computer system (e.g., 900) to the first mode (e.g., enables the first mode), and a second setting (e.g., a second toggle setting) that, when selected, transitions the computer system out of the first mode (e.g., disables the first mode) (e.g., transitions the computer system to a mode (e.g., a default mode) in which alerts can be generated (e.g., a mode in which the first mode is disabled)).

Note that details of the processes described above with respect to method 1000 (e.g., FIG. 10) are also applicable in an analogous manner to the methods described above and below. For example, methods 700, 800, and 1200 optionally include one or more of the characteristics of the various methods described above with reference to method 1000. For example, various steps of method 1000 are performed after acceptance of the notification displayed in step 708 of method 700. As another example, options for pausing notifications as discussed in method 1000 can be applied to the notifications discussed in method 800. As another example, options for pausing notifications as discussed in method 1000 can be applied to the notifications discussed in method 1200. For brevity, these details are not repeated below.

FIGS. 11A-11R illustrate exemplary user interfaces for managing location-related communications of an electronic device associated with a user account, in accordance with some embodiments. The user interfaces in these figures are used to illustrate the processes described below, including the processes in FIG. 12. In a manner similar to that discussed above, these processes involve various steps that can be performed across different electronic devices. In some embodiments, one or more steps can be performed at a first electronic device (e.g., electronic device 1100A) that includes one or more features of device 100, device 300, device 500, device 6000A, and device 6100B, In some embodiments, one or more steps can be performed at a second electronic device (e.g., electronic device 1100B) that is includes one or more features of device 100, device 300, device 500, device 6000B, and device 6100B. In some embodiments, one or more steps can be performed at a third electronic device such as, for example, a server. In some embodiments, one or more steps are performed at any combination of the first electronic device, the second electronic device, and the third electronic device.

FIGS. 11A-11R illustrate exemplary user inputs and corresponding changes to a user interface, which can be displayed on an electronic device, such as electronic device 1100A or electronic device 1100B, having respective rotatable input mechanisms 1101A and 1101B (similar to input mechanism 506), and having displays 1102A and 1102B, which in some cases are touch-sensitive displays (e.g., 112). In the present disclosure, the described electronic device can be referenced using reference numbers 1100, 1100A, or 1100B. In general, reference number 1100A is used to refer to a first electronic device (e.g., a parent's electronic device), reference number 1100B is used to refer to a second electronic device that is different from the first electronic device (e.g., a child's electronic device), and reference number 1100 is used to refer indiscriminately to the first electronic device, the second electronic device, or both. Similarly, various features of electronic device 1100 can be referenced with an "A" or "B" designation to differentiate between two instances of a similar feature. For example, reference number 1102A is used to refer to a display component of electronic device 1100A, reference number 1102B is used to refer to a display component of electronic device 1100B, and reference number 1102 is generally used to refer to a display of electronic device 1100, which, in turn, refers indiscriminately to the display of the first electronic device, the display of the second electronic device, or both.

As previously discussed, the electronic devices are associated with respective user accounts. Specifically, electronic device 1100A is associated with Dad's user account, and electronic device 1100B is associated with John's user account. Details of the relationship and authorization of the respective accounts are discussed above. For brevity, these details are not repeated below.

The following disclosure describes various embodiments in which Dad manages location-related communications relating to John, whose location is presumed to be represented by the location of one or more of John's electronic devices (e.g., John's device 1100B). In the embodiments illustrated in FIGS. 11A-11R, a geofence (e.g., a virtual boundary based on a particular geographic location a particular geographic area)) has been established for a particular timeframe, and Dad is notified (e.g., by receiving notifications at Dad's device 1100A) when John is not at an expected location during a particular range of times, which enables Dad to be alerted to a situation in which John is not at an expected location, such as at school, for example, without the need for Dad to constantly monitor John's location using, for example, a map application. Because John's location can change after the alert was received at Dad's device, additional notifications are automatically generated to provide updates to the status of John's location, which enables Dad to be alerted to changes in John's status (or affirmation of a previously reported status), without the need for Dad to actively monitor John's location.

FIGS. 11A-11D depict an exchange of text message communications between Dad's device 1100A and John's device 1100B. In FIG. 11A, both Dad's and John's devices 1100 are displaying respective messaging interfaces 1104A and 1104B that include a text message previously sent from John's device 1100B to Dad's device 1100A. In some embodiments, messaging interface 1104 is an interface of a messaging application.

In FIG. 11A, Dad's device 1100A detects input 1106, which is a scroll gesture using rotatable input mechanism 1101A. In response, Dad's device 1100A scrolls messaging interface 1104A to display a set of predefined messages 1106A, as shown in FIG. 11B.

Figure 11B:
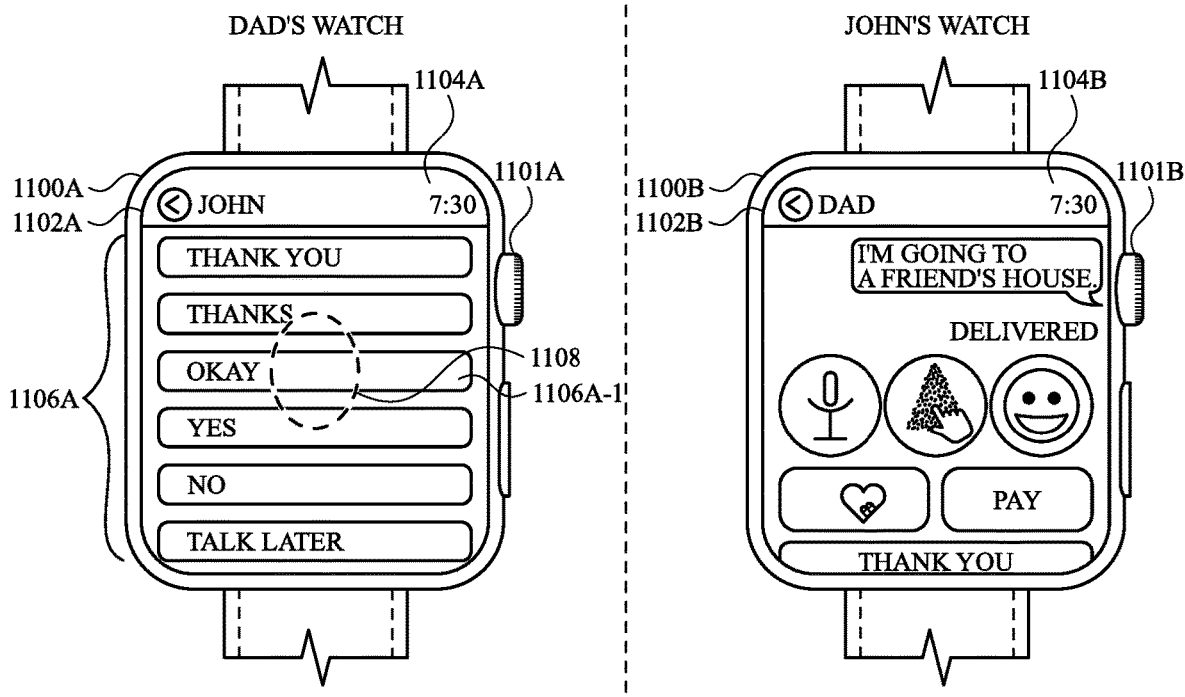
Figure 11C:
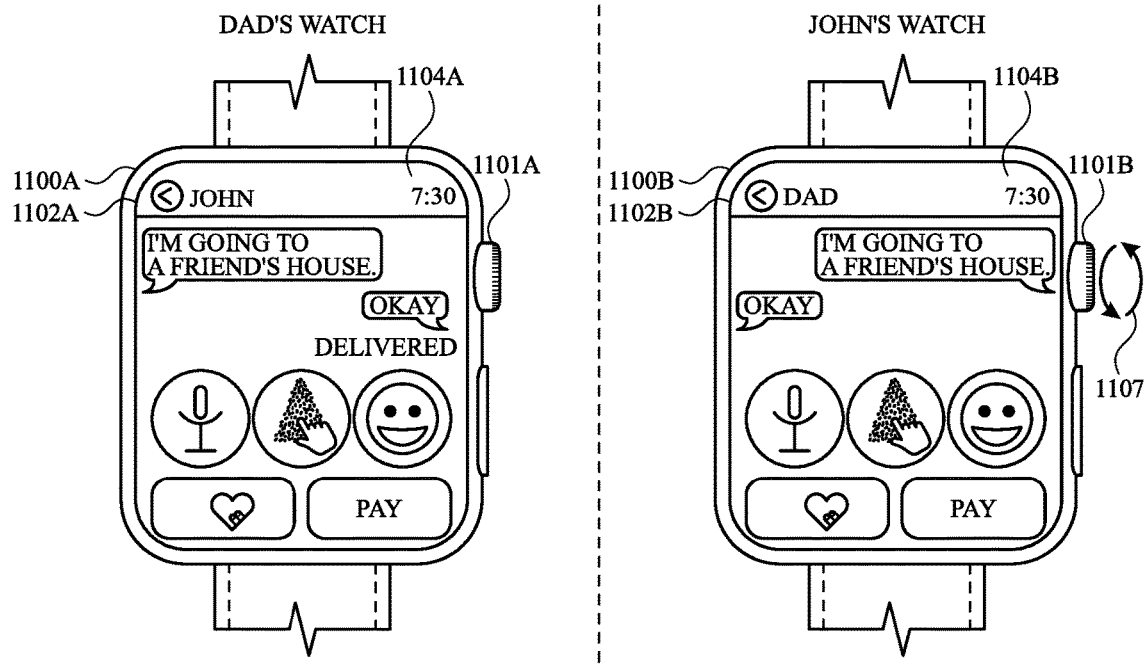

In FIG. 11B, Dad's device 1100A detects input 1108 on predefined message 1106A-1 and, in response, sends the predefined message to John's device 1100B, as shown in FIG. 11C.

Figure 11D:
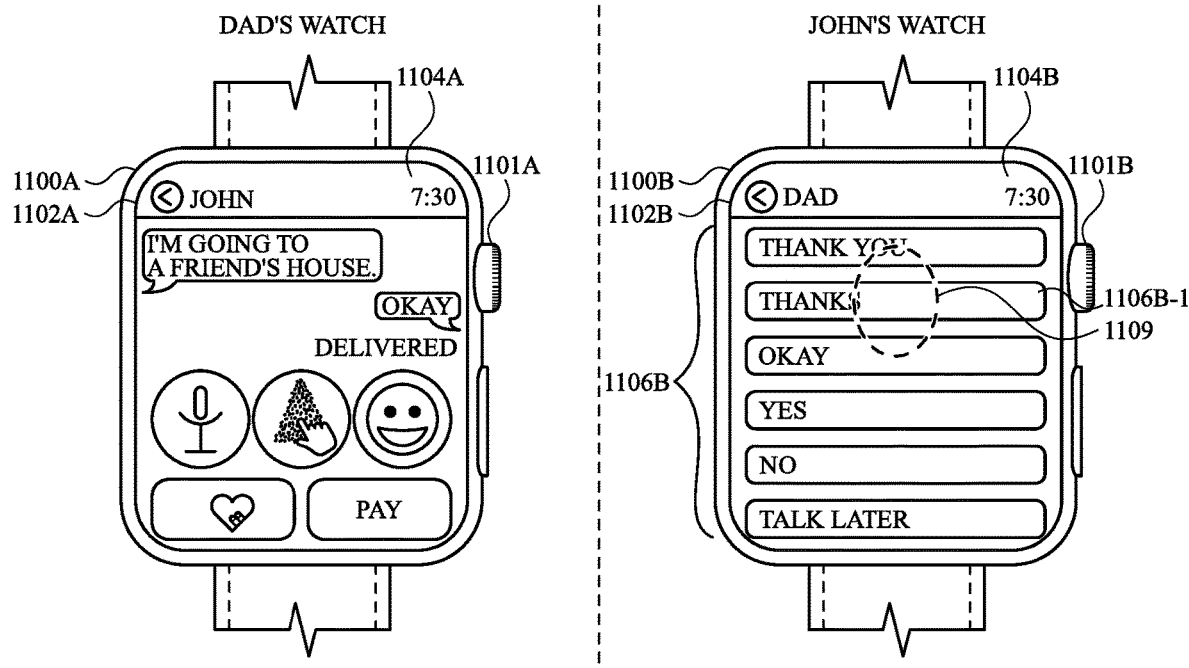

In FIG. 11C, John's device 1100B detects input 1107, which is a scroll gesture using rotatable input mechanism 1101B. In response, John's device 1100B scrolls messaging interface 1104B to display a set of predefined messages 1106B, as shown in FIG. 11D. Predefined messages 1106B are similar to predefined messages 1106A.

In FIG. 11D, John's device 1100B detects input 1109 on predefined message 1106B-1 and, in response, sends the predefined message to Dad's device 11001.

Figure 11E:
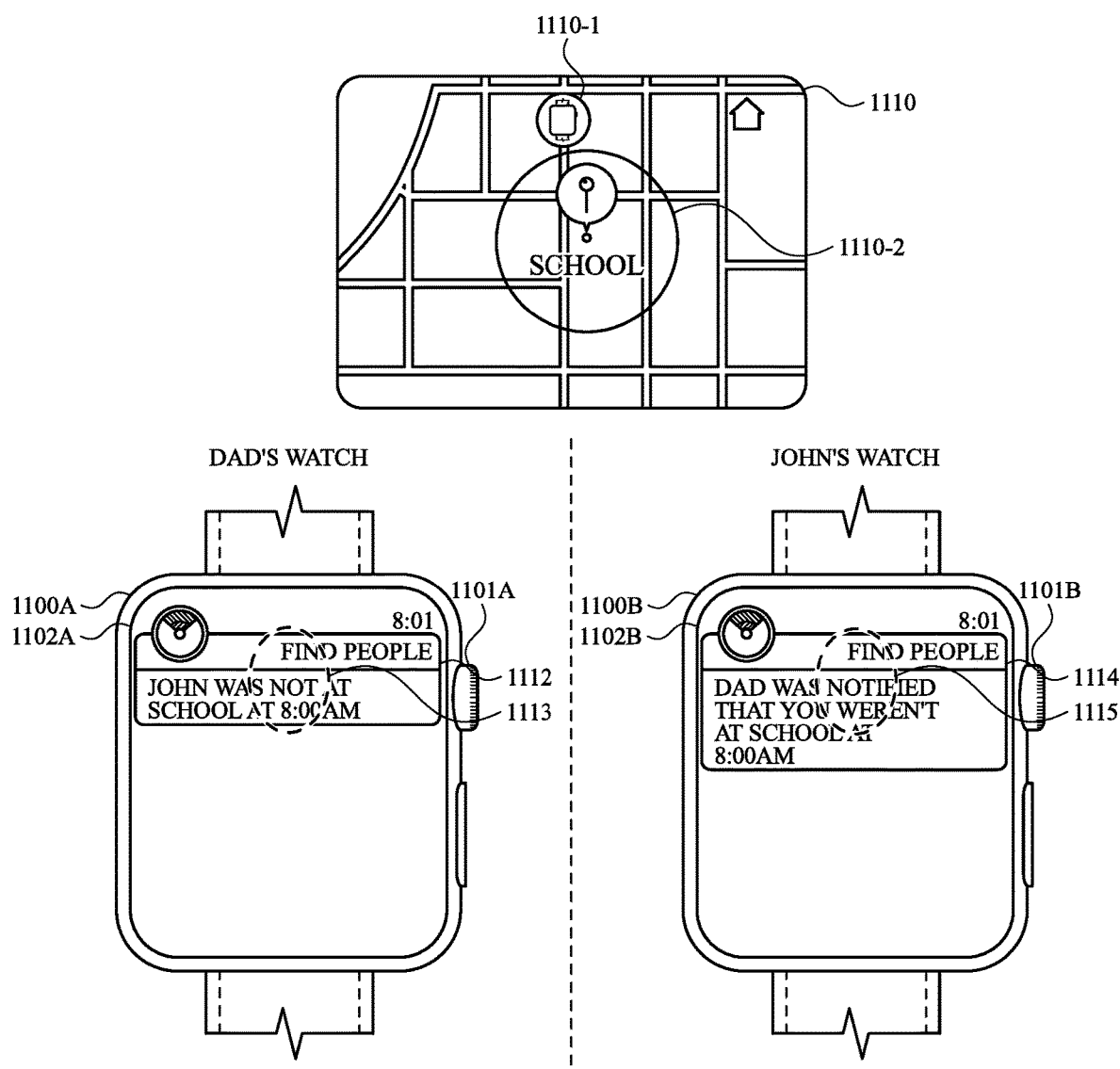
Figure 11F:
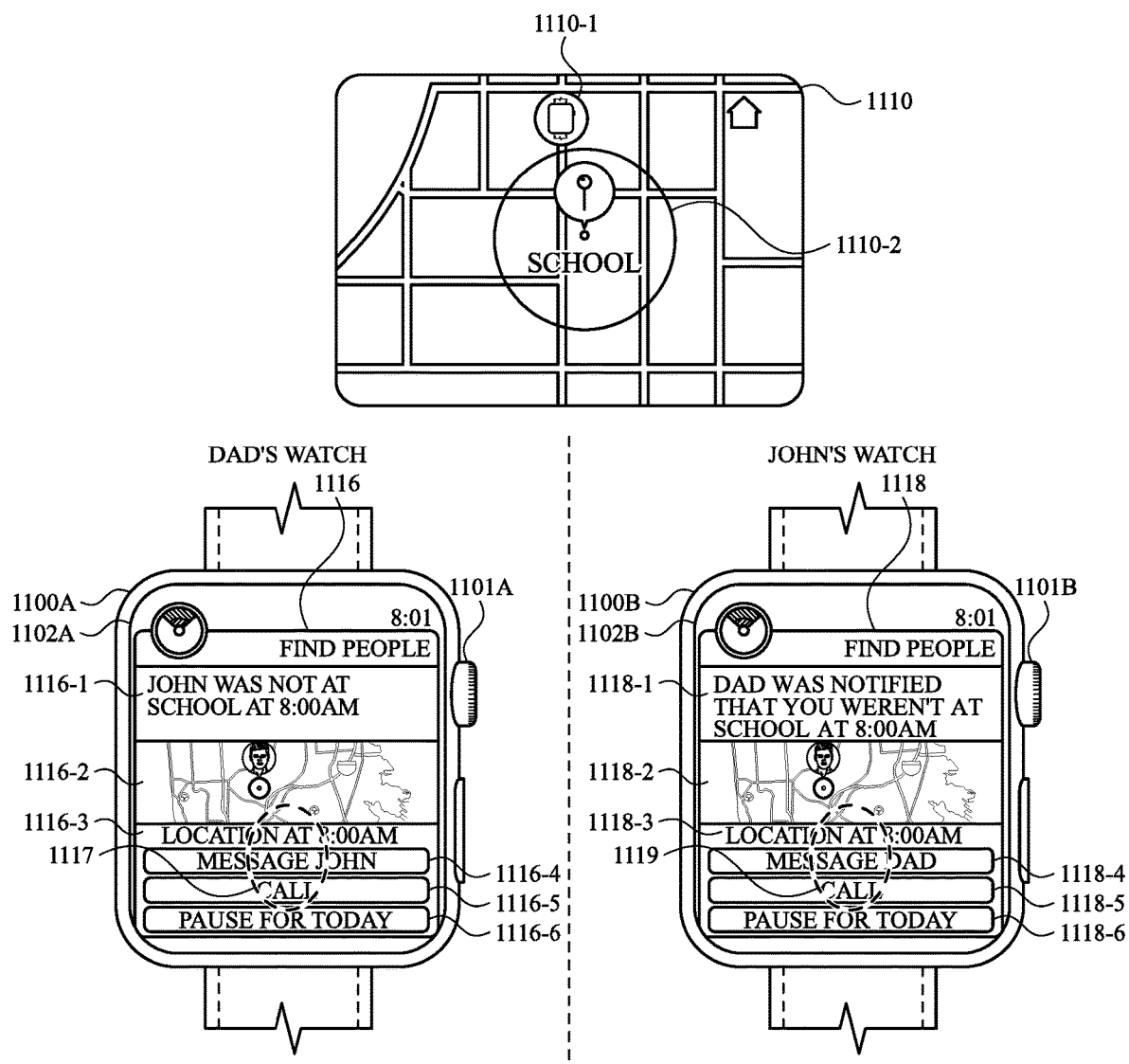
Figure 11G:
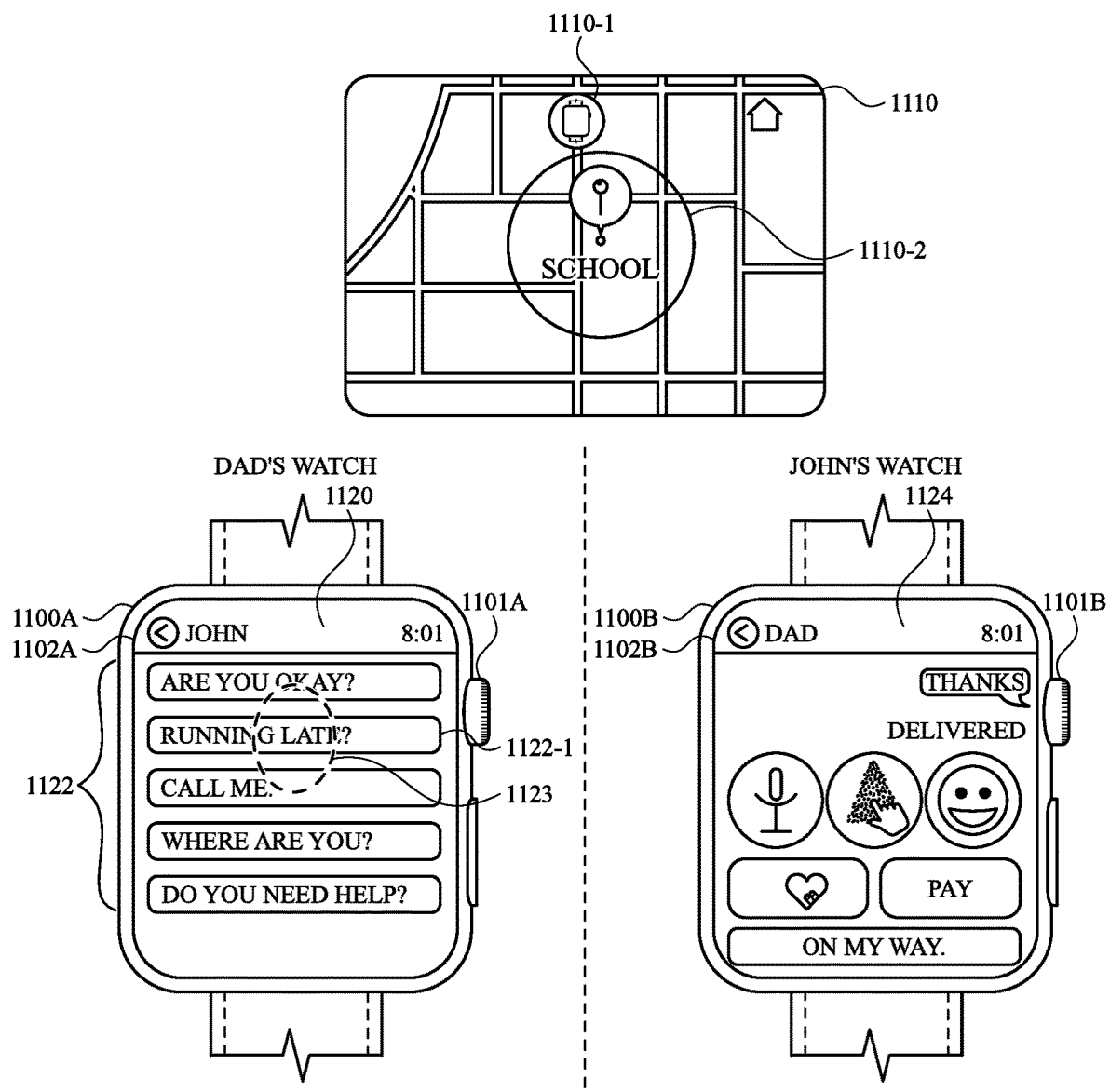
Figure 11H:
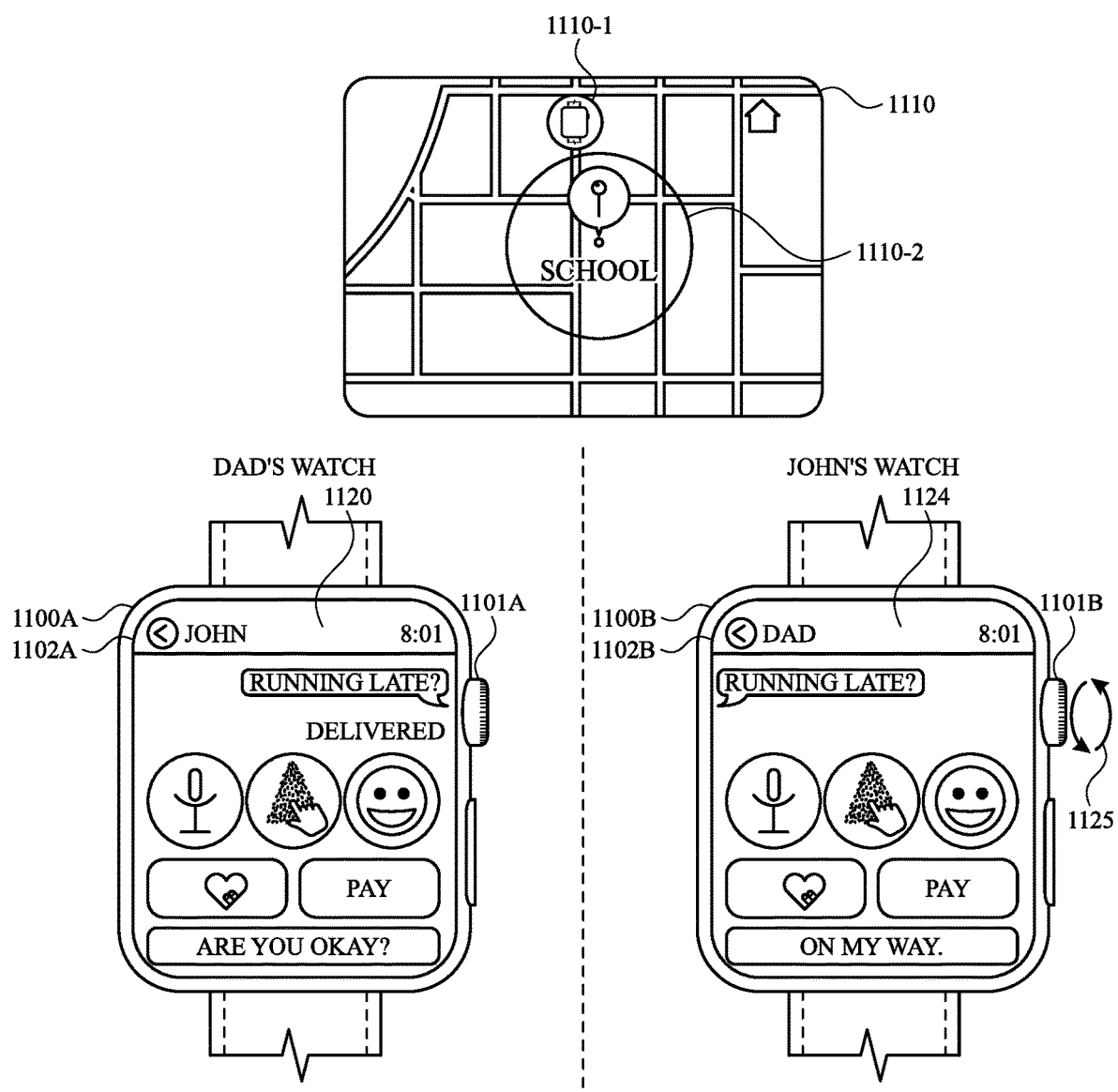
Figure 11I:
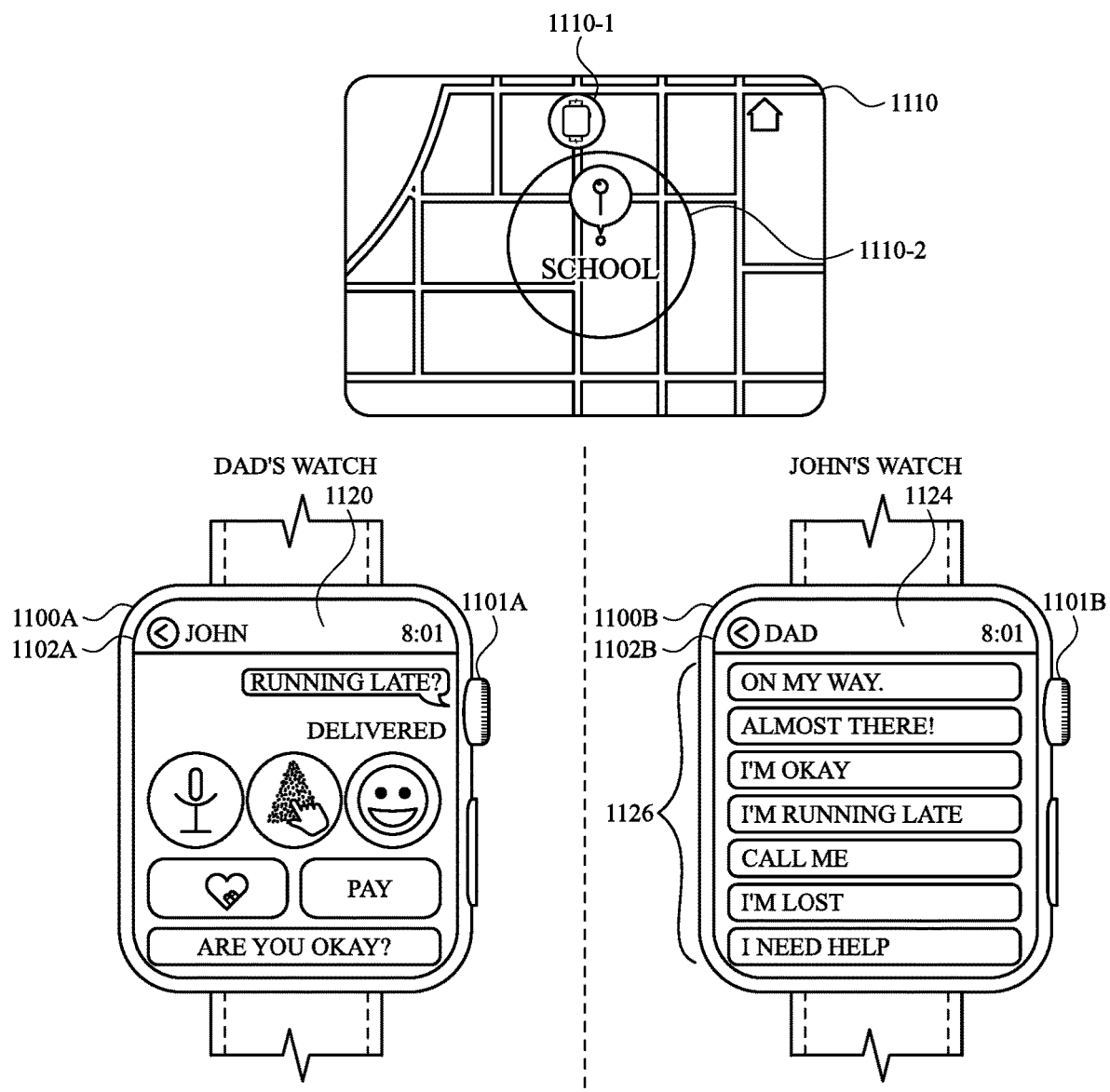
Figure 11J:
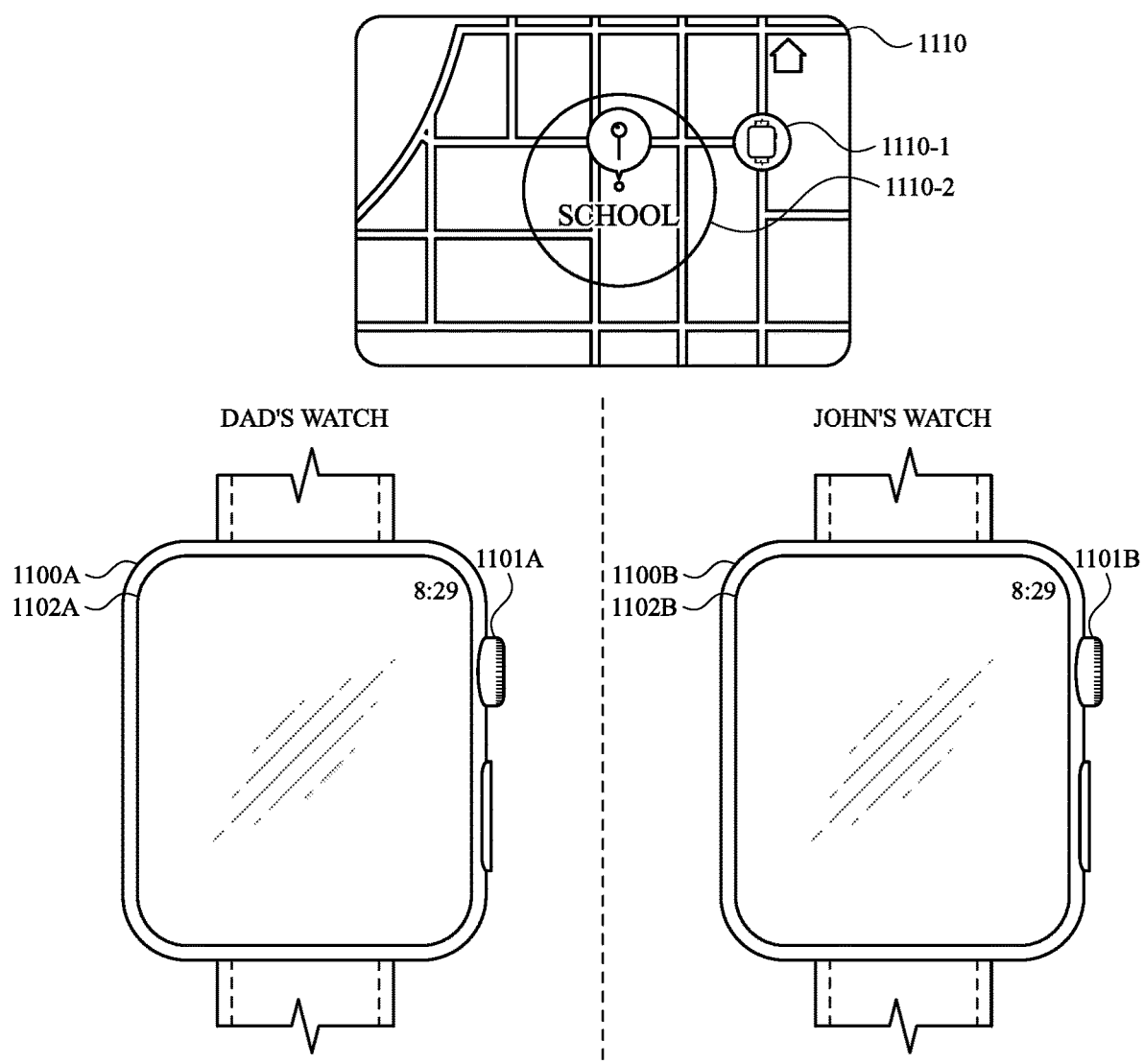
Figure 11K:
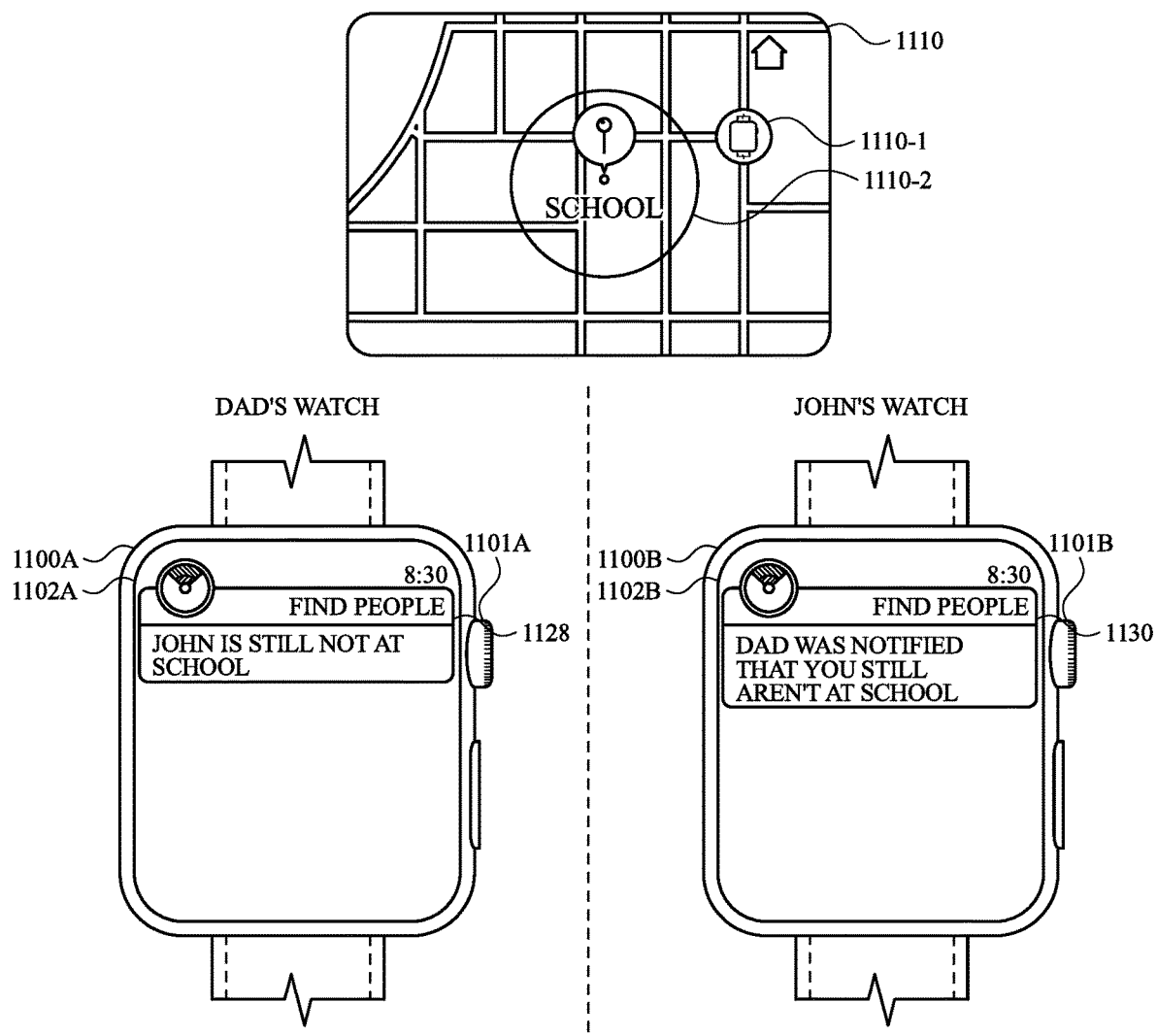
Figure 11L:
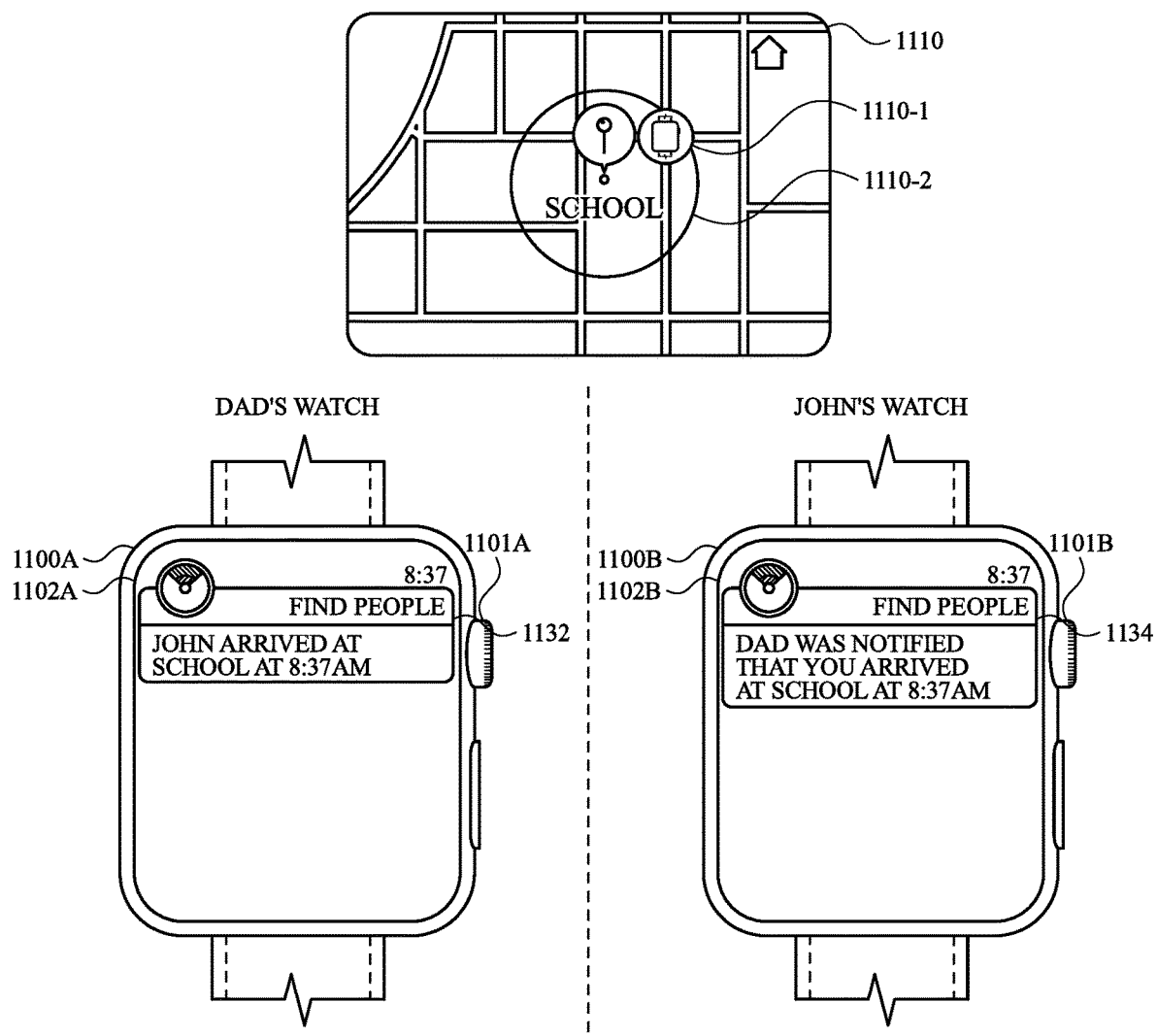
Figure 11M:
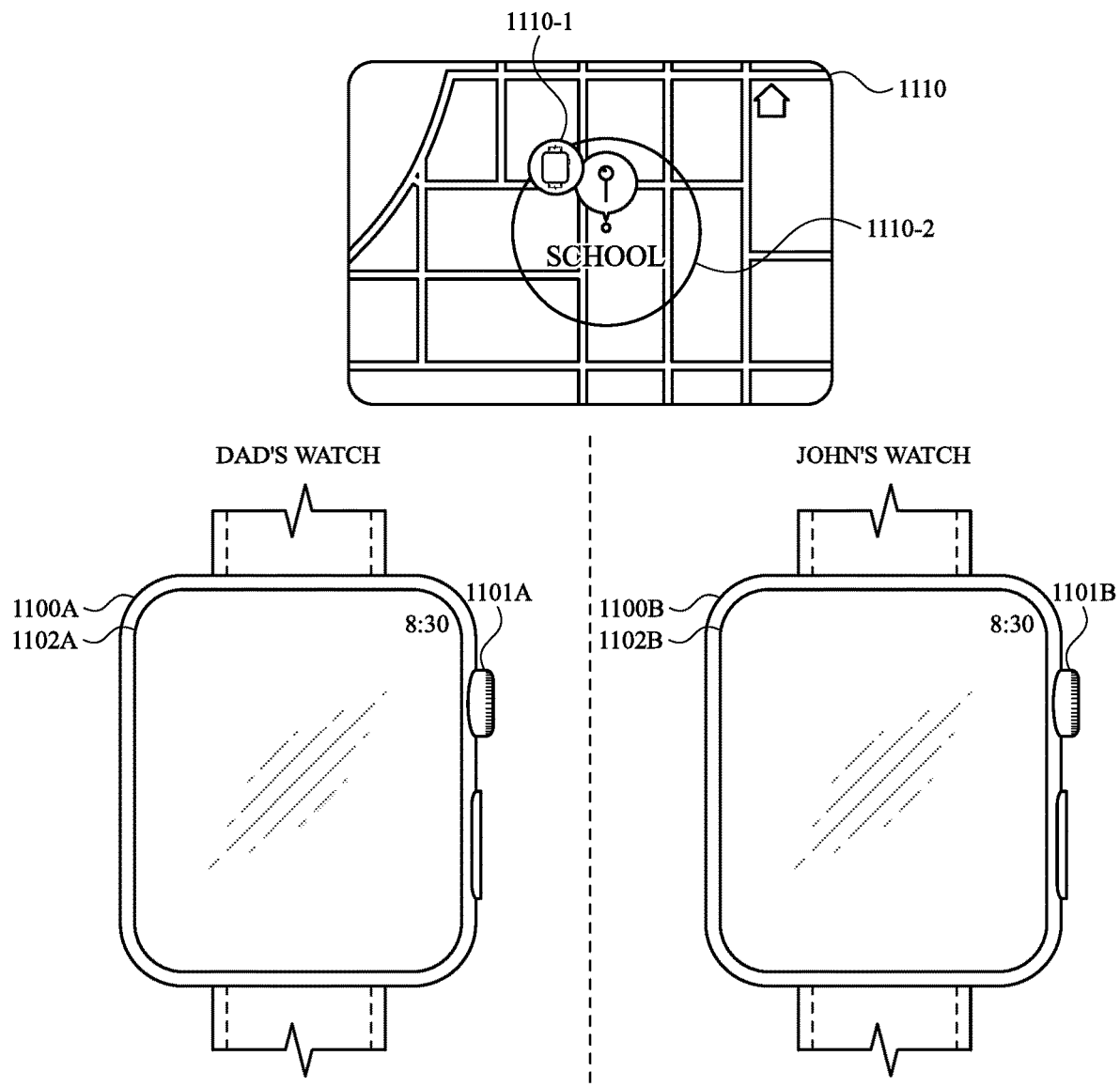
Figure 11N:
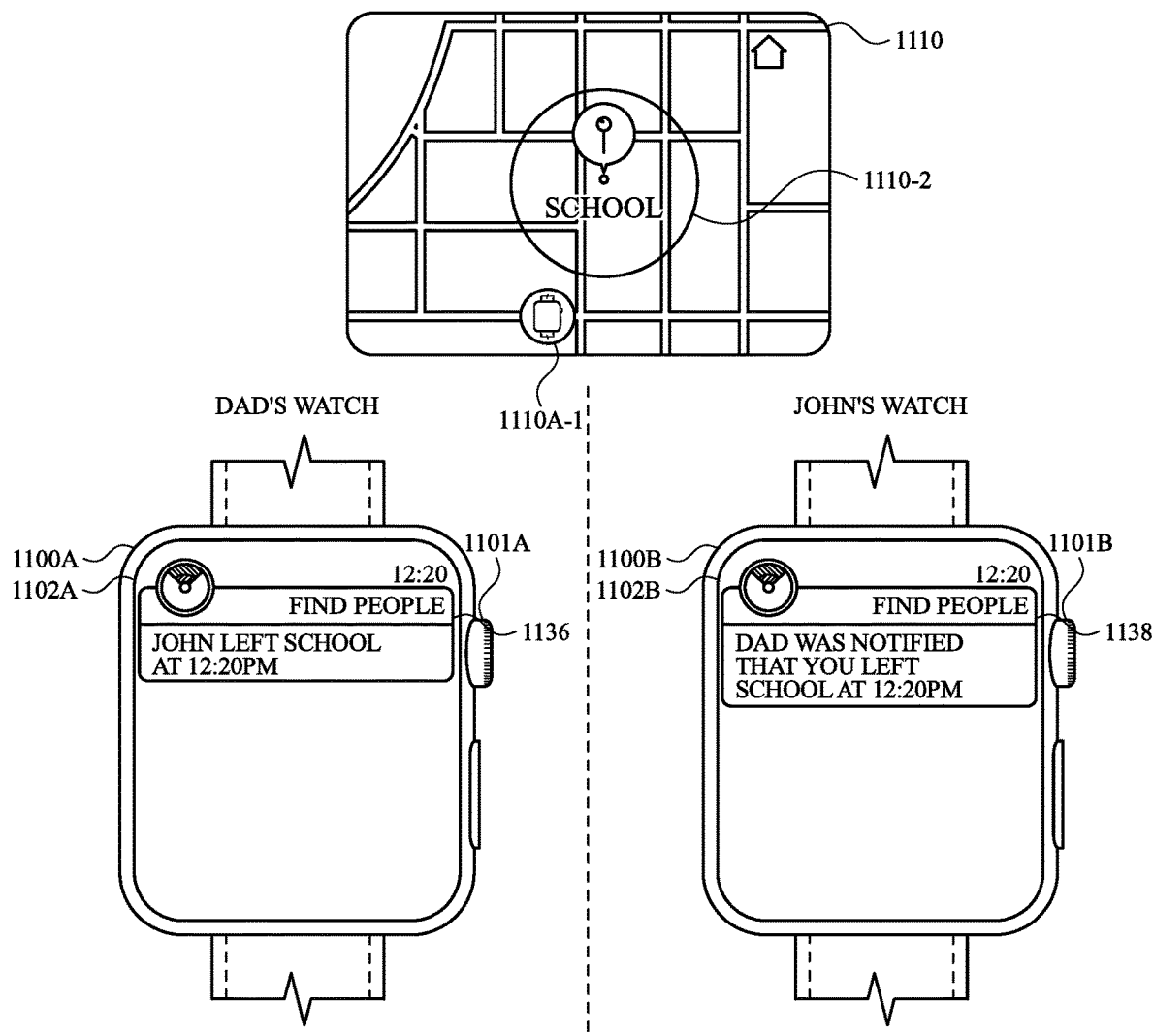
Figure 11O:
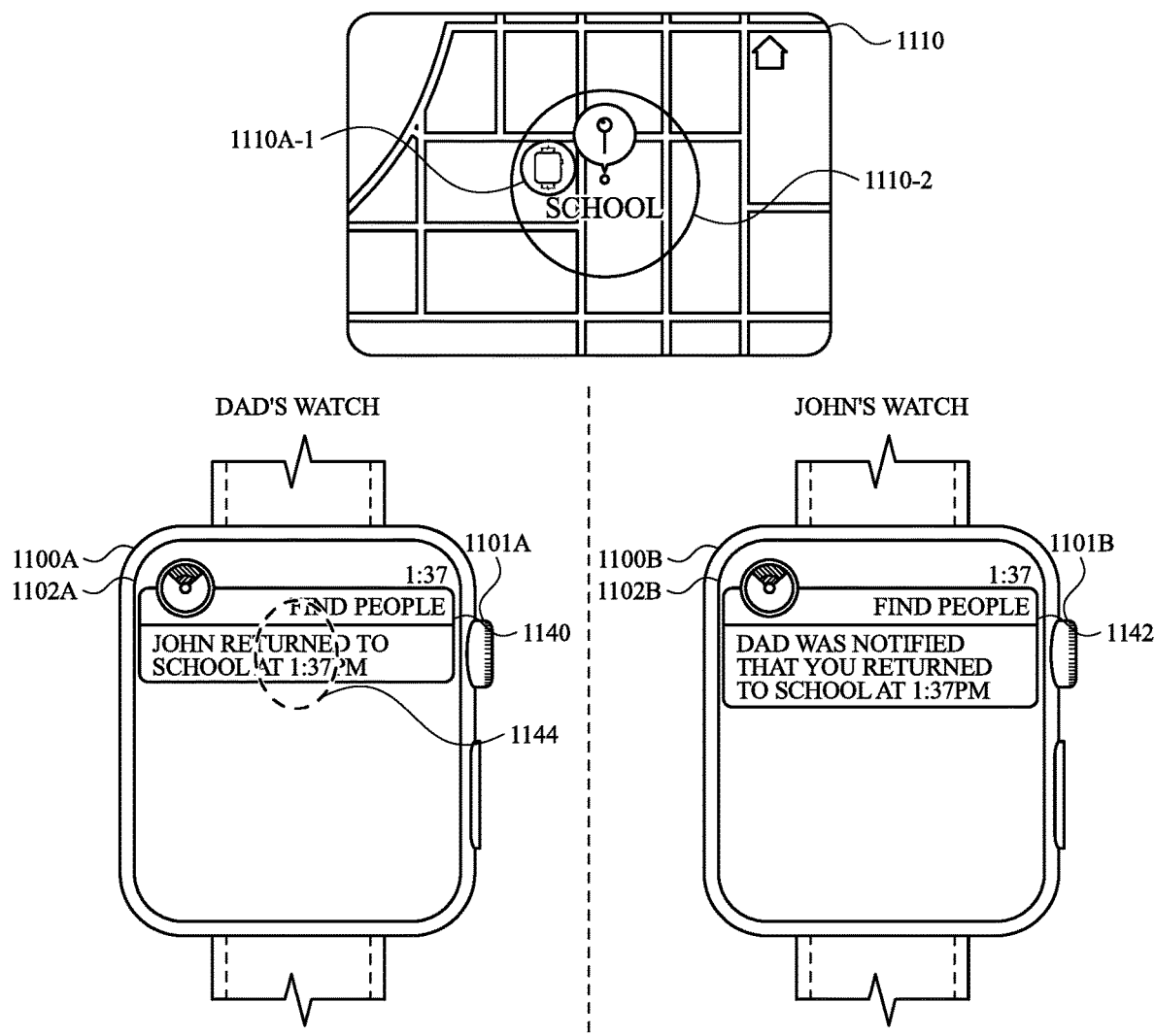
Figure 11P:
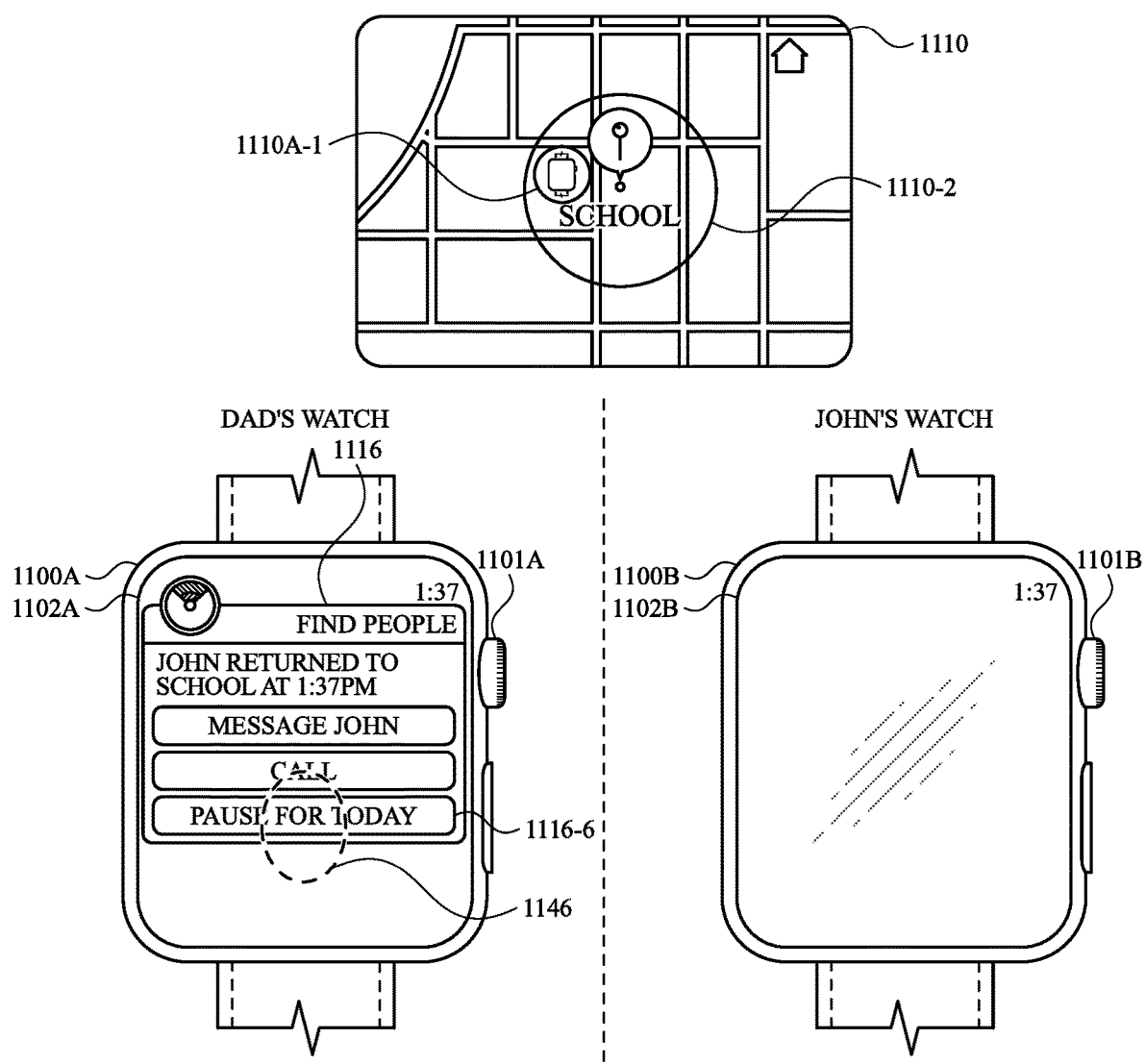
Figure 11Q:
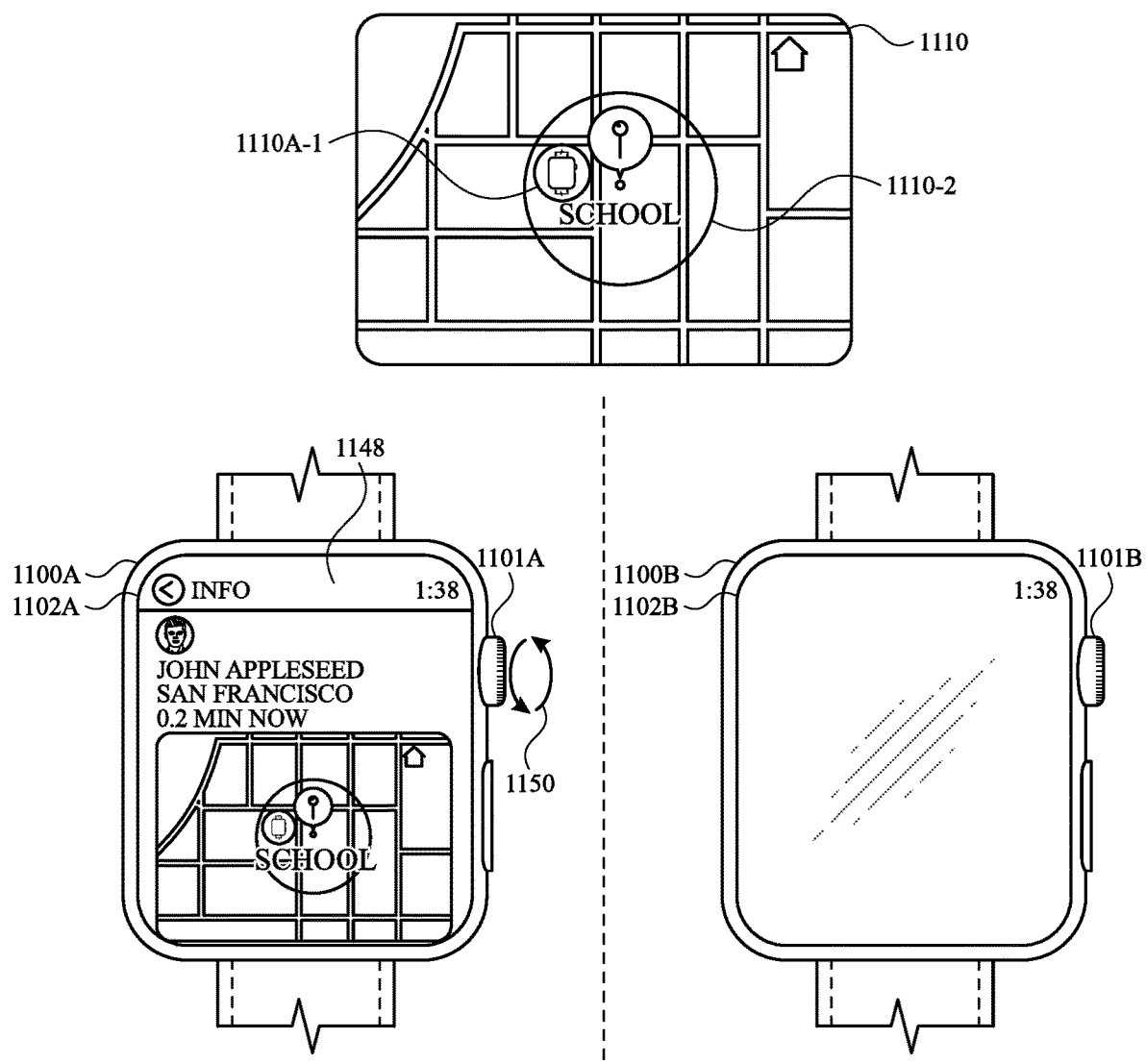
Figure 11R:
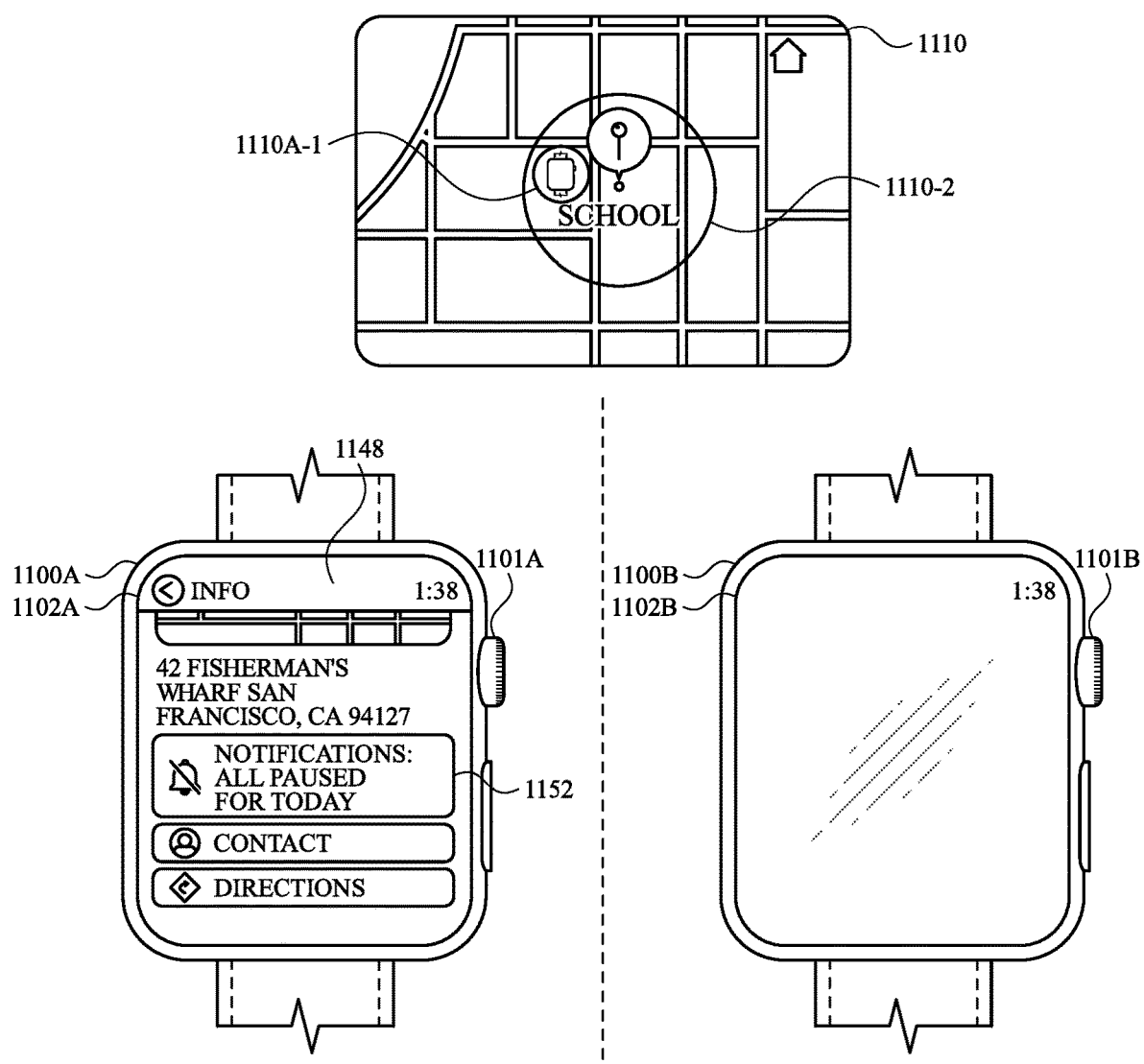

FIGS. 11E-11R depict example embodiments in which devices 1100 display various user interfaces associated with managing location-related notifications.

FIG. 11E depicts an embodiment in which John's location triggers a geofence alert condition (e.g., an alert condition similar to that indicated by geofence identifier 926-1 discussed above) because he was not at school by 8 AM. John's location 1110-1 relative to the geofence boundary 1110-2 is depicted on map 1110, which is similar to map 6042.

In response to the triggering of the geofence alert condition, notification 1112 is displayed at Dad's device 1100A to inform Dad of the breach of the geofence condition (John was not at school by 8:00), and notification 1114 is displayed at John's device 1100B to inform John that Dad was notified of the breach. Notification 1112 is similar to notification 6096, and notification 1114 is similar to notification 6098.

In FIG. 11E, Dad's device 1100A detects input 1113 on notification 1112, and John's device 1100B detects input 1115 on notification 1114.

Referring now to FIG. 11F, Dad's device 1100A displays notification details interface 1116 (similar to interface 908) in response to input 1113. Interface 1116 provides information pertaining to John and additional details for notification 1112, including alert text 1116-1, map 1116-2 of John's location, timestamp 1116-3 of the location on the map, option 1116-4 for messaging John, option 1116-5 for calling John, and option 1116-6 for pausing notifications in a manner similar to that discussed above. In some embodiments, notification details interface 1116 only displays map 1116-2 (and timestamp 1116-3) when John's current location is not within the boundary of the geofence. For example, if Dad were to access notification details interface 1116 after John had arrived at school, map 1116-2 and timestamp 1116-3 would not be displayed.

John's device 1100B displays notification details interface 1118 (similar to notification details interface 1116) in response to input 1115. Interface 1118 provides information pertaining to Dad and additional details for notification 1114, including alert text 1118-1, map 1118-2 of John's location at the time of the alert, timestamp 1118-3 of the location on the map, option 1118-4 for messaging Dad, option 1118-5 for calling Dad, and option 1118-6 for pausing notifications in a manner similar to that discussed above. In some embodiments, map 1118-2 shows Dad's location on the map, and timestamp 1118-3 shows the timestamp of Dad's location.

In FIG. 11F, Dad's device 1100A detects input 1117 on option 1116-4 for messaging John, and John's device 1100B detects input 1119 on option 1118-4 for messaging Dad.

Referring now to FIG. 11G, Dad's device 1100A displays messaging interface 1120 (similar to messaging interface 1104A) in response to input 1117, and John's device 1100B displays messaging interface 1124 (similar to messaging interface 1104B) in response to input 1119. Messaging interface 1120 includes a set of predefined messages 1122. In some embodiments, predefined messages 1122 are displayed immediately in response to input 1117. In some embodiments, Dad's device 1100A displays the messaging interface without the predefined messages or with a portion of the predefined messages (similar to that shown on John's device 1100B in FIG. 11G), and predefined messages 1122 are displayed in response to an input to scroll the messaging interface.

Predefined messages 1122 are different from predefined messages 1106A and 1106B. Specifically, predefined messages 1106 are generic messages that are frequently used in a messaging conversation, whereas predefined messages 1122 are canned messages that are relevant to a conversation about a tracked user's location, from the perspective of the user who is monitoring the user's location, including responses that are relevant to the alert condition, which is triggered when the user is not at an expected location. For example, predefined messages 1122 that are displayed on Dad's device 1100A are relevant to a situation in which John is not at an expected location, and Dad is communicating to John about the situation. These include canned messages such as "Are you okay?", "Running Late?", "Call me," "Where are you?", and "Do you need help?"

In FIG. 11G, Dad's device 1100A detects input 1123 on message 1122-1, which corresponds to "Running late?" This message is then sent to John's device 1100B, as illustrated in FIG. 11H.

In FIG. 11H, John's device 1100B detects input 1125 on rotatable input mechanism 1101B and, in response, scrolls messaging interface 1124 to display predefined messages 1126, as shown in FIG. 11I. Predefined messages are different from predefined messages 1106 and predefined messages 1122. Specifically, predefined messages 1126 are canned messages that are relevant to a conversation about a tracked user's location, from the perspective of the user whose location is being tracked, including responses that are relevant to the alert condition, which is triggered when the user is not at an expected location. For example, predefined messages 1126 that are displayed on John's device 1100B are relevant to a situation in which John is not at an expected location, and John is communicating to Dad about the situation. These include canned messages such as "On my way," "Almost there!", "I'm okay," "I'm running late," "Call me," "I'm lost," and "I need help." John can select any of predefined messages 1126 to send the selected message to Dad's device 1100A. In the embodiment shown in FIGS. 11G-11I, Dad initiates the conversation with John by selecting predefined message 1122-1, however, John can initiate the conversation by sending one of predefined messages 1126 first.

FIG. 11J depicts an embodiment in which John still is not at school, and the current time is 8:29 AM. In FIG. 11J, no alert is displayed on Dad's device 1100A or John's device 1100B.

In FIG. 11K, John still is not at school. Dad's device 1100A displays notification 1128 informing Dad that John is still not at school, and John's device 1100B displays notification 1130 informing John that Dad was notified that John is still not at school. In some embodiments, notifications 1128 and 1130 are generated when a predefined amount of time has elapsed since notifications 1112 and 1114 were generated and John has not arrived at school. In some embodiments, notifications 1128 and 1130 are generated in response to detecting, after notifications 1112 and 1114 were generated (e.g., optionally a predetermined amount of time after they were generated), an updated location for John that does not satisfy the requirements of the geofence (e.g., John's updated location is not at school).

In FIG. 11L, John arrives at school at 8:37 AM and, in response, Dad's device 1100A displays notification 1132 and John's device 1100B displays notification 1134. Notification 1132 informs Dad that John arrived at school at 8:37 AM, and notification 1134 informs John that Dad was notified that John arrived at school at 8:37 AM.

FIG. 11M depicts an alternate embodiment to that shown in FIGS. 11K and 11L in which John arrives at school by 8:30 AM, after previously not being at school at 8:00 (and notifications 1112 and 1114 being generated). Because John arrived at school by 8:30, subsequent notifications 1128 and 1130 (and, consequently, notifications 1132 and 1134) were not generated at Dad's device 1100A and John's device 1100B, respectively, as shown in FIG. 11M.

Referring now to FIG. 11N, John leaves school early (e.g., before 3:00 PM). As a result, Dad's device 1100A displays notification 1136 informing Dad that John left school at 12:20 PM, and John's device 1100E displays notification 1138 informing John that Dad was notified that John left school at 12:20 PM. Notification 1136 is similar to notification 6122.

In FIG. 11O, John returns to school at 1:37 PM and, as a result, Dad's device 1100A displays notification 1140 informing Dad that John returned to school at 1:37 PM, and John's device 1100B displays notification 1142 informing John that Dad was notified of John's return to school at 1:37 PM. In some embodiments, an intervening notification is displayed on Dad's device 1100A and, optionally, John's device 1100B if John does not return to school within a predetermined amount of time. For example, a notification that reads "John still has not returned to school" can be generated at Dad's device 1100A a predetermined amount of time (e.g., 5 minutes, 15 minutes, and/or 30 minutes, etc.) after notification 1136 is generated. Similarly, a notification that reads "Dad was notified that you still have not returned to school" can be generated at John's device 1100B a predetermined amount of time after notification 1138 is generated.

In FIG. 11O, Dad's device 1100A detects input 1144 on notification 1140 and, in response, displays notification details interface 1116, as shown in FIG. 11P. Interface 1116 is similar to that shown in FIG. 11P, but without map 1116-2 and timestamp 1116-3, which are not displayed because John is now at the expected location (school).

In FIG. 11P, Dad's device 1100A detects input 1146 on pause option 1116-6. In response, Dad's device 1100A pauses display of notifications for John for the rest of the day (as discussed above in greater detail), and displays user account information 1148 for John, as shown in FIGS. 11Q and 11R. In FIG. 11Q, Dad's device 1100A detects input 1150 on rotatable input mechanism 1101A and, in response, scrolls account information 1148 to display additional information for John's account, including attention block 1152, which indicates notifications are paused for John's account for the rest of today.

FIG. 12 is a flow diagram illustrating a method for managing location-related communications using an electronic device in accordance with some embodiments. Method 1200 is performed at an electronic device (e.g., 100, 300, 500, 6000, 900, 1100A, 1100B). Some operations in method 1200 are, optionally, combined, the orders of some operations are, optionally, changed, and some operations are, optionally, omitted.

In some embodiments, the electronic device (e.g., 1100A, 1100B) is a computer system (e.g., a smartphone, a smartwatch; a server (e.g., a location-tracking server)). The computer system is optionally in communication (e.g., wired communication, wireless communication) with a display generation component (e.g., 1102A, 1102B) and with one or more input devices (e.g., 1101A, 1101B, 1102A, 1102B). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

In some embodiments, the computer system is associated with a first user account (e.g., a parent's user account) that is authorized to receive location data for a computer system (e.g., an electronic device) associated with a second user account (e.g., a child's user account (e.g., when the first user account is a parent's user account)) for which the current location is being evaluated. In some embodiments, the computer system includes a server that is authorized to receive location data for a computer system associated with the second user account for which the current location is being evaluated.

As described below, method 1200 provides an intuitive way for managing location-related communications. The method reduces the cognitive burden on a user for managing location-related communications, thereby creating a more efficient human-machine interface. For battery-operated computing devices, enabling a user to manage location-related communications faster and more efficiently conserves power and increases time between battery charges.

Method 1200 is performed (1202) while an alert condition that is triggered based on a comparison between a current location (e.g., 1110-1) associated with a user account (e.g., John's account) (e.g., a current location of a computer system associated with the second user account) relative to a geographic location (e.g., 1110-2; school) (e.g., a physical address, a coordinate, a defined area, or a geographic landmark) and a range of times (e.g., weekdays, 8 AM to 3 PM) (e.g., a range of times specified by the second user account)

(e.g., a range of times specified by the first user account) is active (e.g., the alert condition is being tracked or monitored).

After generating a first alert (e.g., 1112; 1114; 1136; 1138) based on having met a first set of criteria that includes a criterion that is met when the current location (e.g., 1110-1 in FIG. 11E) (e.g., the current location at the time the first alert was generated) associated with the user account does not have a first predefined relationship to the geographic location (e.g., 1110-2 in FIG. 11E) during the range of times (e.g., the computer system associated with the second user account is not located at the geographic location at some point during the range of times), and while still within the range of times, the computer system (e.g., 1100A; 1100B) detects (1204) a change in the current location associated with the user account (e.g., 1110-1 in FIG. 11K or FIG. 11L) (e.g., detecting an updated location of a computer system associated with the user account).

In response to detecting the change in the current location associated with the user account and in accordance with a determination that a second set of criteria are met (e.g., a set that includes a criterion that is met when the current location associated with the user account has the predefined relationship to the geographic location during the range of times; a set with the same criterion as the first set of criteria; a set that includes one or more criterion in common with the first set of criteria and one or more additional criterion (e.g., a criterion that is met when a predetermined period of time has elapsed since the first alert was generated)), wherein the second set of criteria includes a criterion that is met when the current location associated with the user account has a second predefined relationship (e.g., being within a predetermined distance of the location (e.g., location 1110-1 in FIG. 11L), not being within a predetermined distance of the location (e.g., location 1110-1 in FIG. 11K)) to the geographic location, the computer system (e.g., 1100A, 1100B) generates (1206) (e.g., automatically generating; generating based on logic operating on the computer system; without requiring user input (e.g., without selection of an affordance (e.g., a "Notify Me when Jane Arrives" affordance) that initiates a process for displaying a subsequent alert when the current location associated with the user account has the predefined relationship to the geographic location)) a second alert (e.g., 1128; 1130; 1132; 1134; 1140; 1142) (e.g., a notification such as a pop-up or a banner) (e.g., indicating that the current location (e.g., the updated location) associated with the user account has, or does not have, the predefined relationship to the geographic location (e.g., generating the second alert when the computer system associated with the second user account is located at the geographic location or is transitioning from a location that does not match the geographic location to a location that does match the geographic location) (e.g., generating the second alert when the computer system associated with the second user account is still not located at the geographic location (e.g., after a predetermined amount of time after the first alert was generated))).

Generating a second alert in response to detecting the change in the current location associated with the user account and in accordance with a determination that a second set of criteria are met, including when the current location associated with the user account has a second predefined relationship to the geographic location, provides feedback to a user of the computer system that the current location associated with the user account satisfies a set of criteria for which the user of the computer system wishes to be notified. Additionally, because the user of the computer system can rely on the computer system to automatically notify that the criteria has been met, the user of the computer system does not need to actively monitor or repeatedly check the current location associated with the user account, which reduces the number of inputs and conserves power. Providing improved feedback; reducing the number of inputs at the computer system, and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, generating an alert includes displaying the alert via the display generation component (e.g., 1102A; 1102B) (e.g., when the computer system is associated with the second user account or is associated with the first user account). In some embodiments, generating the alert includes causing an external computer system to display the alert (e.g., when the computer system includes a server). In some embodiments, the external computer system is a computer system (e.g., 1100B) associated with the second user account. In some embodiments, the external electronic device is a computer system (e.g., 1100A) associated with the first user account.

In some embodiments, in response to detecting the change in the current location associated with the user account and in accordance with a determination that the second set of criteria are not met, the computer system (e.g., 1100A, 1100B) forgoes (1208) generating the second alert (e.g., 1128; 1130; 1132; 1134; 1140; 1142). Forgoing generating the second alert in response to detecting the change in the current location associated with the user account and in accordance with a determination that the second set of criteria are not met provides feedback to a user of the computer system that the second set of criteria are not met, thereby reducing the number of inputs at the computer system by providing this feedback without requiring the user of the computer system to actively access or monitor the location associated with the user account. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the second alert (e.g., 1132; 1134; 1140; 1142) indicates that the current location of the computer system (e.g., 1100B) associated with the user account has the predefined relationship to the geographic location, and the second alert is not generated if the updated location of the computer system associated with the user account does not have the predefined relationship to the geographic location. In some embodiments, the second alert (e.g., 1128; 1130) indicates that the updated location of the computer system associated with the user account still does not have the predefined relationship to the geographic location, and the second alert is not generated if the updated location of the computer system associated with the user account has the predefined relationship to the geographic location.

In some embodiments, the second set of criteria includes a criterion that is met when the first alert (e.g., 1112; 1114) was generated based on having met the first set of criteria. In some embodiments, the second alert (e.g., 1128; 1130; 1132; 1134; 1140; 1142) is only generated if the first alert was generated.

In some embodiments, the current location associated with the user account (e.g., 1110-1) has the first predefined relationship to the geographic location (e.g., 1110-2) when the current location associated with the user account is the same as the geographic location (e.g., the computer system associated with the user account is located at the geographic location or is located within the geographic location or within a predefined distance from the geographic location).

In some embodiments, the first set of criteria includes a second criterion that is met when the current location associated with the user account (e.g., 1110-1) does not have the first predefined relationship to the geographic location (e.g., 1110-2) at a start time (e.g., 8:00 AM) of the range of times (e.g., the range of times includes a start time and an end time (e.g., for a particular date or multiple dates), and the computer system associated with the user account (e.g., 1100B) is not located at the geographic location at the start time).

In some embodiments, the first set of criteria includes a third criterion that is met when the current location associated with the user account (e.g., 1110-1) transitions from having the first predefined relationship to the geographic location (e.g., 1110-2) during the range of times to not having the first predefined relationship to the geographic location during the range of times (e.g., the computer system associated with the user account leaves the geographic location during the range of times (e.g., see FIG. 11N)).

In some embodiments, the current location associated with the user account (e.g., 1110-1) has the second predefined relationship to the geographic location when the current location associated with the user account is different from the geographic location (e.g., the current location is at least a predefined distance from the geographic location) (e.g., see FIG. 11K). In some embodiments, the second set of criteria includes a fourth criterion that is met when a predetermined amount of time (e.g., 5 minutes, 15 minutes, 30 minutes) has elapsed since the first alert (e.g., 1112; 1114) was generated. In some embodiments, the second alert (e.g., 1128; 1130) is generated when the computer system associated with the user account (e.g., 1100B) has not arrived at the geographic location (e.g., 1110-2) after a predetermined amount of time after the first alert was generated.

In some embodiments, the first set of criteria includes a fifth criterion that is met when the current location associated with the user account (e.g., 1110-1) transitions from having the first predefined relationship to the geographic location (e.g., 1110-2) during the range of times to not having the first predefined relationship to the geographic location during the range of times (e.g., the computer system associated with the user account (e.g., 1100B) leaves the geographic location during the range of times (e.g., see FIG. 11N). In some embodiments, the current location associated with the user account has the second predefined relationship to the geographic location when the current location associated with the user account is the same as the geographic location (e.g., the computer system associated with the user account returns to the geographic location (e.g., see FIG. 11O)). In some embodiments, the first alert (e.g., 1136; 1138) is generated with the computer system associated with the user account leaves the geographic location during the range of times, and the second alert (e.g., 1140; 1142) is generated when the computer system associated with the user account returns to the geographic location during the range of times.

In some embodiments, the first set of criteria includes a sixth criterion that is met when the current location associated with the user account (e.g., 1110-1) does not have the first predefined relationship to the geographic location (e.g., 1110-2) during the range of times (e.g., at a start time of the range of times (e.g., the range of times includes a start time and an end time (e.g., for a particular date or multiple dates), and the computer system associated with the user account (e.g., 1100B) is not located at the geographic location at the start time) (e.g., see FIG. 11E)). In some embodiments, the current location associated with the user account has the second predefined relationship to the geographic location when the current location associated with the user account is the same as the geographic location (e.g., the computer system associated with the user account is located at the geographic location or arrives at the geographic location (e.g., see FIG. 11L)). In some embodiments, the first alert is generated with the computer system associated with the user account fails to arrive at the geographic location during the range of times, and the second alert is generated when the computer system associated with the user account arrives at the geographic location during the range of times.

In some embodiments, the computer system (e.g., 1100A; 1100B) is in communication with a display generation component (e.g., 1102A; 1102B) (e.g., a display controller, a touch-sensitive display system). In some embodiments, generating the first alert includes displaying, via the display generation component, a first notification (e.g., a notification indicating that the computer system associated with the user account (e.g., 1100B) failed to arrive at the geographic location (e.g., notification 1112; notification 1114); a notification indicating that the computer system associated with the user account left the geographic location (e.g., notification 1136; notification 1138)). In some embodiments, generating the second alert includes displaying, via the display generation component, a second notification different (e.g., the second notification includes content that is different from the content included in the first notification from the first notification (e.g., a notification indicating that the computer system associated with the user account has arrived at the geographic location (e.g., notification 1132; notification 1134); a notification indicating that the computer system associated with the user account has returned to the geographic location (e.g., notification 1140; notification 1142)). Generating the second alert having a second notification that is different from the first notification displayed when the first alert is generated provides feedback to a user of the computer system that the status of the current location associated with the user account has changed in a manner that satisfies a set of criteria for which the user of the computer system wishes to be notified, without requiring the user of the computer system to actively monitor the current location associated with the user account, thereby reducing the number of inputs needed to monitor the current location. Providing improved feedback, reducing the number of inputs at the computer system, and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 1100A; 1100B) is in communication with a display generation component (e.g., 1102A; 1102B). In some embodiments, generating the first alert and/or the second alert includes displaying, via the display generation component, an indication of a time at which the alert condition was triggered (e.g., see notifications 1112, 1114, 1132; 1134, 1136, 1138; 1140, and/or 1142). Generating the first and/or second alert including an indication of a time at which the alert condition was triggered automatically provides information to a user of the computer system indicating the moment the alert condition was triggered, rather than the moment at which the alert was received, which reduces the need for navigation through multiple user interface views to obtain the information, thereby reducing power usage by the computer system. Providing information automatically and reducing the number of inputs at the computer system enhances the operability of the computer system and makes the user-system interface more efficient (e.g., by helping the user to provide proper inputs and reducing user mistakes when operating/interacting with the computer system) which; additionally; reduces power usage and improves battery life of the computer system by enabling the user to use the system more quickly and efficiently.

In some embodiments, the first alert (e.g., 1136; 1138) includes an indication of a time at which the first set of criteria is met (e.g., the time at which the computer system associated with the user account fails to arrive at the geographic location during the range of times; the time at which the computer system associated with the user account leaves the geographic location during the range of times). In some embodiments, the second alert (e.g., 1140; 1142) includes an indication of a time at which the second set of criteria is met (e.g., the time at which the computer system associated with the user account arrives at the geographic location during the range of times; the time at which the computer system associated with the user account returns to the geographic location during the range of times).

In some embodiments, generating the first alert and/or the second alert includes generating (in some embodiments, and transmitting; in some embodiments, and causing to be transmitted) a first notification (e.g., 1112; 1128; 1132; 1136; 1140) (e.g., a notification associated with the first alert; a notification associated with the second alert) for display at the computer system (e.g., 1100A) (e.g., via a display generation component that is in communication with the computer system), wherein a second notification (e.g., 1114; 1130; 1134; 1138; 1142) (e.g., a notification associated with the first alert; a notification associated with the second alert) is displayed at a second computer system (e.g., 1100B) (e.g., different from the computer system; an external computer system (e.g., via a display component of an external computer system)) associated with the user account. Generating a first notification for display at the computer system, wherein a second notification is displayed at a second computer system associated with the user account, provides feedback to a user of the computer system, and provides notice to a user associated with the user account, that the status of the current location associated with the user account has changed in a manner that satisfies a set of criteria for which the user of the computer system wishes to be notified, without requiring the user of the computer system, or the user associated with the user account, to actively monitor the current location associated with the user account, thereby reducing the number of inputs needed to monitor the current location. Providing improved feedback, reducing the number of inputs at the computer system, and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the method further comprises generating (in some embodiments, and transmitting; in some embodiments, and causing to be transmitted) the second notification for display at the second computer system associated with the user account. In some embodiments, the second notification is similar to the first notification. In some embodiments, both the first notification and the second notification provide an indication of the triggered alert and the conditions that triggered the alert.

In some embodiments, a third computer system (e.g., 1100A; 1100B) (e.g., the computer system; a computer system different from the computer system that is in communication with the computer system) that is in communication with a display generation component (e.g., 1102A; 1102B) and one or more input devices (e.g., 1101A; 1101B; 1102A; 1102B) performs the following steps. After the first alert or the second alert was generated, the third computer system receives, via the one or more input devices, one or more inputs (e.g., 1106; 1108; 1107; 1109; 1117; 1119; 1123; 1125) corresponding to a request to compose a message (e.g., a request to send a text message to a user associated with the user account) (e.g., one or more inputs that include a selection of a message affordance (in some embodiments, the message affordance (e.g., 1116-4; 1118-4; 1122; 1126) is associated with an alert. In some embodiments, the message affordance is not associated with an alert (e.g., the message affordance (e.g., 1106A; 1106B) is displayed, or capable of being displayed, prior to receiving an alert)).

In response to receiving the one or more inputs corresponding to a request to compose a message, in accordance with a determination that the one or more inputs includes a selection (e.g., 1117; 1119) of a first selectable message user interface object (e.g., 1116-4; 1118-4) (e.g., a first message affordance) that is associated with the first alert or the second alert (e.g., 1112; 1114) (e.g., the first message affordance is displayed after receiving the first or second alert (e.g., in response to an input on the first or second alert); the first message affordance is not displayed before receiving the first or second alert; the first message affordance is displayed with the first or second alert; the first message affordance is displayed in a detailed view of the first or second alert), the third computer system displays, via the display generation component, a first set of predefined messages (e.g., 1122; 1126) (e.g., a set of canned messages that are associated with the first alert or the second alert). Displaying a first or second set of predefined messages depending on whether the one or more inputs includes selection of a first selectable message user interface object that is associated with the first or second alert, or selection of a second selectable message user interface object that is not associated with the first or second alert, automatically generates a specific set of predefined messages that are relevant to a user of the computer system and selectable to send to a recipient, without requiring the user to provide input to type the relevant message. Reducing the number of inputs at the computer system and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first set of predefined messages contain content that is relevant to the first alert and/or the second alert. For example, in the case of a parent associated with a first user account and a child that is associated with a second user account, if the alert indicates that the child has not arrived at the geographic location, the first set of predefined messages can include canned messages that, for example, instruct the child to contact the parent, asks where the child where they are located, asks the child if they are safe, lost, late, need help, etc.

In response to receiving the one or more inputs corresponding to a request to compose a message, in accordance with a determination that the one or more inputs includes a selection of a second selectable message user interface object (e.g., a second message affordance) that is not associated with the first alert or the second alert (e.g., the second message affordance is displayed, or capable of being displayed, prior to receiving the first or second alert), the third computer system displays, via the display generation component, a second set of predefined messages different from the first set of predefined messages (e.g., 1106A; 1106B). In some embodiments, the first set of predefined messages includes a first subset of predefined messages and a second subset of predefined messages. In some embodiments, the second set of predefined messages does not include the first subset of predefined messages but, optionally, includes the second subset of predefined messages.

In some embodiments, in accordance with a determination that the third computer system is associated with (e.g., the third computer system is assigned to, or registered with, the user account; the user account is logged into the third computer system) the user account (e.g., 1100B) (e.g., the user account for which the current location is compared to the geographic location and the range of times), the first set of predefined messages includes a first subset of messages (e.g., 1126) (e.g., the first subset of messages include predefined/canned messages that are tailored to the user account). In some embodiments, in accordance with a determination that the third computer system is associated with a second user account different from the user account (e.g., 1100A) (e.g., the third computer system is associated with a second user account that is not the user account for which the current location is compared to the geographic location and the range of times), the first set of predefined messages includes a second subset of messages (e.g., 1122) different from the first subset of messages (e.g., the second subset of messages include predefined/canned messages that are tailored to the second user account). Displaying the first set of predefined messages having a first subset of messages or a second subset of messages depending on whether the third computer system is associated with the user account or a second user account different from the user account, provides a specific set of predefined messages that are relevant to the user of the third computer system and selectable to send to a recipient, without requiring the user to provide input to type to type the relevant message. Reducing the number of inputs at the computer system and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the user account is the user account for which the location is being monitored, and the first subset of messages are tailored to the user account in response to the generated alert. For example; the first subset of messages can include canned messages that indicate the user is on their way to the geographic location, the user is almost at the geographic location, the user is okay, the user is running late, the user wants to be called, or is lost, or needs help. In some embodiments, the second user account is a user account that has been authorized (e.g., by the user account) to receive location data associated with the user account, and the second subset of messages are tailored to the second user account in response to the generated alert. For example, the second subset of messages can include canned messages that say "Are you okay?," "Running late," "Call me," "Where are you?," and "Do you need help?"

In some embodiments, in response to a request (e.g., 1113) (e.g., an input a touch-and-hold input) on an alert notification; an input to view additional details for the alert or for alert conditions) to view information associated with a generated alert (e.g., 1112) (e.g., the first alert the second alert), the computer system (e.g., 1100A) displays, via the display generation component (e.g., 1102A), an indication (e.g., 1116-2) (e.g., a map) of the current location associated with the user account when the alert condition was triggered (e.g., the map shows the location that was associated with the user account at the time the art condition was triggered). Displaying an indication of the current location associated with the user account when the alert condition was triggered provides feedback to a user of the computer system indicating the current location associated with the user account at the moment the alert condition was triggered, rather than at the moment at which the alert was received. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, when the generated alert (e.g., 1112) is the first alert and the computer system (e.g., 1100A) is in communication with one or more input devices (e.g., 1102A), the computer system receives, via the one or more input devices, a subsequent request (e.g., 1144) (e.g., an input on a notification associated with the first or second alert; an input to view additional details for the first or second alert; an input to view additional details for alert conditions) to view information associated with the generated alert. In response to receiving the subsequent request, and after a second change (e.g., an update) in the current location associated with the user account is detected (e.g., by the computer system), the computer system performs the following steps. In accordance with a determination that the current location (e.g., the updated location after the second change in location is detected) associated with the user account does not have the first predefined relationship to the geographic location during the range of times (e.g., similar to 1110-1 in FIG. 11K), the computer system displays, via the display generation component, a second indication (e.g., an updated view of map 1116-2) of the current location associated with the user account (e.g., an indication of the location of the user account at the time the alert condition was initially triggered, an indication of the location of the user account after detecting the second change in location that does not have the first predefined relationship to the geographic location). In accordance with a determination that the current location (e.g., the updated location after detecting the second change in location) associated with the user account has the first predefined relationship to the geographic location during the range of times, forgoing displaying the second indication of the current location associated with the user account (e.g., see 1116 in FIG. 11P, where map 1116-2 is not displayed) (e.g., the indication of the current location associated with the user account is not displayed when the current location has the first predefined relationship to the geographic location). Displaying, or forgoing display of, the second indication of the current location associated with the user account, depending on whether the updated current location associated with the user account has the first predefined relationship to the geographic location during the range of times, provides feedback to a user of the computer system indicating whether or not the current location associated with the user account still has the first predefined relationship to the geographic location, without requiring the user to actively access or monitor the current location associated with the user account. Providing improved feedback and reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the second change in the current location is detected prior to receiving the subsequent request. In some embodiments, the second change in the current location is detected after receiving the subsequent request. In some embodiments, information for the generated alert includes an indication of the current location associated with the user account when the current location still meets the criteria that triggered the alert condition. For example, if the alert condition is triggered when the current location is not at an expected location during a range of times, the information for the generated alert will show the current location associated with the user account when the current location is not at the expected location during the range of times, and will not show the current location associated with the user account when the current location is at the expected location during the range of times.

In some embodiments, in response to the request (e.g., 1113) to view information associated with the generated alert (e.g., 1112) (e.g., the first alert or the second alert), the computer system (e.g., 1100A) displays, via the display generation component (e.g., 1102A), information associated with the generated alert (e.g., 1116) including the indication of the current location (e.g., 1116-2) associated with the user account when the alert condition was triggered. In some embodiments, a second generated alert (e.g., 1114) (e.g., the first alert or the second alert) displayed at a fourth computer system associated with the user account (e.g., 1100B) (e.g., the fourth computer system is assigned to, or registered with, the user account, the user account is logged into the fourth computer system) includes a second indication (e.g., 1118-2) (e.g., same as the indication displayed with the generated alert at the computer system) of the current location associated with the user account when the alert condition was triggered. Displaying information associated with the generated alert including the indication of the current location associated with the user account when the alert condition was triggered, wherein a second generated alert displayed at a fourth computer system associated with the user account includes a second indication of the current location associated with the user account when the alert condition was triggered, provides feedback to a user of the computer system about the current location associated with the user account at the time the alert condition was triggered, as opposed to when the alert was received, without requiring the user to actively access or monitor the location associated with the user account. Providing improved feedback, reducing the number of inputs at the computer system, and performing an operation when a set of conditions has been met without requiring further input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that the computer system is associated with the user account (e.g., the computer system is assigned to, or registered with, the user account; the user account is logged into the computer system), the computer system (e.g., 1100B) displays information (e.g., 1118) associated with the first or second alert including the indication (e.g., 1118-2) of the current location associated with the user account when the alert condition was triggered. In accordance with a determination that the computer system is associated with a third user account different from the user account (e.g., the computer system is associated with a third user account that is not the user account for which the current location is compared to the geographic location and the range of times), the computer system (e.g., 1100A) displays information (e.g., 1116) associated with the first or second alert including the indication (e.g., 1116-2) of the current location associated with the user account when the alert condition was triggered. In some embodiments, the first and/or second alert is generated at a computer system associated with the user account whose location is being tracked and at a computer system associated with the user account that is viewing/receiving/monitoring the location of the tracked user account. In such embodiments, a detailed view of the notification (at either of the respective computer systems) includes the current location of the tracked user account at the time the alert condition was triggered.

In some embodiments, the indication of the current location associated with the user account includes an indication (e.g., 1116-3; 1118-3) of the time at which the alert condition was triggered. In some embodiments, the indication includes a timestamp of when the alert condition was triggered as well as an indication of the current location associated with the user account at the time the alert condition was triggered. Displaying the indication of the current location associated with the user account including an indication of the time at which the alert condition was triggered automatically provides feedback information to a user of the computer system indicating the moment when the alert condition was triggered, rather than the moment at which the alert was received, which reduces the need for navigation through multiple user interface views to obtain the information, thereby reducing power usage by the computer system. Providing information automatically and reducing the number of inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1200 (e.g., FIG. 12) are also applicable in an analogous manner to the methods described above. For example, methods 700, 800, and 1000 optionally include one or more of the characteristics of the various methods described above with reference to method 1200. For example, various steps of method 1200 are performed after acceptance of the notification displayed in step 708 of method 700. As another example, subsequent notifications discussed in method 1200 can be displayed using one or more steps of method 800. As another example, the notifications discussed in method 1200 can be displayed using one or more steps of method 1000. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of location-related communications of electronic devices. The present disclosure contemplates that in some instances, this gathered data may include personal information data that uniquely identifies or can be used to contact or locate a specific person. Such personal information data can include demographic data, location-based data, telephone numbers, email addresses, twitter Ds, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to track locations of a user device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of tracking the location of an electronic device, the present technology can be configured to allow users to select to "opt in" or "opt out" of participation in the collection of personal information data during registration for services or anytime thereafter. In another example, users can select not to provide certain location data for specified timeframes. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   at a computer system that is in communication with a display generation component:
   while an alert condition that is triggered based on a comparison between a current location associated with a user account relative to a geographic location is active:
   displaying, via the display generation component, a user interface that includes:
   one or more representations of active alert conditions associated with the user account for generating one or more alerts indicating that the current location associated with the user account does not have a predefined relationship to the geographic location; and
   a first selectable user interface object that, when selected, transitions the computer system to a first mode that prevents alerts corresponding to one or more of the active alert conditions from being generated; and
   in response to a determination that the current location associated with the user account does not have a predefined relationship to the geographic location:
   in accordance with a determination that a set of alert criteria are met, the alert criteria including a criterion that is met when the computer system is not in the first mode, generating an alert indicating that the current location associated with the user account does not have the predefined relationship to the geographic location; and
   in accordance with a determination that the alert criteria are not met, forgoing generating an alert indicating that the current location associated with the user account does not have the predefined relationship to the geographic location.

2. The method of claim 1, wherein the computer system is in communication with one or more input devices and the user interface further includes a second selectable user interface object, the method further comprising:
   detecting, via the one or more input devices, a first set of one or more inputs that includes a selection of the second selectable user interface object; and
   in response to detecting the selection of the second selectable user interface object, displaying, via the display generation component, one or more selectable options for selecting a time for terminating the first mode.

3. The method of claim 1, wherein displaying the user interface that includes the one or more representations of active alert conditions associated with the user account includes:
   in accordance with a determination that the computer system is in the first mode, displaying an indication of a status of the first mode concurrently with the one or more representations of active alert conditions associated with the user account; and
   in accordance with a determination that the computer system is not in the first mode, forgoing displaying the indication of the status of the first mode.

4. The method of claim 1, wherein:
   the one or more representations of active alert conditions includes:
   a first representation of a first active alert condition associated with the user account for generating a first set of one or more alerts indicating that the current location associated with the user account does not have a first predefined relationship to a first geographic location; and
   a second representation of a second active alert condition associated with the user account for generating a second set of one or more alerts indicating that the current location associated with the user account does not have a second predefined relationship to a second geographic location;
   the first mode prevents the first set of one or more alerts corresponding to the first active alert condition from being generated; and
   the first mode prevents the second set of one or more alerts corresponding to the second active alert condition from being generated.

5. The method of claim 1, wherein the computer system is in communication with one or more input devices, the method further comprising:
   after generating the alert, receiving, via the one or more input devices, a request to display the user interface; and
   in response to receiving the request to display the user interface, displaying the user interface, wherein the user interface includes a notification corresponding to the alert.

6. The method of claim 1, wherein the computer system is in communication with one or more input devices, the method further comprising:
   receiving, via the one or more input devices, a request to display an account user interface; and
   in response to receiving the request to display the account user interface, displaying, via the display generation component, the account user interface including:
   a representation of a first user account authorized to share location data with the computer system, wherein:
   in accordance with a determination that the computer system is in a second mode that prevents alerts corresponding to one or more active alert conditions for the first user account from being generated, the representation of the first user account includes an indication that the computer system is in the second mode; and
   in accordance with a determination that the computer system is not in the second mode, the representation of the first user account does not include the indication that the computer system is in the second mode; and
   a representation of a second user account authorized to share location data with the computer system, wherein:
   in accordance with a determination that the computer system is in a third mode that prevents alerts corresponding to one or more active alert conditions for the second user account from being generated, the representation of the second user account includes an indication that the computer system is in the third mode; and in accordance with a determination that the computer system is not in the third mode, the representation of the second user account does not include the indication that the computer system is in the third mode.

7. The method of claim 1, wherein the first selectable user interface object includes a first setting that, when selected, transitions the computer system to the first mode, and a second setting that, when selected, transitions the computer system out of the first mode.

8. A non-transitory computer-readable storage medium storing one or more programs configured to be executed by one or more processors of a computer system that is in communication with a display generation component, the one or more programs including instructions for:
while an alert condition that is triggered based on a comparison between a current location associated with a user account relative to a geographic location is active:
displaying, via the display generation component, a user interface that includes:
one or more representations of active alert conditions associated with the user account for generating one or more alerts indicating that the current location associated with the user account does not have a predefined relationship to the geographic location; and
a first selectable user interface object that, when selected, transitions the computer system to a first mode that prevents alerts corresponding to one or more of the active alert conditions from being generated; and
in response to a determination that the current location associated with the user account does not have a predefined relationship to the geographic location:
in accordance with a determination that a set of alert criteria are met, the alert criteria including a criterion that is met when the computer system is not in the first mode, generating an alert indicating that the current location associated with the user account does not have the predefined relationship to the geographic location; and
in accordance with a determination that the alert criteria are not met, forgoing generating an alert indicating that the current location associated with the user account does not have the predefined relationship to the geographic location.

9. The non-transitory computer-readable storage medium of claim 8, wherein the computer system is in communication with one or more input devices and the user interface further includes a second selectable user interface object, the one or more programs further including instructions for:
detecting, via the one or more input devices, a first set of one or more inputs that includes a selection of the second selectable user interface object; and
in response to detecting the selection of the second selectable user interface object, displaying, via the display generation component, one or more selectable options for selecting a time for terminating the first mode.

10. The non-transitory computer-readable storage medium of claim 8, wherein displaying the user interface that includes the one or more representations of active alert conditions associated with the user account includes:
in accordance with a determination that the computer system is in the first mode, displaying an indication of a status of the first mode concurrently with the one or more representations of active alert conditions associated with the user account; and
in accordance with a determination that the computer system is not in the first mode, forgoing displaying the indication of the status of the first mode.

11. The non-transitory computer-readable storage medium of claim 8, wherein:
the one or more representations of active alert conditions includes:
a first representation of a first active alert condition associated with the user account for generating a first set of one or more alerts indicating that the current location associated with the user account does not have a first predefined relationship to a first geographic location; and
a second representation of a second active alert condition associated with the user account for generating a second set of one or more alerts indicating that the current location associated with the user account does not have a second predefined relationship to a second geographic location;
the first mode prevents the first set of one or more alerts corresponding to the first active alert condition from being generated; and
the first mode prevents the second set of one or more alerts corresponding to the second active alert condition from being generated.

12. The non-transitory computer-readable storage medium of claim 8, wherein the computer system is in communication with one or more input devices, the one or more programs further including instructions for:
after generating the alert, receiving, via the one or more input devices, a request to display the user interface; and
in response to receiving the request to display the user interface, displaying the user interface, wherein the user interface includes a notification corresponding to the alert.

13. The non-transitory computer-readable storage medium of claim 8, wherein the computer system is in communication with one or more input devices, the one or more programs further including instructions for:
receiving, via the one or more input devices, a request to display an account user interface; and
in response to receiving the request to display the account user interface, displaying, via the display generation component, the account user interface including:
a representation of a first user account authorized to share location data with the computer system, wherein:
in accordance with a determination that the computer system is in a second mode that prevents alerts corresponding to one or more active alert conditions for the first user account from being generated, the representation of the first user account includes an indication that the computer system is in the second mode; and
in accordance with a determination that the computer system is not in the second mode, the representation of the first user account does not include the indication that the computer system is in the second mode; and
a representation of a second user account authorized to share location data with the computer system, wherein:
in accordance with a determination that the computer system is in a third mode that prevents alerts corresponding to one or more active alert conditions for the second user account from being generated, the representation of the second user account includes an indication that the computer system is in the third mode; and in accordance with a determination that the computer system is not in the third mode, the representation of the second user account does not include the indication that the computer system is in the third mode.

14. The non-transitory computer-readable storage medium of claim 8, wherein the first selectable user interface object includes a first setting that, when selected, transitions the computer system to the first mode, and a second setting that, when selected, transitions the computer system out of the first mode.

15. A computer system, comprising:
a display generation component;
one or more processors; and
memory storing one or more programs configured to be executed by the one or more processors, the one or more programs including instructions for:
while an alert condition that is triggered based on a comparison between a current location associated with a user account relative to a geographic location is active:
displaying, via the display generation component, a user interface that includes:
one or more representations of active alert conditions associated with the user account for generating one or more alerts indicating that the current location associated with the user account does not have a predefined relationship to the geographic location; and
a first selectable user interface object that, when selected, transitions the computer system to a first mode that prevents alerts corresponding to one or more of the active alert conditions from being generated; and
in response to a determination that the current location associated with the user account does not have a predefined relationship to the geographic location:
in accordance with a determination that a set of alert criteria are met, the alert criteria including a criterion that is met when the computer system is not in the first mode, generating an alert indicating that the current location associated with the user account does not have the predefined relationship to the geographic location; and
in accordance with a determination that the alert criteria are not met, forgoing generating an alert indicating that the current location associated with the user account does not have the predefined relationship to the geographic location.

16. The computer system of claim 15, wherein the computer system is in communication with one or more input devices and the user interface further includes a second selectable user interface object, the one or more programs further including instructions for:
detecting, via the one or more input devices, a first set of one or more inputs that includes a selection of the second selectable user interface object; and
in response to detecting the selection of the second selectable user interface object, displaying, via the display generation component, one or more selectable options for selecting a time for terminating the first mode.

17. The computer system of claim 15, wherein displaying the user interface that includes the one or more representations of active alert conditions associated with the user account includes:
in accordance with a determination that the computer system is in the first mode, displaying an indication of a status of the first mode concurrently with the one or more representations of active alert conditions associated with the user account; and
in accordance with a determination that the computer system is not in the first mode, forgoing displaying the indication of the status of the first mode.

18. The computer system of claim 15, wherein:
the one or more representations of active alert conditions includes:
a first representation of a first active alert condition associated with the user account for generating a first set of one or more alerts indicating that the current location associated with the user account does not have a first predefined relationship to a first geographic location; and
a second representation of a second active alert condition associated with the user account for generating a second set of one or more alerts indicating that the current location associated with the user account does not have a second predefined relationship to a second geographic location;
the first mode prevents the first set of one or more alerts corresponding to the first active alert condition from being generated; and
the first mode prevents the second set of one or more alerts corresponding to the second active alert condition from being generated.

19. The computer system of claim 15, wherein the computer system is in communication with one or more input devices, the one or more programs further including instructions for:
after generating the alert, receiving, via the one or more input devices, a request to display the user interface; and
in response to receiving the request to display the user interface, displaying the user interface, wherein the user interface includes a notification corresponding to the alert.

20. The computer system of claim 15, wherein the computer system is in communication with one or more input devices, the one or more programs further including instructions for:
receiving, via the one or more input devices, a request to display an account user interface; and
in response to receiving the request to display the account user interface, displaying, via the display generation component, the account user interface including:
a representation of a first user account authorized to share location data with the computer system, wherein:
in accordance with a determination that the computer system is in a second mode that prevents alerts corresponding to one or more active alert conditions for the first user account from being generated, the representation of the first user account includes an indication that the computer system is in the second mode; and in accordance with a determination that the computer system is not in the second mode, the representation of the first user account does not include the indication that the computer system is in the second mode; and a representation of a second user account authorized to share location data with the computer system, wherein:

in accordance with a determination that the computer system is in a third mode that prevents alerts corresponding to one or more active alert conditions for the second user account from being generated, the representation of the second user account includes an indication that the computer system is in the third mode; and in accordance with a determination that the computer system is not in the third mode, the representation of the second user account does not include the indication that the computer system is in the third mode.

21. The computer system of claim 15, wherein the first selectable user interface object includes a first setting that, when selected, transitions the computer system to the first mode, and a second setting that, when selected, transitions the computer system out of the first mode.

\* \* \* \* \*